(12) United States Patent
Takashima

(10) Patent No.: US 8,290,146 B2
(45) Date of Patent: Oct. 16, 2012

(54) CIPHERTEXT GENERATING APPARATUS, CRYPTOGRAPHIC COMMUNICATION SYSTEM, AND GROUP PARAMETER GENERATING APPARATUS

(75) Inventor: Katsuyuki Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 663 days.

(21) Appl. No.: 12/523,827

(22) PCT Filed: Jan. 19, 2007

(86) PCT No.: PCT/JP2007/050766
§ 371 (c)(1),
(2), (4) Date: Aug. 12, 2009

(87) PCT Pub. No.: WO2008/087734
PCT Pub. Date: Jul. 24, 2008

(65) Prior Publication Data
US 2010/0104094 A1    Apr. 29, 2010

(51) Int. Cl.
*H04K 1/00* (2006.01)
*H04L 9/32* (2006.01)
(52) U.S. Cl. .......................................... 380/28; 713/168
(58) Field of Classification Search .................... 380/28; 713/168
See application file for complete search history.

(56) References Cited

U.S. PATENT DOCUMENTS

| 6,285,761 | B1 | 9/2001 | Patel et al. | |
|---|---|---|---|---|
| 7,724,898 | B2 * | 5/2010 | Naslund et al. | 380/30 |
| 2002/0041684 | A1 * | 4/2002 | Nishioka | 380/30 |
| 2002/0087814 | A1 | 7/2002 | Ripley et al. | |
| 2003/0182554 | A1 | 9/2003 | Gentry et al. | |
| 2005/0246533 | A1 * | 11/2005 | Gentry | 713/170 |
| 2006/0143456 | A1 | 6/2006 | Gentry et al. | |
| 2006/0143457 | A1 | 6/2006 | Gentry et al. | |
| 2006/0159259 | A1 * | 7/2006 | Gentry | 380/42 |

(Continued)

FOREIGN PATENT DOCUMENTS

JP    11 288214    10/1999

(Continued)

OTHER PUBLICATIONS

Gentry, C., "Pratical Identity-Based Encryption Without Random Oracles", Eurocrypt, pp. 445-464 (2006).

(Continued)

*Primary Examiner* — Techane Gergiso
(74) *Attorney, Agent, or Firm* — Oblon, Spivak, McClelland, Maier & Neustadt, L.L.P.

(57) ABSTRACT

The random number generating unit 222 randomly generates an integer s. The first ciphertext generating unit 241 generates a first ciphertext C1 by encrypting the plaintext M, based on the integer s. The second ciphertext generating unit 242 generates a second ciphertext C2, based on the integer s and a recipient ID. The third ciphertext generating unit 243 generates a third ciphertext C3, based on the integer s. The hash value calculation unit 244 calculates a hash value $H_0$ by combining the first ciphertext C1, the second ciphertext C2, and the third ciphertext C3. The fourth ciphertext generating unit 245 generates a fourth ciphertext C4, based on the hash value $H_0$. The ciphertext combining unit 246 generates a ciphertext C by combining the first ciphertext C1, the second ciphertext C2, the third ciphertext C3, and the fourth ciphertext C4. Thus, it is possible to provide an ID-based public key cryptographic communication system being secure even when transmitting ciphertexts generated by encrypting the same plaintext to a plurality of recipients.

15 Claims, 29 Drawing Sheets

U.S. PATENT DOCUMENTS

2007/0183600 A1    8/2007  Smart
2009/0034714 A9 *  2/2009  Boneh et al. ............... 380/28
2009/0285386 A1    11/2009 Takashima

FOREIGN PATENT DOCUMENTS

JP    2005 502975    1/2005
WO    2005 050908    6/2005

OTHER PUBLICATIONS

Barbosa, M., "Efficient Identity-Based Key Encapsulation to Multiple Parties", Cryptology Eprint Archive: Report 2005/217, Version: 20060105:122715, pp. 1-13 (2006).
Sakai, R., "Cryptosystems Based on Pairing Over Elliptic Curve", Symposium on Crytography and Information Security (SCIS 2001), pp. 369-373 (2001).
Boneh, D., "Identity-Based Encryption From the Well Pairing", CRYPTO 2001, pp. 213-229 (2001).
Boyen, X., "The $BB_1$ Identity-Based Cryptosystem: A Standard for Encryption and Key Encapsulation", Submission for IEEE, P1363.3, pp. 1-23 (2006).
Cheon, J.H., "Security Analysis of the Strong Diffle-Hellman Problem", Eurocrypt, pp. 1-13 (2006).
Bellare, M. et al., "Public-Key Encryption in a Multi-User Setting: Security Proofs and Improvements", Eurocrypt 2000, vol. 1807, pp. 1-25 (2000).
Bellare, M. et al., "Multi-Recipient Encryption Schemes: Security Notions and Randomness Re-Use", Public-Key Cryptography, vol. 2567, pp. 1-30 (2003).
Cramer, R., "Design and Analysis of Practical Public-Key Encryption Schemes Secure Against Adaptive Chosen Ciphertext Attack", Siam J. Computer, vol. 33, pp. 1-66 (2003).
Boneh, D. et al., "Efficient Selective-ID Secure Identity Based Encryption Without Random Oracles", Eurocrypt 2004, vol. 3027, pp. 1-20 (2004).
Waters, B., "Efficient Identity-Based Encryption Without Random Oracles", Eurocrypt, pp. 1-13 (2005).
Naccache, D., "Secure and Pratical Identity-Based Encryption", pp. 1-13 (2005).
Chatterjee, S. et al., "Trading Time for Space: Towards an Efficient IBE Scheme With Short(er) Public Parameters in the Standard Model", ICISC 2005, vol. 3935, pp. 424-440 (2006).
Smart, N.P., "Efficient Key Encapsulation to Multiple Parties", SCN 2004, vol. 3352, pp. 208-219 (2005).
Barbosa, M. et al., "Efficient Identity-Based Key Encapsulation to Multiple Parties", Cryptography and Coding, $10^{th}$ IMA Int. Cof. 2005, vol. 3796, Springer Verlog, pp. 1-13 (2005).
Baek, J. et al., "Efficient Multi-Receiver Identity-Based Encryption and Its Application to Broadcast Encryption", PKC 2005, vol. 3386, pp. 380-397 (2005).
Chatterjee, S. et al.,"Generalization of the Selective-ID Security Model for HIBE Protocols", PKC 2006, pp. 1-18 (2006).
Chatterjee, S. et al.,"Multi-Receiver Identity-Based Key Encapsulation With Shortened Ciphertext", Indocrypt 2006, vol. 4329, pp. 394-408 (2006).
Boyen, X. et al., "Direct Chosen Ciphertext Security From Identity-Based Techniques", ACM-CC 2005, pp. 1-25 (2005).
Extended Search Report issued May 2, 2012 in European Application No. 07713653.9.
Alexander W. Dent, "A Designers Guide to KEMs", Cryptography and Coding: $9^{TH}$ IMA International Conference LCNS, XP-002672693, 2003, 16 pages.
Ryuichi Sakai, et al., "Cryptosystem based on Pairing over Elliptic Curve", The 2001 Symposium on Cryptography and Information Security, Jan. 23-25, 2001, pp. 369-373, (with English translation).

* cited by examiner

Fig. 14

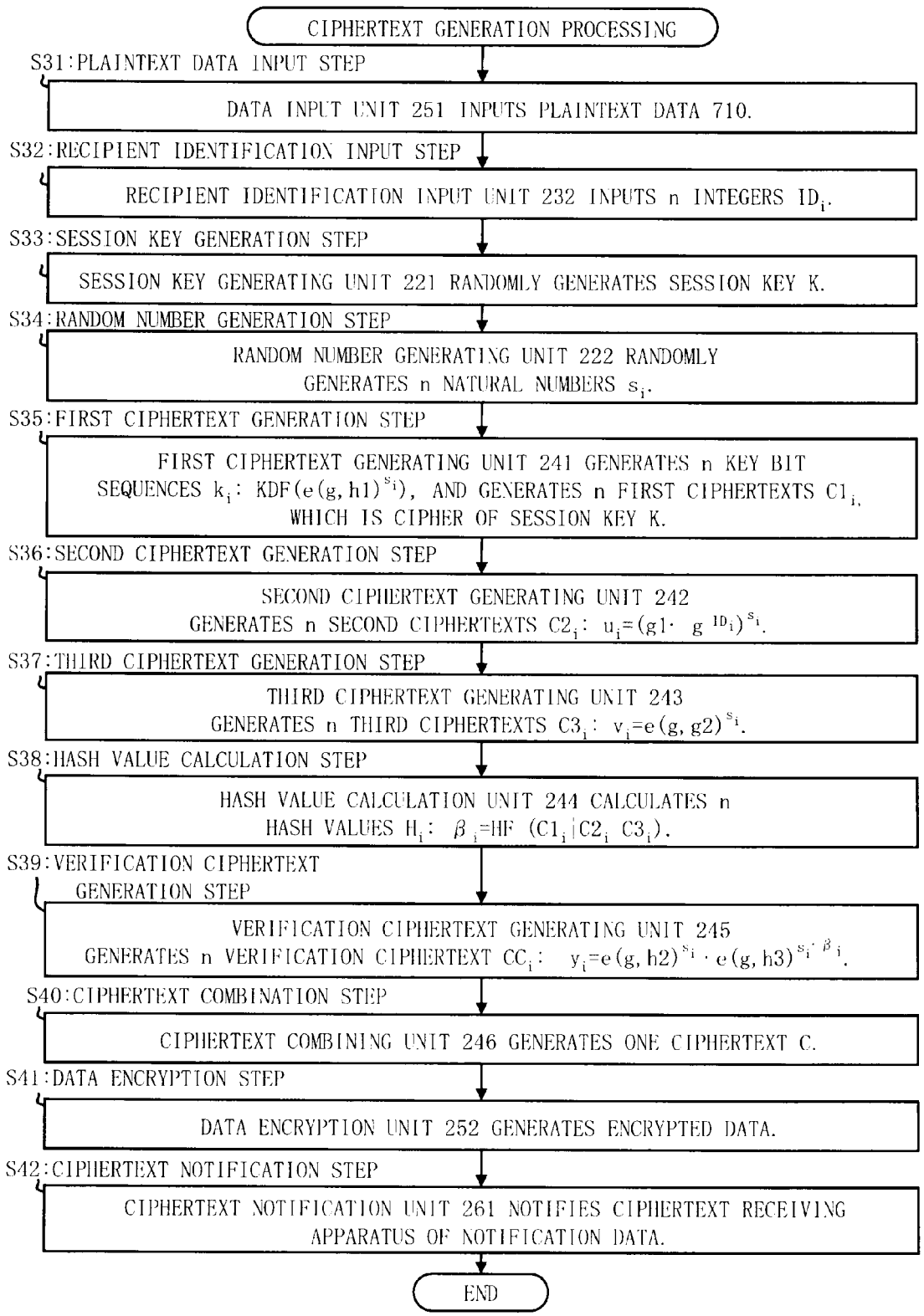

CIPHERTEXT GENERATION PROCESSING

S31: PLAINTEXT DATA INPUT STEP
DATA INPUT UNIT 251 INPUTS PLAINTEXT DATA 710.

S32: RECIPIENT IDENTIFICATION INPUT STEP
RECIPIENT IDENTIFICATION INPUT UNIT 232 INPUTS n INTEGERS $ID_i$.

S33: SESSION KEY GENERATION STEP
SESSION KEY GENERATING UNIT 221 RANDOMLY GENERATES SESSION KEY K.

S34: RANDOM NUMBER GENERATION STEP
RANDOM NUMBER GENERATING UNIT 222 RANDOMLY GENERATES n NATURAL NUMBERS $s_i$.

S35: FIRST CIPHERTEXT GENERATION STEP
FIRST CIPHERTEXT GENERATING UNIT 241 GENERATES n KEY BIT SEQUENCES $k_i$: $KDF(e(g,h1)^{s_i})$, AND GENERATES n FIRST CIPHERTEXTS $C1_i$, WHICH IS CIPHER OF SESSION KEY K.

S36: SECOND CIPHERTEXT GENERATION STEP
SECOND CIPHERTEXT GENERATING UNIT 242 GENERATES n SECOND CIPHERTEXTS $C2_i$: $u_i = (g1 \cdot g^{ID_i})^{s_i}$.

S37: THIRD CIPHERTEXT GENERATION STEP
THIRD CIPHERTEXT GENERATING UNIT 243 GENERATES n THIRD CIPHERTEXTS $C3_i$: $v_i = e(g, g2)^{s_i}$.

S38: HASH VALUE CALCULATION STEP
HASH VALUE CALCULATION UNIT 244 CALCULATES n HASH VALUES $H_i$: $\beta_i = HF(C1_i | C2_i | C3_i)$.

S39: VERIFICATION CIPHERTEXT GENERATION STEP
VERIFICATION CIPHERTEXT GENERATING UNIT 245 GENERATES n VERIFICATION CIPHERTEXT $CC_i$: $y_i = e(g, h2)^{s_i} \cdot e(g, h3)^{s_i \cdot \beta_i}$.

S40: CIPHERTEXT COMBINATION STEP
CIPHERTEXT COMBINING UNIT 246 GENERATES ONE CIPHERTEXT C.

S41: DATA ENCRYPTION STEP
DATA ENCRYPTION UNIT 252 GENERATES ENCRYPTED DATA.

S42: CIPHERTEXT NOTIFICATION STEP
CIPHERTEXT NOTIFICATION UNIT 261 NOTIFIES CIPHERTEXT RECEIVING APPARATUS OF NOTIFICATION DATA.

END

Fig. 21

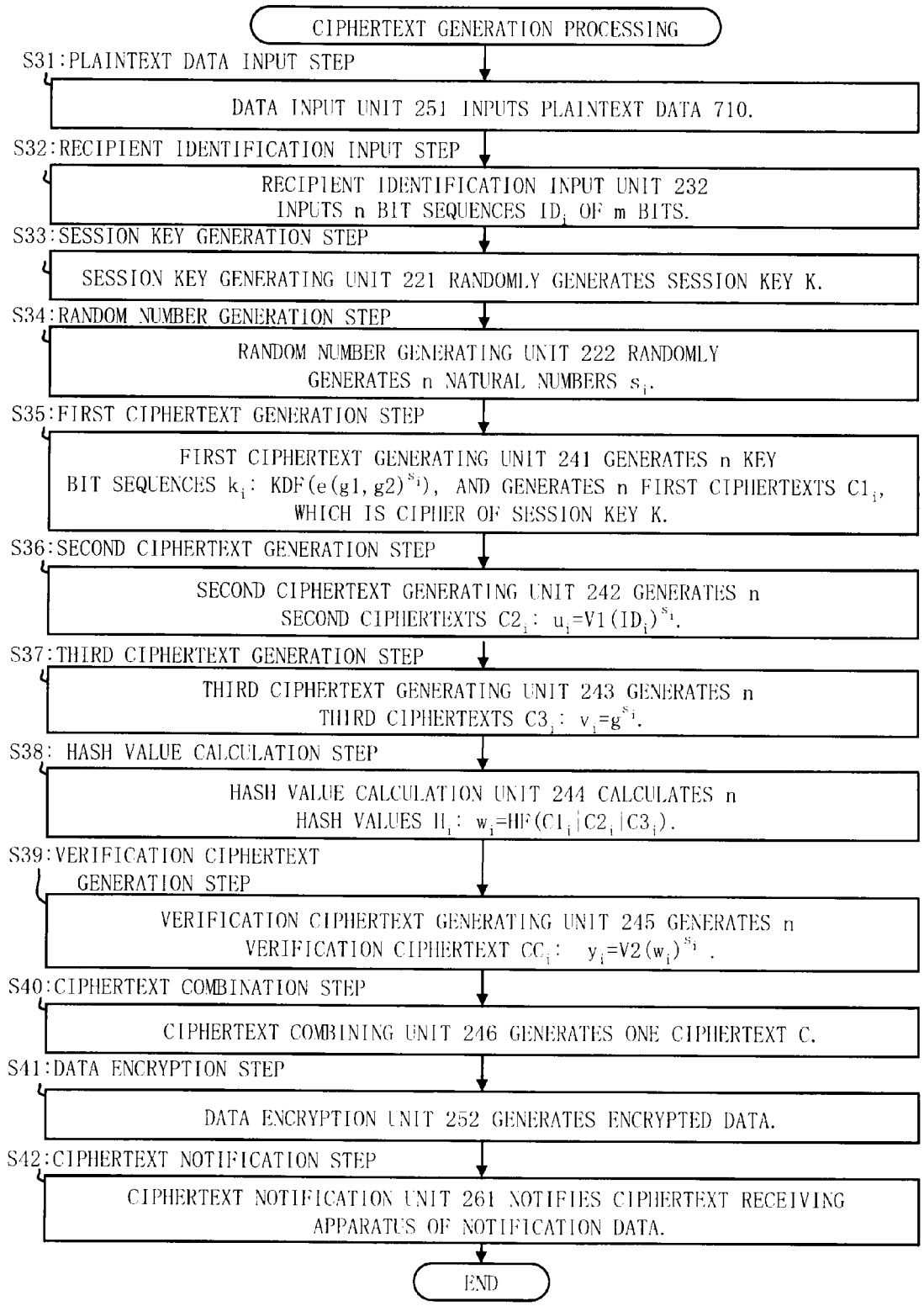

CIPHERTEXT GENERATION PROCESSING

S31: PLAINTEXT DATA INPUT STEP
- DATA INPUT UNIT 251 INPUTS PLAINTEXT DATA 710.

S32: RECIPIENT IDENTIFICATION INPUT STEP
- RECIPIENT IDENTIFICATION INPUT UNIT 232 INPUTS n BIT SEQUENCES $ID_i$ OF m BITS.

S33: SESSION KEY GENERATION STEP
- SESSION KEY GENERATING UNIT 221 RANDOMLY GENERATES SESSION KEY K.

S34: RANDOM NUMBER GENERATION STEP
- RANDOM NUMBER GENERATING UNIT 222 RANDOMLY GENERATES n NATURAL NUMBERS $s_i$.

S35: FIRST CIPHERTEXT GENERATION STEP
- FIRST CIPHERTEXT GENERATING UNIT 241 GENERATES n KEY BIT SEQUENCES $k_i$: $KDF(e(g1,g2)^{s_i})$, AND GENERATES n FIRST CIPHERTEXTS $C1_i$, WHICH IS CIPHER OF SESSION KEY K.

S36: SECOND CIPHERTEXT GENERATION STEP
- SECOND CIPHERTEXT GENERATING UNIT 242 GENERATES n SECOND CIPHERTEXTS $C2_i$: $u_i = V1(ID_i)^{s_i}$.

S37: THIRD CIPHERTEXT GENERATION STEP
- THIRD CIPHERTEXT GENERATING UNIT 243 GENERATES n THIRD CIPHERTEXTS $C3_i$: $v_i = g^{s_i}$.

S38: HASH VALUE CALCULATION STEP
- HASH VALUE CALCULATION UNIT 244 CALCULATES n HASH VALUES $H_i$: $w_i = HF(C1_i|C2_i|C3_i)$.

S39: VERIFICATION CIPHERTEXT GENERATION STEP
- VERIFICATION CIPHERTEXT GENERATING UNIT 245 GENERATES n VERIFICATION CIPHERTEXT $CC_i$: $y_i = V2(w_i)^{s_i}$.

S40: CIPHERTEXT COMBINATION STEP
- CIPHERTEXT COMBINING UNIT 246 GENERATES ONE CIPHERTEXT C.

S41: DATA ENCRYPTION STEP
- DATA ENCRYPTION UNIT 252 GENERATES ENCRYPTED DATA.

S42: CIPHERTEXT NOTIFICATION STEP
- CIPHERTEXT NOTIFICATION UNIT 261 NOTIFIES CIPHERTEXT RECEIVING APPARATUS OF NOTIFICATION DATA.

END

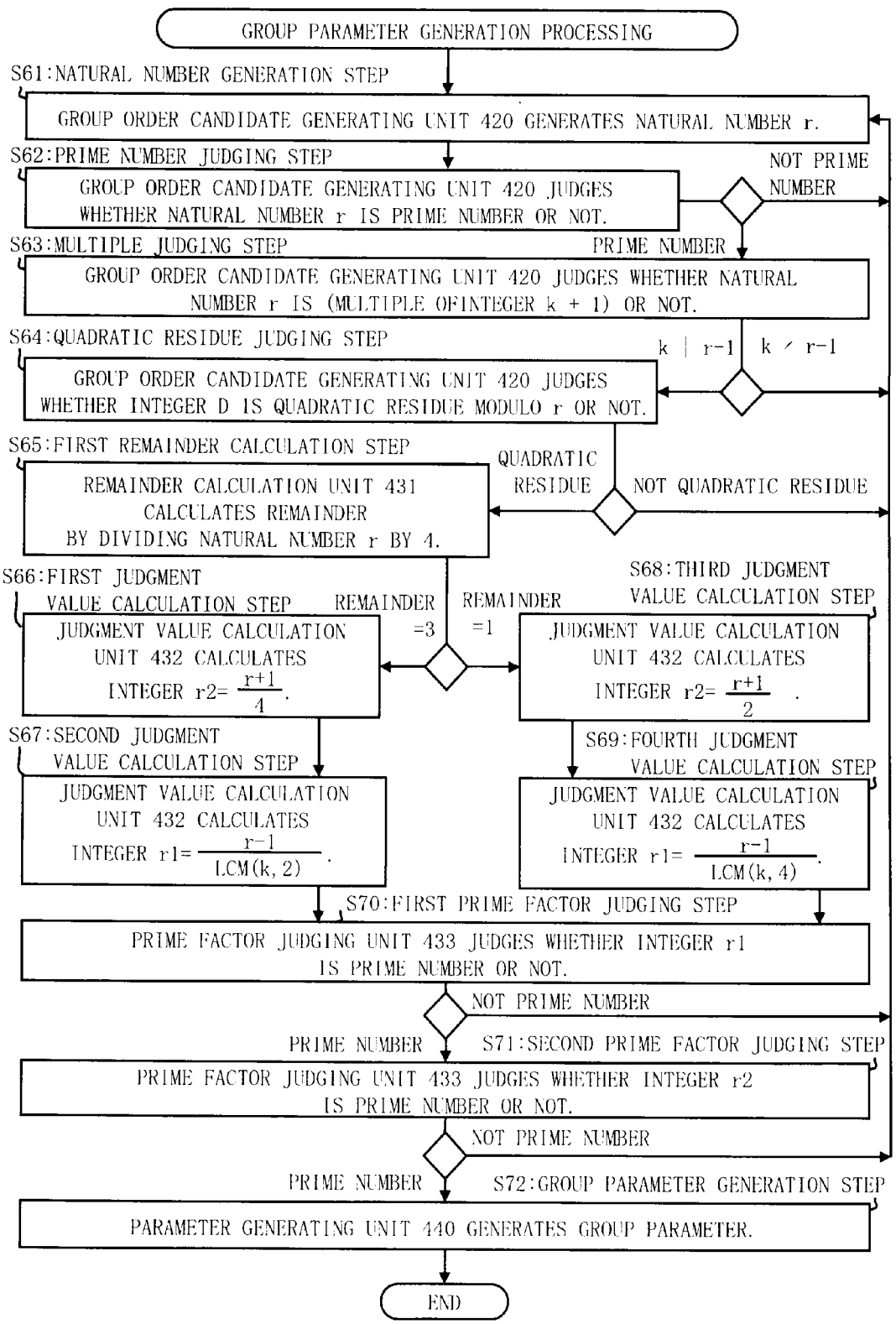

CIPHERTEXT GENERATING APPARATUS, CRYPTOGRAPHIC COMMUNICATION SYSTEM, AND GROUP PARAMETER GENERATING APPARATUS

TECHNICAL FIELD

The present invention relates to a cryptographic communication system employing an ID-based cryptographic communication system.

BACKGROUND ART

The public key cryptosystem realizes cryptographic communication decryptable only by a transmission party by transmitting data encrypted with a transmission party's public key so that it can be decrypted by the transmission party with a secret key paired with the public key.

Conventionally, in order to guarantee that a public key belongs to a transmission party, verification is performed on a public key certificate issued by a public key certification authority.

Moreover, in order to guarantee the correspondence between a public key and its owner even if there is no infrastructure like the public key certification authority, there has been proposed the ID-based cryptographic communication system using an identification name (ID), such as a transmission party's name, a name, and an equipment number, as the public key.

For guaranteeing the security of a public key cryptosystem, proving is performed by letting the security of a public key cryptosystem reduce to the difficulty of solving a mathematical problem.

That is, assuming that there is an attacker who can stochastically break the cipher, when an algorithm exists that can solve a mathematical problem by utilizing the attacker, it can be said that such cryptographic system is reduced to the mathematical problem.

In the proving, what is important is whether the reduced mathematical problem is good or bad, the reduction rate is good or bad, and the model is good or bad.

The goodness or badness of the reduced mathematical problem indicates the difficulty of solving the problem. It can be said that the public key cryptosystem reducible to a problem being difficult to solve has high security by that much.

The goodness or badness of the reduction rate indicates a relation between the resources (time, memory, etc.) exploited by the attacker in order to break a cipher and the resources exploited in order to solve a mathematical problem by utilizing the attacker. If there is not so much difference between the resources required for breaking the cipher and the resources required for solving the mathematical problem, it can be said that the reduction rate is good. In this case, if it is possible to break the cipher, it means it is possible to solve the mathematical problem. Contrapositively, if it is difficult to solve the mathematical problem, to break the cipher is as difficult as the solving. On the other hand, when the reduction rate is bad, that is, when the resources required for solving the mathematical problem are very large in comparison with the resources required for breaking the cipher, even if it is difficult to solve the mathematical problem, to break the cipher is not necessarily as difficult as the solving.

The goodness or badness of the model indicates whether the model being a premise of the proving is practical or not. For example, a model without using a random oracle is better than a model assuming a random oracle.

[Patent Literature 1] International Publication No. 2005-050908

[Non-patent Literature 1] Ryuichi SAKAI, Kiyoshi OHGISHI, and Masao KASAHARA, "Cryptosystems based on Pairing over Elliptic Curve" Symposium on Cryptography and Information Security (SCIS 2001), 2001

[Non-patent Literature 2] Dan Boneh, and Matt Franklin, "Identity-Based Encryption from the Weil Pairing", Crypto 2001, LNCS 2139, pp. 213-229, 2001

[Non-patent Literature 3] Xavier Boyen, "The BB1 Identity-Based Cryptosystem: A Standard for Encryption and Key Encapsulation", Submissions for IEEE P1363.3, 2006 (http://grouper.ieee.org/groups/1363/IBC/submissions/index.html)

[Non-patent Literature 4] Craig Gentry, "Practical Identity-Based Encryption Without Random Oracles", Eurocrypt 2006, LNCS 4004, pp. 445-464, 2006

[Non-patent Literature 5] Jung Hee Cheon, "Security Analysis of the Strong Diffie-Hellman Problem", Eurocrypt 2006, pp. 1-13, 2006

[Non-patent Literature 6] Mihir Bellare, Alexandra Boldyreva, and Silvio Micali, "Public-key Encryption in a Multi-User Setting: Security Proofs and Improvements", Eurocrypt 2000, LNCS1807, 2000 (http://www-cse.ucsd.edu/users/mihir/crypto-research-papers.html)

[Non-patent Literature 7] Mihir Bellare, Alexandra Boldyreva, and Jessica Staddon, "Multi-Recipient Encryption Schemes: Security Notions and Randomness Re-Use", PKC 2003, LNCS 2567, 2003 (http://www-cse.used.edu/users.mihir/crypto-research-papers.html)

[Non-patent Literature 8] Ronald Cramer, and Victor Shoup, "Design and Analysis of Practical Public-Key Encryption Schemes Secure against Adaptive Chosen Ciphertext Attack", SIAM. J. Comput, vol. 33, 2003

[Non-patent Literature 9] Dan Boneh, and Xavier Boyen, "Efficient Selective-ID Secure Identity Based Encryption Without Random Oracles", Eurocrypt 2004, LNCS 3027, pp. 223-238, 2004 (http://crypto.stanford.edu/~dabo/)

[Non-patent Literature 10] Brent Waters, "Efficient Identity-Based Encryption Without Random Oracles", Eurocrypt 2005 (http://www.csl.sri.com/users/bwaters/publications/publications.html)

[Non-patent Literature 11] David Naccache, "Secure and Practical Identity-Based Encryption" (http://eprint.iacr.org/2005/369)

[Non-patent Literature 12] Sanjit Chatterjee, and Palash Sarkar, "Trading Time for Space: Towards an Efficient IBE Scheme with Short(er) Public Parameters in the Standard Model", ICISC 2005, LNCS 3935, pp. 424-440, 2006

[Non-patent Literature 13] N. P. Smart, "Efficient Key Encapsulation to Multiple Parties", SCN 2004, LNCS 3352, pp. 208-219, 2005

[Non-patent Literature 14] M. Barbosa, and P. Farshim, "Efficient Identity-Based Key Encapsulation to Multiple Parties", Cryptography and Coding, 10th IMA Int. Cof. 2005, LNCS 3796, Springer Verlog, pp. 428-441, 2005

[Non-patent Literature 15] Joonsang Baek, Reihaneh Safavi-Naini, and Willy Susilo, "Efficient Multi-receiver Identity-Based Encryption and Its Application to Broadcast Encryption", PKC 2005, LNCS 3386, pp. 380-397, 2005

[Non-patent Literature 16] Sanjit Chatterjee, and Palash Sarkar, "Generalization of the Selective-ID Security Model for HIBE Protocols", PKC 2006, 2006

[Non-patent Literature 17] Sanjit Chatterjee, and Palash Sarkar, "Multi-receiver Identity-Based Key Encapsulation with ShortenedCiphertext", Indocrypt2006, LNCS 4329, pp. 394-408, 2006

[Non-patent Literature 18] Xavier Boyen, Qixiang Mei, and Brent Waters, "Direct Chosen Ciphertext Security from Identity-Based Techniques" ACM-CC 2005, pp. 320-329, 2005

SUMMARY OF INVENTION

Technical Problem

As a method for utilizing cryptography, ciphertexts generated by encrypting the same plaintext are transmitted to multiple different recipients.

Since it takes time to perform encryption processing in the public key cryptosystem, usually, a session key is encrypted and transmitted to a recipient, and data to be transmitted is encrypted with the transmitted session key, based on the common key cryptosystem that can quickly perform encryption processing.

In the public key cryptosystem, a plurality of ciphertexts are generated by encrypting a plaintext (session key) with a public key of each recipient, and the generated plurality of ciphertexts are united in one to be transmitted by e-mail, data broadcasting, etc.

In the conventional public key cryptosystem, the security in the case of transmitting to such multiple recipients has been discussed. However, in the ID-based cryptosystem, the security in the case of such multiple recipients has not been sufficiently discussed yet.

Moreover, in the case of a large number of recipients, since it takes much time even to perform encryption processing for the session keys, the efficiency of the processing needs to be enhanced.

The present invention has been developed, for example, to solve the problem as described above and aims to provide an ID-based cryptosystem capable of performing encryption processing with a small amount of resources and performing high-speed processing in the multiple-recipient environment where the same plaintext is encrypted to be transmitted to multiple recipients.

Solution to Problem

A ciphertext generating apparatus according to the present invention, which generates a ciphertext C to notify n recipient (n being an integer greater than or equal to 1) of a plaintext M, comprises:

a storage device for storing information; a processing device for processing information; an encryption parameter storage unit; a recipient identification input unit; a plaintext input unit; a ciphertext body generating unit; a hash value calculation unit; a ciphertext verification text generating unit; and a ciphertext combining unit, wherein the encryption parameter storage unit stores a public encryption parameter by using the storage device, the recipient identification input unit inputs n recipient identification information $ID_i$ (i being an integer greater than or equal to 1 and less than or equal to n) for identifying the n recipient respectively, by using the processing device, the plaintext input unit inputs the plaintext M by using the processing device, the ciphertext body generating unit generates n ciphertext body $CB_i$ (i being an integer greater than or equal to 1 and less than or equal to n) corresponding to the n recipient, based on the public encryption parameter stored by the encryption parameter storage unit, the n recipient identification information $ID_i$ input by the recipient identification input unit, and the plaintext M input by the plaintext input unit, by using the processing device, the hash value calculation unit generates a combined ciphertext by combining the n ciphertext body $CB_i$ generated by the ciphertext body generating unit, by using the processing device, and calculates a hash value H based on the combined ciphertext generated, by using the processing device, the ciphertext verification text generating unit generates a ciphertext verification text CC, based on the public encryption parameter stored by the encryption parameter storage unit and the hash value H calculated by the hash value calculation unit, by using the processing device, and the ciphertext combining unit makes one ciphertext C by combining the n ciphertext body $CB_i$ generated by the ciphertext body generating unit and the ciphertext verification text CC generated by the ciphertext verification text generating unit, by using the processing device.

The ciphertext generating apparatus according to the present invention further comprises a random number generating unit, wherein the random number generating unit randomly generates n integer $s_i$ (i being an integer greater than or equal to 1 and less than or equal to n) corresponding to the n recipient, by using the processing device, the ciphertext body generating unit includes a first ciphertext generating unit, a second ciphertext generating unit, and a third ciphertext generating unit, the first ciphertext generating unit generates n first ciphertext $C1_i$ (i being an integer greater than or equal to 1 and less than or equal to n) corresponding to the n recipient, based on the public encryption parameter stored by the encryption parameter storage unit, the plaintext M input by the plaintext input unit, and the n integer $s_i$ generated by the random number generating unit, by using the processing device, the second ciphertext generating unit generates n second ciphertext $C2_i$ (i being an integer greater than or equal to 1 and less than or equal to n) corresponding to the n recipient, based on the public encryption parameter stored by the encryption parameter storage unit, the n recipient identification information $ID_i$ input by the recipient identification input unit, and the n integer $s_i$ generated by the random number generating unit, by using the processing device, the third ciphertext generating unit generates n third ciphertext $C3_i$ (i being an integer greater than or equal to 1 and less than or equal to n) corresponding to the n recipient, based on the public encryption parameter stored by the encryption parameter storage unit and then integer $s_i$ generated by the random number generating unit, by using the processing device, the n first ciphertext $C1_i$ generated by the first ciphertext generating unit, the n second ciphertext $C2_i$ generated by the second ciphertext generating unit, and the n third ciphertext $C3_i$ generated by the third ciphertext generating unit are treated as the n ciphertext body $CB_i$ corresponding to the n recipient, the hash value calculation unit makes one combined ciphertext by combining the n first ciphertext $C1_i$ generated by the first ciphertext generating unit, the n second ciphertext $C2_i$ generated by the second ciphertext generating unit, and the n third ciphertext $C3_i$ generated by the third ciphertext generating unit, by using the processing device, and calculates one hash value H based on the one combined ciphertext by using the processing device, the ciphertext verification text generating unit generates n ciphertext verification text $CC_i$ (i being an integer greater than or equal to 1 and less than or equal to n) corresponding to the n recipient, based on the public encryption parameter stored by the encryption parameter storage unit, the n integer $s_i$ generated by the random number generating unit, and the one hash value H calculated by the hash value calculation unit, by using the processing device, and the ciphertext combining unit makes the one ciphertext C by combining the n first ciphertext $C1_i$ generated by the first ciphertext generating unit, the n second ciphertext $C2_i$ generated by the second ciphertext generating unit, the n third ciphertext $C3_i$ generated by the third ciphertext generating unit, and the n ciphertext verification text $CC_i$ generated by the ciphertext verification text generating unit, by using the processing device.

The ciphertext generating apparatus according to the present invention further has the following features:

the encryption parameter storage unit stores information, as public encryption parameters, indicating a natural number r, a multiplicative group G1 whose order is the natural number r, a multiplicative group G2 whose order is the natural number r, a multiplicative group GT whose order is the natural number r, a pairing e for calculating an element of the multiplicative group GT from an element of the multiplicative group G1 and an element of the multiplicative group G2, a key generation function KDF for calculating a bit sequence of predetermined length from the element of the multiplicative group GT, a hash function HF for calculating a natural number being less than the natural number r from a bit sequence of arbitrary length, an element g of the multiplicative group G1, an element g1 of the multiplicative group G1, an element g2 of the multiplicative group G2, an element h1 of the multiplicative group G2, an element h2 of the multiplicative group G2, and an element h3 of the multiplicative group G2, by using the storage device, the recipient identification input unit inputs n integer $ID_i$ as n recipient identification information, by using the processing device, the random number generating unit randomly generates the n integer $s_i$, being greater than or equal to 1 and less than the natural number r, (i being an integer greater than or equal to 1 and less than or equal to n) corresponding to the n recipient, based on the natural number r indicated by the public encryption parameter stored by the encryption parameter storage unit, by using the processing device, the first ciphertext generating unit calculates n key bit sequence $k_i$=KDF ($e(g, h1)\hat{}s_i$) (i being an integer greater than or equal to 1 and less than or equal to n) corresponding to the n recipient, based on the element g of the multiplicative group G1, the element h1 of the multiplicative group G2, the pairing e, and the key generation function KDF indicated by the public encryption parameters stored by the encryption parameter storage unit, and the n integer $s_i$ generated by the random number generating unit, by using the processing device, and generates the n first ciphertext $C1_i$ (i being an integer greater than or equal to 1 and less than or equal to n) corresponding to the n recipient by respectively encrypting the plaintext M input by the plaintext input unit, with the n key bit sequence $k_i$ calculated, by using the processing device, the second ciphertext generating unit calculates n element $u_i=(g1 \cdot g\hat{}-ID_i)\hat{}s_i$ (i being an integer greater than or equal to 1 and less than or equal to n) of the multiplicative group G1 corresponding to the n recipient, based on the element g of the multiplicative group G1 and the element g1 of the multiplicative group G1 indicated by the public encryption parameters stored by the encryption parameter storage unit, the n integer $ID_i$ input by the recipient identification input unit, and the n integer $s_i$ generated by the random number generating unit, and treats each bit sequence, indicating each calculated n element $u_i$ of the multiplicative group G1, as the n second ciphertext $C2_i$ (i being an integer greater than or equal to 1 and less than or equal to n) corresponding to the n recipient, by using the processing device, the third ciphertext generating unit calculates n element $v_i=e(g, g2)\hat{}s_i$ (i being an integer greater than or equal to 1 and less than or equal to n) of the multiplicative group GT corresponding to the n recipient, based on the element g of the multiplicative group G1, the element g2 of the multiplicative group G2, and the pairing e indicated by the public encryption parameters stored by the encryption parameter storage unit and the n integer $s_i$ generated by the random number generating unit, and treats each bit sequence, indicating each calculated element $v_i$ of the multiplicative group GT, as the n third ciphertext $C3_i$ (i being an integer greater than or equal to 1 and less than or equal to n) corresponding to the n recipient, by using the processing device, the hash value calculation unit calculates one natural number $\beta_0$ to be treated as the hash value H, based on the hash function HF indicated by the public encryption parameter stored by the encryption parameter storage unit, by using the processing device, and the ciphertext verification text generating unit calculates n element $y_i=e(g, h2)\hat{}s_i \cdot e(g, h3)\hat{}(s_i \cdot \beta_0)$ (i being an integer greater than or equal to 1 and less than or equal to n) of the multiplicative group GT corresponding to the n recipient, based on the element g of the multiplicative group G1, the element h2 of the multiplicative group G2, the element h3 of the multiplicative group G2, and the pairing e indicated by the public encryption parameter stored by the encryption parameter storage unit, the n integer $s_i$ generated by the random number generating unit, and the one natural number $\beta_0$ calculated by the hash value calculation unit, and treats each bit sequence, indicating each calculated n element $y_i$ of the multiplicative group GT, as the n ciphertext verification text $CC_i$ (i being an integer greater than or equal to 1 and less than or equal to n) corresponding to the n recipient, by using the processing device.

The ciphertext generating apparatus according to the present invention further has the following features:

the encryption parameter storage unit stores information indicating, as public encryption parameters, a natural number r, a multiplicative group G1 whose order is the natural number r, a multiplicative group G2 whose order is the natural number r, a multiplicative group GT whose order is the natural number r, a pairing e for calculating an element of the multiplicative group GT from an element of the multiplicative group G1 and an element of the multiplicative group G2, a key generation function KDF for calculating a bit sequence of predetermined length from an element of the multiplicative group GT, two functions V1 and V2 for calculating an element of the multiplicative group GT from a bit sequence of predetermined length, a hash function HF for calculating a bit sequence of predetermined length from a bit sequence of arbitrary length, an element g of the multiplicative group G1, an element g1 of the multiplicative group G1, and an element g2 of the multiplicative group G2, by using the storage device, the recipient identification input unit inputs n bit sequence $ID_i$ of predetermined length, as n recipient identification information, by using the processing device, the random number generating unit randomly generates the n integer $s_i$, being greater than or equal to 1 and less than the natural number r, (i being an integer greater than or equal to 1 and less than or equal to n) corresponding to the n recipient, based on the natural number r indicated by the public encryption parameter stored by the encryption parameter storage unit, by using the processing device, the first ciphertext generating unit calculates n key bit sequence $k_i$=KDF $(e(g1, g2)^{s_i})$ (i being an integer greater than or equal to 1 and less than or equal to n) corresponding to the n recipient, based on the element g1 of the multiplicative group G1, the element g2 of the multiplicative group G2, the pairing e and the key generation function KDF indicated by the public encryption parameters stored by the encryption parameter storage unit, and the n integer $s_i$ generated by the random number generating unit, by using the processing device, and generates the n first ciphertext $C1_i$ (i being an integer greater than or equal to 1 and less than or equal to n) corresponding to the n recipient by respectively encrypting the plaintext M input by the plaintext input unit, with the n key bit sequence $k_i$ calculated, by using the processing device, the second ciphertext generating unit calculates n element $u_i$=V1 $(ID_i)^{s_i}$ (i being an integer greater than or equal to 1 and less than or equal to n) of the multiplicative group G2 corresponding to the n recipient, based on the function V1 indicated by the public encryption parameter stored by the encryption parameter storage unit, the n integer $s_i$ generated by the random number generating unit, and the n bit sequence $ID_i$ of predetermined length input by the recipient identification input unit, and treats each bit sequence, indicating each calculated n element $u_i$ of the multiplicative group G2, as the n second ciphertext $C2_i$ (i being an integer greater than or equal to 1 and less than or equal to n) corresponding to the n recipient, by using the processing device, the third ciphertext generating unit calculates n element $v_i$=$g^{s_i}$ (i being an integer greater than or equal to 1 and less than or equal to n) of the multiplicative group G1 corresponding to the n recipient, based on the element g of the multiplicative group G1 indicated by the public encryption parameter stored by the encryption parameter storage unit and the n integer $s_i$ generated by the random number generating unit, and treats each bit sequence, indicating each calculated n element $v_i$ of the multiplicative group G1, as the n third ciphertext $C3_i$ (i being an integer greater than or equal to 1 and less than or equal to n) corresponding to the n recipient, by using the processing device, the hash value calculation unit calculates one bit sequence $w_0$ of predetermined length to be treated as the hash value H, based on the hash function HF indicated by the public encryption parameter stored by the encryption parameter storage unit, by using the processing device, and the ciphertext verification text generating unit calculates n element $y_i$=V2$(w_0)^{s_i}$ (i being an integer greater than or equal to 1 and less than or equal to n) of the multiplicative group G2 corresponding to the n recipient, based on the function V2 indicated by the public encryption parameter stored by the encryption parameter storage unit, the n integer $s_i$ generated by the random number generating unit, and the one bit sequence $w_0$ of predetermined length calculated by the hash value calculation unit, and treats each bit sequence, indicating each calculated n element $y_i$ of the multiplicative group G2, as the n ciphertext verification text $CC_i$ (i being an integer greater than or equal to 1 and less than or equal to n) corresponding to the n recipient, by using the processing unit.

The ciphertext generating apparatus according to the present invention further has the following features:

the encryption parameter storage unit stores information indicating m1 element $h_\xi$ ($\xi$ being an integer greater than or equal to 1 and less than or equal to m1) of the multiplicative group G2 and two elements h1' and h2' of the multiplicative group G2, as information indicating the two functions V1 and V2, by using the storage device, the second ciphertext generating unit separates each of the n bit sequence $ID_i$ of predetermined length input by the recipient identification input unit into m1 bit sequence $v_{i\xi}$ ($\xi$ being an integer greater than or equal to 1 and less than or equal to m1) of predetermined length, treats separated m1 bit sequence $v_{i\xi}$ of predetermined length as m1 integer, by using the processing device, and calculates an element V1$(ID_i)$= h1'·$\Pi(h_\xi{}^{\wedge}v_{i\xi})$ ($\xi$ being an integer greater than or equal to 1 and less than or equal to m1) of the multiplicative group G2, which is a value of the function V1, based on the m1 element h of the multiplicative group G2 and the element h1' of the multiplicative group G2 indicated by the public encryption parameters stored by the encryption parameter storage unit, and the m1 integer y, separated, by using the processing device, and the ciphertext verification text generating unit separates a bit sequence w of predetermined length calculated by the hash value calculation unit into m1 bit sequence $v_\xi$ ($\xi$ being an integer greater than or equal to 1 and less than or equal to m1) of predetermined length, treats separated m1 bit sequence $v_\xi$ of predetermined length as m1 integer, by using the processing device, and calculates an element V2(w)=h2'·$\Pi(h_\xi{}^{\wedge}v_\xi)$ ($\xi$ being an integer greater than or equal to 1 and less than or equal to m1) of the multiplicative group G2, which is a value of the function V2, based on the m1 element $h_\xi$ ($\xi$ being an integer greater than or equal to 1 and less than or equal to m1) of the multiplicative group G2 and the element h2' of the multiplicative group G2 indicated by the public encryption parameters stored by the encryption parameter storage unit and the m1 integer $v_\xi$ separated, by using the processing device.

The ciphertext generating apparatus according to the present invention further has a feature that the ciphertext body generating unit generates n ciphertext body $CB_i$ including n recipient identification information $ID_i$, which has been input by the recipient identification input unit, by using the processing device.

The ciphertext generating apparatus according to the present invention further comprises a ciphertext notification unit, wherein the ciphertext notification unit notifies the n recipient identified by the n recipient identification information $ID_i$ input by the recipient identification input unit, of one ciphertext C combined by the ciphertext combining unit, by using the processing device.

The ciphertext generating apparatus according to the present invention further comprises a session key generating unit, wherein the session key generating unit randomly generates a bit sequence of predetermined length, as a session key K, by using the processing device, and the plaintext input unit inputs the session key K generated by the session key generating unit, as the plaintext M, by using the processing device.

The ciphertext generating apparatus according to the present invention further comprises a data input unit; a data encryption unit; and a ciphertext notification unit, wherein the data input unit inputs one plaintext data to be transmitted to the n recipient, by using the processing device, the data encryption unit generates one encrypted data by encrypting the one plaintext data input by the data input unit, with the session key K generated by the session key generating unit, by using the processing device, and the ciphertext notification unit notifies the n recipient identified by the n recipient identification information $ID_i$ input by the recipient identification input unit of the one ciphertext C combined by the ciphertext combining unit and the one encrypted data encrypted by the data encryption unit, by using the processing device.

A cryptographic communication system according to the present invention, which notifies n recipient (n being an integer greater than or equal to 1), each having a corresponding ciphertext receiving apparatus, of a plaintext M through one ciphertext C, the system comprises:

an encryption parameter generating apparatus; a ciphertext generating apparatus; and a plurality of ciphertext receiving apparatuses wherein the encryption parameter generating apparatus includes a storage device for storing information, a processing device for processing information, a secret information generating unit, a secret information storage unit, a public parameter generating unit, a public parameter publishing unit, an identification information input unit, a secret key generating unit, and a secret key notification unit, the secret information generating unit randomly generates secret information by using the processing device, the secret information storage unit stores the secret information generated by the secret information generating unit, by using the storage device, the public parameter generating unit generates a public encryption parameter, based on the secret information generated by the secret information generating unit, by using the processing device, the public parameter publishing unit publishes the public encryption parameter generated by the public parameter generating unit, by using the processing device, the identification information input unit inputs recipient identification information ID for identifying one recipient corresponding to one ciphertext receiving apparatus among the plurality of ciphertext receiving apparatuses, by using the processing device, the secret key generating unit generates a secret key $d_{ID}$ corresponding to the one recipient, based on the secret information stored by the secret information storage unit, the public encryption parameter generated by the public parameter generating unit, and the recipient identification information ID input by the identification information input unit, by using the processing device, the secret key notification unit secretly notifies the one ciphertext receiving apparatus corresponding to the one recipient of the secret key $d_{ID}$ generated by the secret key generating unit, by using the processing device, wherein the ciphertext generating apparatus includes a storage device for storing information, a processing device for processing information, an encryption parameter storage unit, a recipient identification input unit, a plaintext input unit, a ciphertext body generating unit, a hash value calculation unit, a ciphertext verification text generating unit, a ciphertext combining unit, and a ciphertext notification unit, the encryption parameter storage unit stores the public encryption parameter published by the encryption parameter generating apparatus, by using the storage device, the recipient identification input unit inputs n recipient identification information $ID_i$ (i being an integer greater than or equal to 1 and less than or equal to n) for respectively identifying the n recipient, by using the processing device, the plaintext input unit inputs the plaintext M by using the processing device, the ciphertext body generating unit generates n ciphertext body $CB_i$ (i being an integer greater than or equal to 1 and less than or equal to n) corresponding to the n recipient, based on the public encryption parameter stored by the encryption parameter storage unit, the n recipient identification information $ID_i$ input by the recipient identification input unit, and the plaintext M input by the plaintext input unit, by using the processing device, the hash value calculation unit generates a combined ciphertext by combining the n ciphertext body $CB_i$ generated by the ciphertext body generating unit, by using the processing device, and calculates a hash value H based on the combined ciphertext generated, by using the processing device, the ciphertext verification text generating unit generates a ciphertext verification text CC, based on the public encryption parameter stored by the encryption parameter storage unit and the hash value H calculated by the hash value calculation unit, by using the processing device, the ciphertext combining unit makes one ciphertext C by combining the n ciphertext body $CB_i$ generated by the ciphertext body generating unit and the ciphertext verification text CC generated by the ciphertext verification text generating unit, by using the processing device, the ciphertext notification unit notifies n ciphertext receiving apparatus corresponding to the n recipient of the one ciphertext C combined by the ciphertext combining unit, by using the processing device, wherein each of the plurality of ciphertext receiving apparatuses includes a storage device for storing information, a processing device for processing information, a public parameter storage unit, a secret key storage unit, a ciphertext receiving unit, a ciphertext decomposition unit, a verification hash value calculation unit, a ciphertext verification unit, and a ciphertext decryption unit, the public parameter storage unit stores the public encryption parameter published by the encryption parameter generating apparatus, by using the storage device, the secret key storage unit stores the secret key $d_{ID}$ notified by the encryption parameter generating apparatus, by using the storage device, the ciphertext receiving unit receives the one ciphertext C notified by the ciphertext generating apparatus, by using the processing device, the ciphertext decomposition unit acquires the n ciphertext body $CB_i$ and the ciphertext verification text CC, based on the one ciphertext C received by the ciphertext receiving unit, by using the processing device, the verification hash value calculation unit calculates a verification hash value H', based on a combined verification ciphertext made by combining the n ciphertext body $CB_i$ acquired by the ciphertext decomposition unit, by using the processing device, the ciphertext verification unit judges whether the one ciphertext C received by the ciphertext receiving unit has consistency or not, based on the public encryption parameter stored by the public parameter storage unit, one corresponding ciphertext body $CB_{ID}$ corresponding to a recipient corresponding to a ciphertext receiving apparatus among the n ciphertext body $CB_i$ acquired by the ciphertext decomposition unit, the ciphertext verification text CC, and the verification hash value H' calculated by the verification hash value calculation unit, by using the processing device, and when the ciphertext verification unit judges that the one ciphertext C received by the ciphertext receiving unit has consistency, the ciphertext decryption unit restores the plaintext M, based on the public encryption parameter stored by the public parameter storage unit, the secret key $d_{ID}$ stored by the secret key storage unit, and the one corresponding ciphertext body $CB_{ID}$ corresponding to the recipient corresponding to the ciphertext receiving apparatus among the n ciphertext body $CB_i$ acquired by the ciphertext decomposition unit, by using the processing device.

The cryptographic communication system according to the present invention further has the following features:

the ciphertext generating apparatus further includes a random number generating unit, the random number generating unit randomly generates n integer $s_i$ (i being an integer greater than or equal to 1 and less than or equal to n) corresponding to the n recipient, by using the processing device, the ciphertext body generating unit includes a first ciphertext generating unit, a second ciphertext generating unit, and a third ciphertext generating unit, the first ciphertext generating unit generates n first ciphertext $C1_i$ (i being an integer greater than or equal to 1 and less than or equal to n) corresponding to the n recipient, based on the public encryption parameter stored by the encryption parameter storage unit, the plaintext M input by the plaintext input unit, and the n integer $s_i$ generated by the random number generating unit, by using the processing device, the second ciphertext generating unit generates n second ciphertext $C2_i$ (i being an integer greater than or equal to 1 and less than or equal to n) corresponding to the n recipient, based on the public encryption parameter stored by the encryption parameter storage unit, the n recipient identification information $ID_i$ input by the recipient identification input unit, and the n integer $s_i$ generated by the random number generating unit, by using the processing device, the third ciphertext generating unit generates n third ciphertext $C3_i$ (i being an integer greater than or equal to 1 and less than or equal to n) corresponding to the n recipient, based on the public encryption parameter stored by the encryption parameter storage unit, and the n integer $s_i$ generated by the random number generating unit, by using the processing device, the n first ciphertext $C1_i$ generated by the first ciphertext generating unit, the n second ciphertext $C2_i$ generated by the second ciphertext generating unit, and the n third ciphertext $C3_i$ generated by the third ciphertext generating unit are treated as the n ciphertext body $CB_i$ corresponding to the n recipient, the hash value calculation unit makes one combined ciphertext by combining the n first ciphertext $C1_i$ generated by the first ciphertext generating unit, the n second ciphertext $C2_i$ generated by the second ciphertext generating unit, and the n third ciphertext $C3_i$ generated by the third ciphertext generating unit, by using the processing device, and calculates one hash value H, based on the one combined ciphertext, by using the processing device, the ciphertext verification text generating unit generates n ciphertext verification text $CC_i$ (i being an integer greater than or equal to 1 and less than or equal to n) corresponding to the n recipient, based on the public encryption parameter stored by the encryption parameter storage unit, the n integer $s_i$ generated by the random number generating unit, and the one hash value H calculated by the hash value calculation unit, by using the processing device, the ciphertext combining unit makes the one ciphertext C by combining the n first ciphertext $C1_i$ generated by the first ciphertext generating unit, the n second ciphertext $C2_i$ generated by the second ciphertext generating unit, the n third ciphertext $C3_i$ generated by the third ciphertext generating unit, and the n ciphertext verification text $CC_i$ generated by the ciphertext verification text generating unit, by using the processing device, the ciphertext decomposition unit acquires the n first ciphertext $C1_i$, the n second ciphertext $C2_i$, the n third ciphertext $C3_i$, and the n ciphertext verification text $CC_i$, based on the one ciphertext C received by the ciphertext receiving unit, by using the processing device, and acquires one corresponding first ciphertext $C1_{ID}$, one corresponding second ciphertext $C2_{ID}$, one corresponding third ciphertext $C3_{ID}$, and one corresponding ciphertext verification text $CC_{ID}$ which are corresponding to the recipient corresponding to the ciphertext receiving apparatus, among the n first ciphertext $C1_i$, the n second ciphertext $C2_i$, the n third ciphertext $C3_i$, and the n ciphertext verification text $CC_i$ which have been acquired, by using the processing device, the verification hash value calculation unit calculates the verification hash value H', based on the combined verification ciphertext made by combining the n first ciphertext $C1_i$, the n second ciphertext $C2_i$, and the n third ciphertext $C3_i$ acquired by the ciphertext decomposition unit, by using the processing device, the ciphertext verification unit judges whether the one ciphertext C received by the ciphertext receiving unit has consistency or not, based on the public encryption parameter stored by the public parameter storage unit, at least either one of the one corresponding second ciphertext $C2_{ID}$ and the one corresponding third ciphertext $C3_{ID}$, and the one corresponding ciphertext verification text $CC_{ID}$ which have been acquired by the ciphertext decomposition unit, and the verification hash value H' calculated by the verification hash value calculation unit, by using the processing device, and when the ciphertext verification unit judges that the one ciphertext C received by the ciphertext receiving unit has consistency, the ciphertext decryption unit restores the plaintext M, based on the public encryption parameter stored by the public parameter storage unit, the secret key $d_{ID}$ stored by the secret key storage unit, and the one corresponding first ciphertext $C1_{ID}$, the one corresponding second ciphertext $C2_{ID}$ and the one corresponding third ciphertext $C3_{ID}$ acquired by the ciphertext decomposition unit, by using the processing device.

The cryptographic communication system according to the present invention further has the following features:

the encryption parameter generating apparatus further includes a group parameter storage unit, the group parameter storage unit stores information, as group parameters, indicating a natural number r, a multiplicative group G1 whose order is the natural number r, a multiplicative group G2 whose order is the natural number r, a multiplicative group GT whose order is the natural number r, and a pairing e for calculating an element of the multiplicative group GT from an element of the multiplicative group G1 and an element of the multiplicative group G2, by using the storage device, the secret information generating unit randomly generates an integer $\alpha$ being greater than or equal to 1 and less than the natural number r, based on the natural number r indicated by the group parameter stored by the group parameter storage unit, by using the processing device, the secret information storage unit stores information indicating the integer $\alpha$ generated by the secret information generating unit, as secret information, by using the storage device, the public parameter generating unit determines a key generation function KDF for calculating a bit sequence of predetermined length from an element of the multiplicative group GT, and a hash function HF for calculating a natural number being less than the natural number r from a bit sequence of arbitrary length, by using the processing device, randomly selects an element g of the multiplicative group G1, an element g2 of the multiplicative group G2, an element h1 of the multiplicative group G2, an element h2 of the multiplicative group G2, and an element h3 of the multiplicative group G2, based on the multiplicative group G1 and the multiplicative group G2 indicated by the group parameter stored by the group parameter storage unit, by using the processing device, calculates an element $g1=g^\alpha$ of the multiplicative group G1, based on the integer $\alpha$ indicated by the secret information generated by the secret information generating unit and a selected element g of the multiplicative group G1, by using the processing device, and treats information indicating the group parameter stored by the group parameter storage unit, determined key generation function KDF and hash function HF, selected element g of the multiplicative group G1, element g2 of the multiplicative group G2, element h1 of the multiplicative group G2, element h2 of the multiplicative group G2, and element h3 of the multiplicative group G2, and a calculated element g1 of the multiplicative group G1, as public encryption parameters, the identification information input unit inputs an integer ID, as recipient identification information, by using the processing device, the secret key generating unit randomly generates an integer $r_{ID,1}$ being greater than or equal to 1 and less than the natural number r, an integer $r_{ID,2}$ being greater than or equal to 1 and less than the natural number r, and an integer $r_{ID,3}$ being greater than or equal to 1 and less than the natural number r, based on the natural number r indicated by the public encryption parameter generated by the public parameter generating unit, by using the processing device, calculates an element $h_{ID,1}=(h1 \cdot g2^{(-r_{ID,1})})^{(1/(\alpha-ID))}$ of the multiplicative group G2, an element $h_{ID,2}=(h2 \cdot g2^{(-r_{ID,2})})^{(1/(\alpha-ID))}$ of the multiplicative group G2, and an element $h_{ID,3}=(h3 \cdot g2^{(-r_{ID,3})})^{(1/(\alpha-ID))}$ of the multiplicative group G2, based on the element g2 of the multiplicative group G2, the element h1 of the multiplicative group G2, the element h2 of the multiplicative group G2, and the element h3 of the multiplicative group G2 indicated by the public encryption parameters generated by the public parameter generating unit, the integer $\alpha$ stored by the secret information storage unit, the integer ID input by the identification information input unit, and generated integer $r_{ID,1}$, integer $r_{ID,2}$ and integer $r_{ID,3}$, by using the processing device, and treats information indicating the generated integer $r_{ID,1}$, integer $r_{ID,2}$ and integer $r_{ID,3}$ and calculated element $h_{ID,1}$ of the multiplicative group G2, element $h_{ID,2}$ of the multiplicative group G2, and element $h_{ID,3}$ of the multiplicative group G2, as the secret key $d_{ID}$, the recipient identification input unit inputs n integer $ID_i$, as n recipient identification information, by using the processing device, the random number generating unit randomly generates the n integer $s_i$, being greater than or equal to 1 and less than the natural number r, (i being an integer greater than or equal to 1 and less than or equal to n) corresponding to the n recipient, based on the natural number r indicated by the public encryption parameter stored by the encryption parameter storage unit, by using the processing device, the first ciphertext generating unit calculates n key bit sequence $k_i=KDF(e(g,h1)^{s_i})$ (i being an integer greater than or equal to 1 and less than or equal to n) corresponding to the n recipient, based on the element g of the multiplicative group G1, the element h1 of the multiplicative group G2, the pairing e, and the key generation function KDF indicated by the public encryption parameters stored by the encryption parameter storage unit, and the n integer $s_i$ generated by the random number generating unit, by using the processing device, and generates then first ciphertext $C1_i$ (i being an integer greater than or equal to 1 and less than or equal to n) corresponding to the n recipient by respectively encrypting the plaintext M input by the plaintext input unit, with the n key bit sequence $k_i$ calculated, by using the processing device, the second ciphertext generating unit calculates n element $u_i=(g1 \cdot g^{-ID_i})^{s_i}$ (i being an integer greater than or equal to 1 and less than or equal to n) of the multiplicative group G1 corresponding to the n recipient, based on the element g of the multiplicative group G1 and the element g1 of the multiplicative group G1 indicated by the public encryption parameters stored by the encryption parameter storage unit, the n integer $ID_i$ input by the recipient identification input unit, and the n integer $s_i$ generated by the random number generating unit, and treats each bit sequence, indicating each calculated n element $u_i$ of the multiplicative group G1, as the n second ciphertext $C2_i$ (i being an integer greater than or equal to 1 and less than or equal to n) corresponding to the n recipient, by using the processing device, the third ciphertext generating unit calculates n element $v_i=e(g, g2)^{s_i}$ (i being an integer greater than or equal to 1 and less than or equal to n) of the multiplicative group GT corresponding to the n recipient, based on the element g of the multiplicative group G1, the element g2 of the multiplicative group G2, and the pairing e indicated by the public encryption parameters stored by the encryption parameter storage unit and the n integer $s_i$ generated by the random number generating unit, and treats each bit sequence, indicating each calculated n element $v_i$ of the multiplicative group GT, as the n third ciphertext C3 corresponding to the n recipient, by using the processing device, the hash value calculation unit calculates one natural number $\beta_0$ to be treated as the hash value H, based on the hash function HF indicated by the public encryption parameter stored by the encryption parameter storage unit, by using the processing device, the ciphertext verification text generating unit calculates n element $y_i=e(g, h2)^{s_i} \cdot e(g, h3)^{(s_i \cdot \beta_0)}$ (i being an integer greater than or equal to 1 and less than or equal to n) of the multiplicative group GT corresponding to the n recipient, based on the element g of the multiplicative group G1, the element h2 of the multiplicative group G2, the element h3 of the multiplicative group G2, and the pairing e indicated by the public encryption parameters stored by the encryption parameter storage unit, the n integer $s_i$ generated by the random number generating unit, and the one natural number $\beta_0$ calculated by the hash value calculation unit, and treats each bit sequence, indicating each calculated element $y_i$ of the multiplicative group GT, as the n ciphertext verification text $CC_i$ (i being an integer greater than or equal to 1 and less than or equal to n) corresponding to the n recipient, by using the processing device, the verification hash value calculation unit calculates a natural number $\beta'$ to be treated as the verification hash value H', based on the hash function HF indicated by the public encryption parameter stored by the public parameter storage unit, by using the processing device, the ciphertext verification unit, calculates an element $y'=e(u_{ID}, h_{ID,2} \cdot h_{ID,3}^{\beta'}) \cdot v_{ID}^{(r_{ID,2}+r_{ID,3} \cdot \beta')}$ of the multiplicative group GT, based on the pairing e indicated by the public encryption parameter stored by the public parameter storage unit, the integer $r_{ID,2}$ the integer $r_{ID,3}$, the element $h_{ID,2}$ of the multiplicative group G2, and the element $h_{ID,3}$ of the multiplicative group G2 indicated by the secret key $d_{ID}$ stored by the secret key storage unit, an element $u_{ID}$ of the multiplicative group G1 indicated by the one corresponding second ciphertext $C2_{ID}$ and an element $v_{ID}$ of the multiplicative group GT indicated by the one corresponding third ciphertext $C3_{ID}$ acquired by the ciphertext decomposition unit, and the natural number β' calculated by the verification hash value calculation unit, by using the processing device, compares a calculated element y' of the multiplicative group GT with an element $y_{ID}$ of the multiplicative group GT indicated by the corresponding ciphertext verification text $CC_{ID}$ acquired by the ciphertext decomposition unit, by using the processing device, and when the element y' of the multiplicative group GT accords with the element $y_{ID}$ of the multiplicative group GT, judges that the one ciphertext C received by the ciphertext receiving unit has consistency, and when the ciphertext verification unit judges that the one ciphertext C received by the ciphertext receiving unit has consistency, the ciphertext decryption unit calculates a key bit sequence k'=KDF(e($u_{ID}$,$h_{ID,1}$)·$v_{ID}$^$r_{ID,1}$), based on the pairing e and the key generation function KDF indicated by the public encryption parameters stored by the public parameter storage unit, the integer $r_{ID,1}$ and the element $h_{ID,1}$ of the multiplicative group G2 indicated by the secret key $d_{ID}$ stored by the secret key storage unit, the element $u_{ID}$ of the multiplicative group G1 indicated by the one corresponding second ciphertext $C2_{ID}$, and the element $v_{ID}$ of the multiplicative group G2 indicated by the corresponding third ciphertext $C3_{ID}$ acquired by the ciphertext decomposition unit, by using the processing device, and restores the plaintext M by decrypting the corresponding first ciphertext $C1_{ID}$ acquired by the ciphertext decomposition unit, with the key bit sequence k' calculated, by using the processing device.

The cryptographic communication system according to the present invention further comprises a group parameter generating apparatus, wherein the group parameter generating apparatus includes a processing device for processing information, a group order candidate generating unit, a group order security judging unit, and a parameter generating unit, the group order candidate generating unit generates a prime number r as a group order candidate by using the processing device, the group order security judging unit calculates a factor of (r−1) being a difference between the prime number r and 1, and a factor of (r+1) being a sum of the prime number r and 1, based on the prime number r generated by the group order candidate generating unit, by using the processing device, and judges whether the prime number r generated by the group order candidate generating unit is a secure group order or not, based on a calculated factor of (r−1) and a calculated factor of (r+1), by using the processing device, when the group order security judging unit judges that the prime number r generated by the group order candidate generating unit is a secure group order, the parameter generating unit calculates a multiplicative group whose group order is the prime number r, based on the prime number r generated by the group order candidate generating unit, by using the processing device, and generates a group parameter including information indicating the multiplicative group calculated, by using the processing device, and the group parameter storage unit stores the group parameter generated by the group parameter generating apparatus, by using the storage device.

The cryptographic communication system according to the present invention further has the following features:

the group order candidate generating unit generates the prime number r by adding 1 to a multiple of a predetermined integer k, as the group order candidate, by using the processing device, the group order security judging unit includes a remainder calculation unit, a judgment value calculation unit, and a prime factor judging unit, the remainder calculation unit calculates a remainder by dividing the prime number r by 4, based on the prime number r generated by the group order candidate generating unit, by using the processing device, when the remainder calculated by the remainder calculation unit is 1, the judgment value calculation unit calculates an integer r1=(r−1)/LCM(k,4), which is a quotient obtained by dividing the difference (r−1) between the prime number r and 1 by a least common multiple LCM(k,4) of an integer k and 4, based on the predetermined integer k and the prime number r generated by the group order candidate generating unit, by using the processing device, and calculates an integer r2=(r+1)/2, which is a quotient obtained by dividing the sum (r+1) of the prime number r and 1 by 2, based on the prime number r generated by the group order candidate generating unit, by using the processing device, and when the remainder calculated by the remainder calculation unit is 3, the judgment value calculation unit calculates an integer r1=(r−1)/LCM(k,2), which is a quotient obtained by dividing the difference (r−1) between the prime number r and 1 by a least common multiple LCM (k,2) of the integer k and 2, based on the predetermined integer k and the prime number r generated by the group order candidate generating unit, by using the processing device, and calculates an integer r2=(r+1)/4, which is a quotient obtained by dividing the sum (r+1) of the prime number r and 1 by 4, based on the prime number r generated by the group order candidate generating unit, by using the processing device, and the prime factor judging unit judges whether the integer r1 has a prime factor less than a predetermined integer B1 or not, based on the integer r1 calculated by the judgment value calculation unit, by using the processing device, and judges whether the integer r2 has a prime factor less than a predetermined integer B2 or not, based on the integer r2 calculated by the judgment value calculation unit, by using the processing device, and when it is judged that the integer r1 has a prime factor less than the predetermined integer B1 and when it is judged that the integer r2 has a prime factor less than the predetermined integer B2, the prime factor judging unit judges that the prime number r generated by the group order candidate generating unit is not a secure group order.

The cryptographic communication system according to the present invention further has the following features:

the group order candidate generating unit generates the prime number r by adding 1 to a multiple of a predetermined integer k, as a group order candidate, by using the processing device, the group order security judging unit includes a remainder calculation unit, a judgment value calculation unit, and a prime factor judging unit, the remainder calculation unit calculates a remainder by dividing the prime number r by 4, based on the prime number r generated by the group order candidate generating unit, by using the processing device, when the remainder calculated by the remainder calculation unit is 1, the judgment value calculation unit calculates an integer r1=(r−1)/LCM(k,4), which is a quotient obtained by dividing the difference (r−1) between the prime number r and 1 by a least common multiple LCM(k,4) of an integer k and 4, based on the predetermined integer k and the prime number r generated by the group order candidate generating unit, by using the processing device, and calculates an integer r2=(r+1)/2, which is a quotient obtained by dividing the sum (r+1) of the prime number r and 1 by 2, based on the prime number r generated by the group order candidate generating unit, by using the processing device, and when the remainder calculated by the remainder calculation unit is 3, the judgment value calculation unit calculates an integer $r1=(r-1)/\text{LCM}(k,2)$, which is a quotient obtained by dividing the difference $(r-1)$ between the prime number r and 1 by a least common multiple LCM $(k,2)$ of the integer k and 2, based on the predetermined integer k and the prime number r generated by the group order candidate generating unit, by using the processing device, and calculates an integer $r2=(r+1)/4$, which is a quotient obtained by dividing the sum $(r+1)$ of the prime number r and 1 by 4, based on the prime number r generated by the group order candidate generating unit, by using the processing device, and the prime factor judging unit judges whether the integer r1 is a prime number or not, based on the integer r1 calculated by the judgment value calculation unit, by using the processing device, and judges whether the integer r2 is a prime number or not, based on the integer r2 calculated by the judgment value calculation unit, by using the processing device, and when it is judged that the integer r1 is not a prime number and when it is judged that the integer r2 is not a prime number, the prime factor judging unit judges that the prime number r generated by the group order candidate generating unit is not a secure group order.

The cryptographic communication system according to the present invention further has the following features:

the encryption parameter generating apparatus further includes a group parameter storage unit, the group parameter storage unit stores information, as group parameters, indicating a natural number r, a multiplicative group G1 whose order is the natural number r, a multiplicative group G2 whose order is the natural number r, a multiplicative group GT whose order is the natural number r, and a pairing e for calculating an element of the multiplicative group GT from an element of the multiplicative group G1 and an element of the multiplicative group G2, by using the storage device, the secret information generating unit randomly generates an integer $\alpha$ being greater than or equal to 1 and less than the natural number r, based on the natural number r indicated by the group parameter stored by the group parameter storage unit, by using the processing device, the public parameter generating unit determines a key generation function KDF for calculating a bit sequence of predetermined length from an element of the multiplicative group GT, two functions V1 and V2 for calculating an element of the multiplicative group GT from a bit sequence of predetermined length, and a hash function HF for calculating a bit sequence of predetermined length from a bit sequence of arbitrary length, by using the processing device, randomly selects an element g of the multiplicative group G1 and an element g2 of the multiplicative group G2, based on the multiplicative group G1 and the multiplicative group G2 indicated by the group parameters stored by the group parameter storage unit, by using the processing device, calculates an element $g1=g^\alpha$ of the multiplicative group G1, based on the integer $\alpha$ generated by the secret information generating unit and a selected element g of the multiplicative group G1, by using the processing device, and treats information indicating the group parameter stored by the group parameter storage unit, and determined key generation function KDF, two functions V1 and V2, and hash function HF, selected element g of the multiplicative group G1 and element g2 of the multiplicative group G2, and a calculated element g1 of the multiplicative group G1, as public encryption parameters, by using the processing device, the secret information generating unit further calculates an element $msk=g2^\alpha$ of the multiplicative group G2, based on the integer $\alpha$ generated and the element g2 of the multiplicative group G2 selected by the public parameter generating unit, by using the processing device, the secret information storage unit stores information indicating the element msk of the multiplicative group G2 calculated by the secret information generating unit, as secret information, by using the storage device, the identification information input unit inputs a bit sequence ID of predetermined length, as recipient identification information, by using the processing device, the secret key generating unit randomly generates an integer $r_{ID}$ being greater than or equal to 1 and less than the natural number r, based on the natural number r indicated by the public encryption parameter generated by the public parameter generating unit, by using the processing device, and calculates an element $d0_{ID}=msk \cdot V1\,(ID)^{\wedge} r_{ID}$ of the multiplicative group G2 and an element $d1_{ID}=g^{\wedge} r_{ID}$ of the multiplicative group G1, based on the element g of the multiplicative group G1 and the function V1 indicated by the public encryption parameters generated by the public parameter generating unit, the element msk of the multiplicative group G2 indicated by the secret information stored by the secret information storage unit, and the integer $r_{ID}$ generated, and treats information indicating calculated element $d0_{ID}$ of the multiplicative group G2 and element $d1_{ID}$, of the multiplicative group G1, as the secret key $d_{ID}$, by using the processing device, the recipient identification input unit inputs n bit sequence $ID_i$ of predetermined length, as n recipient identification information, by using the processing device, the random number generating unit randomly generates the n integer $s_i$, which is greater than or equal to 1 and less than the natural number r, (i being an integer greater than or equal to 1 and less than or equal to n) corresponding to the n recipient, based on the natural number r indicated by the public encryption parameter stored by the encryption parameter storage unit, by using the processing device, the first ciphertext generating unit calculates n key bit sequence $k_i=\text{KDF}(e(g1,g2)^{\wedge} s_i)$ (i being an integer greater than or equal to 1 and less than or equal to n) corresponding to the n recipient, based on the element g1 of the multiplicative group G1, the element g2 of the multiplicative group G2, the pairing e and the key generation function KDF indicated by the public encryption parameters stored by the encryption parameter storage unit, and the n integer $s_i$ generated by the random number generating unit, by using the processing device, and generates the n first ciphertext $C1_i$ (i being an integer greater than or equal to 1 and less than or equal to n) corresponding to the n recipient by respectively encrypting the plaintext M input by the plaintext input unit, with the n key bit sequence $k_i$ calculated, by using the processing device, the second ciphertext generating unit calculates n element $u_i=V1\,(ID_i)^{\wedge} s_i$ (i being an integer greater than or equal to 1 and less than or equal to n) of the multiplicative group G2 corresponding to the n recipient, based on the function V1 indicated by the public encryption parameter stored by the encryption parameter storage unit, the n bit sequence $ID_i$ of predetermined length input by the recipient identification input unit, and the n integer $s_i$ (i being an integer greater than or equal to 1 and less than or equal to n) generated by the random number generating unit by using the processing device, and treats each bit sequence, indicating each calculated n element $u_i$ of the multiplicative group G2, as the n second ciphertext $C2_i$ (i being an integer greater than or equal to 1 and less than or equal to n) corresponding to the n recipient, the third ciphertext generating unit calculates n element $v_i = g\hat{\ }s_i$ being an integer greater than or equal to 1 and less than or equal to n) of the multiplicative group G1 corresponding to the n recipient, based on the element g of the multiplicative group G1 indicated by the public encryption parameter stored by the encryption parameter storage unit and the n integer $s_i$ generated by the random number generating unit, and treats each bit sequence, indicating each calculated n element $v_i$ of the multiplicative group G1, as the n third ciphertext $C3_i$ (i being an integer greater than or equal to 1 and less than or equal to n) corresponding to the n recipient, by using the processing device, the hash value calculation unit calculates one bit sequence $w_0$ of predetermined length to be treated as the hash value H, based on the hash function HF indicated by the public encryption parameter stored by the encryption parameter storage unit, by using the processing device, the ciphertext verification text generating unit calculates n element $y_i = V2(w_0)\hat{\ }s_i$ (i being an integer greater than or equal to 1 and less than or equal to n) of the multiplicative group G2 corresponding to the n recipient, based on the function V2 indicated by the public encryption parameter stored by the encryption parameter storage unit, the n integer $s_i$ generated by the random number generating unit, and the one bit sequence $w_0$ of predetermined length calculated by the hash value calculation unit, by using the processing device, and treats each bit sequence, indicating each calculated n element $y_i$ of the multiplicative group G2, as the n ciphertext verification text $CC_i$ corresponding to the n recipient, the verification hash value calculation unit calculates a bit sequence w' of predetermined length to be treated as the verification hash value H', based on the hash function HF indicated by the public encryption parameter stored by the public parameter storage unit, by using the processing device, the ciphertext verification unit calculates an element $e(v_{ID}, V2(w'))$ of the multiplicative group GT, based on the pairing e and the function V2 indicated by the public encryption parameters stored by the public parameter storage unit, an element $v_{ID}$ of the multiplicative group G1 indicated by the corresponding third ciphertext $C3_{ID}$ acquired by the ciphertext decomposition unit, and the bit sequence w' of predetermined length calculated by the verification hash value calculation unit, by using the processing device, calculates an element $e(g, y_{ID})$ of the multiplicative group GT, based on the element g of the multiplicative group G1 and the pairing e indicated by the public encryption parameters stored by the public parameter storage unit, and an element $y_{ID}$ of the multiplicative group G2 indicated by the corresponding ciphertext verification text $CC_{ID}$ acquired by the ciphertext decomposition unit, by using the processing device, and compares a calculated element $e(v_{ID}, V2(w'))$ of the multiplicative group GT with a calculated element $e(g, y_{ID})$ of the multiplicative group GT by using the processing device, and when the element $e(v_{ID}, V2(w'))$ of the multiplicative group GT accords with the element $e(g, y_{ID})$ of the multiplicative group GT, judges that the one ciphertext C received by the ciphertext receiving unit has consistency, and when the ciphertext verification unit judges that the one ciphertext C received by the ciphertext receiving unit has consistency, the ciphertext decryption unit calculates a key bit sequence $k' = KDF(e(y_{ID}, d0_{ID})/e(d1_{ID}, u_{ID}))$, based on the pairing e and the key generation function KDF indicated by the public encryption parameters stored by the public parameter storage unit, the element $d0_{ID}$ of the multiplicative group G2 and the element $d1_{ID}$ of the multiplicative group G1 indicated by the secret key $d_{ID}$ stored by the secret key storage unit, the element $u_{ID}$ of the multiplicative group G2 indicated by the one corresponding second ciphertext $C2_{ID}$ and the element $v_{ID}$ of the multiplicative group G1 indicated by the corresponding third ciphertext $C3_{ID}$ acquired by the ciphertext decomposition unit, by using the processing device, and restores the plaintext M by decrypting the corresponding first ciphertext $C1_{ID}$ acquired by the ciphertext decomposition unit, with a calculated key bit sequence k', by using the processing device.

The cryptographic communication system according to the present invention further has a feature that the ciphertext body generating unit generates the n ciphertext body $CB_i$ including the n recipient identification information $ID_i$ input by the recipient identification input unit, by using the processing device.

The cryptographic communication system according to the present invention further has the following features:

the ciphertext generating apparatus further includes a session key generating unit, a data input unit, a data encryption unit, and a ciphertext notification unit, the session key generating unit randomly generates a bit sequence of predetermined length, as a session key K, by using the processing device, the plaintext input unit inputs the session key K generated by the session key generating unit, as the plaintext M, by using the processing device, the data input unit inputs one plaintext data to be transmitted to the n recipient, by using the processing device, the data encryption unit generates one encrypted data by encrypting the one plaintext data input by the data input unit, with the session key K generated by the session key generating unit, by using the processing device, the ciphertext notification unit notifies the n recipient identified by the n recipient identification information input by the recipient identification input unit of one ciphertext C combined by the ciphertext combining unit and the one encrypted data encrypted by the data encryption unit, by using the processing device, each of the plurality of ciphertext receiving apparatuses further includes a data decryption unit, the ciphertext receiving unit receives the one ciphertext C and the one encrypted data notified by the ciphertext generating apparatus, by using the processing device, and the data decryption unit treats the plaintext M decrypted by the ciphertext decryption unit as a session key K', and decrypts the one encrypted data received by the ciphertext receiving unit with the session key K', by using the processing device.

A group parameter generating apparatus according to the present invention, for generating a parameter of a multiplicative group used for encryption processing in a cryptographic communication system that notifies n recipient (n being an integer greater than or equal to 1), each having a corresponding ciphertext receiving apparatus, of a plaintext M through one ciphertext C, the group parameter generating apparatus comprises:

a processing device for processing information; a group order candidate generating unit; a group order security judging unit; and a parameter generating unit, wherein the group order candidate generating unit generates a prime number r as a group order candidate, by using the processing device, the group order security judging unit calculates a factor of (r−1) being a difference between the prime number r and 1, and a factor of (r+1) being a sum of the prime number r and 1, based on the prime number r generated by the group order candidate generating unit, by using the processing device, and judges whether the prime number r generated by the group order candidate generating unit is a secure group order or not, based on a calculated factor of (r−1) and a calculated factor of (r+1), by using the processing device, when the group order security judging unit judges that the prime number r generated by the group order candidate generating unit is a secure group order, the parameter generating unit calculates a multiplicative group whose group order is the prime number r, based on the prime number r generated by the group order candidate generating unit, by using the processing device, and generates a group parameter including information indicating the multiplicative group calculated, by using the processing device, and the group parameter storage unit stores the group parameter generated by the group parameter generating apparatus, by using the storage device.

The group parameter generating apparatus according to the present invention further has the following features:

the group order candidate generating unit generates the prime number r by adding 1 to a multiple of a predetermined integer k, as the group order candidate, by using the processing device, the group order security judging unit includes a remainder calculation unit, a judgment value calculation unit, and a prime factor judging unit, the remainder calculation unit calculates a remainder by dividing the prime number r by 4, based on the prime number r generated by the group order candidate generating unit, by using the processing device, when the remainder calculated by the remainder calculation unit is 1, the judgment value calculation unit calculates an integer $r1=(r-1)/LCM(k,4)$, which is a quotient obtained by dividing the difference (r−1) between the prime number r and 1 by a least common multiple LCM (k,4) of an integer k and 4, based on the predetermined integer k and the prime number r generated by the group order candidate generating unit, by using the processing device, and calculates an integer $r2=(r+1)/2$, which is a quotient obtained by dividing the sum (r+1) of the prime number r and 1 by 2, based on the prime number r generated by the group order candidate generating unit, by using the processing device, and when the remainder calculated by the remainder calculation unit is 3, the judgment value calculation unit calculates an integer $r1=(r-1)/LCM(k,2)$, which is a quotient obtained by dividing the difference (r−1) between the prime number r and 1 by a least common multiple LCM (k,2) of the integer k and 2, based on the predetermined integer k and the prime number r generated by the group order candidate generating unit, by using the processing device, and calculates an integer $r2=(r+1)/4$, which is a quotient obtained by dividing the sum (r+1) of the prime number r and 1 by 4, based on the prime number r generated by the group order candidate generating unit, by using the processing device, and the prime factor judging unit judges whether the integer r1 has a prime factor less than a predetermined integer B1 or not, based on the integer r1 calculated by the judgment value calculation unit, by using the processing device, and judges whether the integer r2 has a prime factor less than a predetermined integer B2 or not, based on the integer r2 calculated by the judgment value calculation unit, by using the processing device, and when it is judged that the integer r1 has a prime factor less than the predetermined integer B1 and when it is judged that the integer r2 has a prime factor less than the predetermined integer B2, the prime factor judging unit judges that the prime number r generated by the group order candidate generating unit is not a secure group order.

The group parameter generating apparatus according to the present invention further has the following features:

the group order candidate generating unit generates the prime number r by adding 1 to a multiple of a predetermined integer k, as a group order candidate, by using the processing device, the group order security judging unit includes a remainder calculation unit, a judgment value calculation unit, and a prime factor judging unit, the remainder calculation unit calculates a remainder by dividing the prime number r by 4, based on the prime number r generated by the group order candidate generating unit, by using the processing device, when the remainder calculated by the remainder calculation unit is 1, the judgment value calculation unit calculates an integer $r1=(r-1)/LCM(k,4)$, which is a quotient obtained by dividing the difference (r−1) between the prime number r and 1 by a least common multiple LCM (k,4) of an integer k and 4, based on the predetermined integer k and the prime number r generated by the group order candidate generating unit, by using the processing device, and calculates an integer $r2=(r+1)/2$, which is a quotient obtained by dividing the sum (r+1) of the prime number r and 1 by 2, based on the prime number r generated by the group order candidate generating unit, by using the processing device, and when the remainder calculated by the remainder calculation unit is 3, the judgment value calculation unit calculates an integer $r1=(r-1)/LCM(k,2)$, which is a quotient obtained by dividing the difference (r−1) between the prime number r and 1 by a least common multiple LCM (k,2) of the integer k and 2, based on the predetermined integer k and the prime number r generated by the group order candidate generating unit, by using the processing device, and calculates an integer $r2=(r+1)/4$, which is a quotient obtained by dividing the sum (r+1) of the prime number r and 1 by 4, based on the prime number r generated by the group order candidate generating unit, by using the processing device, and the prime factor judging unit judges whether the integer r1 is a prime number or not, based on the integer r1 calculated by the judgment value calculation unit, by using the processing device, and judges whether the integer r2 is a prime number or not, based on the integer r2 calculated by the judgment value calculation unit, by using the processing device, and when it is judged that the integer r1 is not a prime number and when it is judged that the integer r2 is not a prime number, the prime factor judging unit judges that the prime number r generated by the group order candidate generating unit is not a secure group order.

Advantageous Effects of Invention

In the ID-based cryptographic communication system using the ciphertext generating apparatus of the present Embodiment, since only one processing of calculating a hash value and only one processing based on the calculated hash value, which are parts of processing for generating one ciphertext C to notify a plurality of recipients of the same plaintext M, are needed, the processing efficiency increases, thereby enabling high speed encryption processing.

DESCRIPTION OF EMBODIMENTS

Embodiment 1

Referring to FIGS. 1 to 10, Embodiment 1 will now be described.

FIG. 1 shows a system configuration illustrating an example of the whole configuration of an ID-based cryptographic communication system 800 according to the present Embodiment. The ID-based cryptographic communication system 800 includes an encryption parameter generating apparatus 100, a ciphertext generating apparatus 200, and a plurality of ciphertext receiving apparatuses 301 to 303.

The ciphertext receiving apparatuses 301 to 303 respectively correspond to recipients, and correspond to recipient identification information 531 to 533 for identifying a corresponding recipient.

The recipient identification information 531 to 533 is information capable of uniquely identifying a recipient, such as an address, a name and an e-mail address of the recipient. The recipient identification information 531 to 533 is a part of information 500 published in the ID-based cryptographic communication system 800, and is information whose correspondence relation can be easily verified to be right or not.

The encryption parameter generating apparatus 100 generates a public encryption parameter 510 required for encryption processing in the ID-based cryptographic communication system 800. The encryption parameter generating apparatus 100 publishes the generated public encryption parameter 510, and the published public encryption parameter 510 becomes a part of the information 500 published in the ID-based cryptographic communication system 800.

Moreover, the encryption parameter generating apparatus 100 inputs the recipient identification information 531 to 533 of the ciphertext receiving apparatuses 301 to 303, and generates secret keys 601 to 603 of the ciphertext receiving apparatuses 301 to 303, based on the input recipient identification information 531 to 533. The encryption parameter generating apparatus 100 secretly notifies each of the ciphertext receiving apparatuses 301 to 303 of the generated secret keys 601 to 603 by a secure method that is unknowable to a third party. For example, the encryption parameter generating apparatus 100 notifies the ciphertext receiving apparatus 301 of the secret key 601 by recording each of the generated secret keys 601 to 603 in a storage medium, such as a flexible disk, directly sending the flexible disk, in which the secret key 601 is recorded, to the recipient himself corresponding to the ciphertext receiving apparatus 301 and the recipient's installing the secret key 601 in the ciphertext receiving apparatus 301 by himself. The ciphertext receiving apparatuses 302 and 303 are notified of the secret keys 602 and 603 in the same way.

The ciphertext generating apparatus 200 inputs data (plaintext data 710) to be notified to all or some of the plurality of ciphertext receiving apparatuses 301 to 303. The case of intending to notify the ciphertext receiving apparatuses 301 and 303 of the plaintext data 710 and not intending to notify the ciphertext receiving apparatus 302 of it will now be described as an example.

The ciphertext generating apparatus 200 notifies the ciphertext receiving apparatuses 301 and 303 of notification data 720.

The ciphertext receiving apparatuses 301 and 303 are notified of the notification data 720, for example, through an e-mail communication, data broadcasting, etc. Therefore, the notification data 720 is the same data for all the recipients. Although it is not intended to publish the notification data 720, the channel used by the ciphertext generating apparatus 200 for notifying the notification data 720 is in the environment, such as the Internet and data broadcasting, where the third party can easily eavesdrop the notification data 720. Thus, the notification data 720 includes encrypted data 722 generated by encrypting the plaintext data 710.

Since the plaintext data 710 may be huge data, such as moving image data, it is encrypted by using a common session key K, regardless of the notified party. It is because if the session key K is changed for each notified party, it becomes necessary to generate the encrypted data 722 of the number same as that of notified parties, thereby increasing the load of encryption processing of the ciphertext generating apparatus 200 and increasing the traffic of the channel for notification.

The notification data 720 further includes a key ciphertext C 721 generated by encrypting the session key K which is used for encrypting the plaintext data 710.

The ciphertext receiving apparatus 301 acquires the session key K by decrypting the key ciphertext C 721 and acquires the plaintext data 710 by decrypting the encrypted data 722 with the acquired session key K.

The ciphertext generating apparatus 200 inputs the public encryption parameter 510 published by the encryption parameter generating apparatus 100, and the published recipient identification information 531 and 533 of the ciphertext receiving apparatuses 301 and 303.

The ciphertext generating apparatus 200 performs encryption processing of the ID-based cryptosystem, based on the input information, to generate the session key K and the key ciphertext C 721.

The ciphertext generating apparatus 200 encrypts the plaintext data 710 with the generated session key K, to generate the encrypted data 722.

The ciphertext generating apparatus 200 notifies the ciphertext receiving apparatuses 301 and 303 of the notification data 720 including the generated key ciphertext C 721 and the encrypted data 722.

The key ciphertext C721 includes a portion corresponding to each notified party. The key ciphertext C721 may further include a portion common regardless of the notified party.

The ciphertext receiving apparatus 301 acquires the portion corresponding to the ciphertext receiving apparatus 301 (and the common portion) from the key ciphertext C 721, and performs decryption processing of the ID-based cryptosystem by using the secret key 601, to acquire the session key K. Similarly, the ciphertext receiving apparatus 303 acquires the session key K by using the secret key 601.

On the other hand, since the key ciphertext C 721 does not include a portion corresponding to the ciphertext receiving apparatus 302, even if the ciphertext receiving apparatus 302 eavesdrops the notification data 720, it is impossible for the ciphertext receiving apparatus 302 to perform decryption with the secret key 602, thereby not acquiring the session key K. Therefore, the ciphertext receiving apparatus 302 cannot acquire the plaintext data 710.

FIG. 2 shows an example of the appearance of the encryption parameter generating apparatus 100, the ciphertext generating apparatus 200, and the ciphertext receiving apparatuses 301 to 303 according to the present Embodiment.

The encryption parameter generating apparatus 100, the ciphertext generating apparatus 200, and the ciphertext receiving apparatuses 301 to 303 include hardware resources, such as a system unit 910, a display device 901 having a display screen of CRT (Cathode Ray Tube) or LCD (Liquid Crystal), a keyboard (K/B) 902, a mouse 903, an FDD (Flexible Disk Drive) 904, a compact disk drive (CDD) 905, a printer 906, and a scanner 907, which are connected through cables and signal lines.

The system unit 910, being a computer, is connected to a facsimile machine 932 and a telephone 931 through cables, and to the Internet 940 through a local area network (LAN) 942 and a gateway 941.

FIG. 3 shows an example of hardware resources of the encryption parameter generating apparatus 100, the ciphertext generating apparatus 200, and the ciphertext receiving apparatuses 301 to 303 according to the present Embodiment.

The encryption parameter generating apparatus 100, the ciphertext generating apparatus 200, and the ciphertext receiving apparatuses 301 to 303 include a CPU 911 (also called a Central Processing Unit, central processing apparatus, processing device, operational device, microprocessor, microcomputer, or processor) which executes a program. The CPU 911 is connected through a bus 912 to a ROM 913, a RAM 914, a communication device 915, the display device 901, the keyboard 902, the mouse 903, the FDD 904, the CDD 905, the printer 906, the scanner 907, and a magnetic disk drive 920, and controls these hardware devices. Instead of the magnetic disk drive 920, a storage device, such as an optical disk drive and a memory card read/write device may be used. The RAM 914 is an example of a volatile memory. Storage media, such as the ROM 913, FDD 904, CDD 905, and magnetic disk drive 920 are examples of a nonvolatile memory. These are examples of a storage device or a storage unit. The communication device 915, keyboard 902, scanner 907, FDD 904, etc. are examples of an input unit or an input device. The communication board 915, display device 901, printer 906, etc. are examples of an output unit or an output device.

The communication device 915 is connected to the facsimile machine 932, telephone 931, LAN 942, etc. The communication device 915 may be connected not only to the LAN 942 but also to a WAN (Wide Area Network), such as the Internet 940 and ISDN. When connected to the WAN, such as the Internet 940 or ISDN, the gateway 941 becomes dispensable.

In the magnetic disk drive 920, an operating system (OS) 921, a window system 922, a program group 923, and a file group 924 are stored. Programs of the program group 923 are executed by the CPU 911, the operating system 921, and the window system 922.

In the program group 923, a program for executing functions indicated by the term "unit" described in the Embodiments stated below is stored. The program is read and executed by the CPU 911. In the file group 924, information, data, signal values, variable values, and parameters indicated by the terms "judgment result of", "calculation result of", or "processing result of" described in the Embodiments stated below are stored as each item of the "file" or "database". Such "file" and "database" are stored in a recording medium, such as a disk and memory. The information, data, signal values, variable values, and parameters stored in the storage medium, such as a disk and a memory, are read to a main memory or a cache memory by the CPU 911 through a read and write circuit, and used for operations of CPU, such as extraction, search, reference, comparison, operation, calculation, processing, output, printing, and display. During the operations of CPU, namely during extraction, search, reference, comparison, operation, calculation, processing, output, printing, and display, the information, data, signal values, variable values, and parameters are temporarily stored in the main memory, cache memory, and buffer memory.

Moreover, arrows in the flowchart described in Embodiments stated below mainly show inputting and outputting of data or signals. Data and signal values are recorded on recording media, such as a memory of the RAM 914, a flexible disk of the FDD 904, a compact disk of the CDD 905, a magnetic disk of the magnetic disk drive 920, an optical disk, a mini disk, and a DVD (Digital Versatile Disk). Moreover, data and signals are transmitted on line by the bus 912, a signal line, a cable, or other transmission medium.

What is described by the term "unit" in the Embodiments stated below may be a "circuit", a "device", or an "apparatus" and may be a "step", a "procedure", or "processing". That is, what is described as a "unit" may be realized by the firmware stored in the ROM 913. Alternatively, they may be implemented only by software, only by hardware, such as an element, a device, a substrate, and a wiring, or by a combination of hardware and software, and alternatively a combination of hardware, software and firmware. Firmware and software are stored, as programs, in a recording medium, such as a magnetic disk, a flexible disk, an optical disk, a compact disk, a mini disk, and DVD. Such programs are read by the CPU 911, and executed by the CPU 911. That is, such programs operate a computer, as units described below, or they cause a computer to execute a procedure or a method of the "unit" described below.

FIG. 4 is a block diagram showing an example of the functional block configuration of the encryption parameter generating apparatus 100 according to the present Embodiment. The encryption parameter generating apparatus 100 includes a parameter setting unit 110 and a secret key setting unit 130. The encryption parameter generating apparatus 100 may be separated into a parameter setting device which includes the parameter setting unit 110, and a secret key setting device which includes the secret key setting unit 130. In that case, there may be a plurality of secret key setting devices for one parameter setting device.

The parameter setting unit 110 generates and publishes public encryption parameters used as a basis for encryption processing and decryption processing of an ID-based cryptosystem in the ID-based cryptographic communication system 800.

The parameter setting unit 110 includes a group parameter storage unit 111, a secret information generating unit 112, a public parameter generating unit 113, a public parameter publishing unit 114, a secret information storage unit 121, and a parameter storage unit 122.

The group parameter storage unit 111 stores a group parameter by using a storage device, such as the magnetic disk drive 920. The group parameter is the information indicating a parameter defining a group that performs a group operation in the ID-based cryptosystem.

For example, in the case of using a group formed by points on an elliptic curve, as a group for performing a group operation in the ID-based cryptosystem, the group parameter storage unit 111 stores a coefficient a and a coefficient b that define an elliptic curve $Y^2=X^3+aX+b$, etc. as a group parameter.

As an operation in the group composed of points on an elliptic curve, addition of the points on the elliptic curve is usually defined. The group indicated by group parameters stored by the group parameter storage unit 111 is not limited to a group formed by points on an elliptic curve, and it may be other groups. In this case, the group indicated by the group parameters stored by the group parameter storage unit 111 shall be a multiplicative group. That is, multiplication shall be defined as an operation between elements of a group indicated by group parameters stored by the group parameter storage unit 111, and the group shall be formed under the multiplication. Therefore, in the following explanation, the group referred to as a "multiplicative group" shall include a group formed by points on an elliptic curve, and an operation referred to as "multiplication" shall generally include an operation called an addition of points on an elliptic curve. When describing "multiplication" in equations, "·" is used.

In addition, multiplication in the multiplicative group indicated by group parameters stored by the group parameter storage unit 111 is to be calculable by a predetermined algorithm within a practical time. Therefore, it is possible to obtain a multiplication result by using a processing device, such as the CPU 911.

The secret information generating unit 112 inputs group parameters stored by the group parameter storage unit 111 by using a processing device, such as the CPU 911.

The secret information generating unit 112 randomly generates secret information by using a processing device, such as the CPU 911.

The secret information generating unit 112 outputs the generated secret information, by using a processing device, such as the CPU 911.

The secret information is information used as a basis for generating public encryption parameters published in the ID-based cryptosystem. Moreover, since the secret information is used as a basis for generating a secret key, it must not be known to the third party by any means.

The content indicated by the secret information differs depending upon a cryptographic system adopted as the ID-based cryptosystem. For example, the secret information indicates an integer less than the order r of the multiplicative group indicated by a group parameter and greater than or equal to 1.

The public parameter generating unit 113 inputs the group parameter stored by the group parameter storage unit 111, and the secret information output by the secret information generating unit 112, by using a processing device, such as the CPU 911.

The public parameter generating unit 113 generates a public encryption parameter, based on the input group parameter and secret information, by using a processing device, such as the CPU 911.

The public parameter generating unit 113 outputs the generated public encryption parameter, by using a processing device, such as the CPU 911.

The content indicated by a public encryption parameter differs depending upon the type of a cryptographic system adopted as the ID-based cryptosystem. The public encryption parameter is information indicating an element of a multiplicative group indicated by a group parameter, for example.

Secret information is skillfully incorporated into public encryption parameters, so that it is possible for the ciphertext generating apparatus 200 and the ciphertext receiving apparatuses 301 to 303 to indirectly utilize the secret information by using the public encryption parameter, but it is impossible to inversely calculate the secret information from the public encryption parameter.

For example, the secret information indicates an integer $\alpha$ and the public encryption parameter includes information of an element g of the multiplicative group G and an element $g^\alpha$ of the multiplicative group G indicated by the group parameters. In addition, "^" denotes an exponential operation and "$g^\alpha$" denotes $\alpha$-th power of g, namely, multiplying $\alpha$ number of g each other. If the multiplicative group G is a group in which solving DH problem (Diffie-Hellmann Problem) is difficult, it is impossible to obtain a from g and $g^\alpha$. For this reason, even if the public encryption parameter is published, the secret of the secret information can be secured.

The public parameter publishing unit 114 inputs the public encryption parameter output by the public parameter generating unit 113, by using a processing device, such as the CPU 911.

The public parameter publishing unit 114 publishes the public parameter which has been input, by using a processing device, such as the CPU 911. The "publishing" includes notifying the ciphertext generating apparatus 200 and the ciphertext receiving apparatuses 301 to 303, and it means that the ciphertext generating apparatus 200 and the ciphertext receiving apparatuses 301 to 303 can acquire a right public encryption parameter, and, if acquiring a falsified public encryption parameter, can easily discriminate whether the acquired one has been falsified or not. For example, the public parameter publishing unit 114 publishes a public encryption parameter by posting it on a homepage. Although it is not beyond the realm of possibility that the homepage is falsified by a third party's attack, such falsification can be discovered by the public encryption parameter generating unit 100' s checking the homepage. Moreover, it is also preferable to discover a falsification by publishing the same public encryption parameters, by using a plurality of server devices, to judge whether both the ones are in accordance with each other or not.

The secret information storage unit 121 inputs the secret information output by the secret information generating unit 112, by using a processing device, such as the CPU 911.

The secret information storage unit 121 stores the input secret information by using a storage device, such as the magnetic disk drive 920.

The parameter storage unit 122 inputs the public encryption parameter output by the public parameter generating unit 113, by using a processing device, such as the CPU 911. The parameter storage unit 122 stores the input public encryption parameter, by using a storage device, such as the magnetic disk drive 920.

The secret key setting unit 130 generates secret keys required for decryption processing of the ID-based cryptosystem in the ID-based cryptographic communication system 800, and notifies each of the ciphertext receiving apparatuses 301 to 303 of the generated secret key in secrecy.

The secret key setting unit 130 includes an identification information input unit 131, a secret key generating unit 132, and a secret key notification unit 133.

The identification information input unit 131 inputs recipient identification information, by using a processing device, such as the CPU 911. The recipient identification information input by the identification information input unit 131 is information for identifying the recipient corresponding to one of the ciphertext receiving apparatuses 301 to 303, and is a part of the published information 500. For example, the identification information input unit 131 inputs the recipient identification information 531 for identifying the recipient corresponding to the ciphertext receiving apparatus 301, from the published information 500.

The identification information input unit 131 verifies whether the input recipient identification information is the one for properly identifying the recipient corresponding to the ciphertext receiving apparatus or not, based on the published information 500, by using a processing device, such as the CPU 911.

Then, if satisfactory as a result of the verification, the identification information input unit 131 outputs the input recipient identification information, by using a processing device, such as the CPU 911.

The secret key generating unit 132 inputs the recipient identification information output by the identification information input unit 131, the secret information stored by the secret information storage unit 121, and the public encryption parameter stored by the parameter storage unit 122, by using a processing device, such as the CPU 911.

The secret key generating unit 132 generates a secret key, based on the input recipient identification information, secret information, and public encryption parameter, by using a processing device, such as the CPU 911.

The secret key generating unit 132 outputs the generated secret key, by using a processing device, such as the CPU 911.

The secret key notification unit 133 inputs the secret key output by the secret key generating unit 132, by using a processing device, such as the CPU 911.

The secret key notification unit 133 secretly notifies the ciphertext receiving apparatus belonging to the corresponding recipient of the input secret key, by using a processing device, such as the CPU 911. For example, the secret key notification unit 133 notifies the ciphertext receiving apparatus 301 corresponding to the recipient identified by the recipient identification information 531 of the secret key 601 which the secret key generating unit 132 generated based on the recipient identification information 531.

Thus, preparation for the cryptographic communication based on the ID-based cryptosystem is completed by publishing the public encryption parameter which the parameter setting unit 110 has generated, and by notifying each of the ciphertext receiving apparatuses 301 to 303 of the secret keys 601 to 603 which the secret key setting unit 130 has generated.

FIG. 5 is a block diagram showing an example of the functional block configuration of the ciphertext generating apparatus 200 according to the present Embodiment.

The ciphertext generating apparatus 200 includes a key encryption unit 290, a data input unit 251, a data encryption unit 252, and a ciphertext notification unit 261.

The key encryption unit 290 generates a session key K and further a key ciphertext C, by using a processing device, such as the CPU 911.

The key ciphertext C is generated by encrypting the session key K which the key encryption unit 290 generated. The key ciphertext C is an example of the ciphertext C. The key encryption unit 290 includes an encryption parameter storage unit 210, a session key generating unit 221, a random number generating unit 222, a plaintext input unit 231, a recipient identification input unit 232, a ciphertext body generating unit 240, a hash value calculation unit, 244 a ciphertext verification text generating unit 245, and a ciphertext combining unit 246.

The encryption parameter storage unit 210 stores a public encryption parameter published by the encryption parameter generating apparatus 100, by using a storage device, such as the magnetic disk drive 920.

The session key generating unit 221 randomly generates a session key K, by using a processing device, such as the CPU 911. The session key K is a key for encrypting the plaintext data 710, and, for example, is a bit sequence of predetermined length. The cryptographic system for encrypting the plaintext data 710 is a common key cryptosystem, such as AES (Advanced Encryption Standard) and MISTY®.

The session key generating unit 221 outputs the generated session key K, by using a processing device, such as the CPU 911.

The plaintext input unit 231 inputs the session key K output by the session key generating unit 221, as a plaintext M, by using a processing device, such as the CPU 911.

The plaintext input unit 231 outputs the input plaintext M, by using a processing device, such as the CPU 911.

The recipient identification input unit 232 inputs recipient identification information of the recipient corresponding to the ciphertext receiving apparatus to which the plaintext data 710 is to be transmitted, by using a processing device, such as the CPU 911. For example, in the case of intending to transmit the plaintext data 710 to the ciphertext receiving apparatuses 301 and 303, the recipient identification input unit 232 inputs the recipient identification information 531 of the recipient corresponding to the ciphertext receiving apparatus 301 and the recipient identification information 533 of the recipient corresponding to the ciphertext receiving apparatus 303.

The number of parties to whom the plaintext data 710 is to be transmitted is hereinafter denoted as n. Moreover, in order to distinguish a plurality of recipient identification information, it will be described, using a suffix, such as recipient identification information $ID_1$, recipient identification information $ID_2$, . . . , recipient identification information $ID_n$. To summarize n number of recipient identification information $ID_1, ID_2, \ldots, ID_n$, it will also be described as "recipient identification information $ID_i$," (i being an integer greater than or equal to 1 and less than or equal to n). In the following description, the suffix "i" indicates what is corresponding to each of n recipients, in principle.

The recipient identification input unit 232 inputs n recipient identification information $ID_i$ (i being an integer greater than or equal to 1 and less than or equal to n) respectively corresponding to the n recipients.

The recipient identification input unit 232 outputs the n recipient identification information $ID_i$ which has been input, by using a processing device, such as the CPU 911.

The number n of recipients is not fixed beforehand (namely, not fixed when generating a public encryption parameter), and it is fixed when actually transmitting data.

The ID-based cryptographic communication system 800 is a cryptographic communication system which can transmit data to recipients of an arbitrary number. Depending upon the necessity at each time, it may be n=1, or may be n=100.

The ciphertext generating apparatus 200 gets to know the number n of the recipients, for example, when the recipient identification input unit 232 inputs recipient identification information. The ciphertext generating apparatus 200 generates one key ciphertext C (and encrypted data) for any n greater than or equal to 1.

Moreover, it is assumed that all of the plurality of recipient identification information input by the recipient identification input unit 232 differ from each other. Alternatively, it may be preferable that the recipient identification input unit 232 discriminates whether or not there is any overlapping in the plurality of recipient identification information that has been input, and collects overlapping recipient identification information into one, to exclude the overlapping.

The random number generating unit 222 inputs the public encryption parameter stored by the encryption parameter storage unit 210, by using a processing device, such as the CPU 911.

The random number generating unit 222 randomly generates n random numbers, by using a processing device, such as the CPU 911. The random number generated by the random number generating unit 222 is an integer s less than the order r of a multiplicative group indicated by the input public encryption parameter and greater than or equal to 1, for example.

Moreover, the n random numbers generated by the random number generating unit 222 respectively correspond to the n recipients. That is, the random number generating unit 222 generates n random numbers each of which corresponds to each of the n recipients.

The random number generating unit 222 outputs the information indicating the n generated random numbers.

The ciphertext body generating unit 240 inputs the public encryption parameter stored by the encryption parameter storage unit 210, the plaintext M output by the plaintext input unit 231, the n recipient identification information output by the recipient identification input unit 232, and the information indicating the n random numbers output by the random number generating unit 222, by using a processing device, such as the CPU 911.

The ciphertext body generating unit 240 generates n ciphertext bodies $CB_i$ (i being an integer greater than or equal to 1 and less than or equal to n) respectively corresponding to the n recipients, based on the input information, by using a processing device, such as the CPU 911.

The ciphertext body generating unit 240 outputs the generated n ciphertext bodies $CB_i$, by using a processing device, such as the CPU 911.

The ciphertext body is what is generated by encrypting the plaintext M (session key K) for each recipient, by using the each recipient's identification information $ID_i$, based on the ID-based cryptosystem. As to the n ciphertext bodies $CB_i$, each of them corresponds to one recipient.

In addition, the ciphertext body may be separated into several portions. In the separated portions of the ciphertext body, there may be a portion common to all the recipients. The entire n ciphertext bodies $CB_i$ may be shortened by gathering the portions common to all the recipients among the separated portions of the ciphertext body into one.

The ciphertext body generating unit 240 includes a first ciphertext generating unit 241, a second ciphertext generating unit 242, and a third ciphertext generating unit 243.

A ciphertext body $CB_i$ output by the ciphertext body generating unit 240 is composed of a first ciphertext $C1_i$ output by the first ciphertext generating unit 241, a second ciphertext $C2_i$ output by the second ciphertext generating unit 242, and a third ciphertext $C3_i$ output by the third ciphertext generating unit 243.

The ciphertext body $CB_i$ may be made by combining the first ciphertext $C1_i$, the second ciphertext $C2_i$, and the third ciphertext $C3_i$, and alternatively it may be made of a group of the first ciphertext $C1_i$, the second ciphertext $C2_i$, and the third ciphertext $C3_i$.

The ciphertext body $CB_i$ is composed of the three ciphertexts in this case, however this is just an example and may have other compositions.

For example, the ciphertext body $CB_i$ may include recipient identification information $ID_i$ in addition to the three ciphertexts.

The "including" as used herein means to include as a form in which the identification information $ID_i$ of the recipient corresponding to the ciphertext body $CB_i$ can be easily discriminated, and can be verified when necessary, such as the case of the ciphertext body $CB_i$ made by combining the recipient identification information $ID_i$, the first ciphertext $C1_i$, the second ciphertext $C2_i$, and the third ciphertext $C3_i$, for example.

The first ciphertext generating unit 241 inputs the plaintext M output by the plaintext input unit 231, the public encryption parameter stored by the encryption parameter storage unit 210, and the information indicating the n random numbers output by the random number generating unit 222, by using a processing device, such as the CPU 911.

The first ciphertext generating unit 241 generates n first ciphertexts $C1_i$ (i being an integer greater than or equal to 1 and less than or equal to n) respectively corresponding to n recipients, based on the input information, by using a processing device, such as the CPU 911.

The first ciphertext generating unit 241 outputs the generated n first ciphertexts $C1_i$, by using a processing device, such as the CPU 911.

The second ciphertext generating unit 242 inputs the n recipient identification information $ID_i$ output by the recipient identification input unit 232, the public encryption parameter stored by the encryption parameter storage unit 210, and the information indicating the n random numbers output by the random number generating unit 222, by using a processing device, such as the CPU 911.

The second ciphertext generating unit 242 generates n second ciphertexts $C2_i$ (i being an integer greater than or equal to 1 and less than or equal to n) respectively corresponding to n recipients, based on the input information, by using a processing device, such as the CPU 911.

The second ciphertext generating unit 242 outputs the generated n second ciphertexts $C2_i$, by using a processing device, such as the CPU 911.

The third ciphertext generating unit 243 inputs the public encryption parameter stored by the encryption parameter storage unit 210 and the information indicating the n random numbers output by the random number generating unit 222, by using a processing device, such as the CPU 911.

The third ciphertext generating unit 243 generates n third ciphertexts $C3_i$ (i being an integer greater than or equal to 1 and less than or equal to n) respectively corresponding to n recipients, based on the input information, by using a processing device, such as the CPU 911.

The third ciphertext generating unit 243 outputs the generated n third ciphertexts $C3_i$, by using a processing device, such as the CPU 911.

The hash value calculation unit 244 inputs the public encryption parameter stored by the encryption parameter storage unit 210 and the n ciphertext bodies $CB_i$ (that is, the n first ciphertexts $C1_i$ generated by the first ciphertext generating unit 241, the n second ciphertexts $C2_i$ generated by the second ciphertext generating unit 242, and the n third ciphertexts $C3_i$ generated by the third ciphertext generating unit 243) generated by the ciphertext body generating unit 240, by using a processing device, such as the CPU 911.

The hash value calculation unit 244 calculates one hash value H, based on the input n ciphertext bodies $CB_i$, by using a processing device, such as the CPU 911.

The hash value calculation unit 244 outputs the calculated one hash value H, by using a processing device, such as the CPU 911.

The hash value H calculated by the hash value calculation unit 244 varies depending upon the ID-based cryptosystem being used. For example, the hash value H is a bit sequence of predetermined length, defined by a public encryption parameter. Alternatively, the hash value H is information indicating an integer less than the order r of a multiplicative group indicated by a public encryption parameter and greater than or equal to 1.

Moreover, it is also preferable to define a hash function HF for calculating a hash value H, in the public encryption parameter. In that case, the hash value calculation unit 244 calculates a hash value H by the hash function HF indicated by the public encryption parameter.

The hash value calculation unit 244 calculates one hash value H, based on all the n ciphertext bodies $CB_i$. For example, the hash value calculation unit 244 generates one combined ciphertext by combining all of the n ciphertext bodies $CB_i$, and calculates a hash value H of the generated one combined ciphertext.

The ciphertext verification text generating unit 245 inputs the hash value H output by the hash value calculation unit 244, the public encryption parameter stored by the encryption parameter storage unit 210, and the information indicating the n random numbers output by the random number generating unit 222, by using a processing device, such as the CPU 911.

The ciphertext verification text generating unit 245 generates n ciphertext verification texts $CC_i$ (i being an integer greater than or equal to 1 and less than or equal to n) respectively corresponding to n recipients, based on the input information, by using a processing device, such as the CPU 911.

The ciphertext verification text generating unit 245 outputs the generated ciphertext verification text $CC_i$, by using a processing device, such as the CPU 911.

Although the number of the ciphertext verification texts generated by the ciphertext verification text generating unit 245 is n in this example, it is also preferable to have a configuration in which one ciphertext verification text being common regardless of the recipient is generated.

The ciphertext combining units 246 inputs the n ciphertext bodies $CB_i$ (that is, the n first ciphertexts $C1_i$ output by the first ciphertext generating unit 241, the n second ciphertexts $C2_i$ output by the second ciphertext generating unit 242, and the n third ciphertexts $C3_i$ output by the third ciphertext generating unit 243) output by the ciphertext body generating unit 240 and the ciphertext verification text CC output by the ciphertext verification text generating unit 245, by using a processing device, such as the CPU 911.

The ciphertext combining unit 246 generates one key ciphertext C, based on the input n first ciphertexts $C1_i$, n second ciphertexts $C2_i$, n third ciphertexts $C3_i$, and ciphertext verification text CC, by using a processing device, such as the CPU 911. For example, the ciphertext combining unit 246 makes one key ciphertext C by combining the input n first ciphertexts $C1_i$, n second ciphertexts $C2_i$, n third ciphertexts $C3_i$, and ciphertext verification text CC, by using a processing device, such as the CPU 911.

The one key ciphertext C combined by the ciphertext combining unit 246 is equally transmitted to all the ciphertext receiving apparatuses corresponding to the n recipients.

In the combined one key ciphertext C, which portion corresponds to which recipient shall be indicated by the order of combination defined previously, for example, and the ciphertext receiving apparatuses 301 to 303 shall easily extract the portions corresponding to themselves from the key ciphertext C.

The ciphertext combining unit 246 outputs the generated one key ciphertext C, by using a processing device, such as the CPU 911.

The data input unit 251 inputs the plaintext data 710, by using a processing device, such as the CPU 911.

The data input unit 251 outputs the input plaintext data 710, by using a processing device, such as the CPU 911.

The data encryption unit 252 inputs the plaintext data 710 output by the data input unit 251, and the session key K output by the session key generating unit 221, by using a processing device, such as the CPU 911.

The data encryption unit 252 encrypts the input plaintext data 710 with the input session key K to generate encrypted data, by using a processing device, such as the CPU 911.

The data encryption unit 252 outputs the generated encrypted data, by using a processing device, such as the CPU 911.

The ciphertext notification unit 261 inputs the one key ciphertext C output by the ciphertext combining unit 246, and the encrypted data output by the data encryption unit 252, by using a processing device, such as the CPU 911.

The ciphertext notification unit 261 generates the notification data 720 including the input key ciphertext C and encrypted data 722, by using a processing device, such as the CPU 911.

The ciphertext notification unit 261 notifies a plurality of ciphertext receiving apparatuses, which are notified parties, of the generated notification data 720, by using a processing device, such as the CPU 911.

The plurality of ciphertext receiving apparatuses are notified of the notification data 720 by way of e-mail communication specifying the plurality of recipients to be transmitted, for example. The notification data 720 is not different for each recipient, and is common to all the recipients.

FIG. 6 is a block diagram showing an example of the functional block configuration of the ciphertext receiving apparatus 301 according to the present Embodiment.

The ciphertext receiving apparatus 301 includes a ciphertext receiving unit 351, a key decryption unit 390, and a data decryption unit 352.

The block configuration of the ciphertext receiving apparatuses 302 and 303 is the same as that of the ciphertext receiving apparatus 301.

The ciphertext receiving unit 351 receives the notification data 720 notified by the ciphertext generating apparatus 200, by using a processing device, such as the CPU 911.

The ciphertext receiving unit 351 acquires the one key ciphertext C and encrypted data included in the received notification data 720, by using a processing device, such as the CPU 911.

The ciphertext receiving unit 351 outputs the acquired one key ciphertext C and encrypted data, by using a processing device, such as the CPU 911.

The key decryption unit 390 decrypts the key ciphertext C output by the ciphertext receiving unit 351, and acquires the session key for decrypting the encrypted data.

The key decryption unit 390 includes a public parameter storage unit 310, a secret key storage unit 323, the ciphertext receiving unit 351, a ciphertext decomposition unit 346, a verification hash value calculation unit 344, a ciphertext verification unit 345, a ciphertext decryption unit 341, and the data decryption unit 352.

The public parameter storage unit 310 stores the public encryption parameter published by the encryption parameter generating apparatus 100, by using a storage device, such as the magnetic disk drive 920.

The secret key storage unit 323 stores the secret key notified by the encryption parameter generating apparatus 100, by using a storage device, such as the magnetic disk drive 920.

The ciphertext decomposition unit 346 inputs the one key ciphertext C output by the ciphertext receiving unit 351, by using a processing device, such as the CPU 911. The ciphertext decomposition unit 346 decomposes the input one key ciphertext C, and acquires the n ciphertext bodies $CB_i$ (that is, n first ciphertexts $C1_i$, n second ciphertexts $C2_i$, and n third ciphertexts $C3_i$) and the ciphertext verification text $CC_i$ by using a processing device, such as the CPU 911.

Among the n ciphertext bodies $CB_i$ corresponding to the n recipients, the second ciphertext corresponding to the recipient corresponding to the ciphertext receiving apparatus 301 is called a corresponding ciphertext body $CB_{ID}$. The same can be applied to the first ciphertext, the second ciphertext, the third ciphertext, and the ciphertext verification text.

The ciphertext decomposition unit 346 acquires the corresponding ciphertext body $CB_{i}$, (that is, a corresponding first ciphertext $C1_{ID}$, a corresponding second ciphertext $C2_{ID}$ and a corresponding third ciphertext $C3_{ID}$) from the n ciphertext bodies $CB_i$, by using a processing device, such as the CPU 911.

Similarly, the ciphertext decomposition unit 346 acquires a corresponding ciphertext verification text $CC_{ID}$, by using a processing device, such as the CPU 911.

When the ciphertext verification text is one ciphertext verification text common regardless of the recipient, the corresponding ciphertext verification text $CC_{ID}$ acquired by the ciphertext decomposition unit 346 is the ciphertext verification text itself.

The ciphertext decomposition unit 346 outputs the acquired n ciphertext bodies $CB_i$, corresponding ciphertext body $CB_{ID}$, and corresponding ciphertext verification text $CC_{ID}$, by using a processing device, such as the CPU 911.

When information indicating which ciphertext body is a corresponding ciphertext body $CB_{ID}$ corresponding to which ID is included in the n ciphertext bodies $CB_i$, the ciphertext decomposition unit 346 may not acquire the corresponding ciphertext body $CB_{ID}$.

The verification hash value calculation unit 344 inputs the n ciphertext bodies $CB_i$ output by the ciphertext decomposition unit 346, and the public encryption parameter stored by the public parameter storage unit 310, by using a processing device, such as the CPU 911.

The verification hash value calculation unit 344 calculates a verification hash value H' by the same method as calculating a hash value H by the hash value calculation unit 244 of the ciphertext generating apparatus 200, by using a processing device, such as the CPU 911.

The verification hash value calculation unit 344 outputs the calculated verification hash value H', by using a processing device, such as the CPU 911.

The verification hash value calculation unit 344 calculates one verification hash value H' by the same method as that of the hash value calculation unit 244, based on the input n ciphertext bodies $CB_i$.

For example, the verification hash value calculation unit 344 calculates a verification hash value H', based on the combined verification ciphertext made by combining all the input n ciphertext bodies $CB_i$.

The ciphertext verification unit 345 inputs the corresponding ciphertext body $CB_{ID}$ and the corresponding ciphertext verification text $CC_{ID}$ output by the ciphertext decomposition unit 346, the verification hash value H' output by the verification hash value calculation unit 344, the public encryption parameter stored by the public parameter storage unit 310, and the secret key stored by the secret key storage unit 323, by using a processing device, such as the CPU 911.

The ciphertext verification unit 345 generates verification information, based on the input information, by using a processing device, such as the CPU 911.

The ciphertext verification unit 345 judges whether the one key ciphertext C received by the ciphertext receiving unit 351 has consistency or not, based on the generated verification information and the input corresponding ciphertext verification text $CC_{ID}$, by using a processing device, such as the CPU 911.

For example, when the generated verification information accords with the input corresponding ciphertext verification text $CC_{ID}$, the ciphertext decomposition unit 346 judges that the one key ciphertext C received by the ciphertext receiving unit 351 has consistency.

Alternatively, it is also preferable that the ciphertext verification unit 345 generates another verification information, based on the input corresponding ciphertext verification text $CC_{ID}$ (and the public encryption parameter and the secret key), and when the two generated verification information accord with each other, judges that the one key ciphertext C received by the ciphertext receiving unit 351 has consistency.

The ciphertext verification unit 345 outputs the information indicating the judgment result, by using a processing device, such as the CPU 911.

The ciphertext decryption unit 341 inputs the information indicating the judgment result output by the ciphertext decomposition unit 346, the corresponding ciphertext body $CB_{ID}$ output by the ciphertext decomposition unit 346, the public encryption parameter stored by the public parameter storage unit 310, and the secret key stored by the secret key storage unit 323, by using a processing device, such as the CPU 911.

When the ciphertext verification unit 345 judges that the one key ciphertext C received by the ciphertext receiving unit 351 has consistency, based on the input information, the ciphertext decryption unit 341 restores the plaintext M, by using a processing device, such as the CPU 911.

The ciphertext decryption unit 341 outputs the restored plaintext M, by using a processing device, such as the CPU 911.

The data decryption unit 352 inputs the plaintext M output by the ciphertext decryption unit 341 and the encrypted data output by the ciphertext receiving unit 351, and treats the input plaintext M as a session key K', by using a processing device, such as the CPU 911.

The data decryption unit 352 decrypts the input encrypted data with the input session key K', to treat it as decrypted data, by using a processing device, such as the CPU 911.

The data decryption unit 352 outputs the decrypted data, by using a processing device, such as the CPU 911.

Operations will now be described.

FIG. 7 is a flowchart showing an example of the flow of parameter setting processing in which the encryption parameter generating apparatus 100 according to the present Embodiment sets public encryption parameters.

In the secret information generation step S11, the secret information generating unit 112 inputs the group parameter stored by the group parameter storage unit 111, by using a processing device, such as the CPU 911.

The secret information generating unit 112 randomly generates secret information, based on the input group parameter, by using a processing device, such as the CPU 911.

The secret information generating unit 112 outputs the generated secret information, by using a processing device, such as the CPU 911.

The secret information storage unit 121 inputs the secret information output by the secret information generating unit 112, by using a processing device, such as the CPU 911.

The secret information storage unit 121 stores the input secret information, by using a storage device, such as the magnetic disk drive 920.

In the encryption parameter generation step S12, the public parameter generating unit 113 inputs the group parameter stored by the group parameter storage unit 111, by using a processing device, such as the CPU 911.

The public parameter generating unit 113 inputs the secret information output by the secret information generating unit 112 at the secret information generation step S11, by using a processing device, such as the CPU 911.

The public parameter generating unit 113 generates a public encryption parameter, based on the input group parameter and the input secret information, by using a processing device, such as the CPU 911.

The public parameter generating unit 113 outputs the generated public encryption parameter, by using a processing device, such as the CPU 911.

The parameter storage unit 122 inputs the public encryption parameter output by the public parameter generating unit 113, by using a processing device, such as the CPU 911.

The parameter storage unit 122 stores the input public encryption parameter, by using a storage device, such as the magnetic disk drive 920.

In the encryption parameter publishing step S13, the public parameter publishing unit 114 inputs the public encryption parameter output by the public parameter generating unit 113 at the encryption parameter generation step S12, by using a processing device, such as the CPU 911.

The public parameter publishing unit 114 publishes the input public encryption parameter, by using a processing device, such as the CPU 911.

The public encryption parameter published by the public parameter publishing unit 114 is acquired by the ciphertext generating apparatus 200 and the ciphertext receiving apparatuses 301 to 303, and stored by the encryption parameter storage unit 210 and the public parameter storage unit 310, by using a storage device, such as the magnetic disk drive 920.

The parameter setting processing may be executed only once before starting the operation of the ID-based cryptographic communication system 800. However, in order to maintain the security of the cryptographic communication, it is also preferable to perform the parameter setting processing periodically, so as to change the public encryption parameter, and in order to enhance the cryptographic strength, it is also preferable to execute the parameter setting processing with changing the multiplicative group to be used.

FIG. 8 is a flowchart showing an example of the flow of secret key setting processing in which the encryption parameter generating apparatus 100 according to the present Embodiment sets a secret key.

In the identification input step S21, the identification information input unit 131 inputs a recipient identification information ID, by using a processing device, such as the CPU 911.

The identification information input unit 131 outputs the input recipient identification information ID, by using a processing device, such as the CPU 911.

In the secret key generation step S22, the secret key generating unit 132 inputs the recipient identification information ID output by the identification information input unit 131 at S21, by using a processing device, such as the CPU 911.

The secret key generating unit 132 inputs the secret information stored by the secret information storage unit 121, by using a processing device, such as the CPU 911.

The secret key generating unit 132 inputs the public encryption parameter stored by the parameter storage unit 122, by using a processing device, such as the CPU 911.

The secret key generating unit 132 generates a secret key $d_{ID}$, based on the input secret information, the input public encryption parameter, and the input recipient identification information ID, by using a processing device, such as the CPU 911.

The secret key generating unit 132 outputs the generated secret key $d_{ID}$, by using a processing device, such as the CPU 911.

In the secret key notification step S23, the secret key notification unit 133 inputs the recipient identification information ID output by the identification information input unit 131 at S21, by using a processing device, such as the CPU 911. The secret key notification unit 133 inputs the secret key $d_{ID}$ output by the secret key generating unit 132 at S22, by using a processing device, such as the CPU 911. The secret key notification unit 133 secretly notifies the ciphertext receiving apparatus corresponding to the recipient identified by the input recipient identification information ID of the input secret key $d_{ID}$, by using a processing device, such as the CPU 911. The secret key $d_{ID}$ notified by the secret key notification unit 133 is acquired by the notified ciphertext receiving apparatus, and stored by the secret key storage unit 323 by using a storage device, such as the magnetic disk drive 920.

The secret key setting processing indicates to set a secret key corresponding to each ciphertext receiving apparatus in the ID-based cryptographic communication system 800. The encryption parameter generating apparatus 100 may generate a secret key beforehand, and notify all the ciphertext receiving apparatuses 301 to 303 in the ID-based cryptographic communication system 800 of the secret key, or may perform execution when required from the ciphertext receiving apparatuses 301 to 303. The secret key setting processing may be executed after notifying the notification data 720 by the ciphertext generating apparatus 200.

FIG. 9 is a flowchart showing an example of the flow of ciphertext generation processing in which the ciphertext generating apparatus 200 according to the present Embodiment generates a ciphertext.

In the plaintext data input step S31, the data input unit 251 inputs the plaintext data which is to be notified to n ciphertext receiving apparatuses, by using a processing device, such as the CPU 911.

The data input unit 251 outputs the input plaintext data, by using a processing device, such as the CPU 911.

In the recipient identification input step S32, the recipient identification input unit 232 inputs n recipient identification information $ID_i$ (i being an integer greater than or equal to 1 and less than or equal to n) which respectively identify each of the n recipients corresponding to the n ciphertext receiving apparatuses that should be notified of the plaintext data input by the data input unit 251 at the plaintext data input step S31, by using a processing device, such as the CPU 911.

The recipient identification input unit 232 outputs the input n recipient identification information $ID_i$, by using a processing device, such as the CPU 911.

In the session key generation step S33, the session key generating unit 221 randomly generates a session key K, by using a processing device, such as the CPU 911.

The session key generating unit 221 outputs the generated session key K, by using a processing device, such as the CPU 911.

The plaintext input unit 231 inputs the session key K output by the session key generating unit 221, by using a processing device, such as the CPU 911.

The plaintext input unit 231 outputs the input session key K, as a plaintext M, by using a processing device, such as the CPU 911.

In the random number generation step S34, the random number generating unit 222 randomly generates n random numbers respectively corresponding to the n recipients, by using a processing device, such as the CPU 911.

The random number generating unit 222 outputs the information indicating the generated n random numbers, by using a processing device, such as the CPU 911.

In the first ciphertext generation step S35, the first ciphertext generating unit 241 inputs the public encryption parameter stored by the encryption parameter storage unit 210, by using a processing device, such as the CPU 911.

The first ciphertext generating unit 241 inputs the plaintext M output by the plaintext input unit 231 at the session key generation step S33, by using a processing device, such as the CPU 911.

The first ciphertext generating unit 241 inputs the information indicating the n random numbers output by the random number generating unit 222 at the random number generation step S34, by using a processing device, such as the CPU 911.

The first ciphertext generating unit 241 generates n first ciphertexts $C1_i$ (i being an integer greater than or equal to 1 and less than or equal to n) corresponding to the n recipients, based on the input information, by using a processing device, such as the CPU 911.

The first ciphertext generating unit 241 outputs the generated n first ciphertexts $C1_i$, by using a processing device, such as the CPU 911.

In the second ciphertext generation step S36, the second ciphertext generating unit 242 inputs the public encryption parameter stored by the encryption parameter storage unit 210, by using a processing device, such as the CPU 911.

The second ciphertext generating unit 242 inputs the n recipient identification information $ID_i$ output by the recipient identification input unit 232 at the recipient identification input step S32, by using a processing device, such as the CPU 911.

The second ciphertext generating unit 242 inputs the information indicating the n random numbers output by the random number generating unit 222 at the random number generation step S34, by using a processing device, such as the CPU 911.

The second ciphertext generating unit 242 generates n second ciphertexts $C2_i$ (i being an integer greater than or equal to 1 and less than or equal to n) respectively corresponding to the n recipients, based on the input information, by using a processing device, such as the CPU 911.

The second ciphertext generating unit 242 outputs the generated n second ciphertexts $C2_i$, by using a processing device, such as the CPU 911.

In the third ciphertext generation step S37, the third ciphertext generating unit 243 inputs the public encryption parameter stored by the encryption parameter storage unit 210, by using a processing device, such as the CPU 911.

The third ciphertext generating unit 243 inputs the information indicating the n random numbers output by the random number generating unit 222 at the random number generation step S34, by using a processing device, such as the CPU 911.

The third ciphertext generating unit 243 generates n third ciphertexts $C3_i$ (i being an integer greater than or equal to 1 and less than or equal to n) respectively corresponding to the n recipients, based on the input information, by using a processing device, such as the CPU 911.

The third ciphertext generating unit 243 outputs the generated n third ciphertexts $C3_i$, by using a processing device, such as the CPU 911.

In the hash value calculation step S38, the hash value calculation unit 244 inputs the public encryption parameter stored by the encryption parameter storage unit 210, by using a processing device, such as the CPU 911.

The hash value calculation unit 244 inputs the n first ciphertexts $C1_i$ output by the first ciphertext generating unit 241 at the first ciphertext generation step S35, by using a processing device, such as the CPU 911.

The hash value calculation unit 244 inputs the n second ciphertexts $C2_i$ output by the second ciphertext generating unit 242 at the second ciphertext generation step S36, by using a processing device, such as the CPU 911.

The hash value calculation unit 244 inputs the n third ciphertexts $C3_i$ output by the third ciphertext generating unit 243 at the third ciphertext generation step S37, by using a processing device, such as the CPU 911.

The hash value calculation unit 244 calculates a hash value H, based on the input information, by using a processing device, such as the CPU 911.

The hash value calculation unit 244 outputs the calculated hash value H, by using a processing device, such as the CPU 911.

In the ciphertext verification text generation step S39, the ciphertext verification text generating unit 245 inputs the public encryption parameter stored by the encryption parameter storage unit 210, by using a processing device, such as the CPU 911.

The ciphertext verification text generating unit 245 inputs the information indicating the n random numbers output by the random number generating unit 222 at the random number generation step S34, by using a processing device, such as the CPU 911.

The ciphertext verification text generating unit 245 inputs the hash value H output by the hash value calculation unit 244 at the hash value calculation step S38, by using a processing device, such as the CPU 911.

The ciphertext verification text generating unit 245 generates n ciphertext verification texts $CC_i$ (i being an integer greater than or equal to 1 and less than or equal to n) corresponding to the n recipients, based on the input information, by using a processing device, such as the CPU 911.

The ciphertext verification text generating unit 245 outputs the generated n ciphertext verification texts $CC_i$, by using a processing device, such as the CPU 911.

In the ciphertext combination step S40, the ciphertext combining unit 246 inputs the n first ciphertexts $C1_i$ output by the first ciphertext generating unit 241 at the first ciphertext generation step S35, by using a processing device, such as the CPU 911.

The ciphertext combining unit 246 inputs the n second ciphertexts $C2_i$ output by the second ciphertext generating unit 242 at the second ciphertext generation step S36, by using a processing device, such as the CPU 911.

The ciphertext combining unit 246 inputs the n third ciphertexts $C3_i$ output by the third ciphertext generating unit 243 at the third ciphertext generation step S37, by using a processing device, such as the CPU 911.

The ciphertext combining unit 246 inputs the n ciphertext verification texts $CC_i$ output by the ciphertext verification text generating unit 245 at the ciphertext verification text generation step S39, by using a processing device, such as the CPU 911.

The ciphertext combining unit 246 makes one key ciphertext C by combining the input n first ciphertexts $C1_i$, the input n second ciphertexts $C2_i$, the input n third ciphertexts $C3_i$, and the input n ciphertext verification texts $CC_i$, by using a processing device, such as the CPU 911.

The ciphertext combining unit 246 outputs the combined one key ciphertext C, by using a processing device, such as the CPU 911.

In the data encryption step S41, the data encryption unit 252 inputs the plaintext data output by the data input unit 251 at the plaintext data input step S31, by using a processing device, such as the CPU 911.

The data encryption unit 252 inputs the session key K output by the session key generating unit 221 at the session key generation step S33, by using a processing device, such as the CPU 911.

The data encryption unit 252 generates encrypted data by encrypting the input plaintext data with the input session key K, by using a processing device, such as the CPU 911.

The data encryption unit 252 outputs the encrypted data, by using a processing device, such as the CPU 911.

In the ciphertext notification step S42, the ciphertext notification unit 261 inputs the n recipient identification information $ID_i$ output by the recipient identification input unit 232 at the recipient identification input step S32, by using a processing device, such as the CPU 911.

The ciphertext notification unit 261 inputs the one key ciphertext C output by the ciphertext combining unit 246 at the ciphertext combination step S40, by using a processing device, such as the CPU 911.

The ciphertext notification unit 261 inputs the encrypted data output by the data encryption unit 252 at the data encryption step S41, by using a processing device, such as the CPU 911.

The ciphertext notification unit 261 generates data including the input one key ciphertext C and the input encrypted data, to be treated as notification data, by using a processing device, such as the CPU 911.

The ciphertext notification unit 261 notifies the ciphertext receiving apparatuses corresponding to the recipients identified by the input n recipient identification information $ID_i$ of the generated notification data, by using a processing device, such as the CPU 911.

FIG. 10 is a flowchart showing an example of the flow of ciphertext reception processing in which the ciphertext receiving apparatuses 301 to 303 according to the present Embodiment receive ciphertexts.

In the notification data receiving step S51, the ciphertext receiving unit 351 receives the notification data notified by the ciphertext generating apparatus 200, by using a processing device, such as the CPU 911.

The ciphertext receiving unit 351 acquires the one key ciphertext C and the encrypted data included in the received notification data, by using a processing device, such as the CPU 911.

The ciphertext receiving unit 351 outputs the acquired one key ciphertext C and encrypted data, by using a processing device, such as the CPU 911.

In the ciphertext decomposing step S52, the ciphertext decomposition unit 346 inputs the one key ciphertext C output by the ciphertext receiving unit 351 at the notification data receiving step S51, by using a processing device, such as the CPU 911.

The ciphertext decomposition unit 346 acquires n first ciphertexts $C1_i$, n second ciphertexts $C2_i$, n third ciphertexts $C3_i$, and n ciphertext verification texts $CC_i$, based on the input one key ciphertext C, by using a processing device, such as the CPU 911.

The ciphertext decomposition unit 346 outputs the acquired n first ciphertexts $C1_i$, n second ciphertexts $C2_i$, n third ciphertexts $C3_i$, and n ciphertext verification texts $CC_i$, by using a processing device, such as the CPU 911.

Moreover, the ciphertext decomposition unit 346 acquires a corresponding first ciphertext $C1_{ID}$, a corresponding second ciphertext $C2_{ID}$, a corresponding third ciphertext $C3_{ID}$, and a corresponding ciphertext verification text $CC_{ID}$, by using a processing device, such as the CPU 911.

The ciphertext decomposition unit 346 outputs the acquired corresponding first ciphertext $C1_{ID}$, corresponding second ciphertext $C2_{ID}$, corresponding third ciphertext $C3_{ID}$, and corresponding ciphertext verification text $CC_{ID}$, by using a processing device, such as the CPU 911.

In the verification hash value calculation step S53, the verification hash value calculation unit 344 inputs the public encryption parameter stored by the public parameter storage unit 310, by using a processing device, such as the CPU 911.

The verification hash value calculation unit 344 inputs the n first ciphertexts $C1_i$, the n second ciphertexts $C2_i$, and the n third ciphertexts $C3_i$ output by the ciphertext decomposition unit 346 at the ciphertext decomposing step S52, by using a processing device, such as the CPU 911.

The verification hash value calculation unit 344 calculates a verification hash value H', based on the input information, by using a processing device, such as the CPU 911.

The verification hash value calculation unit 344 outputs the calculated verification hash value H', by using a processing device, such as the CPU 911.

In the ciphertext verification step S54, the ciphertext verification unit 345 inputs the public encryption parameter stored by the public parameter storage unit 310, by using a processing device, such as the CPU 911.

The ciphertext verification unit 345 inputs the secret key stored by the secret key storage unit 323, by using a processing device, such as the CPU 911.

The ciphertext verification unit 345 inputs the corresponding second ciphertext $C2_{ID}$, the corresponding third ciphertext $C3_{ID}$, and the corresponding ciphertext verification text $CC_{ID}$ output by the ciphertext decomposition unit 346 at the ciphertext decomposing step S52, by using a processing device, such as the CPU 911.

The ciphertext verification unit 345 inputs the verification hash value H' output by the verification hash value calculation unit 344 at the verification hash value calculation step S53, by using a processing device, such as the CPU 911.

The ciphertext verification unit 345 generates verification information, based on the input information, by using a processing device, such as the CPU 911.

The ciphertext verification unit 345 judges whether the one key ciphertext C received by the ciphertext receiving unit 351 has consistency or not, based on the generated verification information and the input corresponding ciphertext verification text $CC_{ID}$, by using a processing device, such as the CPU 911.

When judged there is consistency, it goes to the ciphertext decrypting step S55.

When judged there is no consistency, the ciphertext reception processing is ended.

In the ciphertext decrypting step S55, the ciphertext decryption unit 341 inputs the public encryption parameter stored by the public parameter storage unit 310, by using a processing device, such as the CPU 911.

The ciphertext decryption unit 341 inputs the secret key stored by the secret key storage unit 323, by using a processing device, such as the CPU 911.

The ciphertext decryption unit 341 inputs the corresponding first ciphertext $C1_{ID}$, the corresponding second ciphertext $C2_{ID}$, and the corresponding third ciphertext $C3_{ID}$ output by the ciphertext decomposition unit 346 at the ciphertext decomposing step S52, by using a processing device, such as the CPU 911.

The ciphertext decryption unit 341 restores the plaintext M, based on the input information, by using a processing device, such as the CPU 911.

The ciphertext decryption unit 341 outputs the restored plaintext M, by using a processing device, such as the CPU 911.

In the data decrypting step S56, the data decryption unit 352 inputs the encrypted data output by the ciphertext receiving unit 351 at the notification data receiving step S51, by using a processing device, such as the CPU 911.

The data decryption unit 352 inputs the plaintext M output by the ciphertext decryption unit 341 at the ciphertext decrypting step S55, as a session key K', by using a processing device, such as the CPU 911.

The data decryption unit 352 decrypts the input encrypted data with the input session key K', to be treated as decrypted data, by using a processing device, such as the CPU 911.

The data decryption unit 352 outputs the decrypted data, by using a processing device, such as the CPU 911.

As described above, only the recipient to whom the plaintext data should be notified can restore the session key K, and then can decrypt the encrypted data.

The security of the ID-based cryptographic communication system 800 according to the present Embodiment is discussed below.

First, as the security in the multiple user case in the ID-based cryptosystem, MU-IND-ID-CCA2 security is defined as follows: "MU-IND-ID-CCA2 security" as used herein means the security against an attacker capable of adaptively selecting a target ID in the multiple user (Multi-User) case.

The cryptographic system 11 is an ID-based cryptographic communication system that includes a key generation capability S for PKG (Private Key Generator), a secret key derivation capability X, an encryption capability C, and a decryption capability D.

The key generation capability S for PKG inputs initial information Γ, and generates a master key msk for PKG, and a common parameter params.

The key generation capability S for PKG is equivalent to the function of the parameter setting unit 110 of the public encryption parameter generating apparatus 100 in the ID-based cryptographic communication system 800. The initial information Γ is equivalent to a group parameter. The master key msk for PKG is equivalent to secret information. The common parameter params is equivalent to a public encryption parameter.

The secret key derivation capability X inputs a user's identification information ID and a master key msk for PKG, and outputs a secret key $d_{ID}$.

The secret key derivation capability X is equivalent to the function of the secret key setting unit 130 of the encryption parameter generating apparatus 100 in the ID-based cryptographic communication system 800. The user's identification information ID is equivalent to recipient identification information.

The encryption capability E generates a ciphertext C, based on a user's identification information ID, a common parameter params, and a message M. The ciphertext C is equivalent to a key ciphertext C. The encryption capability E is equivalent to the function of the ciphertext generating apparatus 200 of the ID-based cryptographic communication system 800. The message M is equivalent to the plaintext M (=session key K).

The decryption capability D inputs a secret key $d_{ID}$, a common parameter params, and a ciphertext C, and decrypts a message. The decryption capability D returns a decrypted message. When failing in decryption, not a message but a "rejection" is returned.

The decryption capability D is equivalent to the function of the ciphertext receiving apparatuses 301 to 303 of the ID-based cryptographic communication system 800.

An attacker against the cryptographic system Π configured as mentioned above is defined as A.

Moreover, n=n(k) shall be a polynomial with respect to k.

The attacker A can use an encryption oracle $O_E$.

The encryption oracle $O_E$ previously selects either 0 or 1 at random to be treated as b.

The encryption oracle $O_E$ inputs the user's identification information ID* and two messages M0* and M1*.

The encryption oracle $O_E$ selects either one of the message M0* and the message M1*, based on b selected beforehand, generates a ciphertext C*, based on the input user's identification information ID* and common parameter params, and the selected message, by the encryption capability E, and replies it.

The attacker A can call the encryption oracle $O_E$ with respect to a different user's identification information ID*. However, the number of user's identification information ID* which the attacker A can input into the encryption oracle $O_E$ when calling the encryption oracle $O_E$ shall be less than or equal to n.

Moreover, the attacker A can input different messages M0* and M1* for the same user's identification information ID* when calling the encryption oracle $O_E$.

Thus, the attacker A calls the encryption oracle $O_E$ a plurality of times. The encryption oracle $O_E$ always selects the same one (if selecting the former, the former is always selected, and if selecting the latter, the latter is always selected) of the input two messages.

Moreover, the attacker A can use a key derivation oracle $O_X$.

The key derivation oracle $O_X$ inputs a user's identification information ID.

The key derivation oracle $O_X$ generates a secret key $d_{ID}$, based on the master key msk for PKG which is not known to the attacker A and the input the user's identification information ID, by the key derivation capability X, and replies it.

Moreover, the attacker A can use a decryption oracle $O_D$.

The decryption oracle $O_D$ inputs a user's identification information ID and a ciphertext C.

The decryption oracle $O_D$ generates a secret key $d_{ID}$, based on the master key msk for PKG which is not known to the attacker A, and the input user's identification information $ID_i$ by the key derivation capability X. The decryption oracle $O_D$ decrypts a message, based on the generated secret key $d_{ID}$, the common parameter params, and the input ciphertext C, by the decryption capability E. The decryption oracle $O_D$ replies the decrypted message (or "rejection").

The attacker A tries the game of guessing b to be 0 or 1, by using these oracles. The attacker A cannot input the user's identification information ID which has been input into the key derivation oracle $O_X$, into the encryption oracle $O_E$. If the attacker A knows the secret key $d_{ID}$, since he can decrypt the ciphertext C* output by the encryption oracle, it is easy for him to guess which message has been encrypted, which means no cryptography has been broken.

The attacker A cannot even input, inversely to the above, the user's identification information ID* which has been input into the encryption oracle $O_E$, into the key derivation oracle $O_X$.

Moreover, the attacker A cannot even input a combination of the user's identification information ID* which has been input into the encryption oracle $O_E$, and the ciphertext C which has been output by the encryption oracle $O_E$ in responsive to the user's identification information ID*, into the decryption oracle $O_D$. Also, in the case of decrypting the ciphertext C* output by the encryption oracle, by using the decryption oracle $O_D$, since it is easy to guess which message has been encrypted, which means no cryptography has been broken.

Except for the restriction mentioned above, the attacker A calls the oracles freely and guesses b to be 0 or 1. The attacker A outputs the guess result b'.

The number of times of the attacker A's calling the encryption oracle $O_E$ per user's identification information ID is made to be $q_e$. That is, there is a possibility of the encryption oracle $O_E$ being called $n \cdot q_e$ times at the maximum.

The number of times of the attacker A's calling the decryption oracle $O_D$ is made to be $q_d$ and calling the key derivation oracle $O_X$ is made to be $q_x$.

When the attacker A cannot break the cryptography at all, the probability of b=b' is ½. When the attacker A can always break the cryptography, the probability of b=b' is 1. When the attacker A may be able to decipher the cryptography, the probability of b=b' is between ½ and 1. Also, although the probability of b=b' may become less than ½, in that case it can be said that the attacker A has broken the cryptography in the opposite meaning.

Then, the attacker A's advantage Adv is defined as follows:
$Adv^{mu}_{n,\Pi,\Gamma}(A)=/Pr[Game^{mu}_{n,\Pi,\Gamma}(A,0)=0]-Pr[Game^{mu}_{n,\Pi,\Gamma}(A,1)=0]/$.

Pr[ . . . ] as used herein indicates probability of generation of the event.

$Game^{mu}_{n,\Pi,\Gamma}(A,0)$ denotes a value of the guess result b' guessed by the attacker A in the case of b=0. Therefore, $Game^{mu}_{n,\Pi,\Gamma}(A,0)=0$ indicates a event in which the attacker A succeeds in guessing when b=0. $Game^{mu}_{n,\Pi,\Gamma}(A,1)$ denotes a value of the guess result b' guessed by the attacker A in the case of b=1. Therefore, $Game^{mu}_{n,\Pi,\Gamma}(A,1)=0$ indicates a event in which the attacker A fails in guessing when b=1.

That is, when the attacker A outputs a guess result b'=0, $Adv^{mu}_{n,\Pi,\Gamma}(A)$ denotes the absolute value of the difference between the probability of succeeding in guessing and the probability of failing in guessing. In the case the attacker A cannot break the cryptography at all, $Adv^{mu}_{n,\Pi,\Gamma}(A)$ is 0. In the case the attacker A can always break the cryptography, $Adv^{mu}_{n,\Pi,\Gamma}(A)$ is 1. When the attacker A may be able to break the cryptography, $Adv^{mu}_{n,\Pi,\Gamma}(A)$ is a value between 0 and 1.

n user security of the cryptographic system Π is defined as follows:

$$Adv^{mu}_{n,\Pi,\Gamma}(t,q_e,q_d,q_x)=\max \{Adv^{mu}_{n,\Pi,\Gamma}(A)\}.$$

This indicates the advantage of the attacker having the highest advantage among the attackers A who provide an answer within the time t by calling the encryption oracle $O_E$ $q_e$ times per ID, the decryption oracle $O_D$ $q_d$ times, and the key derivation oracle $O_X$ $q_x$ times.

When $Adv^{mu}_{n,\Pi,\Gamma}(t,q_e,q_d,q_x)$ is ignorable (negligible) for all polynomials n(k) with respect to k, the cryptographic system Π is said to have $(t,q_e,q_d,q_x)$–MU security.

What is conventionally defined as the security of the ID-based cryptosystem is a special case of the security herein defined, and is the MU security in the case of $q_e=1$ and n=1.

Next, as the security in the multiple recipient case in the ID-based cryptosystem, SMMR-IND-ID-CCA2 security is defined as follows: "SMMR-IND-ID-CCA2 security" as used herein means the security against an attacker capable of adaptively selecting a target $ID_i$ in the case of transmitting a single message to multiple recipients (Multi-Recipient).

The cryptographic system is a multiple recipient ID-based cryptographic system in which a single message is multicasted. The cryptographic system Π' includes a key generation capability S' for PKG, a secret key derivation capability X', an encryption capability E', a ciphertext separation capability T' and a decryption capability D'.

Since the key generation capability S' for PKG, and the secret key derivation capability X' are similar to the key generation capability S for PKG, and the secret key derivation capability X' in the definition of the MU-IND-ID-CCA2 security, explanation is omitted.

The encryption capability E' inputs multiple users' identification information ID=($ID_1$, $ID_2$, . . . , $ID_n$), a common parameter params, and a message M, to generate a ciphertext C.

The ciphertext separation capability T' inputs the ciphertext C, and separates it for each $ID_i$ to generate a ciphertext $C_{ID}$.

The ciphertext separation capability T' is equivalent to the function of the ciphertext decomposition unit 346 of the ciphertext receiving apparatus of the ID-based cryptographic communication system 800.

The decryption capability D' inputs the secret key $d_{ID}$, the common parameter params, and the (separated) ciphertext $C_{ID}$ for the ID, and returns the decrypted message (or "rejection").

An attacker against the cryptographic system Π' configured as mentioned above is defined as A.

The attacker A can use an encryption oracle $O_{E'}$. The encryption oracle $O_{E'}$ inputs each identification information ID*=($ID_1$*, $ID_2$*, $ID_n$*) of n users and two messages M0* and M1*.

The encryption oracle $O_{E'}$ randomly selects either 0 or 1 to be treated as b.

The encryption oracle $O_{E'}$ selects either one of the input two messages M0* and M1*, based on the selected b, and generates a ciphertext C*, based on the input each identification information ID* of n users, and common parameter params, and the selected message, by the encryption capability E, and replies it.

Moreover, the attacker A can use a key derivation oracle $O_{X'}$. The key derivation oracle $O_{X'}$ inputs (one) user's identification information ID. The key derivation oracle $O_{X'}$ generates a secret key $d_{ID}$, based on the master key msk for PKG which is not known to the attacker A, and the input user's identification information $ID_i$ by the key derivation capability X', and replies it.

Moreover, the attacker A can use a decryption oracle $O_{D'}$. The decryption oracle $O_{D'}$ inputs a user's identification information ID and a (separated) ciphertext $C_{ID}$ for the ID. The decryption oracle $O_{D'}$ generates a secret key $d_{ID}$, based on the master key msk for PKG which is not known to the attacker A, and the input user's identification information ID, by the key derivation capability X'. The decryption oracle $O_{D'}$ decrypts the message, based on the generated secret key $d_{ID}$, the common parameter params, and the input ciphertext $C_{ID}$, by the decryption capability D'. The decryption oracle $O_{D'}$ replies the decrypted message (or "rejection").

The attacker A tries the game of guessing b to be 0 or 1, by calling the encryption oracle $O_{E'}$ once.

The attacker A can call the key derivation oracle $O_{X'}$ and the decryption oracle $O_{D'}$ a plurality of times at both before and after calling the encryption oracle $O_{E'}$.

However, the attacker A cannot input the user's identification information included in each identification information ID* of n users, which has been input or is to be input into the encryption oracle $O_{E'}$, into the key derivation oracle $O_{X'}$.

Moreover, the attacker A cannot even input a combination of user's identification information included in each identification information ID* of n users, which has been input into the encryption oracle $O_{E'}$, and the ciphertext $C_{ID}$ corresponding to the identification information among the ciphertexts C which the encryption oracle Op has output in responsive to the user's identification information, into the decryption oracle $O_{D'}$, either.

Except for the restriction mentioned above, the attacker A freely calls the key derivation oracle $O_{X'}$ and the decryption oracle $O_{D'}$, and guesses b to be 0 or 1. The attacker A outputs the guess result b'.

Based on the above game, the advantage Adv of the attacker is defined as follows similarly to the case of the MU-IND-ID-CCA2 security.

$\text{Adv}^{smmr}_{n,\Pi',\Gamma}(A) = |Pr[\text{Game}^{smmr}_{n,\Pi',\Gamma}(A,0)=0] - Pr[\text{Game}^{smmr}_{n,\Pi',\Gamma}(A,1)=0]|$.

Moreover, n recipient security of the cryptographic system Π' is similarly defined as follows:

$\text{Adv}^{smmr}_{n,\Pi',\Gamma}(t,q_d,q_x) = \max\{\text{Adv}^{smmr}_{n,\Pi',\Gamma}(A)\}$.

This indicates the advantage of the attacker having the highest advantage among the attackers A who provide an answer within the time t by calling the decryption oracle $O_D$, $q_d$ times and the key derivation oracle $O_{X'}$ $q_x$ times.

When $\text{Adv}^{smmr}_{n,\Pi',\Gamma}(t,q_d,q_x)$ is negligible for all polynomials n(k) with respect to k, the cryptographic system Π' is said to have $(t,q_d,q_x)$-SMMR security.

Based on the above definition, the SMMR-IND-ID-CCA2 security of the ID-based cryptographic communication system 800 according to the present Embodiment will be explained.

In the ID-based cryptographic communication system 800 of the present Embodiment, the hash value calculation unit 244 calculates one hash value H, based on n ciphertext bodies $CB_i$ corresponding to n recipients. This method is called a "common hash value method."

On the other hand, there may be a method in which the hash value calculation unit 244 calculates a hash value, based on each of n ciphertext bodies $CB_i$ corresponding to n recipients, and calculates n hash values corresponding to the n recipients. This method will be called a "conjunctive method." First, security of the conjunctive method is now described.

The encryption oracle $O_E$ in the definition of the SMMR-IND-ID-CCA2 security inputs each of identification information $ID^* = (ID_1^*, ID_2^*, \ldots, ID_n^*)$ of n users, to perform encryption processing.

On the other hand, the encryption oracle $O_E$ in the definition of the MU-IND-ID-CCA2 security inputs an identification information $ID^*$ of (one) user, to perform encryption processing.

Therefore, performing encryption processing for each user's identification information by calling the encryption oracle $O_E$ in the definition of the MU-IND-ID-CCA2 security n times is equivalent to the encryption oracle $O_E$ in the definition of the SMMR-IND-ID-CCA2 security.

Moreover, the key derivation oracle $O_X$ and the decryption oracle $O_D$ in the definition of the MU-IND-ID-CCA2 security are equivalent to the key derivation oracle $O_{X'}$ and the decryption oracle $O_{D'}$ in the definition of the SMMR-IND-ID-CCA2 security.

As mentioned above, the n recipient SMMR security of the cryptographic system Π' based on the conjunctive method is equivalent to the n user MU security in the case of $q_e=1$ in the original cryptographic system Π. That is, $\text{Adv}^{smmr}_{n,\Pi',\Gamma}(t,q_d,q_x) = \text{Adv}^{mu}_{n,\Pi,\Gamma}(t,1,q_d,q_x)$.

The MU security for the general public key cryptosystem Π can be proved to be $\text{Adv}^{mu}_{n,\Pi,\Gamma}(t,q_e,q_d,q_x) \leq q_e \cdot n \cdot \text{Adv}^{mu}_{1,\Pi,\Gamma}(t',1,q_d,q_x)$. This can also be applicable to the case of the ID-based cryptosystem.

Since $\text{Adv}^{mu}_{1,\Pi,\Gamma}(t',1,q_d,q_x)$ is the security in the case of n=1 and $q_e=1$ of the n user MU security, it is what is conventionally defined as the security of the ID-based cryptosystem.

Therefore, the SMMR security of the multiple recipient ID-based cryptosystem made by extending the ID-based cryptosystem, whose security has been proved in the conventional meaning, by the conjunctive method becomes as follows:
$\text{Adv}^{smmr}_{n,\Pi',\Gamma}(t,q_d,q_x) \leq n \cdot \text{Adv}^{mu}_{1,\Pi,\Gamma}(t',1,q_d,q_x)$ Thereby, the security can be proved.

Thus, the SMMR security based on the conjunctive method can be directly led from the MU security of the original (single recipient) ID-based cryptosystem, but the SMMR security of the common hash value method needs to be concretely proved.

In the common hash value method, since it is enough for the hash value calculation unit 244 to calculate one hash value H, the amount of processing of calculating a hash value by the hash value calculation unit 244 can be reduced compared with the conjunctive method in which n hash values corresponding to n recipients are calculated. Moreover, as to the processing of generating a ciphertext verification text CC by the ciphertext verification text generating unit 245, since it is possible to make calculations from the beginning to the middle be common to perform the calculation once, in the common hash value method, the amount of processing of generating a ciphertext verification text CC by the ciphertext verification text generating unit 245 can also be reduced compared with the conjunctive method in which most of calculations need to be repeated n times. Thereby, since the processing speed of the ciphertext generation processing in the ciphertext generating apparatus 200 becomes fast, the ciphertext generation processing can be completed within a practical time even if the throughput of the processing device, such as the CPU 911, of the ciphertext generating apparatus 200 is low.

The ciphertext generating apparatus 200 according to the present Embodiment that generates a ciphertext C (key ciphertext C) to notify n recipients (n being an integer greater than or equal to 1) of a plaintext M has the following features:

The ciphertext generating apparatus 200 includes a storage device for storing information, such as the magnetic disk drive 920, a processing device for processing information, such as the CPU 911, the encryption parameter storage unit 210, the recipient identification input unit 232, the plaintext input unit 231, the ciphertext body generating unit 240, the hash value calculation unit 244, the ciphertext verification text generating unit 245, and the ciphertext combining unit 246.

The encryption parameter storage unit 210 stores a public encryption parameter by using a storage device, such as the magnetic disk drive 920.

The recipient identification input unit 232 inputs n recipient identification information $ID_i$ (i being an integer greater than or equal to 1 and less than or equal to n) for identifying the n recipients respectively, by using a processing device, such as the CPU 911.

The plaintext input unit 231 inputs the plaintext M by using a processing device, such as the CPU 911.

The ciphertext body generating unit 240 generates n ciphertext bodies $CB_i$ (i being an integer greater than or equal to 1 and less than or equal to n) corresponding to the n recipients, based on the public encryption parameter stored by the encryption parameter storage unit 210, the n recipient identification information $ID_i$ input by the recipient identification input unit 232, and the plaintext M input by the plaintext input unit 231, by using a processing device, such as the CPU 911.

The hash value calculation unit 244 generates a combined ciphertext by combining the n ciphertext bodies $CB_i$ generated by the ciphertext body generating unit 240, by using a processing device, such as the CPU 911, and calculates a hash value H based on the combined ciphertext generated, by using a processing device, such as the CPU 911.

The ciphertext verification text generating unit 245 generates a ciphertext verification text CC, based on the public encryption parameter stored by the encryption parameter storage unit 210 and the hash value H calculated by the hash value calculation unit 244, by using a processing device, such as the CPU 911.

The ciphertext combining unit 246 makes one ciphertext C by combining the n ciphertext bodies $CB_i$ generated by the ciphertext body generating unit 240 and the ciphertext verification text CC generated by the ciphertext verification text generating unit 245, by using a processing device, such as the CPU 911.

The ciphertext generating apparatus 200 according to the present Embodiment has the following effect:

In the ID-based cryptographic communication system, since only once processing of calculating a hash value and only once processing based on the calculated hash value, which are parts of processing for generating one ciphertext C to notify a plurality of recipients of the same plaintext M, are required, the processing efficiency is increased, thereby enabling high speed encryption processing.

The ciphertext generating apparatus 200 according to the present Embodiment has the following features:

The ciphertext generating apparatus 200 further includes the random number generating unit 222.

The random number generating unit 222 randomly generates n integers $s_i$ (i being an integer greater than or equal to 1 and less than or equal to n) corresponding to n recipients, by using a processing device, such as the CPU 911.

The ciphertext body generating unit 240 includes the first ciphertext generating unit 241, the second ciphertext generating unit 242, and the third ciphertext generating unit 243.

The first ciphertext generating unit 241 generates n first ciphertexts $C1_i$ (i being an integer greater than or equal to 1 and less than or equal to n) corresponding to the n recipients, based on the public encryption parameter stored by the encryption parameter storage unit 210, the plaintext M input by the plaintext input unit 231, and then integers $s_i$ generated by the random number generating unit 222, by using a processing device, such as the CPU 911.

The second ciphertext generating unit 242 generates n second ciphertexts $C2_i$ (i being an integer greater than or equal to 1 and less than or equal to n) corresponding to the n recipients, based on the public encryption parameter stored by the encryption parameter storage unit 210, the n recipient identification information $ID_i$ input by the recipient identification input unit 232, and the n integers $s_i$ generated by the random number generating unit 222, by using a processing device, such as the CPU 911.

The third ciphertext generating unit 243 generates n third ciphertexts $C3_i$ (i being an integer greater than or equal to 1 and less than or equal to n) corresponding to the n recipients, based on the public encryption parameter stored by the encryption parameter storage unit 210 and the n integers $s_i$ generated by the random number generating unit 222, by using a processing device, such as the CPU 911.

The hash value calculation unit 244 makes one combined ciphertext by combining the n first ciphertexts $C1_i$ generated by the first ciphertext generating unit 241, the n second ciphertexts $C2_i$ generated by the second ciphertext generating unit 242, and the n third ciphertexts $C3_i$ generated by the third ciphertext generating unit 243, by using a processing device, such as the CPU 911, and calculates one hash value $H_0$ based on the one combined ciphertext by using a processing device, such as the CPU 911.

The ciphertext verification text generating unit 245 generates n ciphertext verification texts $CC_i$ (i being an integer greater than or equal to 1 and less than or equal to n) corresponding to the n recipients, based on the public encryption parameter stored by the encryption parameter storage unit 210, the n integers $s_i$ generated by the random number generating unit 222, and the one hash value $H_0$ calculated by the hash value calculation unit 244, by using a processing device, such as the CPU 911.

The ciphertext combining unit 246 makes one ciphertext C (key ciphertext C) by combining the n first ciphertexts $C1_i$ generated by the first ciphertext generating unit 241, the n second ciphertexts $C2_i$ generated by the second ciphertext generating unit 242, the n third ciphertexts $C3_i$ generated by the third ciphertext generating unit 243, and the n ciphertext verification texts $CC_i$ generated by the ciphertext verification text generating unit 245, by using a processing device, such as the CPU 911.

The ciphertext generating apparatus 200 according to the present Embodiment has the following effects:

The hash value calculation unit 244 calculates one hash value $H_0$ being common regardless of the recipient, thereby reducing the processing amount of the ciphertext generation processing in the ciphertext generating apparatus 200.

Moreover, in the ID-based cryptographic communication system whose recipient has been extended to multiple recipients from the ID-based cryptographic communication system whose security has been proved with respect to a single recipient, it is possible to prove the security similar to that of the single recipient case.

The ciphertext generating apparatus 200 according to the present Embodiment has the following features:

The ciphertext body generating unit 240 generates n ciphertext bodies $CB_i$ including n recipient identification information $ID_i$ input by the recipient identification input unit 232, by using a processing device, such as the CPU 911.

The ciphertext generating apparatus 200 according to the present Embodiment has the following effect:

Since n ciphertext bodies $CB_i$ used as the basis of the hash value calculated by the hash value calculation unit 244 include n recipient identification information, the security of the ID-based cryptographic communication system is increased.

The ciphertext generating apparatus 200 according to the present Embodiment has the following features:

The ciphertext generating apparatus 200 further includes the ciphertext notification unit 261.

The ciphertext notification unit 261 notifies the n recipients identified by the n recipient identification information $ID_i$ input by the recipient identification input unit 232, of the one ciphertext C combined by the ciphertext combining unit 246, by using a processing device, such as the CPU 911.

The ciphertext generating apparatus 200 according to the present Embodiment has the following effect:

Since the ciphertext notification unit 261 notifies n recipients of the same ciphertext C, the load applied to the traffic of the communication path for notifying the ciphertext is small.

The ciphertext generating apparatus 200 according to the present Embodiment has the following features:

The ciphertext generating apparatus 200 further includes the session key generating unit 221.

The session key generating unit 221 randomly generates a bit sequence of predetermined length, as a session key K, by using a processing device, such as the CPU 911.

The plaintext input unit 231 inputs the session key K generated by the session key generating unit, as the plaintext M, by using a processing device, such as the CPU 911.

The ciphertext generating apparatus 200 according to the present Embodiment has the following effect:

Since the session key generating unit 221 generates a session key K, and then generates a ciphertext C for notifying a notified party of the generated session key, the security is higher compared with the case of inputting the session key K from the outside.

The ciphertext generating apparatus 200 according to the present Embodiment has the following features:

The ciphertext generating apparatus 200 further includes the data input unit 251, the data encryption unit 252, and the ciphertext notification unit 261.

The data input unit 251 inputs one plaintext data to be transmitted to n recipients, by using a processing device, such as the CPU 911.

The data encryption unit 252 generates one encrypted data by encrypting one plaintext data input by the data input unit 251, with the session key K generated by the session key generating unit 221, by using a processing device, such as the CPU 911.

The ciphertext notification unit 261 notifies the n recipients identified by the n recipient identification information $ID_i$ input by the recipient identification input unit 232 of one ciphertext C (key ciphertext C) combined by the ciphertext combining unit 246 and one encrypted data encrypted by the data encryption unit 252, by using a processing device, such as the CPU 911.

The ciphertext generating apparatus 200 according to the present Embodiment has the following effect:

Since the data encryption unit 252 encrypts plaintext data with one session key K being common regardless of the recipient, and the ciphertext notification unit 261 notifies the recipient of one ciphertext C being common regardless of the recipient and one encrypted data, the load applied to the traffic of the communication path is small.

The ID-based cryptographic communication system 800 (cryptographic communication system) according to the present Embodiment that notifies n recipients (n being an integer greater than or equal to 1), each having a corresponding ciphertext receiving apparatus, of a plaintext M (session key K) through one ciphertext C (key ciphertext C) has the following features:

The ID-based cryptographic communication system 800 includes the encryption parameter generating apparatus 100, the ciphertext generating apparatus 200, and a plurality of ciphertext receiving apparatuses 301 to 303.

The encryption parameter generating apparatus 100 includes a storage device for storing information, such as the magnetic disk drive 920, a processing device for processing information, such as the CPU 911, the secret information generating unit 112, the secret information storage unit 121, the public parameter generating unit 113, the public parameter publishing unit 114, the identification information input unit 131, the secret key generating unit 132, and the secret key notification unit 133.

The secret information generating unit 112 randomly generates secret information by using a processing device, such as the CPU 911.

The secret information storage unit 121 stores the secret information generated by the secret information generating unit 112, by using a storage device, such as the magnetic disk drive 920.

The public parameter generating unit 113 generates a public encryption parameter, based on the secret information generated by the secret information generating unit 112, by using a processing device, such as the CPU 911.

The public parameter publishing unit 114 publishes the public encryption parameter generated by the public parameter generating unit 113, by using a processing device, such as the CPU 911.

The identification information input unit 131 inputs recipient identification information ID for identifying one recipient corresponding to one ciphertext receiving apparatus among a plurality of ciphertext receiving apparatuses 301 to 303, by using a processing device, such as the CPU 911.

The secret key generating unit 132 generates a secret key $d_{ID}$ corresponding to the one recipient, based on the secret information stored by the secret information storage unit 121, the public encryption parameter generated by the public parameter generating unit 113, and the recipient identification information ID input by the identification information input unit 131, by using a processing device, such as the CPU 911.

The secret key notification unit 133 secretly notifies one ciphertext receiving apparatus corresponding to the one recipient of the secret key $d_{ID}$ generated by the secret key generating unit 132, by using a processing device, such as the CPU 911.

The ciphertext generating apparatus 200 includes a storage device for storing information, such as the magnetic disk drive 920, a processing device for processing information, such as the CPU 911, the encryption parameter storage unit 210, the recipient identification input unit 232, the plaintext input unit 231, the random number generating unit 222 the ciphertext body generating unit 240, the hash value calculation unit 244, the ciphertext verification text generating unit 245, the ciphertext combining unit 246, and the ciphertext notification unit 261.

The encryption parameter storage unit 210 stores the public encryption parameter published by the encryption parameter generating apparatus 100, by using a storage device, such as the magnetic disk drive 920.

The recipient identification input unit 232 inputs n recipient identification information $ID_i$ (i being an integer greater than or equal to 1 and less than or equal to n) for respectively identifying n recipients, by using a processing device, such as the CPU 911.

The plaintext input unit 231 inputs the plaintext M by using a processing device, such as the CPU 911.

The second ciphertext generating unit 242 generates n ciphertext bodies $CB_i$ (i being an integer greater than or equal to 1 and less than or equal to n) corresponding to the n recipients, based on the public encryption parameter stored by the encryption parameter storage unit 210, the n recipient identification information $ID_i$ input by the recipient identification input unit 232, and the plaintext M input by the plaintext input unit 231, by using a processing device, such as the CPU 911.

The hash value calculation unit 244 generates a combined ciphertext by combining the n ciphertext bodies $CB_i$ generated by the ciphertext body generating unit 240, by using a processing device, such as the CPU 911, and calculates a hash value H based on the combined ciphertext generated, by using a processing device, such as the CPU 911.

The ciphertext verification text generating unit 245 generates a ciphertext verification text $CC_i$ based on the public encryption parameter stored by the encryption parameter storage unit 210 and the hash value H calculated by the hash value calculation unit 244, by using a processing device, such as the CPU 911.

The ciphertext combining unit 246 makes one ciphertext C (key ciphertext C) by combining the n ciphertext bodies $CB_i$ generated by the ciphertext body generating unit 240 and the ciphertext verification text CC generated by the ciphertext verification text generating unit 245, by using a processing device, such as the CPU 911.

The ciphertext notification unit 261 notifies n ciphertext receiving apparatuses corresponding to the n recipients of the one ciphertext C combined by the ciphertext combining unit 246, by using a processing device, such as the CPU 911.

Each of a plurality of ciphertext receiving apparatuses 301 to 303 includes a storage device for storing information, such as the magnetic disk drive 920, a processing device for processing information, such as the CPU 911, the public parameter storage unit 310, the secret key storage unit 323, the ciphertext receiving unit 351, the ciphertext decomposition unit 346, the verification hash value calculation unit 344, the ciphertext verification unit 345, and the ciphertext decryption unit 341.

The public parameter storage unit 310 stores the public encryption parameter published by the encryption parameter generating apparatus 100, by using a storage device, such as the magnetic disk drive 920.

The secret key storage unit 323 stores the secret key $d_{ID}$ notified by the encryption parameter generating apparatus 100, by using a storage device, such as the magnetic disk drive 920.

The ciphertext receiving unit 351 receives the one ciphertext C (key ciphertext C) notified by the ciphertext generating apparatus 200, by using a processing device, such as the CPU 911.

The ciphertext decomposition unit 346 acquires the n ciphertext bodies $CB_i$ and the ciphertext verification text $CC_i$ based on the one ciphertext C received by the ciphertext receiving unit 351, by using a processing device, such as the CPU 911, and acquires one corresponding ciphertext body $CB_{ID}$, which is corresponding to the recipient corresponding to the ciphertext receiving apparatus, among the acquired n ciphertext bodies $CB_i$, by using a processing device, such as the CPU 911.

The verification hash value calculation unit 344 calculates a verification hash value H', based on a combined verification ciphertext made by combining the n ciphertext bodies $CB_i$ acquired by the ciphertext decomposition unit 346, by using a processing device, such as the CPU 911.

The ciphertext verification unit 345 judges whether the one ciphertext C received by the ciphertext receiving unit 351 has consistency or not, based on the public encryption parameter stored by the public parameter storage unit 310, the one corresponding ciphertext body $CB_{ID}$ and the ciphertext verification text CC acquired by the ciphertext decomposition unit 346, and the verification hash value H' calculated by the verification hash value calculation unit 344, by using a processing device, such as the CPU 911.

When the ciphertext verification unit 345 judges that the one ciphertext C received by the ciphertext receiving unit 351 has consistency, the ciphertext decryption unit 341 restores the plaintext M, based on the public encryption parameter stored by the public parameter storage unit 310, the secret key $d_{ID}$ stored by the secret key storage unit 323, and the one corresponding ciphertext body $CB_{ID}$ acquired by the ciphertext decomposition unit 346, by using a processing device, such as the CPU 911.

The ID-based cryptographic communication system 800 according to the present Embodiment has the following effect:

In the ID-based cryptographic communication system, a plurality of recipients are notified of the same plaintext M through one ciphertext C and other recipients cannot decipher the ciphertext C.

The ID-based cryptographic communication system 800 (cryptographic communication system) according to the present Embodiment has the following features:

The ciphertext generating apparatus 200 further includes the random number generating unit 222.

The random number generating unit 222 randomly generates n integers $s_i$ (i being an integer greater than or equal to 1 and less than or equal to n) corresponding to n recipients, by using a processing device, such as the CPU 911.

The ciphertext body generating unit 240 includes the first ciphertext generating unit 241, the second ciphertext generating unit 242, and the third ciphertext generating unit 243.

The first ciphertext generating unit 241 generates n first ciphertexts $C1_i$ (i being an integer greater than or equal to 1 and less than or equal to n) corresponding to the n recipients, based on the public encryption parameter stored by the encryption parameter storage unit 210, the plaintext M input by the plaintext input unit 231, and the n integers $s_i$ generated by the random number generating unit 222, by using a processing device, such as the CPU 911.

The second ciphertext generating unit 242 generates n second ciphertexts $C2_i$ (i being an integer greater than or equal to 1 and less than or equal to n) corresponding to the n recipients, based on the public encryption parameter stored by the encryption parameter storage unit 210, the n recipient identification information $ID_i$ input by the recipient identification input unit 232, and the n integers $s_i$ generated by the random number generating unit 222, by using a processing device, such as the CPU 911.

The third ciphertext generating unit 243 generates n third ciphertexts $C3_i$ (i being an integer greater than or equal to 1 and less than or equal to n) corresponding to the n recipients, based on the public encryption parameter stored by the encryption parameter storage unit 210, and the n integers $s_i$ generated by the random number generating unit 222, by using a processing device, such as the CPU 911.

The hash value calculation unit 244 makes one combined ciphertext by combining the n first ciphertexts $C1_i$ generated by the first ciphertext generating unit 241, the n second ciphertexts $C2_i$ generated by the second ciphertext generating unit 242, and the n third ciphertexts $C3_i$ generated by the third ciphertext generating unit 243, by using a processing device, such as the CPU 911, and calculates one hash value $H_0$, based on the one combined ciphertext, by using a processing device, such as the CPU 911.

The ciphertext verification text generating unit 245 generates n ciphertext verification texts $CC_i$ (i being an integer greater than or equal to 1 and less than or equal to n) corresponding to the n recipients, based on the public encryption parameter stored by the encryption parameter storage unit 210, the n integers $s_i$ generated by the random number generating unit 222, and the one hash value $H_0$ calculated by the hash value calculation unit 244, by using a processing device, such as the CPU 911.

The ciphertext combining unit 246 makes one ciphertext C (key ciphertext C) by combining the n first ciphertexts $C1_i$ generated by the first ciphertext generating unit 241, the n second ciphertexts $C2_i$ generated by the second ciphertext generating unit 242, the n third ciphertexts $C3_i$ generated by the third ciphertext generating unit 243, and the n ciphertext verification texts $CC_i$ generated by the ciphertext verification text generating unit 245, by using a processing device, such as the CPU 911.

The ciphertext decomposition unit 346 acquires the n first ciphertexts $C1_i$, the n second ciphertexts $C2_i$, the n third ciphertexts $C3_i$, and the n ciphertext verification texts $CC_i$, based on the one ciphertext C received by the ciphertext receiving unit 351, by using a processing device, such as the CPU 911, and acquires one corresponding first ciphertext $C1_{ID}$, one corresponding second ciphertext $C2_{ID}$, one corresponding third ciphertext $C3_{ID}$, and one corresponding ciphertext verification text $CC_{ID}$, which are corresponding to the recipient corresponding to the ciphertext receiving apparatus, from the acquired n first ciphertexts $C1_i$, n second ciphertexts $C2_i$, n third ciphertexts $C3_i$, and n ciphertext verification texts $CC_i$, by using a processing device, such as the CPU 911.

The verification hash value calculation unit 344 calculates a verification hash value H', based on the combined verification ciphertext made by combining the n first ciphertexts $C1_i$, the n second ciphertexts $C2_i$, and the n third ciphertexts $C3_i$ acquired by the ciphertext decomposition unit 346, by using a processing device, such as the CPU 911.

The ciphertext verification unit 345 judges whether the one ciphertext C received by the ciphertext receiving unit 351 has consistency or not, based on the public encryption parameter stored by the public parameter storage unit 310, at least either one of the one corresponding second ciphertext $C2_{ID}$ and the one corresponding third ciphertext $C3_{ID}$, and the one corresponding ciphertext verification text acquired by the ciphertext decomposition unit 346, and the verification hash value H' calculated by the verification hash value calculation unit 344, by using a processing device, such as the CPU 911.

When the ciphertext verification unit 345 judges that the one ciphertext C received by the ciphertext receiving unit 351 has consistency, the ciphertext decryption unit 341 restores the plaintext M, based on the public encryption parameter stored by the public parameter storage unit 310, the secret key $d_{ID}$ stored by the secret key storage unit 323, and the one corresponding first ciphertext $C1_{ID}$, the one corresponding second ciphertext $C2_{ID}$, and the one corresponding third ciphertext $C3_{ID}$ acquired by the ciphertext decomposition unit 346, by using a processing device, such as the CPU 911.

The ID-based cryptographic communication system 800 according to the present Embodiment has the following effect:

Since the hash value calculation unit 244 calculates one hash value $H_0$ being common regardless of the recipient, the processing amount of the ciphertext generation processing in the ciphertext generating apparatus 200 can be reduced.

Moreover, in the ID-based cryptographic communication system whose recipient has been extended to multiple recipients from the ID-based cryptographic communication system whose security has been proved with respect to a single recipient, it is possible to prove the security similar to that of the single recipient case.

The ID-based cryptographic communication system 800 (cryptographic communication system) according to the present Embodiment has the following features:

The ciphertext body generating unit 240 generates n ciphertext bodies $CB_i$ including the n recipient identification information $ID_i$ input by the recipient identification input unit 232, by using a processing device, such as the CPU 911.

The ID-based cryptographic communication system 800 according to the present Embodiment has the following effect:

The n ciphertext bodies $CB_i$ used as the basis of the hash value calculated by the hash value calculation unit 244 includes n recipient identification information, thereby increasing the security of the ID-based cryptographic communication system.

The ID-based cryptographic communication system 800 (cryptographic communication system) according to the present Embodiment has the following features:

The ciphertext generating apparatus 200 further includes the session key generating unit 221, the data input unit 251, the data encryption unit 252, and the ciphertext notification unit 261.

The session key generating unit 221 randomly generates a bit sequence of predetermined length, as a session key K, by using a processing device, such as the CPU 911.

The plaintext input unit 231 inputs the session key K generated by the session key generating unit 221, as the plaintext M, by using a processing device, such as the CPU 911.

The data input unit 251 inputs one plaintext data to be transmitted to the n recipients, by using a processing device, such as the CPU 911.

The data encryption unit 252 generates one encrypted data by encrypting the one plaintext data input by the data input unit 251, with the session key K generated by the session key generating unit 221, by using a processing device, such as the CPU 911.

The ciphertext notification unit 261 notifies the n recipients identified by the n recipient identification information input by the recipient identification input unit 232 of the one ciphertext C (key ciphertext C) combined by the ciphertext combining unit 246 and the one encrypted data encrypted by the data encryption unit 252, by using a processing device, such as the CPU 911.

Each of the plurality of ciphertext receiving apparatuses 301 to 303 further includes the data decryption unit 352.

The ciphertext receiving unit 351 receives the one ciphertext C and the one encrypted data notified by the ciphertext generating apparatus 200, by using a processing device, such as the CPU 911.

The data decryption unit 352 treats the plaintext M decrypted by the ciphertext decryption unit 341, as a session key K', and decrypts the one encrypted data received by the ciphertext receiving unit 351 with the session key K', by using a processing device, such as the CPU 911.

The ID-based cryptographic communication system 800 according to the present Embodiment has the following effect:

Since the data encryption unit 252 encrypts the plaintext data with one session key K being common regardless of the recipient, and the ciphertext notification unit 261 notifies the recipient of one ciphertext C being common regardless of the recipient and one encrypted data, the load applied to the traffic of the communication path is small.

Although it has been explained that the number n of recipients is not fixed beforehand (namely, not fixed when generating a public encryption parameter), and is fixed when actually transmitting data in the present Embodiment, it is also preferable to fix the number n of recipients in advance.

For example, if the recipient has been determined to be one person, it may be fixed as n=1. Alternatively, it may be fixed as n=10.

Moreover, it is also preferable to have a configuration in which the range of the number n of recipients is determined in advance, and n is specified within the range when transmitting data. For example, n may be variable within the range of $1 \leq n < 100$. That is, the ID-based cryptographic communication system 800 may be a cryptographic communication system in which the number of recipients is fixed beforehand, or in which the number of recipients can be varied when transmitting data.

Embodiment 2

Referring to FIGS. 11 to 18, Embodiment 2 will now be explained.

Before explaining the ID-based cryptographic communication system 800 according to the present Embodiment, an ID-based cryptographic communication system, which is a comparative example, will be described first.

Since the whole configuration of the ID-based cryptographic communication system, which is a comparative example, according to the present Embodiment is the same as that described in the Embodiment 1, explanation is herein omitted.

First, the encryption parameter generating apparatus 100 will be described.

Since the block configuration of the encryption parameter generating apparatus 100 is the same as that described in Embodiment 1, a portion different from Embodiment 1 will be explained with reference to FIG. 4.

The group parameter storage unit 111 stores information indicating a natural number r, a multiplicative group G1, a multiplicative group G2, a multiplicative group GT and a pairing e, as group parameters, by using a storage device, such as the magnetic disk drive 920.

The natural number r is a large prime number in which solving DH problem is difficult.

The multiplicative group G1, the multiplicative group G2, and multiplicative group GT are multiplicative groups whose order is the natural number r.

The multiplicative group G1 and the multiplicative group G2 may be the same multiplicative groups or different multiplicative groups. When the multiplicative group G1 and the multiplicative group G2 are the same multiplicative groups, the group parameter storage unit 111 does not need to store the information indicating the multiplicative group G2.

Pairing e is a mapping which calculates an element of the multiplicative group GT, from the element of the multiplicative group G1 and the element of the multiplicative group G2. The element of the multiplicative group GT calculated from an element p of the multiplicative group G1 and an element q of the multiplicative group G2 will be hereafter described as a pairing value e(p,q).

The pairing e shall be a bilinear pairing. That is, the pairing e shall have a feature that a pairing value $e(p\hat{}a, q\hat{}b)$ of the a-th power of the element p of the multiplicative group G1 (a being an integer greater than or equal to 0 and less than the natural number r) and the b-th power of the element q of the multiplicative group G2 (b being an integer greater than or equal to 0 and less than the natural number r) is equal to the c-th power of the pairing value e(p,q) of the element p of the multiplicative group G1 and the element q of the multiplicative group G2 (c being a remainder obtained by dividing a product of the integer a and the integer b by the natural number r), which is expressed by the equation "$e(p\hat{}a, q\hat{}b) = e(p,q)\hat{}(a \cdot b)$".

Tate Pairing, Weil Pairing, etc. are known as a bilinear pairing that can be calculated within a practical time by using a processing device, such as the CPU 911 of a computer.

The pairing e is not limited to be a specific pairing but may any pairing as long as being a bilinear pairing, and shall be calculated within a practical time by using a processing device, such as the CPU 911 of a computer.

The secret information generating unit 112 inputs a group parameter stored by the group parameter storage unit 111, by using a processing device, such as the CPU 911.

The secret information generating unit 112 randomly generates an integer α being greater than or equal to 1 and less than the natural number r, based on the natural number r indicated by the input group parameter, by using a processing device, such as the CPU 911.

The secret information generating unit 112 outputs information (secret information) indicating the generated integer α, by using a processing device, such as the CPU 911.

The public parameter generating unit 113 inputs the group parameter stored by the group parameter storage unit 111, and the information indicating the integer α output by the secret information generating unit 112, by using a processing device, such as the CPU 911.

The public parameter generating unit 113 determines a key generation function KDF, based on the multiplicative group GT indicated by the input group parameter, by using a processing device, such as the CPU 911.

The key generation function KDF is a function for calculating a bit sequence of predetermined length from an element of the multiplicative group GT.

The public parameter generating unit 113 determines a hash function HF, based on the natural number r indicated by the input group parameter, by using a processing device, such as the CPU 911. The hash function HF is a function for calculating a natural number less than the natural number r from a bit sequence of arbitrary length. The hash function HF shall have a very low probability of calculating the same natural numbers from different bit sequences.

The public parameter generating unit 113 randomly selects an element g of the multiplicative group G1, based on the multiplicative group G1 indicated by the input group parameter, by using a processing device, such as the CPU 911.

The public parameter generating unit 113 randomly selects four elements g2, h1, h2, and h3 of the multiplicative group G2, based on the multiplicative group G2 indicated by the input group parameter, by using a processing device, such as the CPU 911.

The elements g2, h1, h2, and h3 of the multiplicative group G2 shall be selected as different elements each other.

Moreover, the element g of the multiplicative group G1 and the element g2 of the multiplicative group G2 are selected so that the element e(g,g2) of the multiplicative group GT, which is a pairing value of the element g of the multiplicative group G1 and the element g2 of the multiplicative group G2, may not be an identity of the multiplicative group GT.

When the multiplicative group G1 and the multiplicative group G2 are the same multiplicative groups, the element g of the multiplicative group G1 and the element g2 of the multiplicative group G2 may be the same elements.

The public parameter generating unit 113 calculates an element $g1 = g\hat{}\alpha$ of the multiplicative group G1, based on the multiplicative group G1 indicated by the input group parameter, the selected element g of the multiplicative group G1, and the integer α indicated by the input information, by using a processing device, such as the CPU 911.

The public parameter generating unit 113 outputs information indicating the input group parameter, the determined key generation function KDF, the determined hash function HF, the selected element g of the multiplicative group G1, the calculated element g1 of the multiplicative group G1, and the selected four elements g2, h1, h2, and h3 of the multiplicative group G2, as public encryption parameters, by using a processing device, such as the CPU 911.

The identification information input unit 131 inputs a recipient identification information ID, by using a processing device, such as the CPU 911.

In the description below, the recipient identification information ID will be treated as an integer, by the encryption parameter generating apparatus 100.

For example, the encryption parameter generating apparatus 100 treats recipient identification information as an integer by treating a bit sequence of arbitrary length, such as an e-mail address, as a bit sequence indicating an integral value.

Alternatively, the encryption parameter generating apparatus 100 may input a bit sequence of arbitrary length, such as an e-mail address, into a hash function (that may be the same hash function as the hash function HF determined by the public parameter generating unit 113, or may be a different hash function) and obtain an integer calculated by the hash function, to treat it as recipient identification information.

That is, the identification information input unit 131 inputs an integer $ID_i$ as recipient identification information, by using a processing device, such as the CPU 911.

The identification information input unit 131 outputs the input integer ID by using a processing device, such as the CPU 911.

The secret key generating unit 132 inputs the information indicating the integer α stored by the secret information storage unit 121, the public encryption parameter stored by the parameter storage unit 122, and the integer ID output by the identification information input unit 131, by using a processing device, such as the CPU 911.

The secret key generating unit 132 randomly generates three integers $r_{ID,1}$, $r_{ID,2}$, and $r_{ID,3}$, based on the natural number r indicated by the input public encryption parameter, by using a processing device, such as the CPU 911. Each of the three integers $r_{ID,1}$, $r_{ID,2}$, and $r_{ID,3}$ has been generated to be greater than or equal to 1 and less than the natural number r and to be different from each other.

The secret key generating unit 132 calculates an inverse number $1/(α-ID)$, which is an inverse of the difference $(α-ID)$ between α and ID, based on the integer α indicated by the input information and the input integer ID, by using a processing device, such as the CPU 911. The inverse number as used herein is an inverse number in the finite field Z/rZ. That is, the inverse number of $(α-ID)$ means an integer x (let the inverse number of $(α-ID)$ be x) greater than or equal to 1 and less than r, where the remainder obtained by dividing the product $(α-ID)$ x by the natural number r is 1. (The product $(α-ID)$ x indicates $(α-ID)$ multiplied by the inverse number x.) The inverse number of $(α-ID)$ is described as $1/(α-ID)$.

Since the natural number r is a prime number, unless α–ID is 0 (or in multiples of the natural number r), there exists one inverse number of $(α-ID)$, which can be calculated within a practical time by using a processing device, such as the CPU 911 of a computer.

Since the natural number r is a very large natural number, the probability that α–ID is 0 (or in multiples of the natural number r) is extremely low and may be ignored.

Based on the multiplicative group G2 and the element g2 of the multiplicative group G2 indicated by the input public encryption parameter, and the generated integer $r_{ID,1}$, the secret key generating unit 132 calculates an element $g2^{\wedge}(-r_{ID,1})$ of the multiplicative group G2, which is the $(-r_{ID,1})$ th power of the element g2 of the multiplicative group G2, by using a processing device, such as the CPU 911.

Based on the multiplicative group G2 and the element h1 of the multiplicative group G2 indicated by the input public encryption parameter, and the calculated element $g2^{\wedge}(-r_{ID,1})$ of the multiplicative group G2, the secret key generating unit 132 calculates an element $h1 \cdot g2^{\wedge}(-r_{ID,1})$ of the multiplicative group G2, which is a product of the element h1 of the multiplicative group G2 and the element $g2^{\wedge}(-r_{ID,1})$ of the multiplicative group G2, by using a processing device, such as the CPU 911.

Based on the calculated element $h1 \cdot g2^{\wedge}(-r_{ID,1})$ of the multiplicative group G2 and the calculated integer $1/(α-ID)$, the secret key generating unit 132 calculates an element $h_{ID,1}=$ $(h1 \cdot g2^{\wedge}(-r_{ID,1}))^{\wedge}(1/(α-ID))$ of the multiplicative group G2, which is the $1/(α-ID)$ th power of the element $h1 \cdot g2^{\wedge}(-r_{ID,1})$ of the multiplicative group G2, by using a processing device, such as the CPU 911.

Similarly, the secret key generating unit 132 calculates an element $h_{ID,2}=(h2 \cdot g2^{\wedge}(-r_{ID,2}))^{\wedge}(1/(α-ID))$ of the multiplicative group G2 and an element $h_{ID,3}=(h3 \cdot g2^{\wedge}(-r_{ID,3}))^{\wedge}(1/(α-ID))$ of the multiplicative group G2, by using a processing device, such as the CPU 911.

The secret key generating unit 132 outputs information indicating the calculated three integers $r_{ID,1}$, $r_{ID,2}$ and $r_{ID,3}$, and the calculated three elements $h_{ID,1}$, $h_{ID,2}$, and $h_{ID,3}$ of the multiplicative group G2, as a secret key $d_{ID}$, by using a processing device, such as the CPU 911.

Next, the ciphertext generating apparatus 200 will be described.

Since the configuration of the functional block of the ciphertext generating apparatus 200 is also the same as that explained in Embodiment 1, different points from Embodiment 1 will be explained with reference to FIG. 5.

The ciphertext generating apparatus 200 treats a recipient identification information $ID_i$ as an integer, similarly to the encryption parameter generating apparatus 100.

The recipient identification input unit 232 inputs n integers $ID_i$ (n being an integer greater than or equal to 1, i being an integer greater than or equal to 1 and less than or equal to n), as n recipient identification information which respectively identifies n recipients, by using a processing device, such as the CPU 911.

The recipient identification input unit 232 outputs the input n integers $ID_i$, by using a processing device, such as the CPU 911.

The random number generating unit 222 inputs the public encryption parameter stored by the encryption parameter storage unit 210, by using a processing device, such as the CPU 911.

The random number generating unit 222 randomly generates n integers $s_i$ greater than or equal to 1 and less than the natural number r (i being an integer greater than or equal to 1 and less than or equal to n) which respectively correspond to n recipients, based on the natural number r indicated by the input public encryption parameter, by using a processing device, such as the CPU 911.

The random number generating unit 222 outputs information indicating the generated n integers $s_i$, by using a processing device, such as the CPU 911.

The first ciphertext generating unit 241 inputs the public encryption parameter stored by the encryption parameter storage unit 210, the information indicating the n integers $s_i$ output by the random number generating unit 222, and the plaintext M output by the plaintext input unit 231, by using a processing device, such as the CPU 911.

The first ciphertext generating unit 241 calculates an element e(g, h1) of the multiplicative group GT, which is a pairing value of the element g of the multiplicative group G1 and the element h1 of the multiplicative group G2, based on the pairing e, the element g of the multiplicative group G1, and the element h1 of the multiplicative group G2 indicated by the input public encryption parameter, by using a processing device, such as the CPU 911.

Since the element e(g, h1) of the multiplicative group GT is constant regardless of the integer $s_i$ and the plaintext M, it may be calculated beforehand and stored by using a storage device, such as the magnetic disk drive 920.

Based on the multiplicative group GT indicated by the input public encryption parameter, the calculated element e(g, h1) of the multiplicative group GT, and the n integers $s_i$ indicated by the input information, the first ciphertext generating unit 241 calculates n elements $e(g,h1)\hat{}s_i$ (i being an integer greater than or equal to 1 and less than or equal to n) of the multiplicative group GT, which is the $s_i$-th power of the element e(g, h1) of the multiplicative group GT, by using a processing device, such as the CPU 911.

Based on the key generation function KDF indicated by the input public encryption parameter, and the calculated n elements $e(g,h1)\hat{}s_i$ of the multiplicative group GT, the first ciphertext generating unit 241 calculates n key bit sequences $k_i$=KDF $(e(g, h1)\hat{}s_i)$ (i being an integer greater than or equal to 1 and less than or equal to n), which is a bit sequence of predetermined length obtained by converting the element $e(g, h1)\hat{}s_i$ of the multiplicative group GT by the key generation function KDF, by using a processing device, such as the CPU 911.

Based on the input plaintext M and the calculated n key bit sequences $k_i$, the first ciphertext generating unit 241 generates n bit sequences by encrypting the plaintext M respectively with the n key bit sequences $k_i$, to be treated as n first ciphertexts $C1_i$ (i being an integer greater than or equal to 1 and less than or equal to n), by using a processing device, such as the CPU 911.

When the bit length of the plaintext M and the bit length of the key bit sequence k are equal, the first ciphertext generating unit 241 calculates an exclusive OR for each bit between the plaintext M and the key bit sequence $k_i$, to be treated as a first ciphertext $C1_i$, for example.

The method for encrypting the plaintext M is not limited to the method using the exclusive OR operation, and it may be other cryptographic system as long as the cryptographic system can restore the plaintext M from the first ciphertext $C1_i$ when there is the same bit sequence as the key bit sequence $k_i$.

The first ciphertext generating unit 241 outputs the generated n first ciphertexts $C1_i$, by using a processing device, such as the CPU 911.

The second ciphertext generating unit 242 inputs the public encryption parameter stored by the encryption parameter storage unit 210, the information indicating then integers $s_i$ output by the random number generating unit 222, and the n integers $ID_i$ output by the recipient identification input unit 232, by using a processing device, such as the CPU 911.

The second ciphertext generating unit 242 calculates n elements $g\hat{}(-ID_i)$ (i being an integer greater than or equal to 1 and less than or equal to n) of the multiplicative group G1, which is the $(-ID_i)$th power of the element g of the multiplicative group G1, based on the multiplicative group G1 indicated by the input public encryption parameter, the element g of the multiplicative group G1, and the input n integers $ID_i$, by using a processing device, such as the CPU 911.

Based on the multiplicative group G1 and the element g1 of the multiplicative group G1 indicated by the input public encryption parameter, and the calculated n elements $g\hat{}(-ID_i)$ of the multiplicative group G1, the second ciphertext generating unit 242 calculates elements $g1·g\hat{}(-ID_i)$ (i being an integer greater than or equal to 1 and less than or equal to n) of the multiplicative group G1, which is a product of the element g1 of the multiplicative group G1 and the element $g\hat{}(-ID_i)$ of the multiplicative group G1, by using a processing device, such as the CPU 911.

Based on the multiplicative group G1 indicated by the input public encryption parameter, the n integers $s_i$ indicated by the input information, and the calculated n elements $g1·g\hat{}(-ID_i)$ of the multiplicative group G1, the second ciphertext generating unit 242 calculates n elements $u_i=(g1·g\hat{}(-ID_i))\hat{}s_i$ (i being an integer greater than or equal to 1 and less than or equal to n) of the multiplicative group G1, which is the $s_i$-th power of the element $g1·g\hat{}(-ID_i)$ of the multiplicative group G1, by using a processing device, such as the CPU 911.

The second ciphertext generating unit 242 outputs bit sequences respectively indicating the calculated n elements $u_i$ of the multiplicative group G1, as n second ciphertexts $C2_i$ (i being an integer greater than or equal to 1 and less than or equal to n), by using a processing device, such as the CPU 911.

The third ciphertext generating unit 243 inputs the public encryption parameter stored by the encryption parameter storage unit 210, and the information indicating the n integers $s_i$ output by the random number generating unit 222, by using a processing device, such as the CPU 911.

Based on a pairing e, the element g of the multiplicative group G1, and the element g2 of the multiplicative group G2 indicated by the input public encryption parameter, the third ciphertext generating unit 243 calculates an element e(g,g2) of the multiplicative group GT, which is a pairing value of the element g of the multiplicative group G1 and the element g2 of the multiplicative group G2, by using a processing device, such as the CPU 911.

Since the element e(g,g2) of the multiplicative group GT is constant regardless of the integer $s_i$, it may be calculated beforehand and stored by using a storage device, such as the magnetic disk drive 920.

Based on the multiplicative group GT indicated by the input public encryption parameter, the n integers $s_i$ indicated by the input information, and the calculated element e(g, g2) of the multiplicative group GT, the third ciphertext generating unit 243 calculates n elements $e(g,g2)\hat{}s_i$ (i being an integer greater than or equal to 1 and less than or equal to n) of the multiplicative group GT, which is the $s_i$-th power of the element e(g,g2) of the multiplicative group GT, by using a processing device, such as the CPU 911.

The third ciphertext generating unit 243 outputs bit sequences respectively indicating the calculated n elements $e(g,g2)\hat{}s_i$ of the multiplicative group GT, as n third ciphertexts $C3_i$ (i being an integer greater than or equal to 1 and less than or equal to n), by using a processing device, such as the CPU 911.

The hash value calculation unit 244 inputs the public encryption parameter stored by the encryption parameter storage unit 210, the n first ciphertexts $C1_i$ output by the first ciphertext generating unit 241, the n second ciphertexts $C2_i$ output by the second ciphertext generating unit 242, and the n third ciphertexts $C3_i$ output by the third ciphertext generating unit 243, by using a processing device, such as the CPU 911.

The hash value calculation unit 244 generates n combined ciphertexts by combining each of the input n first ciphertexts $C1_i$, n second ciphertexts $C2_i$, and n third ciphertexts $C3_i$, by using a processing device, such as the CPU 911.

Based on the hash function HF indicated by the public encryption parameter and the generated n combined ciphertexts, the hash value calculation unit 244 calculates n natural numbers $\beta_i$ by converting the n combined ciphertexts respectively by the hash function HF, as n hash values $H_i$, by using a processing device, such as the CPU 911.

The hash value calculation unit 244 outputs information indicating the calculated n natural numbers $\beta_i$ and the generated n combined ciphertexts, by using a processing device, such as the CPU 911.

The ciphertext verification text generating unit 245 inputs the public encryption parameter stored by the encryption parameter storage unit 210, the information indicating the n integers $s_i$ output by the random number generating unit 222, and the information indicating the n natural numbers $\beta_i$ output by the hash value calculation unit 244, by using a processing device, such as the CPU 911.

Based on the pairing e, the element g of the multiplicative group G1, and the element h2 of the multiplicative group G2 indicated by the input public encryption parameter, the ciphertext verification text generating unit 245 calculates an element e(g,h2) of the multiplicative group GT, which is a pairing value of the element g of the multiplicative group G1 and the element h2 of the multiplicative group G2, by using a processing device, such as the CPU 911.

Based on the pairing e, the element g of the multiplicative group G1, and the element h3 of the multiplicative group G2 indicated by the input public encryption parameter, the ciphertext verification text generating unit 245 calculates an element e(g,h3) of the multiplicative group GT, which is a pairing value of the element g of the multiplicative group G1 and the element h3 of the multiplicative group G2, by using a processing device, such as the CPU 911.

Since the elements e(g,h2) and e(g,h3) of the multiplicative group GT are constant regardless of the integer $s_i$, they may be calculated beforehand and stored by using a storage device, such as the magnetic disk drive 920.

Based on the multiplicative group GT indicated by the input public encryption parameter, the n integers $s_i$ indicated by the input information, and the calculated element e(g,h2) of the multiplicative group GT, the ciphertext verification text generating unit 245 calculates n elements e(g, h2)^$s_i$ of the multiplicative group GT (i being an integer greater than or equal to 1 and less than or equal to n), which is the $s_i$-th power of the element e(g,h2) of the multiplicative group GT, by using a processing device, such as the CPU 911.

Based on the n integers $s_i$ indicated by the input information and the n natural numbers $\beta_i$ indicated by the input information, the ciphertext verification text generating unit 245 calculates n integers $(s_i \cdot \beta_i)$ respectively (i being an integer greater than or equal to 1 and less than or equal to n), which is a product of the integer $s_i$ and the natural number $\beta_i$, by using a processing device, such as the CPU 911.

Based on the multiplicative group GT indicated by the input public encryption parameter, the calculated element e(g,h3) of the multiplicative group GT, and the calculated n integers $(s_i \cdot \beta_i)$, the ciphertext verification text generating unit 245 calculates n elements e(g, h3)^$(s_i \cdot \beta_i)$ (i being an integer greater than or equal to 1 and less than or equal to n) of the multiplicative group GT, which is the $(s_i \cdot \beta_i)$ th power of the element e(g,h3) of the multiplicative group GT, by using a processing device, such as the CPU 911.

Based on the multiplicative group GT indicated by the input public encryption parameter, the calculated n elements e(g,h2)^$s_i$ of the multiplicative group GT, and the calculated n elements e(g,h3)^$(s_i \cdot \beta_i)$ of the multiplicative group GT, the ciphertext verification text generating unit 245 calculates n elements $y_i = e(g,h2)^{s_i} \cdot e(g,h3)^{(s_i \cdot \beta_i)}$ (i being an integer greater than or equal to 1 and less than or equal to n) of the multiplicative group GT, which is a product of the element e(g,h2)^$s_i$ of the multiplicative group GT and the element e(g,h3)^$(s_i \cdot \beta_i)$ of the multiplicative group GT, by using a processing device, such as the CPU 911.

The ciphertext verification text generating unit 245 outputs bit sequences respectively indicating the calculated n elements $y_i$ of the multiplicative group GT, as n ciphertext verification texts $CC_i$ (i being an integer greater than or equal to 1 and less than or equal to n), by using a processing device, such as the CPU 911.

The ciphertext combining unit 246 inputs the n combined ciphertexts output by the hash value calculation unit 244 and the n ciphertext verification texts $CC_i$ output by the ciphertext verification text generating unit 245, by using a processing device, such as the CPU 911.

The ciphertext combining unit 246 generates one key ciphertext C by combining all the input n combined ciphertexts and the input n ciphertext verification texts, by using a processing device, such as the CPU 911.

The ciphertext combining unit 246 outputs the generated one key ciphertext C, by using a processing device, such as the CPU 911.

In this example, although the ciphertext combining unit 246 inputs the n combined ciphertexts output by the hash value calculation unit 244, since the combined ciphertext is made by combining the first ciphertext $C1_i$, the second ciphertext $C2_i$, and the third ciphertext $C3_i$, consequently it means the ciphertext combining unit 246 inputs the n first ciphertexts $C1_i$, the n second ciphertexts $C2_i$, and the n third ciphertexts $C3_i$.

FIG. 11 shows an example of the flow of information exchanged in the ciphertext generating apparatus 200 which is a comparative example of the present Embodiment.

The recipient identification input unit 232 inputs n recipient identification information $ID_1, ID_2, \ldots, ID_n$. The random number generating unit 222 generates n integers $s_1, s_2, \ldots, s_n$ whose number is the same as that of the recipient identification information $ID_i, ID_2, \ldots, ID_n$ input by the recipient identification input unit 232.

The first ciphertext generating unit 241 generates a first ciphertext $C1_1$ based on the plaintext M and the integer $s_1$, a first ciphertext $C1_2$ based on the plaintext M and the integer $s_2, \ldots$, and a first ciphertext $C1_n$ based on the plaintext M and the integer $s_n$.

The second ciphertext generating unit 242 generates a second ciphertext $C2_i$ based on the recipient identification information $ID_1$ and the integer $s_1$, a second ciphertext $C2_2$ based on the recipient identification information $ID_2$ and the integer $s_2, \ldots$, and a second ciphertext $C2_n$ based on the recipient identification information $ID_n$ and the integer $s_n$.

The third ciphertext generating unit 243 generates a third ciphertext $C3_i$ based on the integer $s_1$, a third ciphertext $C3_2$ based on the integer $s_2, \ldots$, and a third ciphertext $C3_n$ based on the integer $s_n$.

The hash value calculation unit 244 generates a combined ciphertext $(C1_1|C2_1|C3_1)$ by combining the first ciphertext $C1_1$, the second ciphertext $C2_1$, and the third ciphertext $C3_1$, generates a combined ciphertext $(C1_2|C2_2|C3_2)$ by combining the first ciphertext $C1_2$, the second ciphertext $C2_2$, and the third ciphertext $C3_2, \ldots$, and generates a combined ciphertext $(C1_n|C2_n|C3_n)$ by combining the first ciphertext $C1_n$, the second ciphertexts $C2_n$, and the third ciphertext $C3_n$.

"|" as used herein denotes combining. For example, $(C1_1|C2_1|C3_1)$ indicates a bit sequence made by combining a bit sequence $C2_1$ to the end of a bit sequence $C1_1$, and further combining a bit sequence $C3_1$ to the end of that. Combining order different from this may be used.

The hash value calculation unit 244 calculates a hash value $H_1$ based on the generated combined ciphertext $(C1_1|C2_1|C3_1)$, a hash value $H_2$ based on the generated combined ciphertext $(C1_2|C2_2|C3_2), \ldots$, and a hash value $H_n$ based on the generated combined ciphertext $(C1_n|C2_n|C3_n)$.

The ciphertext verification text generating unit 245 generates a ciphertext verification text $CC_1$ based on the integer $s_1$ and the hash value $H_1$, a ciphertext verification text $CC_2$ based on the integer $s_2$ and the hash value $H_2, \ldots$, and a ciphertext verification text $CC_n$ based on the integer $s_n$ and the hash value $H_n$.

The ciphertext combining unit 246 generates one key ciphertext $C=(C1_1|C2_1|C3_1|CC_1|C1_2|C2_2|C3_2|CC_2| \ldots |C1_n|C2_n|C3_n|CC_n)$ by combining all the n combined ciphertexts $(C1_1|C2_1|C3_1), (C1_2|C2_2|C3_2), \ldots, (C1_n|C2_n|C3_n)$ and the n ciphertext verification texts $CC_i, CC_2, CC_n$. Although, in this example, the key ciphertext C is generated by combining the ciphertexts in the order of collecting texts from the first ciphertext to the ciphertext verification text corresponding to one recipient in one, combining order different from this may be used. For example, it is also acceptable to perform combining in the order of collecting the first ciphertexts in one, and the second ciphertexts in one, like $(C1_1|C1_2| \ldots |C1_n|C2_1|C2_2| \ldots |C2_n|C3_1|C3_2| \ldots |C3_n|CC_1|CC_2| \ldots CC_n)$. The combining order of collecting the texts from the first ciphertext corresponding to the ciphertext verification text corresponding to one recipient in one, like the example above, is more preferable because the key ciphertext C is generated by combining the combined ciphertexts combined by the hash value calculation unit 244, as they are. Moreover, there is also an advantage that the ciphertext receiving apparatus can easily find a ciphertext corresponding to the recipient corresponding to the apparatus.

Next, the ciphertext receiving apparatuses 301 to 303 will be described. Since the configuration of the functional block of the ciphertext receiving apparatuses 301 to 303 is also the same as that explained in Embodiment 1, different points from Embodiment 1 will be explained with reference to FIG. 6.

The ciphertext decomposition unit 346 inputs one key ciphertext C output by the ciphertext receiving unit 351, by using a processing device, such as the CPU 911. The ciphertext decomposition unit 346 acquires the corresponding first ciphertext $C1_{ID}$, the corresponding second ciphertext $C2_{ID}$, the corresponding third ciphertext $C3_{ID}$, and the corresponding ciphertext verification text $CC_{ID}$ which are corresponding to the recipient concerned, from the input one key ciphertext C, by using a processing device, such as the CPU 911.

The ciphertext decomposition unit 346 outputs the acquired corresponding first ciphertext $C1_{ID}$, corresponding second ciphertext $C2_{ID}$, corresponding third ciphertext $C3_{ID}$, and corresponding ciphertext verification text $CC_{ID}$, by using a processing device, such as the CPU 911.

For example, it is assumed that one key ciphertext C is made by combining ciphertexts in the order of $(C1_1|C2_1|C3_1|CC_1|C1_2|C2_2|C3_2|CC_2| \ldots C1_n|C2_n|C3_n|CC_n)$ as shown in FIG. 11. The ciphertext decomposition unit 346 separates one key ciphertext C into several ones, for example, by sum of bit lengths of from the first ciphertext to the ciphertext verification text to be $(C1_1|C2_1|C3_1|CC_1), (C1_2|C2_2|C3_2|CC_2), \ldots, (C1_n|C2_n|C3_n|CC_n)$, and acquires the corresponding ciphertext $(C1_{ID}|C2_{ID}|C3_{ID}|CC_{ID})$ concerned from the separated ones.

For example, the ciphertext decomposition unit 346 judges at what position the corresponding ciphertext concerned exists, based on other portions of the notification data 720 received by the ciphertext receiving unit 351, and acquires the corresponding ciphertext depending upon the judgment result.

Next, the ciphertext decomposition unit 346 separates the acquired corresponding ciphertext $(C1_{ID}|C2_{ID}|C3_{ID}|CC_{ID})$, and obtains a combined verification ciphertext $(C1_{ID}|C2_{ID}|C3_{ID})$ and a corresponding ciphertext verification text $CC_{ID}$.

Furthermore, the ciphertext decomposition unit 346 separates the acquired combined verification ciphertext $(C1_{ID}|C2_{ID}|C3_{ID})$, and obtains a corresponding first ciphertext $C1_{ID}$, a corresponding second ciphertext $C2_{ID}$, and a corresponding third ciphertext $C3_{ID}$.

The ciphertext decomposition unit 346 outputs the acquired corresponding first ciphertext $C1_{ID}$, corresponding second ciphertext $C2_{ID}$, corresponding third ciphertext $C3_{ID}$, and corresponding ciphertext verification text $CC_{ID}$. Moreover, in this example, in order to save the time and effort of the verification hash value calculation unit 344's generating a combined verification ciphertext $(C1_{ID}|C2_{ID}|C3_{ID})$, the ciphertext decomposition unit 346 also outputs the acquired combined verification ciphertext $(C1_{ID}|C2_{ID}|C3_{ID})$ in addition to them, by using a processing device, such as the CPU 911.

The verification hash value calculation unit 344 inputs the corresponding first ciphertext $C1_{ID}$, the corresponding second ciphertext $C2_{ID}$, and the corresponding third ciphertext $C3_{ID}$ output by the ciphertext decomposition unit 346, by using a processing device, such as the CPU 911. The verification hash value calculation unit 344 generates a combined verification ciphertext $(C1_{ID}|C2_{ID}|C3_{ID})$ by combining the input corresponding first ciphertext $C1_{ID}$, corresponding second ciphertext $C2_{ID}$ and corresponding third ciphertext $C3_{ID}$, by using a processing device, such as the CPU 911. The order of combining may be different from this as long as it is the same as that used when the hash value calculation unit 244 of the ciphertext generating apparatus 200 generates a combined ciphertext.

Moreover, as the example mentioned above, when the ciphertext decomposition unit 346 outputs the combined verification ciphertext $(C1_{ID}|C2_{ID}|C3_{ID})$, the verification hash value calculation unit 344 may input the combined verification ciphertext $(C1_{ID}|C2_{ID}|C3_{ID})$ output by the ciphertext decomposition unit 346 instead of generating the combined verification ciphertext $(C1_{ID}|C2_{ID}|C3_{ID})$.

The verification hash value calculation unit 344 inputs a public encryption parameter stored by the public parameter storage unit 310, by using a processing device, such as the CPU 911.

Based on the hash function HF indicated by the input public encryption parameter and the generated or input combined verification ciphertext $(C1_{ID}|C2_{ID}|C3_{ID})$, the verification hash value calculation unit 344 calculates a natural number $\beta'$ by converting the combined verification ciphertext $(C1_{ID}|C2_{ID}|C3_{ID})$ by the hash function HF, to be treated as a hash value H', by using a processing device, such as the CPU 911.

The verification hash value calculation unit 344 outputs information indicating the calculated natural number $\beta'$, by using a processing device, such as the CPU 911.

The ciphertext verification unit 345 inputs the public encryption parameter stored by the public parameter storage unit 310, the secret key $d_u$, stored by the secret key storage unit 323, the corresponding second ciphertext $C2_{ID}$, the corresponding third ciphertext $C3_{ID}$ and the corresponding ciphertext verification text $CC_{ID}$ output by the ciphertext decomposition unit 346, and the information indicating the natural number $\beta'$ output by the verification hash value calculation unit 344, by using a processing device, such as the CPU 911.

Based on the multiplicative group G2 indicated by the input public encryption parameter, the element $h_{ID,3}$ of the multiplicative group G2 indicated by input secret key $d_{ID}$, and the natural number $\beta'$ indicated by the input information, the ciphertext verification unit 345 calculates an element $h_{ID,3}^{\beta'}$ of the multiplicative group G2, which is the $\beta'$-th power of the element $h_{ID,3}$ of the multiplicative group G2, by using a processing device, such as the CPU 911.

Based on the multiplicative group G2 indicated by the input public encryption parameter, the element $h_{ID,2}$ of the multiplicative group G2 indicated by the input secret key $d_{ID}$, and the calculated element $h_{ID,3}{}^{\beta'}$ of the multiplicative group G2, the ciphertext verification unit 345 calculates the element $h_{ID,2} \cdot h_{ID,3}{}^{\beta'}$ of the multiplicative group G2, which is a product of the element $h_{ID,2}$ of the multiplicative group G2 and the element $h_{ID,3}{}^{\beta'}$ of the multiplicative group G2, by using a processing device, such as the CPU 911.

Based on the pairing e indicated by the input public encryption parameter, the element $u_{ID}$ of the multiplicative group G1 indicated by the input corresponding second ciphertext $C2_{ID}$, and the calculated element $h_{ID,2} \cdot h_{ID,3}{}^{\beta'}$ of the multiplicative group G2, the ciphertext verification unit 345 calculates an element $e(u_{ID}, h_{ID,2} \cdot h_{ID,3}{}^{\beta'})$ of the multiplicative group GT, which is a pairing value of the element $u_{ID}$ of the multiplicative group G1 and the element $h_{ID,2} \cdot h_{ID,3}{}^{\beta'}$ of the multiplicative group G2, by using a processing device, such as the CPU 911.

Based on the integers $r_{ID,2}$ and $r_{ID,3}$ indicated by the input secret key $d_{ID}$, and the natural number $\beta'$ indicated by the input information, the ciphertext verification unit 345 calculates an integer $r_{ID,2} + r_{ID,3} \cdot \beta'$, which is a sum obtained by adding the product of the integer $r_{ID,3}$ and the natural number $\beta'$ to the integer $r_{ID,2}$, by using a processing device, such as the CPU 911.

Based on the multiplicative group GT indicated by the input public encryption parameter, the element $v_{ID}$, of the multiplicative group GT indicated by the input corresponding third ciphertext $C3_{ID}$, and the calculated integer $r_{ID,2} + r_{ID,3}{}^{\hat{}}\beta'$, the ciphertext verification unit 345 calculates an element $v_{ID}{}^{\hat{}}(r_{ID,2} + r_{ID,3} \cdot {}^{\hat{}}\beta')$ of multiplicative group GT, which is the $(r_{ID,2} + r_{ID,3} \cdot \beta')$th power of the element $v_{ID}$ of multiplicative group GT, by using a processing device, such as the CPU 911.

Based on the multiplicative group GT indicated by the input public encryption parameter, the calculated element $e(u_{ID}, h_{ID,2} \cdot h_{ID,3}{}^{\hat{}}\beta')$ of the multiplicative group GT, and the calculated element $v_{ID}{}^{\hat{}}(r_{ID,2} + r_{ID,3} \cdot \beta')$ of the multiplicative group GT, the ciphertext verification unit 345 calculates an element $y' = e(u_{ID}, h_{ID,2} \cdot h_{ID,3}{}^{\hat{}}\beta') \cdot v_{ID}{}^{\hat{}}(r_{ID,2} \cdot r_{ID,3} \cdot \beta')$ of the multiplicative group GT, which is a product of the element $e(u_{ID}, h_{ID,2} \cdot h_{ID,3}{}^{\hat{}}\beta')$ of the multiplicative group GT and the element $v_{ID}{}^{\hat{}}(r_{ID,2} + r_{ID,3} \cdot \beta')$ of the multiplicative group GT, by using a processing device, such as the CPU 911.

The ciphertext verification unit 345 compares the element $y_{ID}$ of the multiplicative group GT indicated by the input corresponding ciphertext verification text $CC_{ID}$ and the calculated element $y'$ of the multiplicative group GT, and when the element $y_{ID}$ of the multiplicative group GT accords with the calculated element $y'$ of the multiplicative group GT, judges that the one key ciphertext C input by the ciphertext receiving unit 351 has consistency, and when they do not accord with each other, judges that the one key ciphertext C input by the ciphertext receiving unit 351 has no consistency, by using a processing device, such as the CPU 911.

In this case, the element $y_i$ of the multiplicative group GT calculated by the ciphertext verification text generating unit 245 of the ciphertext generating apparatus 200 is $y_i = e(g,h2){}^{\hat{}}s_i \cdot e(g,h3){}^{\hat{}}(s_i \cdot \beta_i)$. Moreover, since the element $u_i$ of the multiplicative group G1 calculated by the second ciphertext generating unit 242 of the ciphertext generating apparatus 200 is $u_i = (g1 \cdot g{}^{\hat{}}(-ID_i)){}^{\hat{}}s_i$ and the element g1 of the multiplicative group G1 calculated by the public parameter generating unit 113 of the encryption parameter generating apparatus 100 is $g1 = g{}^{\hat{}}\alpha$, thereby $u_i = g{}^{\hat{}}(s_i \cdot (\alpha - ID_i))$. The element $v_i$ of the multiplicative group GT calculated by the third ciphertext generating unit 243 of the ciphertext generating apparatus 200 is $v_i = e(g,g2){}^{\hat{}}s_i$.

On the other hand, the element $y'$ of the multiplicative group GT calculated by the ciphertext verification text generating unit 245 is $y' = e(u_{ID}, h_{ID,2} \cdot h_{ID,3}{}^{\hat{}}\beta') \cdot v_{ID}{}^{\hat{}}(r_{ID,2} + r_{ID,3} \cdot \beta')$. According to the bilinear of the pairing e, $y' = e(u_{ID}, h_{ID,2}) \cdot e(u_{ID}, h_{ID,3}){}^{\hat{}}\beta' \cdot v_{ID}{}^{\hat{}}(r_{ID,2} + r_{ID,3} \cdot \beta')$. Moreover, since the element $h_{ID,2}$, $h_{ID,3}$ of the multiplicative group G2 calculated by the secret key generating unit 132 of the encryption parameter generating apparatus 100 is $h_{ID,2} = (h2 \cdot g2{}^{\hat{}}(-r_{ID,2})){}^{\hat{}}(1/(\alpha - ID))$, $h_{ID,3} = (h3 \cdot g2{}^{\hat{}}(-r_{ID,3})){}^{\hat{}}(1/(\alpha - ID))$, thereby $e(u_{ID}, h_{ID,2}) = e(g, h2 \cdot g2{}^{\hat{}}(-r_{ID,2})){}^{\hat{}}s_{ID}, e(u_{ID}, h_{ID,3}) = e(g, h3 \cdot g2{}^{\hat{}}(-r_{ID,3})){}^{\hat{}}s_{ID}$. Therefore, $y' = e(g,h2){}^{\hat{}}s_{ID} \cdot e(g,h3){}^{\hat{}}(s_{ID} \cdot \beta')$. When one key ciphertext C has consistency, since $\beta' = \beta_{ID}$, thereby $y' = y_{ID}$.

When the ciphertext verification unit 345 judges that the one key ciphertext C input by the ciphertext receiving unit 351 has consistency, the ciphertext decryption unit 341 performs the following processing in order to restore the plaintext M.

The ciphertext decryption unit 341 inputs the public encryption parameter stored by the public parameter storage unit 310, the secret key $d_{ID}$ stored by the secret key storage unit 323, and the corresponding first ciphertext $C1_{ID}$, the corresponding second ciphertext $C2_{ID}$, and the corresponding third ciphertext $C3_{ID}$ output by the ciphertext decomposition unit 346, by using a processing device, such as the CPU 911.

Based on the pairing e indicated by the input public encryption parameter, the element $h_{ID,1}$ of the multiplicative group G2 indicated by the input secret key $d_{ID}$, and the element $u_{ID}$ of the multiplicative group G1 indicated by the input corresponding second ciphertext $C2_{ID}$, the ciphertext decryption unit 341 calculates an element $e(u_{ID}, h_{ID,1})$ of the multiplicative group GT, which is a pairing value of the element $u_{ID}$ of the multiplicative group G1 and the element $h_{ID,1}$ of the multiplicative group G2, by using a processing device, such as the CPU 911.

Based on the multiplicative group GT indicated by the input public encryption parameter, the integer $r_{ID,1}$ indicated by the input secret key $d_{ID}$, and the element $v_{ID}$ of the multiplicative group GT indicated by the input corresponding third ciphertext $C3_{ID}$, the ciphertext decryption unit 341 calculates an element $v_{ID}{}^{\hat{}}r_{ID,1}$ of multiplicative group GT, which is the $r_{ID,1}$-th power of the element $v_{ID}$ of multiplicative group GT, by using a processing device, such as the CPU 911.

Based on the multiplicative group GT indicated by the input public encryption parameter, the calculated element $e(u_{ID}, h_{ID,1})$ of the multiplicative group GT, and the calculated element $v_{ID}{}^{\hat{}}r_{ID,1}$ of the multiplicative group GT, the ciphertext decryption unit 341 calculates an element $e(u_{ID}, h_{ID,1}) \cdot v_{ID}{}^{\hat{}}r_{ID,1}$ of the multiplicative group GT, which is a product of the element $e(u_{ID}, h_{ID,1})$ of the multiplicative group GT and the element $v_{ID}{}^{\hat{}}r_{ID,1}$ of multiplicative group GT, by using a processing device, such as the CPU 911.

Based on the key generation function KDF indicated by the input public encryption parameter and the calculated element $e(u_{ID}, h_{ID,1}) \cdot v_{ID}{}^{\hat{}}r_{ID,1}$ of the multiplicative group GT, the ciphertext decryption unit 341 calculates a key bit sequence $k' = KDF(e(u_{ID}, h_{ID,1}) \cdot v_{ID}{}^{\hat{}}r_{ID,1})$, which is a bit sequence of predetermined length obtained by converting the element $e(u_{ID}, h_{ID,1}) \cdot v_{ID}{}^{\hat{}}r_{ID,1}$ of the multiplicative group GT by the key generation function KDF, by using a processing device, such as the CPU 911.

Based on the input corresponding first ciphertext $C1_{ID}$ and the calculated key bit sequence $k'$, the ciphertext decryption unit 341 generates a bit sequence by decrypting the corresponding first ciphertext $C1_{ID}$ with the key bit sequence k', by using a processing device, such as the CPU 911.

In this case, the key bit sequence $k_i$ calculated by the first ciphertext generating unit 241 of the ciphertext generating apparatus 200 is $k_i$=KDF (e(g,h1)^$s_i$).

On the other hand, the key bit sequence k' calculated by the ciphertext decryption unit 341 is k'KDF(e($u_{ID}$,$h_{ID,1}$)·$v_{ID}$^$r_{ID,1}$).

Moreover, the element $h_{ID,1}$ of the multiplicative group G2 calculated by the secret key generating unit 132 of the encryption parameter generating apparatus 100 is $h_{ID,1}$=(h1·g2^(-$r_{ID,1}$))^(1/(α-ID)). Therefore, since k'=KDF(e(g,h1)^$s_{ID}$), thereby k'=$k_{ID}$.

The ciphertext decryption unit 341 decrypts the corresponding first ciphertext $C1_{ID}$ by using the same key bit sequence k' as that used for encrypting the plaintext M by the first ciphertext generating unit 241 of the ciphertext generating apparatus 200, thereby enabling to restore the plaintext M.

Next, operations will be described.

FIG. 12 is a flowchart showing an example of the flow of parameter setting processing in which the encryption parameter generating apparatus 100 being a comparative example according to the present Embodiment sets a public encryption parameter.

The same reference numbers are attached to the steps common to the steps of the parameter setting processing explained in Embodiment 1.

In the secret information generation step S11, the secret information generating unit 112 randomly generates an integer α being greater than or equal to 1 and less than a natural number r, based on the natural number r indicated by the group parameter stored by the group parameter storage unit 111, by using a processing device, such as the CPU 911.

The secret information storage unit 121 stores information indicating the integer α generated by the secret information generating unit 112, by using a storage device, such as the magnetic disk drive 920.

In the encryption parameter generation step S12, the public parameter generating unit 113 determines a key generation function KDF and a hash function HF, based on the multiplicative group GT and the natural number r indicated by the group parameter stored by the group parameter storage unit 111, by using a processing device, such as the CPU 911.

The public parameter generating unit 113 randomly selects an element g of the legitimate group G1 and four elements g2, h1, h2, and h3 of the multiplicative group G2, based on the multiplicative groups G1 and G2 indicated by the group parameter stored by the group parameter storage unit 111, by using a processing device, such as the CPU 911.

The public parameter generating unit 113 calculates an element g1=g^α of the multiplicative group G1, based on the multiplicative group G1 indicated by the group parameter stored by the group parameter storage unit 111, the integer α generated by the secret information generating unit 112 at the secret information generation step S11, and the selected element g of the multiplicative group G1, by using a processing device, such as the CPU 911.

The parameter storage unit 122 stores information indicating the group parameter stored by the group parameter storage unit 111, the determined key generation function KDF, the determined hash function HF, the selected element g of the multiplicative group G1, the calculated element g1 of the multiplicative group G1, and the selected four elements g2, h1, h2, and h3 of the multiplicative group G2, as public encryption parameters, by using a storage device, such as the magnetic disk drive 920.

In the encryption parameter publishing step S13, the public parameter publishing unit 114 publishes information indicating the group parameter stored by the group parameter storage unit 111, the key generation function KDF and the hash function HF determined by the public parameter generating unit 113, the element g of the multiplicative group G1 and the four elements g2, h1, h2 and h3 of the multiplicative group G2 selected by the public parameter generating unit 113, and the element g1 of the multiplicative group G1 calculated by the public parameter generating unit 113, as public encryption parameters, by using a processing device, such as the CPU 911.

The public encryption parameters published by the public parameter publishing unit 114 are acquired by the ciphertext generating apparatus 200 and the ciphertext receiving apparatuses 301 to 303, and stored by the encryption parameter storage unit 210 and the public parameter storage unit 310, by using a storage device, such as the magnetic disk drive 920.

FIG. 13 is a flowchart showing an example of the flow of secret key setting processing in which the encryption parameter generating apparatus 100 being a comparative example according to the present Embodiment sets a secret key. The same reference numbers are attached to the steps common to the steps of the secret key setting processing explained in Embodiment 1.

In the identification input step S21, the identification information input unit 131 inputs an integer ID as recipient identification information, by using a processing device, such as the CPU 911.

In the secret key generation step S22, the secret key generating unit 132 randomly generates three integers $r_{ID,1}$, $r_{ID,2}$, and $r_{ID,3}$, being greater than or equal to 1 and less than the natural number r, based on the natural number r indicated by the public encryption parameter stored by the encryption parameter storage unit 210, by using a processing device, such as the CPU 911.

Based on the multiplicative group G2 and three elements h1, h2, and h3 of the multiplicative group G2 indicated by the public encryption parameter stored by the parameter storage unit 122, and the generated three integers $r_{ID,1}$, $r_{ID,2}$, and $r_{ID,3}$, the secret key generating unit 132 calculates three elements of the multiplicative group G2, $h_{ID,1}$=(h1·g2^(-$r_{ID,1}$))^(1/(α-ID)), $h_{ID,2}$=(h2·g2^(-$r_{ID,2}$))^(1/(α-ID)), $h_{ID,3}$=(h3·g2^(-$r_{ID,3}$))^(1/(α-ID)), by using a processing device, such as the CPU 911.

In the secret key notification step S23, the secret key notification unit 133 secretly notifies the corresponding ciphertext receiving apparatus of the information indicating the three integers $r_{ID,1}$, $r_{ID,2}$ and $r_{ID,3}$ generated by the secret key generating unit 132 at the secret key generation step S22, and the three elements $h_{ID,1}$, $h_{ID,2}$, and $h_{ID,3}$ of the multiplicative group G2 calculated by the secret key generating unit 132 at the secret key generation step S22, as a secret key $d_{ID}$, by using a processing device, such as the CPU 911.

The secret key $d_{ID}$ notified by the secret key notification unit 133 is acquired by the corresponding ciphertext receiving apparatus, and stored by the secret key storage unit 323 by using a storage device, such as the magnetic disk drive 920.

FIG. 14 is a flowchart showing an example of the flow of ciphertext generation processing in which the ciphertext generating apparatus 200 being a comparative example according to the present Embodiment generates a ciphertext. The same reference numbers are attached to the steps common to the steps of the ciphertext generation processing explained in Embodiment 1.

In the recipient identification input step S32, the recipient identification input unit 232 inputs n integers $ID_i$ respectively corresponding to n recipients, as n recipient identification information for respectively identifying the n recipients, by using a processing device, such as the CPU 911.

In the random number generation step S34, the random number generating unit 222 randomly generates n integers $s_i$, greater than or equal to 1 and less than the natural number r, respectively corresponding to the n recipients, based on the natural number r indicated by the public encryption parameter stored by the encryption parameter storage unit 210, by using a processing device, such as the CPU 911.

In the first ciphertext generation step S35, based on the multiplicative group GT, the pairing e, the element g of the multiplicative group G1 and the element h1 of the multiplicative group G2, and the key generation function KDF indicated by the public encryption parameters stored by the encryption parameter storage unit 210, and the n integers $s_i$ respectively corresponding to the n recipients generated by the random number generating unit 222 at the random number generation step S34, the first ciphertext generating unit 241 calculates n key bit sequences $k_i = \mathrm{KDF}(e(g,h1)^{s_i})$ respectively corresponding to the n recipients, by using a processing device, such as the CPU 911.

Based on the session key K (=plaintext M) generated by the session key generating unit 221 at the session key generation step S33, and the calculated n key bit sequences $k_i$ respectively corresponding to the n recipients, the first ciphertext generating unit 241 generates, by using a processing device, such as the CPU 911, n first ciphertexts $C1_i$ respectively corresponding to the n recipients by respectively encrypting one session key K by using the n key bit sequences $k_i$ respectively corresponding to the n recipients.

In the second ciphertext generation step S36, based on the multiplicative group G1, the elements g and g1 of the multiplicative group G1 indicated by the public encryption parameters stored by the encryption parameter storage unit 210, the n integers $ID_i$ respectively corresponding to the n recipients input by the recipient identification input unit 232 at the recipient identification input step S32, and the n integers $s_i$ respectively corresponding to the n recipients generated by the random number generating unit 222 at the random number generation step S34, the second ciphertext generating unit 242 calculates n elements $u_i = (g1 \cdot g^{(-ID_i)})^{s_i}$ of the multiplicative group G1 respectively corresponding to the n recipients, by using a processing device, such as the CPU 911.

The second ciphertext generating unit 242 treats bit sequences respectively indicating the calculated n elements $u_i$ of the multiplicative group G1 respectively corresponding to the n recipients, as n second ciphertexts $C2_i$ respectively corresponding to the n recipients, by using a processing device, such as the CPU 911.

In the third ciphertext generation step S37, based on the multiplicative group GT, the pairing e, the element g of the multiplicative group G1 and the element g2 of the multiplicative group G2 indicated by the public encryption parameters stored by the encryption parameter storage unit 210 and the n integers $s_i$ respectively corresponding to the n recipients generated by the random number generating unit 222 at the random number generation step S34, the third ciphertext generating unit 243 calculates n elements $v_i = e(g, g2)^{s_i}$ of the multiplicative group GT respectively corresponding to the n recipients, by using a processing device, such as the CPU 911.

The third ciphertext generating unit 243 treats bit sequences respectively indicating the calculated n elements $v_i$ of the multiplicative group GT respectively corresponding to the n recipients, as n third ciphertexts $C3_i$ respectively corresponding to the n recipients, by using a processing device, such as the CPU 911.

In the hash value calculation step S38, based on the n first ciphertexts $C1_i$ respectively corresponding to the n recipients generated by the first ciphertext generating unit 241 at the first ciphertext generation step S35, the n second ciphertexts $C2_i$ respectively corresponding to the n recipients generated by the second ciphertext generating unit 242 at the second ciphertext generation step S36, and the n third ciphertexts $C3_i$ respectively corresponding to the n recipients generated by the third ciphertext generating unit 243 at the third ciphertext generation step S37, the hash value calculation unit 244 generates n combined ciphertexts $(C1_i|C2_i|C3_i)$ respectively corresponding to the n recipients made by respectively combining the n first ciphertexts $C1_i$ respectively corresponding to the n recipients, the n first ciphertexts $C2_i$ respectively corresponding to the n recipients, and the n third ciphertexts $C3_i$ respectively corresponding to the n recipients, by using a processing device, such as the CPU 911.

Based on the hash function HF indicated by the public encryption parameter stored by the encryption parameter storage unit 210, and the generated n combined ciphertexts $(C1_i|C2_i|C3_i)$ respectively corresponding to the n recipients, the hash value calculation unit 244 calculates n integers $\beta_i = \mathrm{HF}(C1_i|C2_i|C3_i)$ respectively corresponding to the n recipients obtained by respectively converting the n combined ciphertexts $(C1_i|C2_i|C3_i)$ respectively corresponding to n the recipients, by the hash function HF, by using a processing device, such as the CPU 911.

In the ciphertext verification text generation step S39, based on the multiplicative group GT, the pairing e, the element g of the multiplicative group G1, and two elements h2 and h3 of the multiplicative group G2 indicated by the public encryption parameters stored by the encryption parameter storage unit 210, the n integers $s_i$ respectively corresponding to the n recipients generated by the random number generating unit 222 at the random number generation step S34, and the n integers $\beta_i$ respectively corresponding to the n recipients calculated by the hash value calculation unit 244 at the hash value calculation step S38, the ciphertext verification text generating unit 245 calculates n elements $y_i = e(g, h2)^{s_i} \cdot e(g, h3)^{(s_i \cdot \beta_i)}$ of the multiplicative group GT respectively corresponding to the n recipients, by using a processing device, such as the CPU 911.

The ciphertext verification text generating unit 245 treats bit sequences respectively indicating the calculated n elements $y_i$ of the multiplicative group GT respectively corresponding to the n recipients, as n ciphertext verification texts $CC_i$ respectively corresponding to the n recipients, by using a processing device, such as the CPU 911.

FIG. 15 is a flowchart showing an example of the flow of ciphertext reception processing in which the ciphertext receiving apparatuses 301 to 303 being comparative examples according to the present Embodiment receive ciphertexts. The same reference numbers are attached to the steps common to the steps of the ciphertext reception processing explained in Embodiment 1.

In the ciphertext decomposing step S52, the ciphertext decomposition unit 346 acquires one corresponding first ciphertext $C1_{ID}$, one corresponding second ciphertext $C2_{ID}$, one corresponding third ciphertext $C3_{ID}$, and one corresponding ciphertext verification text $CC_{ID}$ corresponding to the recipient corresponding to the ciphertext receiving apparatus, based on the one key ciphertext C output by the ciphertext receiving unit 351 at the notification data receiving step, by using a processing device, such as the CPU 911.

In the verification hash value calculation step S53, based on the hash function HF indicated by the public encryption parameter stored by the public parameter storage unit 310, and the one corresponding combined ciphertext $(C1_{ID}|C2_{ID}|C3_{ID})$ made by combining the one corresponding first ciphertext $C1_{ID}$, the one corresponding second ciphertext $C2_{ID}$, and the one corresponding third ciphertext $C3_{ID}$ acquired by the ciphertext decomposition unit 346 at the ciphertext decomposing step S52, the verification hash value calculation unit 344 calculates one integer β' by converting the one corresponding combined ciphertext $(C1_{ID}|C2_{ID}|C3_{ID})$ by the hash function HF, as a verification hash value H', by using a processing device, such as the CPU 911.

In the ciphertext verification step S54, based on the multiplicative group GT and the pairing e indicated by the public encryption parameters stored by the public parameter storage unit 310, the two integers $r_{ID,2}$ and $r_{ID,3}$ and the two elements $h_{ID,2}$ and $h_{ID,3}$ of the multiplicative group G2 indicated by the secret key $d_{ID}$ stored by the secret key storage unit 323, one element $u_{ID}$ of the multiplicative group G1 indicated by the one verification second ciphertext $C2_{ID}$ and one element $v_{ID}$ of the multiplicative group GT indicated by the one verification third ciphertext $C3_{ID}$ acquired by the ciphertext decomposition unit 346 at the ciphertext decomposing step S52, and the one integer β' calculated by the verification hash value calculation unit 344 at the verification hash value calculation step S53, the ciphertext verification unit 345 calculates one element $y'=e(u_{ID},h_{ID,2}\cdot h_{ID,3}\hat{}\beta')\cdot v_{ID}\hat{}(r_{ID,2}+r_{ID,3}\cdot \beta')$ of the multiplicative group GT, by using a processing device, such as the CPU 911.

The ciphertext verification unit 345 compares the one element $y_{ID}$ of the multiplicative group GT indicated by the one corresponding ciphertext verification text $CC_{ID}$ acquired by the ciphertext decomposition unit 346 at the ciphertext decomposing step S52 with the calculated one element y' of the multiplicative group GT, by using a processing device, such as the CPU 911.

When the element $y_{ID}$ of the multiplicative group GT is equal to the element y' of the multiplicative group GT, the ciphertext verification unit 345 judges that the one key ciphertext C received by the ciphertext receiving unit 351 has consistency, and it goes to the ciphertext decrypting step S55.

When the element $y_{ID}$ of the multiplicative group GT is not equal to the element y' of the multiplicative group GT, the ciphertext verification unit 345 judges that the one key ciphertext C received by the ciphertext reception unit 351 has no consistency, and the ciphertext reception processing is ended.

In the ciphertext decrypting step S55, based on the multiplicative group GT, the pairing e and the key generation function KDF stored by the public parameter storage unit 310, the integer $r_{ID,1}$ and the element $h_{ID,1}$ of the multiplicative group G2 indicated by the secret key $d_{ID}$ stored by the secret key storage unit 323, and the one element $u_{ID}$ of the multiplicative group G1 indicated by one corresponding second ciphertext $C2_{ID}$ and the one element $v_{ID}$ of the multiplicative group GT indicated by one corresponding third ciphertext $C3_{ID}$ acquired by the ciphertext decomposition unit 346 at the ciphertext decomposing step S52, the ciphertext decryption unit 341 calculates one key bit sequence k'=KDF$(e(u_{ID},h_{ID,1})\cdot v_{ID}\hat{}r_{ID,1})$, by using a processing device, such as the CPU 911.

Based on the one corresponding first ciphertext $C1_{ID}$ acquired by the ciphertext decomposition unit 346 at the ciphertext decomposing step S52, and the calculated one key bit sequence k', the ciphertext decryption unit 341 decrypts the corresponding first ciphertext $C1_{ID}$ by using the key bit sequence k', to generate a bit sequence of predetermined length, as a session key K'(=plaintext M), by using a processing device, such as the CPU 911.

As mentioned above, the session key K' generated by the ciphertext decryption unit 341 has the same bit sequence as that of the session key K generated by the session key generating unit 221 of the ciphertext generating apparatus 200.

Next, security of the ID-based cryptosystem used in the ID-based cryptographic communication system which is a comparative example according to the present Embodiment will be discussed. To simplify in the following proving, the multiplicative group G1 and the multiplicative group G2 shall be the same multiplicative group G.

First, as a mathematical problem to which the ID-based cryptosystem being a comparative example according to the present Embodiment reduces, q-D-tABDHE problem (q Decisional Trancated Augmented Bilinear Diffie-Hellman Exponent Problem) is defined.

In the q-D-tABDHE problem, a solver B is given q+3 elements g', $g'_{q+2}$, g, $g_1$, ..., $g_q$, of the multiplicative group G and one element Z of the multiplicative group GT. Moreover, there is an integer α greater than or equal to 1 and less than the order of the multiplicative group G, as secret information from the solver B. The elements g and g' of the multiplicative group G are randomly selected elements of the multiplicative group G. When the i-th power of an integer α is described as an integer α$\hat{}$i, the element $g_i$ (i being an integer greater than or equal to 1 and less than or equal to q) of the multiplicative group G is an element g$\hat{}$(α$\hat{}$i) of the multiplicative group G, which is the α$\hat{}$i-th power of the element g of the multiplicative group G. The element $g'_{q+2}$ of the multiplicative group G is similarly defined. That is, the element $g'_{q+2}$ of the multiplicative group G is $g'_{q+2}$=g'$\hat{}$(α$\hat{}$(q+2)). The solver B replies to the question of judging whether an element $e(g_{q+1},g')$ of the multiplicative group GT, which is a pairing value of an element $g_{q+1}$=g$\hat{}$(α$\hat{}$(q+1)) of the multiplicative group G and an element g' of the multiplicative group G, is equal to the given element Z of multiplicative group GT or not.

Let's define the distribution where practically Z=$e(g_{q+1},g')$ as P, and the distribution where Z is a randomly selected element of the multiplicative group GT as R.

The advantage of the solver B is defined as $\text{Adv}^{q\text{-}d\text{-}tabdhe}_{k,G,GT}(B)=|\Pr[B(1^k, I)=1:I\leftarrow P]-\Pr[B(1^k, I)=1:I\leftarrow R]|$. $B(1^k,I)$ as used herein indicates a judgment result of the solver B, and "$B(1^k,I)=1$" indicates that it has been judged to be Z=$e(g_{q+1},g')$. "I←P" indicates an event where practically Z=$e(g_{q+1},g')$, and "I←R" indicates an event where Z is a randomly selected element of the multiplicative group GT. That is, $\text{Adv}^{q\text{-}d\text{-}tabdhe}_{k,G,GT}(B)$ is an absolute value of the difference between the probability that the solver B judges to be Z=$e(g_{q+1},g')$ in the case of practically Z=$e(g_{q+1},g')$ (namely, the judgment of the solver B is right), and the probability that the solver B judges to be Z=$e(g_{q+1},g')$ in the case of Z being a randomly selected element of the multiplicative group GT (that is, the judgment of the solver B is wrong).

Let's define $\text{Adv}^{q\text{-}d\text{-}tabdhe}_{k,G,GT}(t)=\max(\text{Adv}^{q\text{-}d\text{-}tabdhe}_{k,G,GT}(B))$. This means the advantage of the solver who has the highest advantage among the solvers B who reply during the time t. (t,ϵ,q)-D-tABDHE assumption (or just "q-D-tABDHE assumption") is satisfied with (G,GT) when $\text{Adv}^{q\text{-}d\text{-}tabdhe}_{k,G,GT}(t)\leqq \epsilon$.

First, the MU-IND-ID-CCA2 security of the ID-based cryptosystem Π of single recipient, which is a basis of the ID-based cryptosystem Π' of multiple recipients being a comparative example according to the present Embodiment, will be proved.

It is assumed that the attacker A has an advantage $\text{Adv}^{mu}_{n,\Pi,\Gamma}(A)=|\Pr[T_0]-1/2|$ for the cryptographic system Π. $T_0$ as used herein indicates an event satisfying b=b' (namely, the attacker A replies correctly) in a game (hereinafter called "$G_0$") which the attacker A challenges in the definition of the MU-IND-ID-CCA2 security. $Pr[T_0]$ indicates probability that the event $T_0$ occurs. Moreover, it is defined to be $q=q_x+n+1$. Similarly, hereinafter, the event satisfying b=b' in the game $G_\lambda$ ($\lambda$ being an integer greater than or equal to 1 and less than or equal to 6) is called $T_\lambda$.

The game $G_1$ differs from the game $G_0$ in that the object which the attacker A attacks is not the cryptographic system Π but the encryption oracle $O_E$, the key derivation oracle $O_X$, and the decryption oracle $O_D$ which have been simulated by the solver B.

First, the solver B simulates the key generation capability S for PKG as follows:

The solver B randomly generates an integer α greater than or equal to 1 and less than the order r of the multiplicative group G.

The solver B generates three q-th order polynomials $f_j(x)$ (j being an integer greater than or equal to 1 and less than or equal to 3) with a random integer coefficient greater than or equal to 0 and less than r.

The solver B randomly generates a key generation function KDF and a hash function HF with collision resistance.

The solver B randomly selects the element g of the multiplicative group G.

The solver B calculates an element $g1=g^\alpha$ of the multiplicative group G.

The solver B calculates three elements $h1=g^{f_1(\alpha)}$, $h2=g^{f_2}(\alpha)$, and $h3=g^{f_3(\alpha)}$ of the multiplicative group G.

The solver B randomly generates an integer s0 greater than or equal to 1 and less than r.

The solver B calculates an element $g'=g^{s0}$ of the multiplicative group G.

The solver B outputs a common parameter params=(g,g1, h1,h2,h3,KDF,HF). Since g, α, $f_j(x)$, and s0 are random, the distribution of the common parameter params is the same as that of the practical key generation capability S for PKG.

Moreover, the solver B simulates the key derivation oracle $O_X$ as follows:

When the input identification information ID (treated as an integer) of the user is equal to the integer α, the solver B rejects it. This is also performed in the practical cryptographic system Π.

When ID≠α, the solver B calculates three integers $r_{ID,j}=f_j$(ID) (j being an integer greater than or equal to 1 and less than or equal to 3).

The solver B calculates the (q−1)th order polynomial $F_{ID,j}(x)=(f_j(x)-f_j(ID))/(x-ID)$.

The solver B calculates three elements $h_{ID,j}=g^{F_{ID,j}(\alpha)}$ (j being an integer greater than or equal to 1 and less than or equal to 3) of the multiplicative group G.

The solver B outputs $d_{ID}=(r_{ID,1},r_{ID,2},r_{ID,3},h_{ID,1},h_{ID,2},h_{ID,3})$ as a secret key $d_{ID}$.

In this case, since $h1=g^{f_1(\alpha)}$, therefore $h_{ID,1}=g^{((f_1(\alpha)-f_1(ID))/(\alpha-ID))}=(h1\cdot g^{(-f_1(ID))})^{(1/(\alpha-ID))}$. Similarly, $h_{ID,2}$ and $h_{ID,3}$ are calculated. Since $r_{ID,j}=f_j$(ID), the relation between $r_{ID,j}$ and $h_{ID,j}$ is the same as that in the practical cryptographic system Π.

Moreover, the solver B simulates the decryption oracle $O_D$ as follows:

The solver B simulates the key derivation oracle $O_X$ by the procedure mentioned above, and generates a secret key $d_{ID}$.

Based on the generated secret key $d_{ID}$, the solver B decrypts a ciphertext C by the same procedure as that of the practical cryptographic system Π.

Furthermore, the solver B simulates the encryption oracle $O_E$ as follows:

When the input user's identification information ID* is equal to the integer α, the solver B generates a ciphertext C by the same procedure as that of the practical cryptographic system Π.

When ID*·α, the solver B simulates the key derivation oracle $O_X$ by the procedure mentioned above, and generates a secret key $d_{ID}*=(r_{ID}*_{,1}, r_{ID}*_{,2}, r_{ID}*_{,3}, h_{ID}*_{,1}, h_{ID}*_{,2}, h_{ID}*_{,3}$.

The solver B calculates an element $Z=e(g,g')^{(\alpha^{((q+1))})}$ of the multiplicative group GT.

Based on the (q+2)th order polynomial $\phi(x)=x^{(q+2)}$, the solver B calculates the (q+1)th order polynomial $\Phi_{ID}*(x)=(\phi(x)-\phi(ID*))/(x-ID)$. The τ-th order coefficient (τ being an integer greater than or equal to 0 and less than or equal to q) of the calculated (q+1)th order polynomial $\Phi_{ID}*(x)$ is defined to be $\Phi_{ID}*_{,\tau}$.

The solver B randomly generates an integer s'* greater than or equal to 1 and less than r.

The solver B calculates an element $u*=(g'^{(\phi(\alpha)-\phi(ID*))})^{s'*}$ of the multiplicative group G.

The solver B calculates an element $v*=(Z\cdot e(g',\Pi(g^{(\Phi_{ID}*}, \alpha^\tau)))^{s'*}$ of the multiplicative group GT. The solver B calculates a key bit sequence $k*=KDF(e(u*,h_{ID}*_{,1})\cdot v*^{r_{ID}*_{,1}})$ The solver B encrypts the selected message with the key bit sequence k*.

The solver B combines the bit sequence (first ciphertext C1) indicating the encrypted message, the bit sequence (second ciphertext C2) indicating the element u* of the multiplicative group G, and the bit sequence (third ciphertext C3) indicating the element v* of the multiplicative group G, and calculates a hash value β* by the hash function HF.

The solver B calculates an element $y*=e(u*,h_{ID}*_{,2}\cdot h_{ID}*_{,3}{}^{\beta*})\cdot v*^{(r_{ID}*_{,2}+r_{ID}*_{,3}\cdot\beta*)}$ of the multiplicative group GT.

The solver B generates a ciphertext C, and outputs it.

Now, let $s*=s'*\cdot s0\cdot\Phi_{ID}*(\alpha)$. Since $g'=g^{s0}$, $\phi(\alpha)-\phi(ID*)=\Phi_{ID}*(\alpha)\cdot(\alpha-ID*)$, $g1=g^\alpha$, therefore $u*=g^{(s*\cdot(\alpha-ID*))}=(g1\cdot g^{(-ID*)})^{s*}$. Moreover, since $\Pi(g^{(\phi_{ID},\alpha^\tau)})=g^{\Sigma(\phi_{ID}\cdot(\alpha^\tau)}=g^{(\phi_{ID}(\alpha)-\alpha^{(q+1)})}$, therefore $v*=e(g,g)^{s*}$ according to the bilinear of the pairing e.

Furthermore, since $r_{ID,j}=f_j(ID)$, $h_{ID,1}=g^{((f_1(\alpha)-f_1(ID))/(\alpha-ID))}$, therefore $k*=KDF(e(g^{(s*\cdot(\alpha-ID*))},g^{((f_1(\alpha)-f_1(ID))/(\alpha-ID))})\cdot e(g,g)^{(s*\cdot f_1(ID))})=KDF(e(g,g)^{(s*\cdot f_1(ID))})=KDF(e(g,h1)^{s*})$.

Similarly, $y*=e(g,h2)^{s*}\cdot e(g,h3)^{(s*\cdot\beta)}$.

Therefore, the relation between ciphertexts is also the same as that of the practical cryptographic system Π. Moreover, since s* is independent random for each call of the encryption oracle $O_E$, the distribution of the ciphertext is also the same as that of the practical cryptographic system Π.

Furthermore, since $q=q_x+n+1$, therefore $\{f_j(ID)\}$ and $\{f_j(\alpha)\}$ used by the key derivation oracle $O_X$, the encryption oracle $O_E$ and the decryption oracle $O_D$ are all independent random, thereby the simulation by the solver B is perfect. Then, the advantage of the attacker A in the game $G_1$ is the same as that in the game $G_0$, that is $Pr[T_1]=Pr[T_0]$.

A game $G_2$ is made by changing the game $G_1$ as follows:

In simulation of the encryption oracle $O_E$, the solver B calculates Z beforehand (for example, at the time of simulation of the key generation capability S for PKG) according to the following procedure instead of calculating the element $Z=e(g,g')^{(\alpha^{q+1})}$ of the multiplicative group GT.

The solver B randomly generates an integer z greater than or equal to 1 and less than the order r of the multiplicative group G. However, it shall be $z\cdot\alpha^{(q+1)}$.

The solver B calculates an element $Z=e(g,g')^z$ of the multiplicative group GT.

If there is some difference between the actions of the attacker A in the games $G_1$ and $G_2$, the solver B can judge whether $Z=e(g,g')^{\wedge}(\alpha^{\wedge}(q+1))$ or not by distinguishing the difference.

Now, consider the case where the solver B simulates an oracle by utilizing a given parameter in the given q-D-tABHE problem.

In the given q-D-tABDHE problem, since the solver B knows q+3 elements $g'$, $g'_{q+1}$, $g$, $g_1$, . . . , $g_q$, though not knowing the secret integer $\alpha$ which is unknown to the solver B, he can perform simulation by utilizing them. That is, the solver B treats the element g of the multiplicative group G which was given in the q-D-tABDHE problem, as the element g of the multiplicative group G which is selected in simulation of the key generation capability S for PKG. Moreover, instead of randomly generating the integer s0, the solver B treats the element g' of the multiplicative group G which was given in the q-D-tABDHE problem, as the element $g'(=g^{\wedge}s0)$ of the multiplicative group G which is calculated in simulation of the key generation capability S for PKG.

If the $\tau$-th order coefficient of the q-th order polynomial $f_j(x)$ is defined to be $f_{j,\tau}$ ($\tau$ being an integer greater than or equal to 0 and less than or equal to q), since the element h1 of the multiplicative group G is $h1=g^{\wedge}f_j(\alpha)=\Pi(g^{\wedge}(f_{j,1}\cdot\alpha^{\wedge}\tau))=\Pi(g_1^{\wedge}f_j)$, even if the solver B does not know $\alpha$, he can calculate the element h1 of the multiplicative group G. Similarly, h2 and h3 can be calculated. Therefore, even if the solver B does not know $\alpha$, he can simulate the key generation capability S for PKG. Similarly, even if the solver B does not know $\alpha$, he can simulate the key derivation oracle $O_X$ and the decryption oracle $O_D$. Moreover, the solver B can also simulate the encryption oracle $O_E$ except for the calculation of the element Z of the multiplicative group GT.

The solver B simulates the encryption oracle $O_E$ by using the element Z of the multiplicative group GT which was given to him in the q-D-tABDHE problem, as the element Z of the multiplicative group GT. If $Z=(g,g')^{\wedge}(\alpha^{\wedge}(q+1))$, it means that the solver B is performing the game $G_1$. If $Z=\cdot(g,g')^{\wedge}(\alpha^{\wedge}(q+1))$, it means that the solver B is performing the game $G_2$. The solver B discerns this, based on a difference of the action of the attacker A in the game, and judges whether $Z=(g,g')^{\wedge}(\alpha^{\wedge}(q+1))$ or not, to reply to the given q-D-tABDHE problem.

Therefore, $|Pr[T_2]-Pr[T_1]|\leq Adv^{q-d-tabdhe}_{k,G,GT}(t_1)+3/p$ is satisfied. Here, $t_1=t+O(q^2\cdot t_G)$, and $t_G$ is the time spent for exponential operation in the multiplicative group G.

A game $G_3$ is made by changing the game $G_2$ as follows:

In simulation of the key generation capability S for PKG, the solver B does not calculate elements h1, h2, and h3 of the multiplicative group G by using the q-th order polynomial $f_j(x)$ randomly generated, but randomly selects the elements h1, h2, and h3 of the multiplicative group G. Moreover, in simulation of the key derivation oracle $O_X$, the solver B randomly generates an integer $r_{ID,j}$ for ID, and calculates an element $h_{ID,1}=(h1\cdot g^{\wedge}(-r_{ID,j}))^{\wedge}(1/(\alpha-ID))$ of the multiplicative group G. Similarly, $h_{ID,2}$ and $h_{ID,3}$ are calculated.

The solver B simulates the encryption oracle $O_E$ according to the following procedure:

The solver B calculates an integer $z'^{*}=(z-\alpha^{\wedge}(q+1))/\phi_{ID}^{*}(\alpha)$.

The solver B randomly generates an integer s* greater than or equal to 1 and less than the order r of the multiplicative group G.

The solver B calculates an element $u^{*}=g^{\wedge}(s^{*}\cdot(\alpha-ID^{*}))$ of the multiplicative group G.

The solver B calculates an element $v^{*}=e(g,g)^{\wedge}(s^{*}\cdot(1+z'^{*}))$ of the multiplicative group GT.

The solver B calculates a key bit sequence $k=KDF(e(g,h1\cdot g^{\wedge}(z'^{*}\cdot r_{ID,1})^{\wedge}s^{*})$.

The solver B calculates an element $y^{*}=e(g,h2\cdot h3^{\wedge}\beta^{*})^{\wedge}s^{*}\cdot e(g,g)^{\wedge}(s^{*}\cdot z'^{*}\cdot(r_{ID}^{*},_2+r_{ID}^{*},_3\cdot\beta^{*}))$ of the multiplicative group GT.

Respects other than the above are the same as those of the game $G_2$.

When seen from the attacker A, since the game $G_2$ and the game $G_3$ look the same, therefore $Pr[T_3]=Pr[T_2]$.

A game $G_4$ is made by changing the game $G_3$ as follows:

In simulation of the decryption oracle $O_D$, the solver judges whether $v=e(u,g)^{\wedge}(1/(\alpha-ID))$ and $y=e(u,h2\cdot h3^{\wedge}\beta)$ are satisfied or not. When not satisfied, "rejection" is returned. When satisfied, the solver B calculates a key bit sequence $k'=KDF(e(u,h1)^{\wedge}(1/(\alpha-ID)))$, and decrypts the message.

Thus, the solver B uses the integer $\alpha$, not the secret key $d_{ID}$, for judging the consistency of the ciphertext and generating the key bit sequence k'.

In judging the consistency of the ciphertext, it is judged whether $y=e(u,h_{ID,2}\cdot h_{ID,3}^{\wedge}\beta))\cdot v^{\wedge}(r_{ID,2}+r_{ID,3}\cdot\beta)$ or not, in the practical cryptographic system E. Since the judgment method is different, a ciphertext which is not rejected in the practical cryptographic system II may be rejected. When this event is represented as $R_4$, $|Pr[T4]-Pr[T3]|\leq Pr[R_4]$.

A game $G_5$ is made by changing the game $G_4$ as follows:

In the encryption oracle $O_E$, the solver B randomly generates an integer r* greater than or equal to 1 and less than the order r of the multiplicative group G.

The solver B calculates a key bit sequence $k^{*}=KDF(e(g,g)^{\wedge}r^{*})$.

The solver B treats the calculated key bit sequence k* as it is, as an encrypted message, regardless of the messages $M_0^{*}$ and $M_i^{*}$ input by the encryption oracle OE.

Since the output of the encryption oracle $O_E$ is independent of b, $M_0^{*}$ and $M_1^{*}$, the attacker A does not have an advantage. Therefore, $Pr[T_5]=1/2$.

As described in the explanation for the game $G_4$, the solver B does not use the integer $r_{ID,1}$ in simulation of the decryption oracle $O_D$. The first time (and only once) of the $r_{ID,1}$ being used is at the time of ID* being input into the encryption oracle $O_E$.

Therefore, when (g,h1,z',*,s*,M*) is fixed, with respect to (r*,$r_{ID}^{*},_1$), to first randomly generate $r_{ID}^{*},_1$ and then calculate r* to be consistent with the generated $r_{ID}^{*},_1$ gives the same distribution as that of to first randomly generate r* and then calculate $r_{ID}^{*},_1$ to be consistent with the generated r*.

Thus, when seen from the attacker A, the game $G_4$ and the game $G_5$ look the same.

Since $r_{ID,1}$ is not referred to except for in the simulation of the encryption oracle OE, it is not necessary to calculate it based on r*.

As mentioned above, $Pr[T_4]=Pr[T_5]=1/2$, and $Pr[R_4]=Pr[R_5]$ are satisfied. $R_5$ indicates an event that a ciphertext which is not rejected in the practical cryptographic system $\Pi$ is rejected in game $G_5$.

A game $G_6$ is made by changing the game $G_5$ as follows:

In simulation of the i-th encryption oracle $O_E$, the solver B holds a group $his^{*}_i(ID^{*}_i,C^{*}_i,\beta^{*}_i)$ composed of the input ID*, the generated ciphertext C*, and the calculated hash value $\beta^{*}$ in a list Clist.

In simulation of the decryption oracle $O_D$, the solver B performs the following judgment before judging the consistency of the ciphertext.

The solver B judges whether there is $his^{*}_i$ where $ID^{*}_i$ is equal to the input ID and $\beta^{*}_i$ is equal to $\beta$ calculated from the input ciphertext C, in the held list Clist or not. When there is $his^{*}_i$ with equality, the solver B compares the portion corresponding to the ciphertext body CB$^*_i$ (excluding the ciphertext verification text CC$^*_i$) in the ciphertext C*, included in the his$^*_i$ with the portion corresponding to the ciphertext body CB (excluding the ciphertext verification text CC) in the input ciphertext C, and when they are not equal, returns "rejection".

The event of rejecting the ciphertext by this judgment is defined as $C_6$. The event that the ciphertext which is not rejected in the practical cryptographic system E nor rejected by this judgment is rejected by the judgment method changed in the game $G_4$ is defined to be $R_6$, and thus $|Pr[R_6]-Pr[R_5]| \leq Pr[C_6]$.

The event $C_6$ is the case of hash values 13 being equal though the bit sequences used as the basis of the hash value calculation are different, therefore $Pr[C_6] \leq Adv^{cr}_H(t_2)$. In addition, $Adv^{cr}_H(t_2)$ indicates the collision resistance advantage of the hash function HF.

In order that the event $R_6$ occurs, it is necessary to input y being $y=e(g,h2 \cdot h3\hat{}\beta)\hat{}s \cdot e(g,g)\hat{}(s \cdot z' \cdot (r_{ID,2}+r_{ID,3}\beta))$ for z' which is not 0, into the decryption oracle $O_D$. Since $(r_{ID,2}, r_{ID,3})$ is random for each ID, the probability of selecting such y before the ID being input into the encryption oracle OE is less than or equal to 1/r (r being the order of the multiplicative group GT). Moreover, after ID=ID$^*_i$ is input into the encryption oracle, if $\beta=\beta^*_i$, it is rejected by an additional judgment. Therefore, $\beta \cdot \beta^*_i$. The probability of selecting y which satisfies the conditions mentioned above is still less than or equal to 1/r. Thus, $Pr[R_6] \leq q_d/r$ is satisfied.

According to what is described above, $Adv^{mu}_{n,\Pi,\Gamma}(t,q_e, q_d, q_x) \leq q_e \cdot Adv^{q-d-tabdhe}_{k,G,GT}(t_1)+q_e \cdot Adv^{cr}_H(t_2)+q_e \cdot (q_d+3)/r$.

The ID-based cryptosystem Π' being a comparative example according to the present Embodiment is what is extended from the cryptographic system Π of a single recipient explained above to multiple recipients by the conjunctive method. As described in Embodiment 1, the SMMR security of the cryptographic system extended to multiple recipients by the conjunctive method is $Adv^{smmr}_{n,\Pi,\Gamma}(t,q_d,q_x) \leq Adv^{mu}_{n,\Pi,\Gamma}(t,1,q_d,q_x)$. Therefore, the SMMR security of the ID-based cryptosystem being a comparative example according to the present Embodiment is $Adv^{smmr}_{n,\Pi,\Gamma}(t,q_d,q_x) \leq Adv^{q-d-tabdhe}_{k,G,GT}(t_1)+Adv^{cr}_H(t_2)+(q_d+3)/r$.

On the other hand, since the SMMR security in the case of extending a general single recipient cryptographic system to multiple recipients by the conjunctive method is $Adv^{smmr}_{n,\Pi,\Gamma}(t,q_d,q_x) \leq n \cdot Adv^{mu}_{1,\Pi,\Gamma}(t',1,q_d,q_x)$, the recipient number n appears in the inequality showing the relation with respect to the advantage of the mathematical problem. That is, compared with the general case, the SMMR security of the ID-based cryptosystem being a comparative example according to the present Embodiment tightly reduces to the mathematical problem (high reduction rate). Thus, the ID-based cryptosystem which is a comparative example according to the present Embodiment can prove better security.

Next, the ID-based cryptographic communication system 800 according to the present Embodiment will be explained. Since the whole configuration of the ID-based cryptographic communication system 800 and the block configuration of the encryption parameter generating apparatus 100 according to the present Embodiment are the same as those described in the comparative example, their explanation is herein omitted. The ID-based cryptographic communication system 800 according to the present Embodiment is made by increasing the efficiency of the multiple recipient ID-based cryptosystem explained in the comparative example by making the hash value common.

First, the ciphertext generating apparatus 200 will be explained.

Since the block configuration of the ciphertext generating apparatus 200 is the same as that described in the comparative example, respects different from the comparative example will be explained with reference to FIG. 4.

The hash value calculation unit 244 inputs a public encryption parameter stored by the encryption parameter storage unit 210, by using a processing device, such as the CPU 911.

The hash value calculation unit 244 inputs n first ciphertexts $C1_i$ output by the first ciphertext generating unit 241, n second ciphertexts $C2_i$ output by the second ciphertext generating unit 242, and n third ciphertexts $C3_i$ output by the third ciphertext generating unit 243, as n ciphertext bodies $CB_i$ output by the ciphertext body generating unit 240, by using a processing device, such as the CPU 911.

The hash value calculation unit 244 generates one combined ciphertext by combining all the input n first ciphertexts $C1_i$, n second ciphertexts $C2_i$, and n third ciphertexts $C3_i$, by using a processing device, such as the CPU 911.

In addition, the hash value calculation unit 244 may further input n recipient identification information $ID_i$ output by the recipient identification input unit 232, as (a part of) the n ciphertext bodies $CB_i$, and may generate one combined ciphertext by combining all the input n recipient identification information $ID_i$, n first ciphertexts $C1_i$, n second ciphertexts $C2_i$, and n third ciphertexts $C3_i$.

Based on the hash function HF indicated by the input public encryption parameter and the generated one combined ciphertext, the hash value calculation unit 244 calculates one natural number N by converting the one combined ciphertext by the hash function HF, to be treated as one hash value $H_0$, by using a processing device, such as the CPU 911.

The hash value calculation unit 244 outputs information indicating the calculated one natural number N, and the generated one combined ciphertext, by using a processing device, such as the CPU 911.

The ciphertext verification text generating unit 245 inputs the public encryption parameter stored by the encryption parameter storage unit 210, the information indicating the n integers $s_i$ output by the random number generating unit 222, and the information indicating one natural number N output by the hash value calculation unit 244, by using a processing device, such as the CPU 911.

Based on the pairing e, the element g of the multiplicative group G1, and the element h2 of the multiplicative group G2 indicated by the input public encryption parameters, the ciphertext verification text generating unit 245 calculates an element e(g,h2) of the multiplicative group GT, which is a pairing value of the element g of the multiplicative group G1 and the element h2 of the multiplicative group G2, by using a processing device, such as the CPU 911.

Based on the pairing e, the element g of the multiplicative group G1, and the element h3 of the multiplicative group G2 indicated by the input public encryption parameters, the ciphertext verification text generating unit 245 calculates an element e(g,h3) of the multiplicative group GT, which is a pairing value of the element g of the multiplicative group G1 and the element h3 of the multiplicative group G2, by using a processing device, such as the CPU 911.

Since the elements e(g,h2) and e(g,h3) of the multiplicative group GT are constant regardless of the integer $s_i$, they may be calculated beforehand and stored by using a storage device, such as the magnetic disk drive 920.

Based on the multiplicative group GT indicated by the input public encryption parameter, the one natural number $\beta_0$ indicated by the input information, and the calculated element e(g,h3) of the multiplicative group GT, the ciphertext verification text generating unit 245 calculates one element e(g,h3)

$^\wedge\beta_0$ of the multiplicative group GT, which is the $\beta_0$-th power of the element e(g,h3) of the multiplicative group GT, by using a processing device, such as the CPU 911.

Based on the multiplicative group GT indicated by the input public encryption parameter, the calculated element e(g,h2) of the multiplicative group GT, and the calculated one element e(g,h3)$^\wedge\beta_0$ of the multiplicative group GT, the ciphertext verification text generating unit 245 calculates one element e(g,h2)·e(g,h3)$^\wedge\beta_0$ of the multiplicative group GT, which is a product of the element e(g,h2) of the multiplicative group GT and the element e(g,h3)$^\wedge\beta_0$ of the multiplicative group GT, by using a processing device, such as the CPU 911.

Based on the multiplicative group GT indicated by the input public encryption parameter, the n integers $s_i$ indicated by the input information, and the calculated one element e(g,h2)·e(g,h3)$^\wedge\beta_0$ of the multiplicative group GT, the ciphertext verification text generating unit 245 calculates n elements $y_i$=(e(g,h2)·e(g,h3)$^\wedge\beta_0$)$^\wedge s_i$ (i being an integer greater than or equal to 1 and less than or equal to n) of the multiplicative group GT, which is the $s_i$-th power of the element e(g,h2)·e(g,h3)$^\wedge(\beta_0$ of the multiplicative group GT, by using a processing device, such as the CPU 911.

The ciphertext verification text generating unit 245 outputs n bit sequences respectively indicating the calculated n elements $y_i$ of the multiplicative group GT, as n ciphertext verification texts $CC_i$ (i being an integer greater than or equal to 1 and less than or equal to n), by using a processing device, such as the CPU 911.

The ciphertext combining unit 246 inputs the one combined ciphertext output by the hash value calculation unit 244, and the n ciphertext verification texts $CC_i$ output by the ciphertext verification text generating unit 245, by using a processing device, such as the CPU 911.

The ciphertext combining unit 246 generates one key ciphertext C by combining all the input one combined ciphertext and the input n ciphertext verification texts, by using a processing device, such as the CPU 911.

The ciphertext combining unit 246 outputs the generated one key ciphertext C, by using a processing device, such as the CPU 911.

FIG. 16 shows an example of the flow of information exchanged in the ciphertext generating apparatus 200 according to the present Embodiment.

The recipient identification input unit 232 inputs n recipient identification information $ID_1$, $ID_2$, . . . , $ID_n$.

The random number generating unit 222 generates n integers $s_i, s_2, \ldots, s_n$ whose number is the same as that of recipient identification information $ID_1$, $ID_2$, . . . , $ID_n$ input by the recipient identification input unit 232.

The first ciphertext generating unit 241 generates a first ciphertext $C1_1$ based on the plaintext M and the integer $s_1$, a first ciphertext $C1_2$ based on the plaintext M and the integer $s_2, \ldots$, and a first ciphertext $C1_n$ based on the plaintext M and the integer $s_n$.

The second ciphertext generating unit 242 generates a second ciphertext $C2_i$ based on the recipient identification information $ID_1$ and the integer $s_1$, a second ciphertext $C2_2$ based on the recipient identification information $ID_2$ and the integer $s_2, \ldots$, and a second ciphertext $C2_n$ based on the recipient identification information $ID_n$ and the integer $s_n$.

The third ciphertext generating unit 243 generates a third ciphertext $C3_1$ based on the integer $s_i$, a third ciphertext $C3_2$ based on the integer $s_2, \ldots$, and a third ciphertext $C3_n$ based on the integer $s_n$.

The flow up to this point is the same as that of the comparative example.

The hash value calculation unit 244 generates one combined ciphertext $(C1_1|C2_1|C3_1|C1_2|C2_2|C3_2| \ldots |C1_n|C2_n|C3_n)$ by combining all the first ciphertext $C1_1$, the second ciphertext $C2_1$, the third ciphertext $C3_1$, the first ciphertext $C1_2$, the second ciphertext $C2_2$, the third ciphertext $C3_2, \ldots$, the first ciphertext $C1_n$, the second ciphertext $C2_n$, and the third ciphertext $C3_n$. The order of combining may be different from this.

The hash value calculation unit 244 generates one hash value $H_0$, based on the generated one combined ciphertext $(C1_1|C2_1|C3_1|C1_2|C2_2|C3_2| \ldots |C1_n|C2_n|C3_n)$.

The ciphertext verification text generating unit 245 generates a ciphertext verification text $CC_1$ based on the integer $s_1$ and the hash value $H_0$, a ciphertext verification text $CC_2$ based on the integer $s_2$ and the hash value $H_0, \ldots$, and a ciphertext verification text $CC_n$ based on the integer $s_n$ and the hash value $H_0$.

The ciphertext combining unit 246 generates one key ciphertext $C=(C1_1|C2_1|C3_1|C1_2|C2_2|C3_2| \ldots |C1_n|C2_n|C3_n|CC_1|CC_2| \ldots CC_n)$ by combining all the one combined ciphertext $(C1_1|C2_1|C3_1|C1_2|C2_2|C3_2| \ldots |C1_n|C2_n|C3_n)$, the ciphertext verification text $CC_i$, the ciphertext verification text $CC_2, \ldots$, and the ciphertext verification text $CC_n$.

In this example, since the combined ciphertext generated by the hash value calculation unit 244 is used as it is, the combining order of the ciphertext differs from that of the comparative example, and, however, it is not limited to this order. The combining order of the ciphertext may be the same as the one explained in the comparative example, or may be other order.

Next, the ciphertext receiving apparatuses 301 to 303 will be explained. Since the block configuration of the ciphertext receiving apparatuses 301 to 303 is also the same as that described in the comparative example, respects different from the comparative example will be explained with reference to FIG. 6.

The ciphertext decomposition unit 346 inputs one key ciphertext C output by the ciphertext receiving unit 351, by using a processing device, such as the CPU 911.

The ciphertext decomposition unit 346 acquires a corresponding first ciphertext $C1_{ID}$, a corresponding second ciphertext $C2_{ID}$, a corresponding third ciphertext $C3_{ID}$, and a corresponding ciphertext verification text $CC_{ID}$ which are corresponding to the recipient concerned, from the input one key ciphertext C, by using a processing device, such as the CPU 911.

The ciphertext decomposition unit 346 outputs the acquired corresponding first ciphertext $C1_{ID}$, corresponding second ciphertext $C2_{ID}$, corresponding third ciphertext $C3_{ID}$, and corresponding ciphertext verification text $CC_{ID}$, by using a processing device, such as the CPU 911.

For example, it is assumed that one key ciphertext C is made by combining ciphertexts in the order of $(C1_1|C2_1|C3_1|C1_2|C2_2|C3_2| \ldots |C1_n|C2_n|C3_n|CC_1|CC_2| \ldots |CC_n)$ as shown in FIG. 16.

The ciphertext decomposition unit 346 separates one key ciphertext C into, for example, n times of the sum of the bit lengths of from the first ciphertext to the third ciphertext, and n times of the bit length of the ciphertext verification text, and acquires a combined verification ciphertext $(C1_1|C2_1|C3_1|C1_2|C2_2|C3_2| \ldots |C1_n|C2_n|C3_n)$ and a combined ciphertext verification text $(CC_1|CC_2| \ldots |CC_n)$.

The ciphertext decomposition unit 346 further separates the combined verification ciphertext $(C1_1|C2_1|C3_1|C1_2|C2_2|C3_2| \ldots |C1_n|C2_n|C3_n)$ into $(C1_1|C2_1|C3_1), (C1_2|C2_2|C3_2), \ldots,$ and $(C1_n|C2_n|C3_n)$, and acquires the corresponding ciphertext $(C1_{ID}|C2_{ID}|C3_{ID})$ concerned from them.

The ciphertext decomposition unit 346 separates the acquired corresponding ciphertext $(C1_{ID}|C2_{ID}|C3_{ID})$, and acquires the corresponding first ciphertext $C1_{ID}$, the corresponding second ciphertext $C2_{ID}$, and the corresponding third ciphertext $C3_{ID}$.

Moreover, the ciphertext decomposition unit 346 separates the acquired combined ciphertext verification text $(CC_1|CC_2|\ldots|CC_n)$ into $CC_1, CC_2, \ldots, CC_n$, and acquires the corresponding ciphertext verification text $CC_{ID}$ concerned.

The ciphertext decomposition unit 346 outputs the acquired corresponding first ciphertext $C1_{ID}$, corresponding second ciphertext $C2_{ID}$, corresponding third ciphertext $C3_{ID}$, and corresponding ciphertext verification text $CC_{ID}$. Moreover, in this example, in order to save the time and effort of the verification hash value calculation unit 344' s generating a combined verification ciphertext $(C1_1|C2_1|C3_1|C1_2|C2_2|C3_2|\ldots|C1_n|C2_n|C3_n)$, the ciphertext decomposition unit 346 also outputs the acquired combined verification ciphertext $(C1_1|C2_1|C3_1|C1_2|C2_2|C3_2|\ldots|C1_n|C2_n|C3_n)$ in addition to them, by using a processing device, such as the CPU 911.

The verification hash value calculation unit 344 inputs the combined verification ciphertext $(C1_1|C2_1|C3_1|C1_2|C2_2|C3_2|\ldots|C1_n|C2_n|C3_n)$ output by the ciphertext decomposition unit 346, by using a processing device, such as the CPU 911.

Alternatively, the verification hash value calculation unit 344 may combine the ciphertexts and generate a combined verification ciphertext $(C1_1|C2_1|C3_1|C1_2|C2_2|C3_2|\ldots|C1_n|C2_n|C3_n)$, by using a processing device, such as the CPU 911.

The verification hash value calculation unit 344 inputs public encryption parameters stored by the public parameter storage unit 310, by using a processing device, such as the CPU 911.

Based on the hash function HF indicated by the input public encryption parameter, and the generated or input combined verification ciphertext $(C1_1|C2_1|C3_1|C1_2|C2_2|C3_2|\ldots|C1_n|C2_n|C3_n)$, the verification hash value calculation unit 344 calculates a natural number $\beta'$ by converting the combined verification ciphertext $(C1_1|C2_1|C3_1|C1_2|C2_2|C3_2|\ldots|C1_n|C2_n|C3_n)$ by the hash function HF, to be treated as a hash value H', by using a processing device, such as the CPU 911.

The verification hash value calculation unit 344 outputs information indicating the calculated natural number $\beta'$, by using a processing device, such as the CPU 911.

Next, operations will be described.

FIG. 17 is a flowchart showing an example of the flow of ciphertext generation processing in which the ciphertext generating apparatus 200 according to the present Embodiment generates a ciphertext. The same reference numbers are attached to the steps common to the steps of ciphertext generation processing explained in the comparative example.

In the hash value calculation step S38, based on the n first ciphertexts $C1_i$ respectively corresponding to the n recipients generated by the first ciphertext generating unit 241 at the first ciphertext generation step S35, the n second ciphertexts $C2_i$ respectively corresponding to the n recipients generated by the second ciphertext generating unit 242 at the second ciphertext generation step S36, and the n third ciphertexts $C3_i$ respectively corresponding to the n recipients generated by the third ciphertext generating unit 243 at the third ciphertext generation step S37, the hash value calculation unit 244 generates one combined ciphertext $(C1_1|C2_1|C3_1|C1_2|C2_2|C3_2|\ldots|C1_n|C2_n|C3_n)$ by combining all the n first ciphertexts $C1_i$ respectively corresponding to the n recipients, the n first ciphertexts $C2_i$ respectively corresponding to the n recipients, and the n third ciphertexts $C3_i$ respectively corresponding to the n recipients, by using a processing device, such as the CPU 911.

Based on the hash function HF indicated by the public encryption parameter stored by the encryption parameter storage unit 210, and the generated one combined ciphertext $(C1_1|C2_1|C3_1|C1_2|C2_2|C3_2|\ldots|C1_n|C2_n|C3_n)$, the hash value calculation unit 244 calculates one integer $\beta_0$=HF $(C1_1|C2_1|C3_1|C1_2|C2_2|C3_2|\ldots|C1_n|C2_n|C3_n)$ by converting the one combined ciphertext $(C1_1|C2_1|C3_1|C1_2|C2_2|C3_2|\ldots|C1_n|C2_n|C3_n)$ by the hash function HF, by using a processing device, such as the CPU 911.

In the ciphertext verification text generation step S39, based on the multiplicative group GT, the pairing e, the element g of the multiplicative group G1, and two elements h2 and h3 of the multiplicative group G2 indicated by the public encryption parameters stored by the encryption parameter storage unit 210, the n natural numbers $s_i$ respectively corresponding to the n recipients generated by the random number generating unit 222 at the random number generation step S34, and the one integer $\beta_0$ calculated by the hash value calculation unit 244 at the hash value calculation step S38, the ciphertext verification text generating unit 245 calculates n elements $y_i = e(g, h2)^{\wedge}s_i \cdot e(g, h3)^{\wedge}(s_i \cdot \beta_0)$ of the multiplicative group GT respectively corresponding to the n recipients, by using a processing device, such as the CPU 911.

The ciphertext verification text generating unit 245 treats bit sequences respectively indicating the calculated n elements $y_i$ of the multiplicative group GT respectively corresponding to the n recipients, as n ciphertext verification texts $CC_i$ respectively corresponding to the n recipients, by using a processing device, such as the CPU 911.

FIG. 18 is a flowchart showing an example of the flow of ciphertext reception processing in which the ciphertext receiving apparatuses 301 to 303 according to the present Embodiment receive a ciphertext. The same reference numbers are attached to the steps common to the steps of ciphertext reception processing explained in the comparative example.

In the verification hash value calculation step S53, based on the hash function HF indicated by the public encryption parameter stored by the public parameter storage unit 310, and the combined verification ciphertext $(C1_1|C2_1|C3_1|C1_2|C2_2|C3_2|\ldots|C1_n|C2_n|C3_n)$, the verification hash value calculation unit 344 calculates an integer $\beta'$=HF $(C1_1|C2_1|C3_1|C1_2|C2_2|C3_2|\ldots|C1_n|C2_n|C3_n)$ by converting the combined verification ciphertext $(C1_1|C2_1|C3_1|C1_2|C2_2|C3_2|\ldots|C1_n|C2_n|C3_n)$ by the hash function HF, by using a processing device, such as the CPU 911.

Since the steps other than the one described above are the same as those explained in the comparative example, their explanation is herein omitted.

As mentioned above, in the ID-based cryptographic communication system 800 of the present Embodiment, compared with the ID-based cryptographic communication system 800 explained in the comparative example, although the length of one key ciphertext C is the same, the amount of calculation required for ciphertext generation processing decreases, thereby reducing the cost of the cryptographic communication. Particularly, at the hash value calculation step S38, only one time of hash value calculation is required in the present method, whereas n times of hash value calculation is required in the method explained in the comparative example.

Moreover, at the ciphertext verification text generation step S39, although 2n times of exponential operation in the multiplicative group GT and n times of multiplication in the multiplicative group GT are required in the method explained in the comparative example, only (n+1) times of exponential operation in the multiplicative group GT and one time of multiplication in the multiplicative group GT are required in the present method. Therefore, it is possible to considerably reduce the amount of calculation in the case of a large number of recipients.

Next, the SMMR security of the ID-based cryptosystem used by the ID-based cryptographic communication system 800 according to the present Embodiment will be explained. In the description below, the ciphertext body $CB_i$ shall include recipient identification information $ID_i$ for identifying the corresponding recipient.

The SMMR security of the ID-based cryptosystem according to the present Embodiment can be proved by discussing in parallel to the proof of the MU security of the ID-based cryptosystem of single recipient that is the basis of the ID cryptographic system explained in the comparative example. Explanation for respects common in the proof is omitted, and different respects will be described.

The decryption oracle $O_D$, inputs a user's identification information ID and a (separated) ciphertext $C_{ID}$ corresponding to the ID.

This (separated) ciphertext $C_{ID}$ is composed of n ciphertext bodies $CB_i$, information indicating which of the n ciphertext bodies $CB_i$ is a corresponding ciphertext body $CB_{ID}$ corresponding to the $ID_i$ and a corresponding ciphertext verification text $CC_{ID}$.

The decryption oracle $O_{D'}$ combines the input n ciphertext bodies $CB_i$ to generate a combined verification ciphertext, and calculates a hash value $\beta'$.

The decryption oracle $O_D$ verifies the ciphertext, based on the corresponding ciphertext body $CB_{ID}$ indicated by the input information, the input corresponding ciphertext verification text $CC_{ID}$, the calculated hash value $\beta'$, and the secret key $d_u$, generated by key derivation capability X'.

When failed in the verification, the decryption oracle $O_{D'}$ returns "rejection".

When succeeded in the verification, the decryption oracle $O_{D'}$ performs decryption processing, and returns the decrypted message.

A game $G_6$ is made by changing the game $G_5$ as follows:

In simulation of the encryption oracle $O_E$, the solver B holds the input $ID^*=(ID^*_1, ID^*_2, \ldots, ID^*_n)$, the generated n ciphertext bodies $CB^*=(CB^*_1, CB^*_2, \ldots, CB^*_n)$, and the calculated hash value $\beta^*_0$.

In simulation of the decryption oracle $O_{D'}$, the solver B judges whether the holding $\beta^*_0$ is equal to the hash value $\beta'$ calculated based on the input n ciphertext bodies $CB_i$ or not. When they are equal, the solver B judges whether there is an $ID^*_i$ equal to the input ID among the holding $ID^*$. When there is an $ID^*_i$ equal to the input ID, the solver B compares the ciphertext body $CB^*_i$ corresponding to the $ID^*_i$ with the corresponding ciphertext body $CB_{ID}$ indicated by the input information, among the holding n ciphertext bodies $CB^*$. When they are not equal, "rejection" is returned.

Since the composition of the main part of the proof is not different except for the difference above stated, the SMMR security of the ID-based cryptosystem according to the present Embodiment is $Adv^{smmr}_{n,\Pi,\Gamma}(t,q_d,q_x) \leq Adv^{q-d-tabdhe}_{k,G,GT}(t_1)+Adv^{cr}_H(t_2)+(q_d+3)/r$.

Since it is possible to prove the SMMR-IND-ID-CCA2 security by the proof tightly reducing to a mathematical problem, by the ID-based cryptographic communication system 800 according to the present Embodiment, there is an effect that secure cryptographic communication can be realized by using the ID-based cryptographic communication system 800.

The ciphertext generating apparatus 200 according to the present Embodiment has the following features:

The encryption parameter storage unit 210 stores information, as public encryption parameters, indicating a natural number r, a multiplicative group G1 whose order is the natural number r, a multiplicative group G2 whose order is the natural number r, a multiplicative group GT whose order is the natural number r, a pairing e for calculating an element of the multiplicative group GT from an element of the multiplicative group G1 and an element of the multiplicative group G2, a key generation function KDF for calculating a bit sequence of predetermined length from the element of the multiplicative group GT, a hash function HF for calculating a natural number being less than the natural number r from a bit sequence of arbitrary length, an element g of the multiplicative group G1, an element g1 of the multiplicative group G1, an element g2 of the multiplicative group G2, an element h1 of the multiplicative group G2, an element h2 of the multiplicative group G2, and an element h3 of the multiplicative group G2, by using a storage device, such as the magnetic disk drive 920.

The recipient identification input unit 232 inputs n integers $ID_i$ as n recipient identification information, by using a processing device, such as the CPU 911.

The random number generating unit 222 randomly generates the n integers $s_i$, being greater than or equal to 1 and less than the natural number r, (i being an integer greater than or equal to 1 and less than or equal to n) corresponding to the n recipients, based on the natural number r indicated by the public encryption parameter stored by the encryption parameter storage unit 210, by using a processing device, such as the CPU 911.

The first ciphertext generating unit 241 calculates n key bit sequences $k_i=KDF(e(g,h1)^{s_i})$ (i being an integer greater than or equal to 1 and less than or equal to n) corresponding to the n recipients, based on the element g of the multiplicative group G1, the element h1 of the multiplicative group G2, the pairing e, and the key generation function KDF indicated by the public encryption parameters stored by the encryption parameter storage unit 210, and the n integers $s_i$ generated by the random number generating unit 222, by using a processing device, such as the CPU 911, and generates n first ciphertexts $C1_i$ (i being an integer greater than or equal to 1 and less than or equal to n) corresponding to the n recipients by respectively encrypting the plaintext M input by the plaintext input unit 231, with the n key bit sequences $k_i$ calculated, by using a processing device, such as the CPU 911.

The second ciphertext generating unit 242 calculates n elements $u_i=(g1 \cdot g^{-ID_i})^{s_i}$ (i being an integer greater than or equal to 1 and less than or equal to n) of the multiplicative group G1 corresponding to the n recipients, based on the element g of the multiplicative group G1 and the element g1 of the multiplicative group G1 indicated by the public encryption parameters stored by the encryption parameter storage unit 210, the n integers $ID_i$ input by the recipient identification input unit 232, and the n integers $s_i$ generated by the random number generating unit 222, and treats each bit sequence, indicating each of the calculated n elements $u_i$ of the multiplicative group G1, as the n second ciphertexts (i being an integer greater than or equal to 1 and less than or equal to n) corresponding to the n recipients, by using a processing device, such as the CPU 911.

The third ciphertext generating unit 243 calculates n elements $v_i = e(g, g2)^{s_i}$ (i being an integer greater than or equal to 1 and less than or equal to n) of the multiplicative group GT corresponding to the n recipients, based on the element g of the multiplicative group G1, the element g2 of the multiplicative group G2, and the pairing e indicated by the public encryption parameters stored by the encryption parameter storage unit 210 and the n integers $s_i$ generated by the random number generating unit 222, and treats each bit sequence, indicating each of the calculated elements $v_i$ of the multiplicative group GT, as the n third ciphertexts $C3_i$ (i being an integer greater than or equal to 1 and less than or equal to n) corresponding to the n recipients, by using a processing device, such as the CPU 911.

The hash value calculation unit 244 calculates one natural number $\beta_0$ to be treated as the hash value $H_0$, based on the hash function HF indicated by the public encryption parameter stored by the encryption parameter storage unit 210, by using a processing device, such as the CPU 911.

The ciphertext verification text generating unit 245 calculates n elements $y_i = e(g, h2)^{s_i} \cdot e(g, h3)^{(s_i \cdot \beta_0)}$ (i being an integer greater than or equal to 1 and less than or equal to n) of the multiplicative group GT corresponding to the n recipients, based on the element g of the multiplicative group G1, the element h2 of the multiplicative group G2, the element h3 of the multiplicative group G2, and the pairing e indicated by the public encryption parameters stored by the encryption parameter storage unit 210, the n integers $s_i$ generated by the random number generating unit 222, and the one natural number $\beta_0$ calculated by the hash value calculation unit 244, and treats each bit sequence, indicating each of the calculated n elements $y_i$ of the multiplicative group GT, as the n ciphertext verification text $CC_i$ (i being an integer greater than or equal to 1 and less than or equal to n) corresponding to the n recipients, by using a processing device, such as the CPU 911.

The ciphertext generating apparatus 200 according to the present Embodiment has the following effects:

It is possible to perform encryption processing with a small amount of resources, and to realize the cryptographic communication utilizing the ID-based cryptosystem where the SMMR-IND-ID-CCA2 security can be mathematically proved.

The ID-based cryptographic communication system 800 (cryptographic communication system) according to the present Embodiment has the following features:

The encryption parameter generating apparatus 100 further includes a group parameter storage unit 111.

The group parameter storage unit 111 stores information, as group parameters, indicating a natural number r, a multiplicative group G1 whose order is the natural number r, a multiplicative group G2 whose order is the natural number r, a multiplicative group GT whose order is the natural number r, and a pairing e for calculating an element of the multiplicative group GT from an element of the multiplicative group G1 and an element of the multiplicative group G2, by using a storage device, such as the magnetic disk drive 920.

The secret information generating unit 112 randomly generates an integer $\alpha$ being greater than or equal to 1 and less than the natural number r, based on the natural number r indicated by the group parameter stored by the group parameter storage unit, by using a processing device, such as the CPU 911.

The secret information storage unit 121 stores information indicating the integer $\alpha$ generated by the secret information generating unit 112, as secret information, by using a storage device, such as the magnetic disk drive 920.

The public parameter generating unit 113 determines a key generation function KDF for calculating a bit sequence of predetermined length from an element of the multiplicative group GT, and a hash function HF for calculating a natural number being less than the natural number r from a bit sequence of arbitrary length, by using a processing device, such as the CPU 911, randomly selects an element g of the multiplicative group G1, an element g2 of the multiplicative group G2, an element h1 of the multiplicative group G2, an element h2 of the multiplicative group G2, and an element h3 of the multiplicative group G2, based on the multiplicative group G1 and the multiplicative group G2 indicated by the group parameter stored by the group parameter storage unit 111, by using a processing device, such as the CPU 911, calculates an element $g1 = g^\alpha$ of the multiplicative group G1, based on the integer $\alpha$ indicated by the secret information generated by the secret information generating unit 112 and the selected element g of the multiplicative group G1, by using a processing device, such as the CPU 911, and treats information indicating the group parameter stored by the group parameter storage unit 111, the determined key generation function KDF and hash function HF, the selected element g of the multiplicative group G1, element g2 of the multiplicative group G2, element h1 of the multiplicative group G2, element h2 of the multiplicative group G2, and element h3 of the multiplicative group G2, and the calculated element g1 of the multiplicative group G1, as public encryption parameters.

The identification information input unit 131 inputs an integer $ID_i$ as recipient identification information, by using a processing device, such as the CPU 911.

The secret key generating unit 132 randomly generates an integer $r_{ID,1}$ being greater than or equal to 1 and less than the natural number r, an integer $r_{ID,2}$ being greater than or equal to 1 and less than the natural number r, and an integer $r_{ID,3}$ being greater than or equal to 1 and less than the natural number r, based on the natural number r indicated by the public encryption parameter generated by the public parameter generating unit 113, by using a processing device, such as the CPU 911, calculates an element $h_{ID,1} = (h1 \cdot g2^{(-r_{ID,1})})^{(1/(\alpha - ID))}$ of the multiplicative group G2, an element $h_{ID,2} = (h2 \cdot g2^{(-r_{ID,2})})^{(1/(\alpha - ID))}$ of the multiplicative group G2, and an element $h_{ID,3} = (h3 \cdot g2^{(-r_{ID,3})})^{(1/(\alpha - ID))}$ of the multiplicative group G2, based on the element g2 of the multiplicative group G2, the element h1 of the multiplicative group G2, the element h2 of the multiplicative group G2, and the element h3 of the multiplicative group G2 indicated by the public encryption parameters generated by the public parameter generating unit 113, the integer $\alpha$ stored by the secret information storage unit 121, the integer ID input by the identification information input unit 131, and the generated integer $r_{ID,1}$, integer $r_{ID,2}$ and integer $r_{ID,3}$, by using a processing device, such as the CPU 911, and treats information indicating the generated integer $r_{ID,1}$, integer $r_{ID,2}$ and integer $r_{ID,3}$ and the calculated element $h_{ID,1}$ of the multiplicative group G2, element $h_{ID,2}$ of the multiplicative group G2, and element $h_{ID,3}$ of the multiplicative group G2, as the secret key $d_{ID}$.

The recipient identification input unit 232 inputs n integers $ID_i$, as n recipient identification information, by using a processing device, such as the CPU 911.

The random number generating unit 222 randomly generates n integers $s_i$, being greater than or equal to 1 and less than the natural number r, (i being an integer greater than or equal to 1 and less than or equal to n) corresponding to the n recipients, based on the natural number r indicated by the public encryption parameter stored by the encryption parameter storage unit 210, by using a processing device, such as the CPU 911.

The first ciphertext generating unit 241 calculates n key bit sequences $k_i = KDF(e(g,h1)\hat{\ }s_i)$ (i being an integer greater than or equal to 1 and less than or equal to n) corresponding to the n recipients, based on the element g of the multiplicative group G1, the element h1 of the multiplicative group G2, the pairing e, and the key generation function KDF indicated by the public encryption parameters stored by the encryption parameter storage unit 210, and the n integers $s_i$ generated by the random number generating unit 222, by using a processing device, such as the CPU 911, and generates n first ciphertexts $C1_i$ (i being an integer greater than or equal to 1 and less than or equal to n) corresponding to the n recipients by respectively encrypting the plaintext M input by the plaintext input unit 231, with the n key bit sequences $k_i$ calculated, by using a processing device, such as the CPU 911.

The second ciphertext generating unit 242 calculates n elements $u_i = (g1 \cdot g\hat{\ } - ID_i)\hat{\ }s_i$ (i being an integer greater than or equal to 1 and less than or equal to n) of the multiplicative group G1 corresponding to the n recipients, based on the element g of the multiplicative group G1 and the element g1 of the multiplicative group G1 indicated by the public encryption parameters stored by the encryption parameter storage unit 210, the n integers $ID_i$ input by the recipient identification input unit 232, and the n integers $s_i$ generated by the random number generating unit 222, and treats each bit sequence, indicating each of the calculated n elements $u_i$ of the multiplicative group G1, as the n second ciphertexts $C2_i$ (i being an integer greater than or equal to 1 and less than or equal to n) corresponding to the n recipients, by using a processing device, such as the CPU 911.

The third ciphertext generating unit 243 calculates n elements $v_i = e(g,g2)\hat{\ }s_i$ (i being an integer greater than or equal to 1 and less than or equal to n) of the multiplicative group GT corresponding to the n recipients, based on the element g of the multiplicative group G1, the element g2 of the multiplicative group G2, and the pairing e indicated by the public encryption parameters stored by the encryption parameter storage unit 210 and the n integers $s_i$ generated by the random number generating unit 222, and treats each bit sequence, indicating each of the calculated n elements $v_i$ of the multiplicative group GT, as the n third ciphertexts $C3_i$ (i being an integer greater than or equal to 1 and less than or equal to n) corresponding to the n recipients, by using a processing device, such as the CPU 911.

The hash value calculation unit 244 calculates one natural number $\beta_0$ to be treated as the hash value $H_0$, based on the hash function HF indicated by the public encryption parameter stored by the encryption parameter storage unit 210, by using a processing device, such as the CPU 911.

The ciphertext verification text generating unit 245 calculates n elements $y_i = e(g,h2)\hat{\ }s_i \cdot e(g,h3)\hat{\ }(s_i \cdot \beta_0)$ (i being an integer greater than or equal to 1 and less than or equal to n) of the multiplicative group GT corresponding to the n recipients, based on the element g of the multiplicative group G1, the element h2 of the multiplicative group G2, the element h3 of the multiplicative group G2, and the pairing e indicated by the public encryption parameters stored by the encryption parameter storage unit 210, the n integers $s_i$ generated by the random number generating unit 222, and the one natural number $\beta_0$ calculated by the hash value calculation unit 244, and treats each bit sequence, indicating each of the calculated n elements $y_i$ of the multiplicative group GT, as the n ciphertext verification texts $CC_i$ (i being an integer greater than or equal to 1 and less than or equal to n) corresponding to the n recipients, by using a processing device, such as the CPU 911.

The verification hash value calculation unit 344 calculates a natural number $\beta'$ to be treated as the verification hash value H', based on the hash function HF indicated by the public encryption parameter stored by the public parameter storage unit 310, by using a processing device, such as the CPU 911.

The ciphertext verification unit 345, calculates an element $y' = e(u_{ID}, h_{ID,2} \cdot h_{ID,3}\hat{\ }\beta') \cdot v_{ID}\hat{\ }(r_{ID,2} + r_{ID,3} \cdot \beta')$ of the multiplicative group GT, based on the pairing e indicated by the public encryption parameter stored by the public parameter storage unit 310, the integer $r_{ID,2}$, the integer $r_{ID,3}$, the element $h_{ID,2}$ of the multiplicative group G2, and the element $h_{ID,3}$ of the multiplicative group G2 indicated by the secret key $d_{ID}$ stored by the secret key storage unit 323, an element $u_{ID}$ of the multiplicative group G1 indicated by the one corresponding second ciphertext $C2_{ID}$ and an element $v_{ID}$ of the multiplicative group GT indicated by the one corresponding third ciphertext $C3_{ID}$ acquired by the ciphertext decomposition unit 346, and the natural number $\beta'$ calculated by the verification hash value calculation unit 344, by using a processing device, such as the CPU 911, compares the calculated element y' of the multiplicative group GT with an element $y_{ID}$ of the multiplicative group GT indicated by the corresponding ciphertext verification text $CC_{ID}$ acquired by the ciphertext decomposition unit 346, by using a processing device, such as the CPU 911, and when the element y' of the multiplicative group GT accords with the element $y_{ID}$ of the multiplicative group GT, judges that the one ciphertext C (key ciphertext C) received by the ciphertext receiving unit 351 has consistency.

When the ciphertext verification unit 345 judges that the one ciphertext C received by the ciphertext receiving unit 351 has consistency, the ciphertext decryption unit 341 calculates a key bit sequence $k' = KDF(e(u_{ID}, h_{ID,1}) \cdot v_{ID}\hat{\ }r_{ID,1})$, based on the pairing e and the key generation function KDF indicated by the public encryption parameters stored by the public parameter storage unit 310, the integer $r_{ID,1}$ and the element $h_{ID,1}$ of the multiplicative group G2 indicated by the secret key $d_{ID}$ stored by the secret key storage unit 323, the element $u_{ID}$, of the multiplicative group G1 indicated by the one corresponding second ciphertext $C2_{ID}$, and the element $v_{ID}$ of the multiplicative group G2 indicated by the corresponding third ciphertext $C3_{ID}$ acquired by the ciphertext decomposition unit, by using a processing device, such as the CPU 911, and restores the plaintext M by decrypting the corresponding first ciphertext $C1_{ID}$ acquired by the ciphertext decomposition unit 346, with the key bit sequence k' calculated, by using a processing device, such as the CPU 911.

The ID-based cryptographic communication system 800 according to the present Embodiment has the following effect:

It is possible to perform encryption processing with a small amount of resources, and to realize the cryptographic communication utilizing the ID-based cryptosystem where the SMMR-IND-ID-CCA2 security can be mathematically proved.

Embodiment 3

Referring to FIGS. 18 to 24, Embodiment 3 will now be explained.

Before explaining the ID-based cryptographic communication system 800 according to the present Embodiment, an ID-based cryptographic communication system, which is a comparative example, will be described first.

Since the whole configuration of the ID-based cryptographic communication system which is a comparative example according to the present Embodiment is the same as that described in the Embodiment 1, its description is omitted herein.

First, the encryption parameter generating apparatus 100 will be described. Since the block configuration of the encryption parameter generating apparatus 100 is the same as that described in Embodiment 1, points different from Embodiment 1 will be explained with reference to FIG. 4.

The group parameter storage unit 111 stores information indicating a natural number r, a multiplicative group G1, a multiplicative group G2, a multiplicative group GT and a pairing e, as group parameters, by using a storage device, such as the magnetic disk drive 920.

The natural number r is a large prime number based on which it is difficult to solve the DH problem.

The multiplicative group G1, the multiplicative group G2, and multiplicative group GT are multiplicative groups whose order is the natural number r.

The multiplicative group G1 and the multiplicative group G2 may be the same multiplicative groups or different multiplicative groups. When the multiplicative group G1 and the multiplicative group G2 are the same multiplicative groups, the group parameter storage unit 111 does not need to store the information indicating the multiplicative group G2.

Pairing e is a mapping which calculates an element of the multiplicative group GT, from the element of the multiplicative group G1 and the element of the multiplicative group G2. Pairing e shall be bilinear pairing and shall be calculated within a practical time by using a processing device, such as the CPU 911 of a computer.

The secret information generating unit 112 inputs a group parameter stored by the group parameter storage unit 111, by using a processing device, such as the CPU 911.

The secret information generating unit 112 randomly generates an integer α being greater than or equal to 1 and less than the natural number r, based on the natural number r indicated by the input group parameter, by using a processing device, such as the CPU 911.

The secret information generating unit 112 outputs information indicating the generated integer α, by using a processing device, such as the CPU 911.

The public parameter generating unit 113 inputs the group parameter stored by the group parameter storage unit 111, and the integer α output by the secret information generating unit 112, by using a processing device, such as the CPU 911.

The public parameter generating unit 113 determines a key generation function KDF, based on the multiplicative group GT indicated by the input group parameter, by using a processing device, such as the CPU 911.

The key generation function KDF is a function for calculating a bit sequence of predetermined length from an element of the multiplicative group GT.

The public parameter generating unit 113 determines a hash function HF by using a processing device, such as the CPU 911.

The hash function HF is a function for calculating a bit sequence of predetermined length from a bit sequence of arbitrary length.

The hash function HF shall have a very low probability of calculating the same bit sequence from different bit sequences.

Hereafter, the length of the bit sequence output by the hash function HF shall be m bits.

The public parameter generating unit 113 determines two functions V1 and V2, based on the multiplicative group G2 indicated by the input group parameter, by using a processing device, such as the CPU 911.

The functions V1 and V2 are for calculating an element of the multiplicative group G2 from the bit sequence of predetermined length.

The length of the bit sequence input by the functions V1 and V2 is equal to the length of the bit sequence output by the hash function HF, that is m bits.

It is assumed in this comparative example that the bit sequence of m bits input by the functions V1 and V2 can be decomposed into m1 bit sequences of m2 bits. That is, it shall be m=m1·m2.

The public parameter generating unit 113 randomly selects (m1+2) elements $h_1, h_2, \ldots, h_{m1}, h_1', h_2'$ of the multiplicative group G2, based on the multiplicative group G2 indicated by the input group parameter, by using a processing device, such as the CPU 911.

The bit sequence of m bits to be input by the functions V1 and V2 shall be ID=$(v_1|v_2|\ldots|v_{m1})$ ($v_\xi$ being a bit sequence of m2 bits and ξ being an integer greater than or equal to 1 and less than or equal to m1).

The function V1 shall be defined as follows: an element V1(ID) of the multiplicative group G2 output by the function V1 is an element $h_1' \cdot \Pi(h_\xi{}^{v_\xi})$ (ξ being an integer greater than or equal to 1 and less than or equal to m1) of the multiplicative group G2, which is a total product of the $v_1$-th power of the element $h_1$ of the multiplicative group G2, the $v_2$-th power of the element $h_2$ of the multiplicative group G2, ..., the $v_{m1}$-th power of the element $h_{m1}$ of the multiplicative group G2, and the element $h_1'$ of the multiplicative group G2, based on interpretation of the $v_\xi$ as an integer greater than or equal to 0 and less than $2^{m2}$, and on the (m1+1) elements $h_1, h_2, \ldots, h_{m1}, h_1'$ of the multiplicative group G2 selected by the public parameter generating unit 113.

Similarly, the function V2 shall be defined as follows: an element V2(ID) of the multiplicative group G2 output by the function V2 is an element $h_2' \cdot \Pi(h_\xi{}^{v_\xi})$ (ξ being an integer greater than or equal to 1 and less than or equal to m1) of the multiplicative group G2, which is a total product of the $v_1$-th power of the element $h_1$ of the multiplicative group G2, the $v_2$-th power of the element $h_2$ of the multiplicative group G2, ..., the $v_{m1}$-th power of the element $h_{m1}$ of the multiplicative group G2, and the element $h_2'$ of the multiplicative group G2, based on the (m1+1) elements $h_1, h_2, \ldots, h_{m1}, h_2'$ of the multiplicative group G2 selected by the public parameter generating unit 113.

The public parameter generating unit 113 determines the functions V1 and V2 by selecting (m1+2) elements $h_1, h_2, \ldots, h_{m1}, h_1'$, and $h_2'$ of the multiplicative group G2 which are necessary for calculating the functions V1 and V2.

In addition, the functions V1 and V2 may be ones other than those defined in the description above. Moreover, the function V1 and the function V2 may be the same functions.

The public parameter generating unit 113 randomly selects an element g of the multiplicative group G1, based on the multiplicative group G1 indicated by the input group parameter, by using a processing device, such as the CPU 911.

The public parameter generating unit 113 randomly selects an element g2 of the multiplicative group G2, based on the multiplicative group G2 indicated by the input group parameter, by using a processing device, such as the CPU 911.

However, the element g of the multiplicative group G1 and the element g2 of the multiplicative group G2 are selected so that the element e(g,g2) of the multiplicative group GT, which is a pairing value of the element g of the multiplicative group G1 and the element g2 of the multiplicative group G2, may not be an identity of the multiplicative group GT.

When the multiplicative group G1 and the multiplicative group G2 are the same multiplicative groups, different elements should be selected as the element g of the multiplicative group G1 and the element g2 of the multiplicative group G2.

The public parameter generating unit 113 calculates an element $g1=g\char`\^\alpha$ of the multiplicative group G1, which is the $\alpha$-th power of the element g of the multiplicative group G1, based on the multiplicative group G1 indicated by the input group parameter, the selected element g of the multiplicative group G1, and the integer $\alpha$ indicated by the input information, by using a processing device, such as the CPU 911.

The public parameter generating unit 113 outputs information indicating the input group parameter, the determined key generation function KDF, the determined hash function HF, the determined two functions V1 and V2, the selected element g of the multiplicative group G1, the calculated element g1 of the multiplicative group G1, and the selected element g2 of the multiplicative group G2, as public encryption parameters, by using a processing device, such as the CPU 911.

The public encryption parameter includes information indicating the (m1+2) elements $h_1, h_2, \ldots, h_{m1}, h_1', h_2'$ of the multiplicative group G2, as information indicating the functions V1 and V2.

The secret information generating unit 112 inputs the public encryption parameter output by the public parameter generating unit 113, by using a processing device, such as the CPU 911.

Based on the multiplicative group G2 and the element g2 of the multiplicative group G2 indicated by the input public encryption parameters, and the generated integer $\alpha$, the secret information generating unit 112 calculates an element $g2\char`\^\alpha$ of the multiplicative group G2, which is the $\alpha$-th power of the element g2 of the multiplicative group G2, by using a processing device, such as the CPU 911.

The secret information generating unit 112 outputs information indicating the calculated element $g2\char`\^\alpha$ of the multiplicative group G2, by using a processing device, such as the CPU 911.

The secret information storage unit 121 inputs the information indicating the element $g2\char`\^\alpha$ of the multiplicative group G2 output by the secret information generating unit 112, as secret information, by using a processing device, such as the CPU 911.

The secret information storage unit 121 stores the input information indicating the element $msk=g2\char`\^\alpha$ of the multiplicative group G2, by using a storage device, such as the magnetic disk drive 920.

The secret information storage unit 121 may store information indicating the integer $\alpha$ generated by the secret information generating unit 112, instead of the information indicating the element msk of the multiplicative group G2 calculated by the secret information generating unit 112.

The identification information input unit 131 inputs a recipient identification information ID, by using a processing device, such as the CPU 911.

In the description below, the encryption parameter generating apparatus 100 will treat the recipient identification information $ID_i$ as a bit sequence of m bits.

For example, the encryption parameter generating apparatus 100 generates a bit sequence of m bits by appending a padding bit sequence to a bit sequence of arbitrary length, such as an e-mail address, to be treated as recipient identification information.

Alternatively, the encryption parameter generating apparatus 100 may input a bit sequence of arbitrary length, such as an e-mail address, into a hash function (that may be the same hash function as the hash function HF determined by the public parameter generating unit 113, or may be a different hash function) and obtain a bit sequence of m bits, which is calculated by the hash function, to be treated as recipient identification information.

That is, the identification information input unit 131 inputs a bit sequence ID of m bits, as recipient identification information, by using a processing device, such as the CPU 911.

The identification information input unit 131 outputs the input bit sequence ID of m bits, by using a processing device, such as the CPU 911.

The secret key generating unit 132 inputs the information indicating the element msk of the multiplicative group G2 stored by the secret information storage unit 121, the public encryption parameter stored by the parameter storage unit 122, and the bit sequence ID of m bits output by the identification information input unit 131, by using a processing device, such as the CPU 911.

The secret key generating unit 132 randomly generates an integer $r_{ID}$, based on the natural number r indicated by the input public encryption parameter, by using a processing device, such as the CPU 911. The integer $r_{ID}$ is an integer greater than or equal to 1 and less than r.

Based on the function V1 indicated by the input public encryption parameter, and the input bit sequence ID having the length m, the secret key generating unit 132 calculates an element V1 (ID) of the multiplicative group G2 by converting the bit sequence ID of m bits by the function V1, by using a processing device, such as the CPU 911.

Based on the multiplicative group G2 indicated by the input public encryption parameter, the calculated element V1 (ID) of the multiplicative group G2, and the generated integer $r_{ID}$, the secret key generating unit 132 calculates an element V1 (ID)$\char`\^r_{ID}$ of the multiplicative group G2, which is the $r_{ID}$-th power of the element V1 (ID) of the multiplicative group G2, by using a processing device, such as the CPU 911.

Based on the multiplicative group G2 indicated by the input public encryption parameter, the element msk of the multiplicative group G2 indicated by the input information, and the calculated element V1 (ID)$\char`\^r_{ID}$ of multiplicative group G2, the secret key generating unit 132 calculates an element $d0_{ID}=msk \cdot V1$ (ID)$\char`\^r_{ID}$ of the multiplicative group G2, which is a product of the element msk of the multiplicative group G2 and the element V1 (ID)$\char`\^r_{ID}$, of the multiplicative group G2, by using a processing device, such as the CPU 911.

Based on the multiplicative group G1 and the element g of the multiplicative group G1 indicated by the input public encryption parameter, and the generated integer $r_{ID}$, the secret key generating unit 132 calculates an element $d1_{ID}=g\char`\^r_{ID}$ of the multiplicative group G1, which is the $r_{ID}$-th power of the element g of the multiplicative group G1, by using a processing device, such as the CPU 911.

The secret key generating unit 132 outputs information indicating the calculated element $d0_{ID}$ of the multiplicative group G2, and the calculated element $d1_{ID}$ of the multiplicative group G1, as a secret key $d_{ID}$, by using a processing device, such as the CPU 911.

Next, the ciphertext generating apparatus 200 will be described. Since the configuration of the functional block of the ciphertext generating apparatus 200 is also the same as that described in Embodiment 1, different points from Embodiment 1 will be explained with reference to FIG. 5.

The ciphertext generating apparatus 200 treats a recipient identification information ID, as a bit sequence of m bits, similarly to the encryption parameter generating apparatus 100.

The recipient identification input unit 232 inputs n bit sequence $ID_i$ of m bits (i being greater than or equal to 1 and less than or equal to n), as n recipient identification information which respectively identifies n recipients (n being an integer greater than or equal to 1), by using a processing device, such as the CPU 911.

The recipient identification input unit 232 outputs the input n bit sequence $ID_i$ of m bits, by using a processing device, such as the CPU 911.

The random number generating unit 222 inputs the public encryption parameter stored by the encryption parameter storage unit 210, by using a processing device, such as the CPU 911.

Based on the natural number r indicated by the input public encryption parameter, the random number generating unit 222 randomly generates n integers $s_i$ greater than or equal to 1 and less than the natural number r (i being an integer greater than or equal to 1 and less than or equal to n) which respectively correspond to n recipients, by using a processing device, such as the CPU 911.

The random number generating unit 222 outputs information indicating the generated n integers $s_i$, by using a processing device, such as the CPU 911.

The first ciphertext generating unit 241 inputs the public encryption parameter stored by the encryption parameter storage unit 210, the information indicating the n integers $s_i$ output by the random number generating unit 222, and the plaintext M output by the plaintext input unit 231, by using a processing device, such as the CPU 911.

Based on the pairing e, the element g1 of the multiplicative group G1, and the element g2 of the multiplicative group G2 indicated by the input public encryption parameters, the first ciphertext generating unit 241 calculates an element e(g1, g2) of the multiplicative group GT, which is a pairing value of the element g1 of the multiplicative group G1 and the element g2 of the multiplicative group G2, by using a processing device, such as the CPU 911.

Since the element e(g1,g2) of the multiplicative group GT is constant regardless of the integer $s_i$ and the plaintext M, it may be calculated beforehand and stored by using a storage device, such as the magnetic disk drive 920.

Based on the multiplicative group GT indicated by the input public encryption parameter, the calculated element e(g1,g2) of the multiplicative group GT, and the n integers $s_i$ indicated by the input information, the first ciphertext generating unit 241 calculates n elements e(g1,g2)^$s_i$ of the multiplicative group GT (i being an integer greater than or equal to 1 and less than or equal to n), which is the $s_i$-th power of the element e(g1,g2) of the multiplicative group GT, by using a processing device, such as the CPU 911.

Based on the key generation function KDF indicated by the input public encryption parameter, and the calculated n elements e(g1,g2)^$s_i$ of the multiplicative group GT, the first ciphertext generating unit 241 calculates n key bit sequences $k_i$=KDF (e(g1, g2)^$s_i$) (i being an integer greater than or equal to 1 and less than or equal to n), each of which is a bit sequence of predetermined length obtained by converting the element e(g1,g2)^$s_i$ of the multiplicative group GT by the key generation function KDF, by using a processing device, such as the CPU 911.

Based on the input plaintext M and the calculated n key bit sequences $k_i$, the first ciphertext generating unit 241 generates n bit sequences obtained by respectively encrypting the plaintext M with the n key bit sequences $k_i$, to be treated as n first ciphertexts $C1_i$ (i being an integer greater than or equal to 1 and less than or equal to n), by using a processing device, such as the CPU 911.

The first ciphertext generating unit 241 outputs the generated n first ciphertexts $C1_i$, by using a processing device, such as the CPU 911.

The second ciphertext generating unit 242 inputs the public encryption parameter stored by the encryption parameter storage unit 210, the information indicating the n integers $s_i$ output by the random number generating unit 222, and the n bit sequence $ID_i$ of m bits output by the recipient identification input unit 232, by using a processing device, such as the CPU 911.

Based on the function V1 indicated by the input public encryption parameter, and the input n bit sequence $ID_i$ of m bits, the second ciphertext generating unit 242 calculates n elements V1 ($ID_i$) of the multiplicative group G2 (i being an integer greater than or equal to 1 and less than or equal to n) by converting the bit sequence $ID_i$ of m bits by the function V1, by using a processing device, such as the CPU 911.

The calculation of the function V1 is based on the following steps, for example.

The second ciphertext generating unit 242 decomposes each of the input n bit sequence $ID_i$ of m bits into m1 bit sequences $v_{i\xi}$ of m2 bits (i being an integer greater than or equal to 1 and less than or equal to n, $\xi$, being an integer greater than or equal to 1 and less than or equal to m1, and m=m1·m2), by using a processing device, such as the CPU 911.

Consequently, the number of the decomposed bit sequences $v_{i\xi}$ of m2 bits is totally n·m1.

In the explanation below, in order to avoid complication, the step of calculating a value V1($ID_i$) of the function V1 will be described with respect to one bit sequence $ID_i$ of m bits.

The second ciphertext generating unit 242 treats the decomposed bit sequence $v_{i\xi}$ of m2 bits, as an integer greater than or equal to 0 and less than the m2-th power of 2. For example, it treats a bit sequence $v_{i\xi}$ composed of all "0" bits, as an integer 0, and a bit sequence $v_{i\xi}$ composed of all "1" bits, as an integer $2^{m2}-1$.

It is acceptable to treat any bit sequence as any integer, however, in order to save the time of conversion, it is preferable to treat them based on the correspondence relation defined according to the integer expression form used in a processing device, such as the CPU 911.

"Integer $v_{i\xi}$" as used in the following description means the integer in the case of treating a bit sequence $v_{i\xi}$ of m2 bits as an integer.

Based on the multiplicative group G2 and the m1 elements $h_\xi$ ($\xi$ being an integer greater than or equal to 1 and less than or equal to m1) of the multiplicative group G2 indicated by the input public encryption parameters, and m1 integers $v_{i\xi}$, the second ciphertext generating unit 242 calculates m1 elements $h_\xi\hat{}v_{i\xi}$ of the m1 multiplicative group G2, which is the $\xi_i$-th power of the element $h_\xi$ of the multiplicative group G2, by using a processing device, such as the CPU 911.

Based on the multiplicative group G2 and the element h1' of the multiplicative group G2 indicated by the input public encryption parameters, and the calculated m1 elements $h_\xi\hat{}v_{i\xi}$ of the multiplicative group G2, the second ciphertext generating unit 242 calculates one element h1'·Π($h_\xi\hat{}v_{i\xi}$) ($\xi$ being an integer greater than or equal to 1 and less than or equal to m1) of the multiplicative group G2, which is a result of multiplying all the element h1' of the multiplicative group G2 and m1 elements $h_\xi\hat{}v_{i\xi}$ of the multiplicative group G2, by using a processing device, such as the CPU 911.

The second ciphertext generating unit 242 treats the calculated one element h1'·Π($h_\xi\hat{}v_{i\xi}$) of the multiplicative group G2, as a value V1 ($ID_i$) of the function V1.

The procedure described above is performed n times for calculating n elements V1 ($ID_i$) of the multiplicative group G2.

Based on the multiplicative group G2 indicated by the input public encryption parameter, the calculated n elements V1($ID_i$) of the multiplicative group G2, and the n integers $s_i$ indicated by the input information, the second ciphertext generating unit 242 calculates n elements $u_i$=V1($ID_i$)^$s_i$ of the multiplicative group G2 (i being an integer greater than or equal to 1 and less than or equal to n), which is the $s_i$-th power of the element V1 ($ID_i$) of the multiplicative group G2, by using a processing device, such as the CPU 911.

The second ciphertext generating unit 242 outputs n bit sequences respectively indicating the calculated n elements $u_i$ of the multiplicative group G2, as n second ciphertexts $C2_i$ (i being an integer greater than or equal to 1 and less than or equal to n), by using a processing device, such as the CPU 911.

The third ciphertext generating unit 243 inputs the public encryption parameter stored by the encryption parameter storage unit 210, and the information indicating the n integers $s_i$ output by the random number generating unit 222, by using a processing device, such as the CPU 911.

Based on the multiplicative group G1 and the element g of the multiplicative group G1 indicated by the input public encryption parameters, and the n integers $s_i$ indicated by the input information, the third ciphertext generating unit 243 calculates n elements $v_i$=g^$s_i$ of the multiplicative group G1 (i being an integer greater than or equal to 1 and less than or equal to n), which is the $s_i$-th power of the element g of the multiplicative group G1, by using a processing device, such as the CPU 911.

The third ciphertext generating unit 243 outputs n bit sequences respectively indicating the calculated n elements v, of the multiplicative group G1, as n third ciphertexts $C3_i$ (i being an integer greater than or equal to 1 and less than or equal to n), by using a processing device, such as the CPU 911.

The hash value calculation unit 244 inputs the public encryption parameters stored by the encryption parameter storage unit 210, by using a processing device, such as the CPU 911.

The hash value calculation unit 244 inputs the n first ciphertexts $C1_i$ output by the first ciphertext generating unit 241, the n second ciphertexts $C2_i$ output by the second ciphertext generating unit 242, and the n third ciphertexts $C3_i$ output by the third ciphertext generating unit 243, as n ciphertext bodies $CB_i$ output by the ciphertext body generating unit 240, by using a processing device, such as the CPU 911.

The hash value calculation unit 244 generates n combined ciphertexts by respectively combining the input n first ciphertexts $C1_i$, n second ciphertexts $C2_i$, and n third ciphertexts $C3_i$, by using a processing device, such as the CPU 911.

In addition, the hash value calculation unit 244 may further input the n recipient identification information $ID_i$ output by the recipient identification input unit 232, as (a part of) n ciphertext bodies $CB_i$, and generate one combined ciphertext by combining all the input n recipient identification information $ID_i$, n first ciphertexts $C1_i$, n second ciphertexts $C2_i$, and n third ciphertexts $C3_i$.

Based on the hash function HF indicated by the input public encryption parameter, and the generated n combined ciphertexts, the hash value calculation unit 244 calculates n bit sequences $w_i$ of m bits by respectively converting the n combined ciphertexts by the hash function HF, as n hash values $H_i$, by using a processing device, such as the CPU 911.

The hash value calculation unit 244 outputs information indicating the calculated n bit sequences $w_i$ of m bits and the generated n combined ciphertexts, by using a processing device, such as the CPU 911.

The ciphertext verification text generating unit 245 inputs the public encryption parameter stored by the encryption parameter storage unit 210, the information indicating the n integers $s_i$ output by the random number generating unit 222, and the information indicating the n bit sequences $w_i$ of m bits output by the hash value calculation unit 244, by using a processing device, such as the CPU 911.

Based on the function V2 indicated by the input public encryption parameter, and the input n bit sequences $w_i$ of m bits, the ciphertext verification text generating unit 245 calculates n elements V2($w_i$) of the multiplicative group G2 (i being an integer greater than or equal to 1 and less than or equal to n) by respectively converting the bit sequences $w_i$ of m bits by the function V2, by using a processing device, such as the CPU 911.

The calculation of the function V2 is based on the following steps, for example.

The ciphertext verification text generating unit 245 decomposes each of the input n bit sequences $w_i$ of m bits into m1 bit sequences $v_{i,\xi}$ of m2 bits (i being an integer greater than or equal to 1 and less than or equal to n, $\xi$ being an integer greater than or equal to 1 and less than or equal to m1, and m=m1·m2), by using a processing device, such as the CPU 911.

Consequently, the number of the decomposed bit sequences $v_{i,\xi}$ of m2 bits is totally n·m1.

In the explanation below, the step of calculating a value V2($w_i$) of the function V2 will be described with respect to one bit sequence $w_i$ of m bits.

The ciphertext verification text generating unit 245 treats the decomposed bit sequence $v_{i,\xi}$ of m2 bits, as an integer greater than or equal to 0 and less than the m2-th power of 2.

Based on the multiplicative group G2 and the m1 elements $h_\xi$ ($\xi$ being an integer greater than or equal to 1 and less than or equal to m1) of the multiplicative group G2 indicated by the input public encryption parameter, and m1 integers $v_{i,\xi}$, the ciphertext verification text generating unit 245 calculates m1 elements $h_\xi$^$v_{i,\xi}$ of the m1 multiplicative group G2, which is the $v_{i,\xi}$-th power of the element $h_\xi$ of the multiplicative group G2, by using a processing device, such as the CPU 911.

Based on the multiplicative group G2 and the element h2' of the multiplicative group G2 indicated by the input public encryption parameters, and the calculated m1 elements $h_\xi$^$v_{i,\xi}$ of the multiplicative group G2 ($\xi$ being an integer greater than or equal to 1 and less than or equal to m1), the ciphertext verification text generating unit 245 calculates one element h2'·$\Pi$($h_\xi$^$v_{i,\xi}$) of the multiplicative group G2, which is a result of multiplying all the element h2' of the multiplicative group G2 and m1 elements $h_\xi$^$v_{i,\xi}$ of the multiplicative group G2, by using a processing device, such as the CPU 911.

The ciphertext verification text generating unit 245 treats the calculated one element h2'·$\Pi$($h_\xi$^$v_{i,\xi}$) of the multiplicative group G2, as a value V2($ID_i$) of the function V2.

The procedure described above is performed n times for calculating n elements V2($ID_i$) of the multiplicative group G2.

Based on the n integers $s_i$ indicated by the input information, and the calculated n elements V2($w_i$) of the multiplicative group G2, the ciphertext verification text generating unit 245 calculates n elements $y_i$=V2($w_i$)^$s_i$ of the multiplicative group G2 (i being an integer greater than or equal to 1 and less than or equal to n), which is the $s_i$-th power of the element $V2(w_i)$ of the multiplicative group G2, by using a processing device, such as the CPU 911.

The ciphertext verification text generating unit 245 outputs n bit sequences respectively indicating the calculated n elements $y_i$ of the multiplicative group G2, as n ciphertext verification texts $CC_i$ (i being an integer greater than or equal to 1 and less than or equal to n), by using a processing device, such as the CPU 911.

The ciphertext combining unit 246 inputs the n combined ciphertexts output by the hash value calculation unit 244, and the n ciphertext verification texts $CC_i$ output by the ciphertext verification text generating unit 245, by using a processing device, such as the CPU 911.

The ciphertext combining unit 246 generates one key ciphertext C by combining all the input n combined ciphertexts and the input n ciphertext verification texts, by using a processing device, such as the CPU 911.

The ciphertext combining unit 246 outputs the generated one key ciphertext C, by using a processing device, such as the CPU 911.

In this example, although the ciphertext combining unit 246 inputs the n combined ciphertexts output by the hash value calculation unit 244, since the combined ciphertext is made by combining the first ciphertext $C1_i$, the second ciphertext $C2_i$, and the third ciphertext $C3_i$, consequently it means the ciphertext combining unit 246 inputs n first ciphertexts $C1_i$, n second ciphertexts $C2_i$, and n third ciphertexts $C3_i$.

The flow of information exchanged in the ciphertext generating apparatus 200 which is a comparative example according to the present Embodiment is the same as that explained in Embodiment 2 referring to FIG. 11.

Next, the ciphertext receiving apparatuses 301 to 303 will be described.

Since the configuration of the functional block of the ciphertext receiving apparatuses 301 to 303 is also the same as that described in Embodiment 1, points different from Embodiment 1 will be explained with reference to FIG. 6.

The ciphertext decomposition unit 346 inputs one key ciphertext C output by the ciphertext receiving unit 351, by using a processing device, such as the CPU 911.

The ciphertext decomposition unit 346 acquires, from the input one key ciphertext C, the corresponding first ciphertext $C1_{ID}$, corresponding second ciphertext $C2_{ID}$, corresponding third ciphertext $C3_{ID}$, and corresponding ciphertext verification text $CC_{ID}$ which correspond to the recipient concerned, by using a processing device, such as the CPU 911.

The ciphertext decomposition unit 346 outputs the acquired corresponding first ciphertext $C1_{ID}$, corresponding second ciphertext $C2_{ID}$, corresponding third ciphertext $C3_{ID}$, and corresponding ciphertext verification text $CC_{ID}$, by using a processing device, such as the CPU 911.

Moreover, the ciphertext decomposition unit 346 may acquire a combined verification ciphertext $(C1_{ID}|C2_{ID}|C3_{ID})$ and output it, by using a processing device, such as the CPU 911.

The verification hash value calculation unit 344 inputs the corresponding first ciphertext $C1_{ID}$, the corresponding second ciphertext $C2_{ID}$, and the corresponding third ciphertext $C3_{ID}$ output by the ciphertext decomposition unit 346, by using a processing device, such as the CPU 911.

The verification hash value calculation unit 344 generates a combined verification ciphertext $(C1_{ID}|C2_{ID}|C3_{ID})$ by combining the input corresponding first ciphertext $C1_{ID}$, corresponding second ciphertext $C2_{ID}$ and corresponding third ciphertext $C3_{ID}$, by using a processing device, such as the CPU 911.

Alternatively, the verification hash value calculation unit 344 may input the combined verification ciphertext $(C1_{ID}|C2_{ID}|C3_{ID})$ output by the ciphertext decomposition unit 346 instead of generating the combined verification ciphertext $(C1_{ID}|C2_{ID}|C3_{ID})$.

The verification hash value calculation unit 344 inputs a public encryption parameter stored by the public parameter storage unit 310, by using a processing device, such as the CPU 911.

Based on the hash function HF indicated by the input public encryption parameter, and the generated or input combined verification ciphertext $(C1_{ID}|C2_{ID}|C3_{ID})$, the verification hash value calculation unit 344 calculates a bit sequence w' of m bits by converting the combined verification ciphertext $(C1_{ID}|C2_{ID}|C3_{ID})$ by the hash function HF, to be treated as a hash value H', by using a processing device, such as the CPU 911.

The verification hash value calculation unit 344 outputs information indicating the calculated bit sequence w' of m bits, by using a processing device, such as the CPU 911.

The ciphertext verification unit 345 inputs the public encryption parameter stored by the public parameter storage unit 310, the corresponding second ciphertext $C2_{ID}$ and the corresponding third ciphertext $C3_{ID}$ output by the ciphertext decomposition unit 346, a bit sequence ID of m bits for identifying the recipient concerned, and the bit sequence w' of m bits output by the verification hash value calculation unit 344, by using a processing device, such as the CPU 911.

Based on the function V1 indicated by the input public encryption parameter, and the input bit sequence ID of m bits, the ciphertext verification unit 345 calculates an element V1 (ID) of the multiplicative group G2 by converting the bit sequence ID of m bits by the function V1, by using a processing device, such as the CPU 911.

Since the steps of calculating the function V1 by the ciphertext verification unit 345 are the same as those of, for example, calculating the function V1 by the second ciphertext generating unit 242 of the ciphertext generating apparatus 200 as described above, their explanation is omitted herein.

Based on the pairing e indicated by the input public encryption parameter, the element $v_{ID}$ of the multiplicative group G1 indicated by the input corresponding third ciphertext $C3_{ID}$, and the calculated element V1(ID) of the multiplicative group G2, the ciphertext verification unit 345 calculates an element $e(v_{ID}, V1 (ID))$ of the multiplicative group GT, which is a pairing value of the element $v_{ID}$ of the multiplicative group G1 and the element V1 (ID) of the multiplicative group G2, by using a processing device, such as the CPU 911.

Based on the pairing e and the element g of the multiplicative group G1 indicated by the input public encryption parameter, and the element $u_{ID}$ of the multiplicative group G2 indicated by the input corresponding second ciphertext $C2_{ID}$, the ciphertext verification unit 345 calculates an element $e(g, u_{ID})$ of the multiplicative group GT, which is a pairing value of the element g of the multiplicative group G1 and the element $u_{ID}$ of the multiplicative group G2, by using a processing device, such as the CPU 911.

The ciphertext verification unit 345 compares the calculated element $e(v_{ID}, V1 (ID))$ of the multiplicative group GT and the calculated element $e(g, u_{ID})$ of the multiplicative group GT, and when they do not accord with each other, judges that one key ciphertext C input by the ciphertext receiving unit 351 has no consistency, by using a processing device, such as the CPU 911.

When the calculated element $e(v_{ID}, V1(ID))$ of the multiplicative group GT and the calculated element $e(g, u_{ID})$ of the multiplicative group GT accord with each other, based on the function V2 indicated by the input public encryption parameter, and the input bit sequence w' of m bits, the ciphertext verification unit 345 calculates an element V2(w') of the multiplicative group G2 by converting the bit sequence w' of m bits by the function V2, by using a processing device, such as the CPU 911.

Since the steps of calculating the function V2 by the ciphertext verification unit 345 are the same as those of, for example, calculating the function V2 by the ciphertext verification text generating unit 245 of the ciphertext generating apparatus 200 as described above, their explanation is omitted herein.

Based on the pairing e indicated by the input public encryption parameter, the element $v_{ID}$ of the multiplicative group G1 indicated by the input corresponding third ciphertext $C3_{ID}$, and the calculated element V2(w') of the multiplicative group G2, the ciphertext verification unit 345 calculates an element $e(v_{ID}, V2(w'))$ of the multiplicative group GT, which is a pairing value of the element $v_{ID}$ of the multiplicative group G1 and the element V2(w') of the multiplicative group G2, by using a processing device, such as the CPU 911.

The ciphertext verification unit 345 inputs the corresponding ciphertext verification text $CC_{ID}$ output by the ciphertext decomposition unit 346, by using a processing device, such as the CPU 911.

Based on the pairing e and the element g of the multiplicative group G1 indicated by the input public encryption parameters, and the element $y_{ID}$ of the multiplicative group G2 indicated by the input corresponding ciphertext verification text $CC_{ID}$, the ciphertext verification unit 345 calculates an element $e(g, y_{ID})$ of the multiplicative group GT, which is a pairing value of the element g of the multiplicative group G1 and the element $y_{ID}$ of the multiplicative group G2, by using a processing device, such as the CPU 911.

The ciphertext verification unit 345 compares the calculated element $e(v_{ID}, V2(w'))$ of the multiplicative group GT with the calculated element $e(g, y_{ID})$ of the multiplicative group GT, by using a processing device, such as the CPU 911.

When they accord with each other, the ciphertext verification unit 345 judges that one key ciphertext C input by the ciphertext receiving unit 351 has consistency, by using a processing devices, such as the CPU 911.

When they do not accord with each other, the ciphertext verification unit 345 judges that one key ciphertext C input by the ciphertext receiving unit 351 has no consistency, by using a processing devices, such as the CPU 911.

When one key ciphertext C input by the ciphertext receiving unit 351 has consistency, since $u_{ID}=V1(ID)\hat{}s_{ID}$, $v_{ID}=g\hat{}s_{ID}$, therefore $e(v_{ID}, V1(ID))=e(g, u_{ID})=e(g, V1(ID))\hat{}s_{ID}$ according to the bilinear of the pairing e.

Moreover, since $y_{ID}=V2(w_{ID})\hat{}s_{ID}$, if $w'=w_{ID}$, therefore $e(v_{ID}, V2(w'))=e(g, y_{ID})=e(g, V2(w_{ID}))\hat{}s_{ID}$.

When the ciphertext verification unit 345 judges that the one key ciphertext C input by the ciphertext receiving unit 351 has consistency, the ciphertext decryption unit 341 performs the following processing in order to restore the plaintext M.

The ciphertext decryption unit 341 inputs the public encryption parameter stored by the public parameter storage unit 310, the secret key $d_{ID}$ stored by the secret key storage unit 323, and the corresponding first ciphertext $C1_{ID}$, corresponding second ciphertext $C2_{ID}$, and corresponding third ciphertext $C3_{ID}$ output by the ciphertext decomposition unit 346, by using a processing device, such as the CPU 911.

Based on the pairing e indicated by the input public encryption parameter, the element $d0_{ID}$ of the multiplicative group G2 indicated by the input secret key $d_{ID}$, and the element $v_{ID}$ of the multiplicative group G1 indicated by the input corresponding third ciphertext $C3_{ID}$, the ciphertext decryption unit 341 calculates an element $e(v_{ID}, d0_{ID})$ of the multiplicative group GT, which is a pairing value of the element $v_{ID}$ of the multiplicative group G1 and the element $d0_{ID}$ of the multiplicative group G2, by using a processing device, such as the CPU 911.

Based on the pairing e indicated by the input public encryption parameter, the element $d1_{ID}$ of the multiplicative group G1 indicated by the input secret key $d_{ID}$, and the element $u_{ID}$ of the multiplicative group G2 indicated by the input corresponding second ciphertext $C2_{ID}$, the ciphertext decryption unit 341 calculates an element $e(d1_{ID}, u_{ID})$ of the multiplicative group GT, which is a pairing value of the element $d1_{ID}$ of the multiplicative group G1 and the element $u_{ID}$ of the multiplicative group G2, by using a processing device, such as the CPU 911.

Based on the multiplicative group GT indicated by the input public encryption parameter, the calculated element $e(v_{ID}, d0_{ID})$ of the multiplicative group GT, and the calculated element $e(d1_{ID}, u_{ID})$ of the multiplicative group GT, the ciphertext decryption unit 341 calculates an elements $e(v_{ID}, d0_{ID})/e(d1_{ID}, u_{ID})$ of the multiplicative group GT, which is a product of the element $e(v_{ID}, d0_{ID})$ of the multiplicative group GT and the inverse of the element $e(d1_{ID}, u_{ID})$ of the multiplicative group GT, by using a processing device, such as the CPU 911.

The inverse of the element $e(d1_{ID}, u_{ID})$ of the multiplicative group GT as used herein means the inverse in the multiplicative group GT. That is, the inverse of the element $e(d_{ID,2}, u_{ID})$ of the multiplicative group GT is an element of the multiplicative group GT whose product with the element $e(d1_{ID}, u_{ID})$ of the multiplicative group GT is an identity of the multiplicative group GT.

Based on the key generation function KDF indicated by the input public encryption parameter, and the calculated element $e(v_{ID}, d0_{ID})/e(d1_{ID}, u_{ID})$ of the multiplicative group GT, the ciphertext decryption unit 341 calculates a key bit sequence $k'=KDF(e(v_{ID}, d0_{ID})/e(d1_{ID}, u_{ID}))$ by converting the element $e(v_{ID}, d0_{ID})/e(d1_{ID}, u_{ID})$ of the multiplicative group GT by the key generation function KDF, by using a processing device, such as the CPU 911.

Based on the input corresponding first ciphertext $C1_{ID}$ and the calculated key bit sequence k', the ciphertext decryption unit 341 generates a bit sequence by decrypting the corresponding first ciphertext $C1_{ID}$ with the key bit sequence k', by using a processing device, such as the CPU 911.

In this case, the key bit sequence $k_i$ calculated by the first ciphertext generating unit 241 of the ciphertext generating apparatus 200 is $k_i=KDF(e(g1, g2)\hat{}s_i)$. Since $g1=g\hat{}\alpha$, therefore $e(g1,g2)\hat{}s_i=e(g, g2)\hat{}(\alpha \cdot s_i)$ according to the bilinear of the pairing e.

Meanwhile, the key bit sequence k' calculated by the ciphertext decryption unit 341 is $k'=KDF(e(v_{ID}, d0_{ID})/e(d1_{ID}, u_{ID}))$. Since $d0_{ID}=g2\hat{}\alpha \cdot V1(ID)\hat{}r_{ID}$, $d1_{ID}=g\hat{}r_{ID}$, $u_{ID}=V1(ID)\hat{}s_{ID}$, and $v_{ID}=g\hat{}s_{ID}$, therefore, $e(v_{ID}, d0_{ID})=e(g, g2)\hat{}(\alpha \cdot s_{ID}) \cdot e(g, V1(ID))\hat{}(r_{ID} \cdot s_{ID})$ and $e(d1_{ID}, u_{ID})=e(g, V1(ID))\hat{}(r_{ID} \cdot s_{ID})$ according to the bilinear of the pairing e. Accordingly, since $k'=KDF(e(g, g2)\hat{}(\alpha \cdot s_{ID}))$ therefore $k'=k_{ID}$.

The ciphertext decryption unit 341 decrypts the corresponding first ciphertext $C1_{ID}$ by using the key bit sequence k' which is the same key bit sequence as that used for encrypting the plaintext M by the first ciphertext generating unit 241 of the ciphertext generating apparatus 200, thereby enabling to restore the plaintext M.

Next, operations will be described.

FIG. 19 is a flowchart showing an example of the flow of parameter setting processing in which the encryption parameter generating apparatus 100 being a comparative example according to the present Embodiment sets a public encryption parameter. The same reference numbers are attached to the steps common to the steps of the parameter setting processing explained in Embodiment 1.

In the secret information generation step S11, based on the natural number r indicated by the group parameter stored by the group parameter storage unit 111, the secret information generating unit 112 randomly generates an integer $\alpha$ being greater than or equal to 1 and less than the natural number r, by using a processing device, such as the CPU 911.

In the encryption parameter generation step S12, the public parameter generating unit 113 determines a key generation function KDF and a hash function HF, based on the multiplicative group GT and the natural number r indicated by the group parameters stored by the group parameter storage unit 111, by using a processing device, such as the CPU 911.

The public parameter generating unit 113 determines a function V1 and a function V2, based on the multiplicative group G2 indicated by the group parameter stored by the group parameter storage unit 111, by using a processing device, such as the CPU 911.

The public parameter generating unit 113 randomly selects an element g of the legitimate group G1 and an element g2 of the multiplicative group G2, based on the multiplicative groups G1 and G2 indicated by the group parameters stored by the group parameter storage unit 111, by using a processing device, such as the CPU 911.

The public parameter generating unit 113 calculates an element $g1=g^{\alpha}$ of the multiplicative group G1, based on the multiplicative group G1 indicated by the group parameter stored by the group parameter storage unit 111, the integer $\alpha$ generated by the secret information generating unit 112 at the secret information generation step S11, and the selected element g of the multiplicative group G1, by using a processing device, such as the CPU 911.

The parameter storage unit 122 stores information indicating the group parameter stored by the group parameter storage unit 111, the determined key generation function KDF, the determined hash function HF, the determined function V1, the determined function V2, the selected element g of the multiplicative group G1, the calculated element g1 of the multiplicative group G1, and the selected element g2 of the multiplicative group G2, as public encryption parameters, by using a storage device, such as the magnetic disk drive 920.

In the second secret information generation step S16, the secret information generating unit 112 calculates an element $msk=g2^{\alpha}$ of the multiplicative group G2, based on the multiplicative group G2 indicated by the group parameter stored by the group parameter storage unit 111, the integer $\alpha$ generated at the secret information generation step S11, and the element g2 of the multiplicative group G2 selected by the public parameter generating unit 113 at the encryption parameter generation step S12, by using a processing device, such as the CPU 911.

The secret information storage unit 121 stores information indicating the element msk of the multiplicative group G2 calculated by the secret information generating unit 112, by using a storage device, such as the magnetic disk drive 920.

In the encryption parameter publishing step S13, the public parameter publishing unit 114 publishes information indicating the group parameter stored by the group parameter storage unit 111, the key generation function KDF, the hash function HF and the functions V1, and V2 determined by the public parameter generating unit 113, the element g of the multiplicative group G1 and the element g2 of the multiplicative group G2 selected by the public parameter generating unit 113, and the element g1 of the multiplicative group G1 calculated by the public parameter generating unit 113, as public encryption parameters, by using a processing device, such as the CPU 911.

The public encryption parameters published by the public parameter publishing unit 114 are acquired by the ciphertext generating apparatus 200 and the ciphertext receiving apparatuses 301 to 303, and stored by the encryption parameter storage unit 210 and the public parameter storage unit 310 by using a storage device, such as the magnetic disk drive 920.

FIG. 20 is a flowchart showing an example of the flow of secret key setting processing in which the encryption parameter generating apparatus 100 being a comparative example according to the present Embodiment sets a secret key. The same reference numbers are attached to the steps common to the steps of the secret key setting processing explained in Embodiment 1.

In the identification input step S21, the identification information input unit 131 inputs a bit sequence ID of m bits, as recipient identification information, by using a processing device, such as the CPU 911.

In the secret key generation step S22, based on the natural number r indicated by the public encryption parameter stored by the encryption parameter storage unit 210, the secret key generating unit 132 randomly generates an integer $r_{ID}$ greater than or equal to 1 and less than the natural number r, by using a processing device, such as the CPU 911.

Based on the multiplicative group G2 and the function V1 indicated by the public encryption parameters stored by the parameter storage unit 122, the element msk of the multiplicative group G2 stored by the secret information storage unit 121, the bit sequence ID of m bits input at the identification input step S21, and the generated integer $r_{ID}$, the secret key generating unit 132 calculates an element $d0_{ID}=msk \cdot V1(ID)^{\hat{}r_{ID}}$ of the multiplicative group G2, by using a processing device, such as the CPU 911.

Based on the multiplicative group G1 and the element g of the multiplicative group G1 indicated by the public encryption parameters stored by the parameter storage unit 122, and the generated integer $r_{ID}$, the secret key generating unit 132 calculates an element $d1_{ID}=g^{\hat{}r_{ID}}$ of the multiplicative group G1, by using a processing device, such as the CPU 911.

The secret key notification unit 133 secretly notifies the corresponding ciphertext receiving apparatus of information indicating the element $d0_{ID}$ of the multiplicative group G2 and the element $d1_{ID}$ of the multiplicative group G1 calculated by the secret key generating unit 132 at the secret key generation step S22, as a secret key $d_{ID}$, by using a processing device, such as the CPU 911.

The secret key $d_{ID}$ notified by the secret key notification unit 133 is acquired by the corresponding ciphertext receiving apparatus, and stored by the secret key storage unit 323 by using a storage device, such as the magnetic disk drive 920.

FIG. 21 is a flowchart showing an example of the flow of ciphertext generation processing in which the ciphertext generating apparatus 200 being a comparative example according to the present Embodiment generates a ciphertext.

The same reference numbers are attached to the steps common to the steps of the ciphertext generation processing explained in Embodiment 1.

In the recipient identification input step S32, the recipient identification input unit 232 inputs n bit sequence $ID_i$ of m bits respectively corresponding to n recipients, as n recipient identification information for respectively identifying the n recipients, by using a processing device, such as the CPU 911.

In the random number generation step S34, the random number generating unit 222 randomly generates n integers $s_i$, greater than or equal to 1 and less than the natural number r, respectively corresponding to the n recipients, based on the natural number r indicated by the public encryption parameter stored by the encryption parameter storage unit 210, by using a processing device, such as the CPU 911.

In the first ciphertext generation step S35, based on the multiplicative group GT, the pairing e, the element g1 of the multiplicative group G1, the element g2 of the multiplicative group G2, and the key generation function KDF indicated by the public encryption parameters stored by the encryption parameter storage unit 210, and the n integers $s_i$ respectively corresponding to the n recipients generated by the random number generating unit 222 at the random number generation step S34, the first ciphertext generating unit 241 calculates n key bit sequences $k_i=KDF(e(g1,g2)\hat{\ }s_i)$ respectively corresponding to the n recipients, by using a processing device, such as the CPU 911.

Based on the session key K (=plaintext M) generated by the session key generating unit 221 at the session key generation step S33, and the calculated n key bit sequences $k_i$ respectively corresponding to the n recipients, the first ciphertext generating unit 241 generates n first ciphertexts $C1_i$ respectively corresponding to the n recipients, by encrypting one session key K respectively with the n key bit sequences $k_i$ which respectively correspond to the n recipients, by using a processing device, such as the CPU 911.

In the second ciphertext generation step S36, based on the function V1 indicated by the public encryption parameter stored by the encryption parameter storage unit 210, the n bit sequence $ID_i$ of m bits respectively corresponding to the n recipients input by the recipient identification input unit 232 at the recipient identification input step S32, and the n integers $s_i$ respectively corresponding to the n recipients generated by the random number generating unit 222 at the random number generation step S34, the second ciphertext generating unit 242 calculates n elements $u_i=V1(ID_i)\hat{\ }s_i$ of the multiplicative group G2 respectively corresponding to the n recipients, by using a processing device, such as the CPU 911.

The second ciphertext generating unit 242 treats bit sequences respectively indicating the calculated n elements $u_i$ of the multiplicative group G2 respectively corresponding to the n recipients, as n second ciphertexts $C2_i$ respectively corresponding to the n recipients, by using a processing device, such as the CPU 911.

In the third ciphertext generation step S37, based on the multiplicative group G1 and the element g of the multiplicative group G1 indicated by the public encryption parameters stored by the encryption parameter storage unit 210, and the n integers $s_i$ respectively corresponding to the n recipients generated by the random number generating unit 222 at the random number confronting step S34, the third ciphertext generating unit 243 calculates n elements $v_i=g\hat{\ }s_i$ of the multiplicative group G1 respectively corresponding to the n recipients, by using a processing device, such as the CPU 911.

The third ciphertext generating unit 243 treats bit sequences respectively indicating the calculated n elements $v_i$ of the multiplicative group G1 respectively corresponding to the n recipients, as n third ciphertexts $C3_i$ respectively corresponding to the n recipients, by using a processing device, such as the CPU 911.

In the hash value calculation step S38, based on the n first ciphertexts $C1_i$ respectively corresponding to the n recipients generated by the first ciphertext generating unit 241 at the first ciphertext generation step S35, the n second ciphertexts $C2_i$ respectively corresponding to the n recipients generated by the second ciphertext generating unit 242 at the second ciphertext generation step S36, and the n third ciphertexts $C3_i$ respectively corresponding to the n recipients generated by the third ciphertext generating unit 243 at the third ciphertext generation step S37, the hash value calculation unit 244 generates n combined ciphertexts $(C1_1|C2_1|C3_1)$ respectively corresponding to the n recipients by respectively combining the n first ciphertexts $C1_i$ respectively corresponding to the n recipients, the n first ciphertexts $C2_i$ respectively corresponding to the n recipients, and the n third ciphertexts $C3_i$ respectively corresponding to the n recipients, by using a processing device, such as the CPU 911.

Based on the hash function HF indicated by the public encryption parameter stored by the encryption parameter storage unit 210, and the generated n combined ciphertexts $(C1_1|C2_1|C3_1)$ respectively corresponding to the n recipients, the hash value calculation unit 244 calculates n bit sequences $w_i=HF(C1_i|C2_i|C3_i)$ of m bits respectively corresponding to the n recipients by respectively converting the n combined ciphertexts $(C1_1|C2_1|C3_1)$ respectively corresponding to n the recipients by the hash function HF, by using a processing device, such as the CPU 911.

In the ciphertext verification text generation step S39, based on the multiplicative group G2 and function V2 indicated by the public encryption parameters stored by the encryption parameter storage unit 210, the n integers $s_i$ respectively corresponding to the n recipients generated by the random number generating unit 222 at the random number generation step S34, and the n bit sequences $w_i$ of m bits respectively corresponding to the n recipients calculated by the hash value calculation unit 244 at the hash value calculation step S38, the ciphertext verification text generating unit 245 calculates n elements $y_i=V2(w_i)\hat{\ }s_i$ of the multiplicative group G2 respectively corresponding to the n recipients, by using a processing device, such as the CPU 911.

The ciphertext verification text generating unit 245 treats bit sequences respectively indicating the calculated n elements $y_i$ of the multiplicative group G2 respectively corresponding to the n recipients, as n ciphertext verification texts $CC_i$ respectively corresponding to the n recipients, by using a processing device, such as the CPU 911.

FIG. 22 is a flowchart showing an example of the flow of ciphertext reception processing in which the ciphertext receiving apparatuses 301 to 303 being comparative examples according to the present Embodiment receive ciphertexts. The same reference numbers are attached to the steps common to the steps of the ciphertext reception processing explained in Embodiment 1.

In the ciphertext decomposing step S52, the ciphertext decomposition unit 346 acquires one corresponding first ciphertext $C1_{ID}$, one corresponding second ciphertext $C2_{ID}$, one corresponding third ciphertext $C3_{ID}$, and one corresponding ciphertext verification text $CC_{ID}$ which correspond to the recipient to whom the ciphertext receiving apparatus corresponds, based on the one key ciphertext C output by the ciphertext receiving unit 351 at the notification data receiving step, by using a processing device, such as the CPU 911.

In the verification hash value calculation step S53, based on the hash function HF indicated by the public encryption parameter stored by the public parameter storage unit 310, and the one corresponding combined ciphertext $(C1_{ID}|C2_{ID}|C3_{ID})$ made by combining the one corresponding first ciphertext $C1_{ID}$, one corresponding second ciphertext $C2_{ID}$, and one corresponding third ciphertext $C3_{ID}$ acquired by the ciphertext decomposition unit 346 at the ciphertext decomposing step S52, the verification hash value calculation unit 344 calculates one bit sequence w' of m bits by converting the one corresponding combined ciphertext ($C1_{ID}|C2_{ID}|C3_{ID}$) by the hash function HF, as a verification hash value H', by using a processing device, such as the CPU 911.

In the ciphertext verification step S54, the ciphertext verification unit 345 calculates one element $e(v_{ID}, V1\,(ID))$ of the multiplicative group GT, based on the pairing e and the function V1 indicated by the public encryption parameters stored by the public parameter storage unit 310, the one element $v_{ID}$ of the multiplicative group G1 indicated by one corresponding third ciphertext $C3_{ID}$ acquired by the ciphertext decomposition unit 346 at the ciphertext decomposing step S52, and the bit sequence ID of m bits for identifying the recipient concerned, by using a processing device, such as the CPU 911.

The ciphertext verification unit 345 calculates one element $e(g, u_{ID})$ of the multiplicative group GT, based on the pairing e and the element g of the multiplicative group G1 indicated by the public encryption parameters stored by the public parameter storage unit 310, and one element $u_{ID}$ of one multiplicative group G2 indicated by one corresponding second ciphertext $C2_{ID}$ acquired by the ciphertext decomposition unit 346 at the ciphertext decomposing step S52, by using a processing device, such as the CPU 911.

The ciphertext verification unit 345 calculates one element $e(v_{ID}, V2(w'))$ of the multiplicative group GT, based on the pairing e and the function V2 indicated by the public encryption parameters stored by the public parameter storage unit 310, one element $v_{ID}$ of the multiplicative group G1 indicated by one corresponding third ciphertext $C3_{ID}$ acquired by the ciphertext decomposition unit 346 at the ciphertext decomposing step S52, and the bit sequence w' of m bits calculated by the verification hash value calculation unit 344 at the verification hash value calculation step S53, by using a processing device, such as the CPU 911.

The ciphertext verification unit 345 calculates one element $e(g, y_{ID})$ of the multiplicative group GT, based on the pairing e and the element g of the multiplicative group G1 indicated by the public encryption parameters stored by the public parameter storage unit 310, and one element $y_{ID}$ of the multiplicative group G2 indicated by one corresponding ciphertext verification text $CC_{ID}$ acquired by the ciphertext decomposition unit 346 at the ciphertext decomposing step S52, by using a processing device, such as the CPU 911.

Based on the calculated one element $e(v_{ID}, V1\,(ID))$ of the multiplicative group GT, the calculated one element $e(g, u_{ID})$ of the multiplicative group GT, the calculated one element $e(v_{ID}, V2(w'))$ of the multiplicative group GT, and the calculated one element $e(g, y_{ID})$ of the multiplicative group GT, the ciphertext verification unit 345 judges whether $e(v_{ID}, V1\,(ID)) = e(g, u_{ID})$ and $e(v_{ID}, V2(w')) = e(g, y_{ID})$ or not, by using a processing device, such as the CPU 911.

When the two equations are satisfied, the ciphertext verification unit 345 judges that the one key ciphertext C received by the ciphertext receiving unit 351 has consistency, and it goes to the ciphertext decrypting step S55.

When one or both of the equations is not satisfied, the ciphertext verification unit 345 judges that the one key ciphertext C received by the ciphertext receiving unit 351 has no consistency, and the ciphertext reception processing is ended.

In the ciphertext decrypting step S55, the ciphertext decryption unit 341 calculates one key bit sequence k'=KDF $(e(v_{ID}, d0_{ID})/e(d1_{ID}, u_{ID}))$, based on the multiplicative group GT, the pairing e, and the key generation function KDF stored by the public parameter storage unit 310, the element $d0_{ID}$ of the multiplicative group G2 and the element $d1_{ID}$ of the multiplicative group G1 indicated by the secret key $d_{ID}$ stored by the secret key storage unit 323, and one element $u_{ID}$ of the multiplicative group G2 indicated by one corresponding second ciphertext $C2_{ID}$ and one element $v_{ID}$ of the multiplicative group G1 indicated by one corresponding third ciphertext $C3_{ID}$ acquired by the ciphertext decomposition unit 346 at the ciphertext decomposing step S52, by using a processing device, such as the CPU 911.

Based on the one corresponding first ciphertext $C1_{ID}$ acquired by the ciphertext decomposition unit 346 at the ciphertext decomposing step S52, and the calculated one key bit sequence k', the ciphertext decryption unit 341 decrypts the corresponding first ciphertext $C1_{ID}$ by using the key bit sequence k', to generate a bit sequence of predetermined length, as a session key K' (=plaintext M), by using a processing device, such as the CPU 911.

As mentioned above, the session key K' generated by the ciphertext decryption unit 341 has the same bit sequence as that of the session key K generated by the session key generating unit 221 of the ciphertext generating apparatus 200.

Next, security of the ID-based cryptosystem used in the ID-based cryptographic communication system which is a comparative example according to the present Embodiment will be discussed.

Since the ID-based cryptographic system of multiple recipients being a comparative example according to the present Embodiment is extended from the ID-based cryptographic system of a single recipient by the conjunctive method, the SMMR security is $Adv^{smmr}_{n,\Pi,\Gamma}(t, q_d, q_x) \leq n \cdot Adv^{smmr}_{1,\Pi,\Gamma}(t', 1, q_d, q_x)$. $Adv^{mu}_{1,\Pi,\Gamma}(t', 1, q_d, q_x)$ indicates the security, in the conventional meaning, of the ID-based cryptographic system of a single recipient used as the basis of the ID-based cryptosystem of multiple recipients being a comparative example according to the present Embodiment.

It can be proved that the security $Adv^{mu}_{1,\Pi,\Gamma}(t', 1, q_d, q_x)$, in the conventional meaning, of the ID-based cryptographic system of a single recipient used as the basis of the ID-based cryptographic system of multiple recipient being a comparative example according to the present Embodiment reduces to the D-BDH problem (Decisional Bilinear Diffie-Hellman Problem). The D-BDH problem is a mathematical problem defined below.

In the D-BDH problem, the solver B is given four elements g, g1, g2, and g3 of the multiplicative group G and one element Z of the multiplicative group GT. Moreover, there are three integers a, b, and c, being greater than or equal to 1 and less than the order of the multiplicative group G, as secret information from the solver B.

The element g of the multiplicative group G is a randomly selected element of the multiplicative group G.

The element g1 of the multiplicative group G is an element $g^{\wedge}\alpha$ of the multiplicative group G, which is the a-th power of the element g of the multiplicative group G.

The element g2 of the multiplicative group G is an element $g^{\wedge}b$ of the multiplicative group G, which is the b-th power of the element g of the multiplicative group G.

The element g3 of the multiplicative group G is an element $g^{\wedge}c$ of the multiplicative group G, which is the c-th power of the element g of the multiplicative group G.

The solver B replies to a problem of judging whether an element $e(g,g)^{\wedge}(a \cdot b \cdot c)$ of the multiplicative group GT is equal to the given element Z of the multiplicative group GT or not, where the element $e(g,g)^{\wedge}(a \cdot b \cdot c)$ is obtained by exponentiating the element $e(g,g)$ of the multiplicative group GT, which is the pairing value of the elements g of the multiplicative group G, by the product $(a \cdot b \cdot c)$, which is the product of integers a, b, and c.

Similarly to the q-D-ABDHE problem, $\mathrm{Adv}^{d\text{-}bhd}_{k,G,GT}(t)$ is defined. Then, when $\mathrm{Adv}^{d\text{-}bhd}_{k,G,GT}(t) \leq \epsilon$, it is said that D-BDH assumption is satisfied.

Thus, as mentioned above, it can be proved that the SMMR security of the ID-based cryptosystem being a comparative example according to the present Embodiment reduces to the D-BDH problem.

Next, the ID-based cryptographic communication system 800 according to the present Embodiment will be explained. Since the whole configuration of the ID-based cryptographic communication system 800 and the block configuration of the encryption parameter generating apparatus 100 according to the present Embodiment are the same as those described in the comparative example, their description is omitted herein.

First, the ciphertext generating apparatus 200 will be explained. Since the block configuration of the ciphertext generating apparatus 200 is the same as that described in the comparative example, points different from the comparative example will be explained with reference to FIG. 4.

The hash value calculation unit 244 inputs public encryption parameters stored by the encryption parameter storage unit 210, n first ciphertexts $C1_i$ output by the first ciphertext generating unit 241, n second ciphertexts $C2_i$ output by the second ciphertext generating unit 242, and n third ciphertexts $C3_i$ output by the third ciphertext generating unit 243, by using a processing device, such as the CPU 911.

The hash value calculation unit 244 generates one combined ciphertext by combining all the input n first ciphertexts $C1_i$, n second ciphertexts $C2_i$, and n third ciphertexts $C3_i$, by using a processing device, such as the CPU 911.

Based on the hash function HF indicated by the input public encryption parameter, and the generated one combined ciphertext, the hash value calculation unit 244 calculates one bit sequence $w_0$ of m bits by converting the one combined ciphertext by the hash function HF, to be treated as one hash value $H_0$, by using a processing device, such as the CPU 911.

The hash value calculation unit 244 outputs information indicating the calculated one bit sequence $w_0$ of m bits, and the generated one combined ciphertext, by using a processing device, such as the CPU 911.

The ciphertext verification text generating unit 245 inputs the public encryption parameter stored by the encryption parameter storage unit 210, the information indicating the n integers $s_i$ output by the random number generating unit 222, and the information indicating one bit sequence $w_0$ of m bits output by the hash value calculation unit 244, by using a processing device, such as the CPU 911.

Based on the function V2 indicated by the input public encryption parameter, and the one bit sequence $w_0$ of m bits indicated by the input information, the ciphertext verification text generating unit 245 calculates one element $V2(w_0)$ of the multiplicative group G2 by converting the bit sequence $w_0$ of m bits by the function V2, by using a processing device, such as the CPU 911.

Based on the multiplicative group G2 indicated by the input public encryption parameter, n integers $s_i$ indicated by the input information, and the calculated element $V2(w_0)$ of the multiplicative group G2, the ciphertext verification text generating unit 245 calculates n elements $y_i = V2(w_0)^{s_i}$ of the multiplicative group G2 (i being an integer greater than or equal to 1 and less than or equal to n), which is the $s_i$-th power of the element $V2(w_0)$ of the multiplicative group G2, by using a processing device, such as the CPU 911.

The ciphertext verification text generating unit 245 outputs n bit sequences respectively indicating the calculated n elements $y_i$ of the multiplicative group G2, as n ciphertext verification texts $CC_i$ (i being an integer greater than or equal to 1 and less than or equal to n), by using a processing device, such as the CPU 911.

The ciphertext combining unit 246 inputs the one combined ciphertext output by the hash value calculation unit 244, and the n ciphertext verification texts $CC_i$ output by the ciphertext verification text generating unit 245, by using a processing device, such as the CPU 911.

The ciphertext combining unit 246 generates one key ciphertext C by combining all the input one combined ciphertext and the input n ciphertext verification texts, by using a processing device, such as the CPU 911.

The ciphertext combining unit 246 outputs the generated one key ciphertext C, by using a processing device, such as the CPU 911.

Since the flow of information exchanged in the ciphertext generating apparatus 200 according to the present Embodiment is the same as that described in Embodiment 2 referring to FIG. 16, its description is omitted herein.

Next, the ciphertext receiving apparatuses 301 to 303 will be explained. Since the block configuration of the ciphertext receiving apparatuses 301 to 303 is also the same as that described in the comparative example, points different from the comparative example will be described with reference to FIG. 6.

The ciphertext decomposition unit 346 inputs one key ciphertext C output by the ciphertext receiving unit 351, by using a processing device, such as the CPU 911.

The ciphertext decomposition unit 346 acquires, from the input one key ciphertext C, the corresponding first ciphertext $C1_{ID}$, the corresponding second ciphertext $C2_{ID}$, the corresponding third ciphertext $C3_{ID}$, and the corresponding ciphertext verification text $CC_{ID}$ which correspond to the recipient concerned, by using a processing device, such as the CPU 911.

The ciphertext decomposition unit 346 outputs the acquired corresponding first ciphertext $C1_{ID}$, corresponding second ciphertext $C2_{ID}$, corresponding third ciphertext $C3_{ID}$, and corresponding ciphertext verification text $CC_{ID}$, by using a processing device, such as the CPU 911.

The ciphertext decomposition unit 346 also acquires a combined verification ciphertext $(C1_1|C2_1|C3_1|C1_2|C2_2|C3_2|\ldots|C1_n|C2_n|C3_n)$ from one key ciphertext C, and outputs the acquired one, by using a processing device, such as the CPU 911.

The verification hash value calculation unit 344 inputs the combined verification ciphertext $(C1_1|C2_1|C3_1|C1_2|C2_2|C3_2|\ldots|C1_n|C2_n|C3_n)$ output by the ciphertext decomposition unit 346, by using a processing device, such as the CPU 911.

Alternatively, the verification hash value calculation unit 344 may combine ciphertexts and generate a combined verification ciphertext $(C1_1|C2_1|C3_1|C1_2|C2_2|C3_2|\ldots|C1_n|C2_n|C3_n)$, by using a processing device, such as the CPU 911.

The verification hash value calculation unit 344 inputs public encryption parameters stored by the public parameter storage unit 310, by using a processing device, such as the CPU 911.

Based on the hash function HF indicated by the input public encryption parameter, and the input or generated combined verification ciphertext $(C1_1|C2_1|C3_1|C1_2|C2_2|C3_2|\ldots|C1_n|C2_n|C3_n)$ the verification hash value calculation unit 344 calculates a bit sequence w' of m bits by converting the combined verification ciphertext $(C1_1|C2_1|C3_1|C1_2|C2_2|C3_2|\ldots|C1_n|C2_n|C3_n)$ by the hash function HF, to be treated as a hash value H', by using a processing device, such as the CPU 911.

The verification hash value calculation unit 344 outputs information indicating the calculated bit sequence w' of m bits, by using a processing device, such as the CPU 911.

Next, operations will be described.

FIG. 23 is a flowchart showing an example of the flow of ciphertext generation processing in which the ciphertext generating apparatus 200 according to the present Embodiment generates a ciphertext. The same reference numbers are attached to the steps common to the steps of ciphertext generation processing explained in the comparative example.

In the hash value calculation step S38, based on the n first ciphertexts $C1_i$ respectively corresponding to the n recipients generated by the first ciphertext generating unit 241 at the first ciphertext generation step S35, the n second ciphertexts $C2_i$ respectively corresponding to the n recipients generated by the second ciphertext generating unit 242 at the second ciphertext generation step S36, and the n third ciphertexts $C3_i$ respectively corresponding to the n recipients generated by the third ciphertext generating unit 243 at the third ciphertext generation step S37, the hash value calculation unit 244 generates one combined ciphertext $(C1_1|C2_1|C3_1|C1_2|C2_2|C3_2| \ldots |C1_n|C2_n|C3_n)$ by combining all the n first ciphertexts $C1_i$ respectively corresponding to the n recipients, the n first ciphertexts $C2_i$ respectively corresponding to the n recipients, and the n third ciphertexts $C3_i$ respectively corresponding to the n recipients, by using a processing device, such as the CPU 911.

Based on the hash function HF indicated by the public encryption parameter stored by the encryption parameter storage unit 210, and the generated one combined ciphertext $(C1_1|C2_1|C3_1|C1_2|C2_2|C3_2| \ldots |C1_n|C2_n|C3_n)$, the hash value calculation unit 244 calculates one m-bit bit sequence $w_0 = HF(C1_1|C2_1|C3_1|C1_2|C2_2|C3_2| \ldots |C1_n|C2_n|C3_n)$ by converting the one combined ciphertext $(C1_1|C2_1|C3_1|C1_2|C2_2|C3_2| \ldots |C1_n|C2_n|C3_n)$ by the hash function HF, by using a processing device, such as the CPU 911.

In the ciphertext verification text generation step S39, based on the multiplicative group G2 and the function V2 indicated by the public encryption parameters stored by the encryption parameter storage unit 210, the n natural numbers $s_i$ respectively corresponding to the n recipients generated by the random number generating unit 222 at the random number generation step S34, and the one bit sequence $w_0$ of m bits calculated by the hash value calculation unit 244 at the hash value calculation step S38, the ciphertext verification text generating unit 245 calculates n elements $y_i = V2(w_0)^{s_i}$ of the multiplicative group GT respectively corresponding to the n recipients, by using a processing device, such as the CPU 911.

The ciphertext verification text generating unit 245 treats bit sequences respectively indicating the calculated n elements $y_i$ of the multiplicative group G2 respectively corresponding to the n recipients, as n ciphertext verification texts $CC_i$ respectively corresponding to the n recipients, by using a processing device, such as the CPU 911.

FIG. 24 is a flowchart showing an example of the flow of ciphertext reception processing in which the ciphertext receiving apparatuses 301 to 303 according to the present Embodiment receive a ciphertext. The same reference numbers are attached to the steps common to the steps of ciphertext reception processing explained in the comparative example.

In the verification hash value calculation step S53, based on the hash function HF indicated by the public encryption parameter stored by the public parameter storage unit 310, and the combined verification ciphertext $(C1_1|C2_1|C3_1|C1_2|C2_2|C3_2| \ldots |C1_n|C2_n|C3_n)$, the verification hash value calculation unit 344 calculates a m-bit bit sequence $w' = HF(C1_1|C2_1|C3_1|C1_2|C2_2|C3_2| \ldots |C1_n|C2_n|C3_n)$ by converting the combined verification ciphertext $(C1_1|C2_1|C3_1|C1_2|C2_2|C3_2| \ldots |C1_n|C2_n|C3_n)$ by the hash function HF, by using a processing device, such as the CPU 911.

Since the steps other than the one described above are the same as those explained in the comparative example, their explanation is herein omitted.

As mentioned above, in the ID-based cryptographic communication system 800 of the present Embodiment, compared with the ID-based cryptographic communication system 800 explained in the comparative example, although the length of one key ciphertext C is the same, the amount of calculation required for ciphertext generation processing decreases, thereby reducing the cost of the cryptographic communication.

Particularly, at the hash value calculation step S38, only one time of hash value calculation is required in the present method, whereas n times of hash value calculation is required in the method explained in the comparative example.

In the ciphertext verification text generation step S39, calculation of the function V2 is needed. If the function V2 is calculated according to the steps explained in the comparative example, m1 times of exponential operation in the multiplicative group G2 and m1 times of multiplication in the multiplicative group G2 are required for one-time calculation of the function V2. While n times of calculation of the function V2 is required in the method explained in the comparative example, only one time of calculation of the function V2 is required in the present method. Therefore, it is possible to considerably reduce the amount of calculation in the case of a large number of recipients.

Next, the SMMR security of the ID-based cryptosystem used by the ID-based cryptographic communication system 800 according to the present Embodiment will be explained. In the description below, the ciphertext body $CB_i$ shall include recipient identification information $ID_i$ for identifying the corresponding recipient.

The SMMR security of the ID-based cryptosystem used by the ID-based cryptographic communication system 800 according to the present Embodiment can be proved by combining the proof described in the Non-patent Literature 18 and that in the Non-patent Literature 6.

In simulation of an encryption oracle, the solver B randomly generates an integer j greater than or equal to 1 and less than or equal to m2, and judges whether $ID^*_j$ is a simulatable ID or not.

When $ID^*_j$ is a simulatable ID, the solver B selects $M^*_0$ with respect to i satisfying $1 \leq i < j$, to generate a ciphertext body $CB_i$, and selects $M^*_i$ with respect to i satisfying $j < i \leq n$, to generate a ciphertext body $CB_i$. Moreover, with respect to i satisfying i=j, the solver generates a ciphertext body $CB_i$ by simulating using the given parameter of the D-BDH problem.

The solver B calculates a hash value $w^*_0$ by combining generated n ciphertext bodies $CB_i$ (i being an integer greater than or equal to 1 and less than or equal to n).

With respect to i satisfying i·j, the solver B generates a ciphertext verification text $CC_i$ by using a random number $s_i$ which was used for generating the ciphertext body, and with respect to i satisfying i=j, generates a ciphertext verification text $CC_i$ by performing simulation using the given parameter of the D-BDH problem.

Thereby, when $ID^*_j$ is a simulatable ID, the solver B can correctly reply to the D-BDH problem. When $ID^*_j$ is not a simulatable ID, output distribution of the encryption oracle simulated by the solver B is independent of b.

Therefore, the SMMR security of the ID-based cryptosystem according to the present Embodiment can be proved.

The ID-based cryptographic communication system 800 according to the present Embodiment has the following effect:

Since the MR-IND-ID-CCA security can be proved mathematically, secure cryptographic communication can be realized by using the ID-based cryptographic communication system 800.

The ciphertext generating apparatus 200 according to the present Embodiment has the following features:

The encryption parameter storage unit 210 stores information indicating, as public encryption parameters, a natural number r, a multiplicative group G1 whose order is the natural number r, a multiplicative group G2 whose order is the natural number r, a multiplicative group GT whose order is the natural number r, a pairing e for calculating an element of the multiplicative group GT from an element of the multiplicative group G1 and an element of the multiplicative group G2, a key generation function KDF for calculating a bit sequence of predetermined length from an element of the multiplicative group GT, two functions V1 and V2 for calculating an element of the multiplicative group GT from a bit sequence of predetermined length, a hash function HF for calculating a bit sequence of predetermined length from a bit sequence of arbitrary length, an element g of the multiplicative group G1, an element g1 of the multiplicative group G1, and an element g2 of the multiplicative group G2, by using a storage device, such as the magnetic disk drive 920.

The recipient identification input unit 232 inputs n bit sequence $ID_i$ of predetermined length, as n recipient identification information, by using a processing device, such as the CPU 911.

The random number generating unit 222 randomly generates n integers $s_i$, being greater than or equal to 1 and less than the natural number r, (i being an integer greater than or equal to 1 and less than or equal to n) corresponding to the n recipients, based on the natural number r indicated by the public encryption parameter stored by the encryption parameter storage unit 210, by using a processing device, such as the CPU 911.

The first ciphertext generating unit 241 calculates n key bit sequences $k_i = KDF(e(g1,g2)\hat{\,}s_i)$ (i being an integer greater than or equal to 1 and less than or equal to n) corresponding to the n recipients, based on the element g1 of the multiplicative group G1, the element g2 of the multiplicative group G2, the pairing e and the key generation function KDF indicated by the public encryption parameters stored by the encryption parameter storage unit 210, and the n integers $s_i$ generated by the random number generating unit 222, by using a processing device, such as the CPU 911, and generates n first ciphertexts $C1_i$ (i being an integer greater than or equal to 1 and less than or equal to n) corresponding to the n recipients by respectively encrypting the plaintext M input by the plaintext input unit 231, with the n key bit sequences $k_i$ calculated, by using a processing device, such as the CPU 911.

The second ciphertext generating unit 242 calculates n elements $u_i = V1(ID_i)\hat{\,}s_i$ (i being an integer greater than or equal to 1 and less than or equal to n) of the multiplicative group G2 corresponding to the n recipients, based on the function V1 indicated by the public encryption parameter stored by the encryption parameter storage unit 210, the n integers $s_i$ generated by the random number generating unit 222, and the n bit sequence $ID_i$ of predetermined length input by the recipient identification input unit 232, and treats each bit sequence, indicating each of the calculated n elements $u_i$ of the multiplicative group G2, as n second ciphertexts $C2_i$ (i being an integer greater than or equal to 1 and less than or equal to n) corresponding to the n recipients, by using a processing device, such as the CPU 911.

The third ciphertext generating unit 243 calculates n elements $v_i = g\hat{\,}s_i$ (i being an integer greater than or equal to 1 and less than or equal to n) of the multiplicative group G1 corresponding to the n recipients, based on the element g of the multiplicative group G1 indicated by the public encryption parameter stored by the encryption parameter storage unit 210 and the n integers $s_i$ generated by the random number generating unit 222, and treats each bit sequence, indicating each of the calculated n elements $v_i$ of the multiplicative group G1, as n third ciphertexts $C3_i$ (i being an integer greater than or equal to 1 and less than or equal to n) corresponding to the n recipients, by using a processing device, such as the CPU 911.

The hash value calculation unit 244 calculates one bit sequence $w_0$ of predetermined length to be treated as the hash value H, based on the hash function HF indicated by the public encryption parameter stored by the encryption parameter storage unit 210, by using a processing device, such as the CPU 911.

The ciphertext verification text generating unit 245 calculates n elements $y_i = V2(w_0)\hat{\,}s_i$ (i being an integer greater than or equal to 1 and less than or equal to n) of the multiplicative group G2 corresponding to the n recipients, based on the function V2 indicated by the public encryption parameter stored by the encryption parameter storage unit 210, the n integers $s_i$ generated by the random number generating unit 222, and the one bit sequence $w_0$ of predetermined length calculated by the hash value calculation unit 244, and treats each bit sequence, indicating each of the calculated n elements $y_i$ of the multiplicative group G2, as n ciphertext verification texts $CC_i$ (i being an integer greater than or equal to 1 and less than or equal to n) corresponding to the n recipients, by using the processing unit.

The ciphertext generating apparatus 200 according to the present Embodiment has the following effects:

It is possible to perform encryption processing with a small amount of resources, and to realize the cryptographic communication utilizing the ID-based cryptosystem where the SMMR-IND-ID-CCA2 security can be mathematically proved.

The ciphertext generating apparatus 200 according to the present Embodiment has the following features:

The encryption parameter storage unit 210 stores information indicating m1 elements $h_\xi$ ($\xi$ being an integer greater than or equal to 1 and less than or equal to m1) of the multiplicative group G2 and two elements h1' and h2' of the multiplicative group G2, as information indicating two functions V1 and V2, by using a storage device, such as the magnetic disk drive 920.

The second ciphertext generating unit 242 separates each of the n bit sequence $ID_i$ of predetermined length input by the recipient identification input unit 232 into m1 bit sequences $v_{i\xi}$ ($\xi$ being an integer greater than or equal to 1 and less than or equal to m1) of predetermined length, treats the separated m1 bit sequences $v_{i\xi}$ of predetermined length as m1 integers, by using a processing device, such as the CPU 911, and calculates an element $V1(ID_i) = h1' \cdot \Pi(h_\xi\hat{\,}v_{i\xi})$ ($\xi$ being an integer greater than or equal to 1 and less than or equal to m1) of the multiplicative group G2, which is a value of the function V1, based on the m1 elements $h_\xi$ of the multiplicative group G2 and the element h1' of the multiplicative group G2 indicated by the public encryption parameters stored by the encryption parameter storage unit 210, and the m1 integers $v_j$, separated, by using a processing device, such as the CPU 911.

The ciphertext verification text generating unit 245 separates a bit sequence w of predetermined length calculated by the hash value calculation unit 244 into m1 bit sequences $v_\xi$ ($\xi$ being an integer greater than or equal to 1 and less than or equal to m1) of predetermined length, treats the separated m1 bit sequences $v_\xi$ of predetermined length as m1 integers, by using a processing device, such as the CPU 911, and calculates an element $V2(w)=h2'\cdot\Pi(h_\xi{}^{\wedge}v_\xi)$ ($\xi$ being an integer greater than or equal to 1 and less than or equal to m1) of the multiplicative group G2, which is a value of the function V2, based on the m1 elements $h_\xi$ ($\xi$ being an integer greater than or equal to 1 and less than or equal to m1) of the multiplicative group G2 and the element h2' of the multiplicative group G2 indicated by the public encryption parameters stored by the encryption parameter storage unit 210 and the m1 integers $v_\xi$ separated, by using a processing device, such as the CPU 911.

The ciphertext generating apparatus 200 according to the present Embodiment has the following effects:

It is possible to perform encryption processing with a small amount of resources, and to realize the cryptographic communication utilizing the ID-based cryptosystem where the SMMR-IND-ID-CCA2 security can be mathematically proved.

The ID-based cryptographic communication system 800 according to the present Embodiment has the following features:

The encryption parameter generating apparatus 100 further includes a group parameter storage unit 111.

The group parameter storage unit 111 stores information indicating, as group parameters, a natural number r, a multiplicative group G1 whose order is the natural number r, a multiplicative group G2 whose order is the natural number r, a multiplicative group GT whose order is the natural number r, and a pairing e for calculating an element of the multiplicative group GT from an element of the multiplicative group G1 and an element of the multiplicative group G2, by using a storage device, such as the magnetic disk drive 920.

The secret information generating unit 112 randomly generates an integer $\alpha$ being greater than or equal to 1 and less than the natural number r, based on the natural number r indicated by the group parameter stored by the group parameter storage unit 111, by using a processing device, such as the CPU 911.

The public parameter generating unit 113 determines a key generation function KDF for calculating a bit sequence of predetermined length from an element of the multiplicative group GT, two functions V1 and V2 for calculating an element of the multiplicative group GT from a bit sequence of predetermined length, and a hash function HF for calculating a bit sequence of predetermined length from a bit sequence of arbitrary length, by using a processing device, such as the CPU 911, randomly selects an element g of the multiplicative group G1 and an element g2 of the multiplicative group G2, based on the multiplicative group G1 and the multiplicative group G2 indicated by the group parameters stored by the group parameter storage unit 111, by using a processing device, such as the CPU 911, calculates an element $g1=g^{\wedge}\alpha$ of the multiplicative group G1, based on the integer $\alpha$ generated by the secret information generating unit 112 and the selected element g of the multiplicative group G1, and treats information indicating the group parameter stored by the group parameter storage unit 111, and the determined key generation function KDF, two functions V1 and V2, and hash function HF, the selected element g of the multiplicative group G1 and element g2 of the multiplicative group G2, and the calculated element g1 of the multiplicative group G1, as public encryption parameters, by using a processing device, such as the CPU 911.

The secret information generating unit 112 further calculates an element $msk=g2^{\wedge}\alpha$ of the multiplicative group G2, based on the integer $\alpha$ generated and the element g2 of the multiplicative group G2 selected by the public parameter generating unit 113, by using a processing device, such as the CPU 911.

The secret information storage unit 121 stores information indicating the element msk of the multiplicative group G2 calculated by the secret information generating unit 112, as secret information, by using a storage device, such as the magnetic disk drive 920.

The identification information input unit 131 inputs a bit sequence ID of predetermined length, as recipient identification information, by using a processing device, such as the CPU 911.

The secret key generating unit 132 randomly generates an integer $r_{ID}$ being greater than or equal to 1 and less than the natural number r, based on the natural number r indicated by the public encryption parameter generated by the public parameter generating unit 113, by using a processing device, such as the CPU 911, calculates an element $d0_{ID}=msk\cdot V1(ID)^{\wedge}r_{ID}$ of the multiplicative group G2 and an element $d1_{ID}=g^{\wedge}r_{ID}$ of the multiplicative group G1, based on the element g of the multiplicative group G1 and the function V1 indicated by the public encryption parameters generated by the public parameter generating unit 113, the element msk of the multiplicative group G2 indicated by the secret information stored by the secret information storage unit 121, and the integer $r_{ID}$ generated, and treats information indicating the calculated element $d0_{ID}$ of the multiplicative group G2 and element $d1_{ID}$ of the multiplicative group G1, as the secret key $d_{ID}$, by using a processing device, such as the CPU 911.

The recipient identification input unit 232 inputs n bit sequences $ID_i$ of predetermined length, as n recipient identification information, by using a processing device, such as the CPU 911.

The random number generating unit 222 randomly generates the n integers $s_i$, greater than or equal to 1 and less than the natural number r (i being an integer greater than or equal to 1 and less than or equal to n), corresponding to the n recipients, based on the natural number r indicated by the public encryption parameter stored by the encryption parameter storage unit 210, by using a processing device, such as the CPU 911.

The first ciphertext generating unit 241 calculates n key bit sequences $k_i=KDF(e(g1,g2)^{\wedge}s_i)$ (i being an integer greater than or equal to 1 and less than or equal to n) corresponding to the n recipients, based on the element g1 of the multiplicative group G1, the element g2 of the multiplicative group G2, the pairing e and the key generation function KDF indicated by the public encryption parameters stored by the encryption parameter storage unit 210, and the n integers $s_i$ generated by the random number generating unit 222, by using a processing device, such as the CPU 911, and generates n first ciphertexts $C1_i$ (i being an integer greater than or equal to 1 and less than or equal to n) corresponding to the n recipients by respectively encrypting the plaintext M input by the plaintext input unit 231, with the n key bit sequences $k_i$ calculated, by using a processing device, such as the CPU 911.

The second ciphertext generating unit 242 calculates n elements $u_i=V1(ID_i)^{\wedge}s_i$ (i being an integer greater than or equal to 1 and less than or equal to n) of the multiplicative group G2 corresponding to the n recipients, based on the function V1 indicated by the public encryption parameter stored by the encryption parameter storage unit 210, the n bit sequence $ID_i$ of predetermined length input by the recipient identification input unit 232, and the n integers $s_i$ (i being an integer greater than or equal to 1 and less than or equal to n) generated by the random number generating unit 222 by using a processing device, such as the CPU 911, and treats each bit sequence, indicating each of the calculated n elements $u_i$ of the multiplicative group G2, as n second ciphertexts $C2_i$ (i being an integer greater than or equal to 1 and less than or equal to n) corresponding to the n recipients.

The third ciphertext generating unit 243 calculates n elements $v_i = g\hat{\ }s_i$ (i being an integer greater than or equal to 1 and less than or equal to n) of the multiplicative group G1 corresponding to the n recipients, based on the element g of the multiplicative group G1 indicated by the public encryption parameter stored by the encryption parameter storage unit 210 and the n integers $s_i$ generated by the random number generating unit 222, and treats each bit sequence, indicating each of the calculated n elements $v_i$ of the multiplicative group G1, as the n third ciphertexts $C3_i$ (i being an integer greater than or equal to 1 and less than or equal to n) corresponding to the n recipients, by using a processing device, such as the CPU 911.

The hash value calculation unit 244 calculates one bit sequence $w_0$ of predetermined length to be treated as the hash value H, based on the hash function HF indicated by the public encryption parameter stored by the encryption parameter storage unit 210, by using a processing device, such as the CPU 911.

The ciphertext verification text generating unit 245 calculates n elements $y_i = V2(w_0)\hat{\ }s_i$ (i being an integer greater than or equal to 1 and less than or equal to n) of the multiplicative group G2 corresponding to the n recipients, based on the function V2 indicated by the public encryption parameter stored by the encryption parameter storage unit 210, the n integers $s_i$ generated by the random number generating unit 222, and the one bit sequence $w_0$) of predetermined length calculated by the hash value calculation unit 244, by using a processing device, such as the CPU 911, and treats each bit sequence, indicating each of the calculated n elements $y_i$ of the multiplicative group G2, as n ciphertext verification texts $CC_i$ corresponding to the n recipients.

The verification hash value calculation unit 344 calculates a bit sequence w' of predetermined length to be treated as the verification hash value H', based on the hash function HF indicated by the public encryption parameter stored by the public parameter storage unit 310, by using a processing device, such as the CPU 911.

The ciphertext verification unit 345 calculates an element $e(v_{ID}, V2(w'))$ of the multiplicative group GT, based on the pairing e and the function V2 indicated by the public encryption parameters stored by the public parameter storage unit 310, the element $v_{ID}$ of the multiplicative group G1 indicated by the corresponding third ciphertext $C3_{ID}$ acquired by the ciphertext decomposition unit 346, and the bit sequence w' of predetermined length calculated by the verification hash value calculation unit 344, by using a processing device, such as the CPU 911, calculates an element $e(g, y_{ID})$ of the multiplicative group GT, based on the element g of the multiplicative group G1 and the pairing e indicated by the public encryption parameters stored by the public parameter storage unit 310, and the element $y_{ID}$ of the multiplicative group G2 indicated by the corresponding ciphertext verification text $CC_{ID}$ acquired by the ciphertext decomposition unit 346, by using a processing device, such as the CPU 911, and compares the calculated element $e(v_{ID}, V2(w'))$ of the multiplicative group GT with the calculated element $e(g, y_{ID})$ of the multiplicative group GT by using a processing device, such as the CPU 911, and when the element $e(v_{ID}, V2(w'))$ of the multiplicative group GT accords with the element $e(g, y_{ID})$ of the multiplicative group GT, judges that the one ciphertext C (key ciphertext C) received by the ciphertext receiving unit 351 has consistency.

When the ciphertext verification unit 345 judges that the one ciphertext C received by the ciphertext receiving unit 351 has consistency, the ciphertext decryption unit 341 calculates a key bit sequence $k' = KDF(e(v_{ID}, d0_{ID})/e(d1_{ID}, u_{ID}))$, based on the pairing e and the key generation function KDF indicated by the public encryption parameters stored by the public parameter storage unit 310, the element $d0_{ID}$ of the multiplicative group G2 and the element $d1_{ID}$ of the multiplicative group G1 indicated by the secret key $d_{ID}$ stored by the secret key storage unit 323, the element $u_{ID}$ of the multiplicative group G2 indicated by the one corresponding second ciphertext $C2_{ID}$ and the element $v_{ID}$ of the multiplicative group G1 indicated by the corresponding third ciphertext $C3_{ID}$ acquired by the ciphertext decomposition unit 346, by using a processing device, such as the CPU 911, and restores the plaintext M by decrypting the corresponding first ciphertext $C1_{ID}$ acquired by the ciphertext decomposition unit 346, with the calculated key bit sequence k', by using a processing device, such as the CPU 911.

The ID-based cryptographic communication system 800 according to the present Embodiment has the following effects:

It is possible to perform encryption processing with a small amount of resources, and to realize the cryptographic communication utilizing the ID-based cryptosystem where the SMMR-IND-ID-CCA2 security can be mathematically proved.

Embodiment 4

Referring to FIGS. 25 to 28, Embodiment 4 will now be described.

FIG. 25 shows a system configuration illustrating an example of the whole configuration of the ID-based cryptographic communication system 800 according to the present Embodiment.

The ID-based cryptographic communication system 800 includes the encryption parameter generating apparatus 100, the ciphertext generating apparatus 200, the ciphertext receiving apparatuses 301 to 303, and a group parameter generating apparatus 400.

Since the encryption parameter generating apparatus 100, the ciphertext generating apparatus 200 and the ciphertext receiving apparatuses 301 to 303 are the same as those described in Embodiment 2, their explanation is omitted herein.

The group parameter generating apparatus 400 generates a group parameter. The group parameter generated by the group parameter apparatus 400 is input by the encryption parameter generating apparatus 100 and stored by the group parameter storage unit 111. The group parameter generating apparatus 400 may be inside the encryption parameter generating apparatus 100.

FIG. 26 is a block diagram showing an example of the functional block configuration of the group parameter generating apparatus 400 according to the present Embodiment.

The group parameter generating apparatus 400 includes a parameter generation condition storage unit 410, a group order candidate generating unit 420, a group order security judging unit 430, and a parameter generating unit 440.

The parameter generation condition storage unit 410 stores parameter generation condition information by using a storage device, such as the magnetic disk drive 920.

The parameter generation condition information indicates a condition relating to group parameters generated by the group parameter generating apparatus 400. The condition relating to group parameters generated by the group parameter generating apparatus 400 has been specified beforehand from the viewpoint of the security, etc. of the ID-based cryptographic communication system 800 that uses the group parameters.

The parameter generation condition storage unit 410 stores information indicating an integer k, an integer D, an integer B1, and an integer B2, as parameter generation condition information.

The integer k indicates an embedding degree. The integer D indicates a discriminant. The integer B1 indicates the first threshold. The integer B2 indicates the second threshold.

The group order candidate generating unit 420 generates a natural number to be a candidate for the natural number r (the order of the multiplicative groups G1, G2, and GT) in the group parameters.

The group order candidate generating unit 420 inputs the parameter generation condition information stored by the parameter generation condition storage unit 410, by using a processing device, such as the CPU 911.

Based on the integers k and D indicated by the input parameter generation condition information, the group order candidate generating unit 420 generates the natural number r that satisfies the following three conditions, by using a processing device, such as the CPU 911.

The first condition is that the natural number r should be a sufficiently large prime number. "Sufficiently large" as used herein indicates that it is difficult to solve the DH problem in the multiplicative group whose order is the natural number r.

The second condition is that the natural number r should be (a multiple of the integer k)+1.

The third condition is that the integer D should be a quadratic residue modulo the natural number r.

The group order candidate generating unit 420 generates the natural number r that satisfies the above three conditions, and outputs information indicating the generated natural number r, by using a processing device, such as the CPU 911.

The group order security judging unit 430 judges whether the natural number r generated by the group order candidate generating unit 420 is suitable or not from the viewpoint of the security of the ID-based cryptographic communication system 800.

It shall be considered in the present Embodiment that the highest security is achieved when it is impossible to factorize (r−1) and (r+1) into prime factors.

This is because, on the q-D-tABDHE problem, since there exists an algorithm for obtaining a by utilizing a factor of (r−1) or (r+1), it is preferable to avoid such r when adopting a cryptographic system which reduces to the q-D-ABDHE problem.

However, r that satisfies such conditions does not actually exist. This is because since r is a large prime number, namely being odd, each of (r−1) and (r+1) is divisible by 2.

Moreover, according to the conditions of selecting r mentioned above, (r−1) is divisible by k. Furthermore, either (r−1) or (r+1) is divisible by 4. This is because, if it is assumed that (r+1) is not divisible by 4, since (r+1) is divisible by 2, the remainder obtained by dividing (r+1) by 4 is 2. Then, (r−1) is divisible by 4. Thus, the natural number r is selected aiming that (r−1) and (r+1) should not have any prime factors other than the ones mentioned above.

The group order security judging unit 430 includes a remainder calculation unit 431, a judgment value calculation unit 432, and a prime factor judging unit 433.

The remainder calculation unit 431 inputs the information indicating the natural number r output by the group order candidate generating unit 420, by using a processing device, such as the CPU 911.

The remainder calculation unit 431 calculates a remainder by dividing the natural number r indicated by the input information by 4, by using a processing device, such as the CPU 911.

The remainder calculation unit 431 outputs information indicating the calculated remainder, by using a processing device, such as the CPU 911.

The conditions to be satisfied by the natural number r are different depending upon whether the remainder obtained by dividing the natural number r by 4 is 1 or 3.

The judgment value calculation unit 432 inputs the parameter generation condition information stored by the parameter generation condition storage unit 410, the information indicating the natural number r output by the group order candidate generating unit 420, and the information indicating the remainder output by the remainder calculation unit 431, by using a processing device, such as the CPU 911.

Based on the remainder indicated by the input information, the judgment value calculation unit 432 judges whether a remainder obtained by dividing the natural number r by 4 is 1 or 3, by using a processing device, such as the CPU 911.

When the remainder obtained by dividing the natural number r by 4 is 1, (r−1) is divisible by 4. Then, the natural number r is selected under the condition that the quotient obtained by dividing (r−1) by the least common multiple of the integer k and 4 has no prime factor less than the integer B1, and the quotient obtained by dividing (r+1) by 2 has no prime factor less than the integer B2.

Therefore, when it is judged that the remainder obtained by dividing the natural number r by 4 is 1, the judgment value calculation unit 432 calculates a quotient (r−1)/CM (k,4) by dividing the difference (r−1) between the natural number r and 1 by the least common multiple LCM(k,4) of the integer k and 4, to be treated as the integer r1, based on the integer k indicated by the input parameter generation condition information and the natural number r indicated by the input information, by using a processing device, such as the CPU 911.

Moreover, based on the natural number r indicated by the input information, the judgment value calculation unit 432 calculates a quotient (r+1)/2 by dividing the sum (r+1) of the natural number r and 1 by 2, to be treated as an integer r2, by using a processing device, such as the CPU 911.

When the remainder obtained by dividing the natural number r by 4 is 3, (r+1) is divisible by 4. Then, the natural number r is selected under the condition that the quotient obtained by dividing (r−1) by the least common multiple of the integer k and 2 has no prime factor less than the integer B1, and the quotient obtained by dividing (r+1) by 4 has no prime factor less than the integer B2.

Therefore, when it is judged that the remainder obtained by dividing the natural number r by 4 is 3, the judgment value calculation unit 432 calculates a quotient (r−1)/LCM(k,2) by dividing the difference (r−1) between the natural number r and 1 by the least common multiple LCM(k,2) of the integer k and 2, to be treated as the integer r1, based on the integer k indicated by the input parameter generation condition information and the natural number r indicated by the input information, by using a processing device, such as the CPU 911.

Moreover, based on the natural number r indicated by the input information, the judgment value calculation unit 432 calculates a quotient (r+1)/4 by dividing the sum (r+1) of the natural number r and 1 by 4, to be treated as the integer r2, by using a processing device, such as the CPU 911.

The judgment value calculation unit 432 outputs information indicating the calculated integers r1 and r2, by using a processing device, such as the CPU 911.

The prime factor judging unit 433 inputs the parameter generation condition information stored by the parameter generation condition storage unit 410 and the information indicating the integers r1 and r2 output by the judgment value calculation unit 432, by using a processing device, such as the CPU 911.

Based on the integer B1 indicated by the input parameter generation condition information, and the integer r1 indicated by the input information, the prime factor judging unit 433 judges whether the integer r1 has a prime factor less than the integer B1 or not, by using a processing device, such as the CPU 911.

When it is judged that the integer r1 has a prime factor less than the integer B1, the prime factor judging unit 433 judges that the natural number r is not suitable, by using a processing device, such as the CPU 911.

Based on the integer B2 indicated by the input parameter generation condition information, and the integer r2 indicated by the input information, the prime factor judging unit 433 judges whether the integer r2 has a prime factor less the integer B2 or not, by using a processing device, such as the CPU 911.

When it is judged that the integer r2 has a prime factor less than the integer B2, the prime factor judging unit 433 judges that the natural number r is not suitable, by using a processing device, such as the CPU 911.

Only when it is judged that the integer r1 has no prime factor less than the integer B1 and the integer r2 has no prime factor less than the integer B2, the prime factor judging unit 433 judges that the natural number r is suitable, by using a processing device, such as the CPU 911.

When the group order security judging unit 430 judges that the natural number r is suitable, the parameter generating unit 440 generates a group parameter, based on the natural number r.

The parameter generating unit 440 inputs the parameter generation condition information stored by the parameter generation condition storage unit 410, and the information indicating the natural number r output by the group order candidate generating unit 420, by using a processing device, such as the CPU 911.

The parameter generating unit 440 determines the multiplicative groups G1 and G2, based on the integers k and D indicated by the input parameter generation condition information and the natural number r indicated by the input information, by using a processing device, such as the CPU 911.

Based on the determined multiplicative groups G1 and G2, the parameter generating unit 440 determines a pairing e between the element of the multiplicative group G1 and the element of the multiplicative group G2, and the multiplicative group GT whose elements are the values taken by the pairing e, by using a processing device, such as the CPU 911.

The parameter generating unit 440 outputs information indicating the determined multiplicative groups G1, G2 and GT, and the pairing e, as group parameters, by using a processing device, such as the CPU 911.

Now, the multiplicative groups G1 and G2 are formed by points on the elliptic curve E: $Y^2=X^3+aX+b$ (X, Y, a, and b being elements of the finite field GF (p) whose order is p (p being a prime number)), for example.

The pairing e is a Weil pairing or a Tate pairing, for example.

The multiplicative group GT is a subgroup of the multiplicative group in the finite field $GF(q^k)$ whose order is $q^k$ (q being a prime number and k being an integer greater than or equal to 2), for example.

As an algorithm for calculating parameters of the elliptic curve E, where the natural number r is the order of the group formed by points on the elliptic curve E, the integer D is a discriminant, and the integer k is an embedding degree of the finite field $GF(q^k)$, there is known the Cocks-Pinch method, for example.

The parameter generating unit 440 calculates an order p of the finite field GF(p), and an integer t which lets p+1−t or p+1+t be a prime number, by the Cocks-Pinch method for example, by using a processing device, such as the CPU 911.

The parameter generating unit 440 calculates the Hilbert class polynomial $H_D(x)$ for the discriminant D, by using a processing device, such as the CPU 911.

The parameter generating unit 440 calculates an element j of the finite field GF(p), which is a root of a reduced polynomial modulo p of the calculated Hilbert class polynomial $H_D(X)$, by using a processing device, such as the CPU 911.

The parameter generating unit 440 calculates the element j of the finite field GF(p) by Berlekamp's algorithm, for example.

Based on the calculated element j of the finite field GF(p), the parameter generating unit 440 calculates elements a and b of the finite field GF(p), which satisfy $j=1728a^3/(a^3+27b^2)$, and defines them as coefficients of the elliptic curve $E: Y^2=X^3 aX+b$, by using a processing device, such as the CPU 911.

As described above, the parameter generating unit 440 determines the multiplicative groups G1, G2, and GT, and the pairing e, for example.

The group parameters output by the parameter generating unit 440 are input by the group parameter storage unit 111 of the encryption parameter generating apparatus 100 by using a processing device, such as the CPU 911, and stored by it by using a storage device, such as the magnetic disk drive 920.

FIG. 27 is a flowchart showing an example of the flow of group parameter generation processing in which the group parameter generating apparatus 400 according to the present Embodiment generates a group parameter.

In the natural number generation step S61, the group order candidate generating unit 420 generates a natural number r by using a processing device, such as the CPU 911.

In the prime number judging step S62, based on the natural number r generated at the natural number generation step S61, the group order candidate generating unit 420 judges whether the natural number r is a prime number or not, by using a processing device, such as the CPU 911.

When judged that the natural number r is a prime number, it goes to the multiple judging step S63.

When judged that the natural number r is not a prime number, it returns to the natural number generation step S61, and generates a different natural number r.

In the multiple judging step S63, based on the integer k indicated by the parameter generation condition information stored by the parameter generation condition storage unit 410, and the natural number r generated at the natural number generation step S61, the group order candidate generating unit 420 judges whether the natural number r is (a multiple of the integer k)+1 or not, by using a processing device, such as the CPU 911.

When judged that the natural number r is (a multiple of the integer k)+1, it goes to the quadratic residue judging step S64.

When judged that the natural number r is not (a multiple of the integer k)+1, it returns to the natural number generation step S61, and generates a different natural number r.

In the quadratic residue judging step S64, based on the integer D indicated by the parameter generation condition information stored by the parameter generation condition storage unit 410, and the natural number r generated at the natural number generation step S61, the group order candidate generating unit 420 judges whether the integer D is a quadratic residue modulo r or not, by using a processing device, such as the CPU 911.

When judged that the integer D is a quadratic residue modulo r, it goes to the first remainder calculation step S65.

When judged that the integer D is not a quadratic residue modulo r, it returns to the natural number generation step S61, and generates a different natural number r.

In the first remainder calculation step S65, based on the natural number r generated at the natural number generation step S61, the remainder calculation unit 431 calculates a remainder by dividing the natural number r by 4, by using a processing device, such as the CPU 911.

When the remainder obtained by dividing the natural number r by 4 is 3, it goes to the first judgment value calculation step S66.

When the remainder obtained by dividing the natural number r by 4 is 1, it goes to the third judgment value calculation step S68.

In the first judgment value calculation step S66, based on the natural number r generated at the natural number generation step S61, the judgment value calculation unit 432 calculates a quotient (r+1)/4 by dividing the sum (r+1) of the natural number r and 1 by 4, to be treated as the integer r2, by using a processing device, such as the CPU 911.

In the second judgment value calculation step S67, based on the integer k indicated by the parameter generation condition information stored by the parameter generation condition storage unit 410, the judgment value calculation unit 432 calculates a least common multiple LCM(k,2) of the integer k and 2, by using a processing device, such as the CPU 911.

Based on the natural number r generated at the natural number generation step S61 and the calculated least common multiple LCM(k,2), the judgment value calculation unit 432 calculates a quotient (r−1)/LCM(k,2) by dividing the difference (r−1) between the natural number r and 1 by the least common multiple LCM(k,2), to be treated as the integer r1, by using a processing device, such as the CPU 911.

Then, it goes to the first prime factor judging step S70.

In the third judgment value calculation step S68, based on the natural number r generated at the natural number generation step S61, the judgment value calculation unit 432 calculates a quotient (r+1)/2 by dividing the sum (r+1) of the natural number r and 1 by 2, to be treated as the integer r2, by using a processing device, such as the CPU 911.

In the fourth judgment value calculation step S69, based on the integer k indicated by the parameter generation condition information stored by the parameter generation condition storage unit 410, the judgment value calculation unit 432 calculates a least common multiple LCM(k,4) of the integer k and 4, by using a processing device, such as the CPU 911.

Based on the natural number r generated at the natural number generation step S61 and the calculated least common multiple LCM(k,4), the judgment value calculation unit 432 calculates a quotient (r−1)/LCM(k,4) by dividing the difference (r−1) between the natural number r and 1 by the least common multiple LCM(k,4), to be treated as the integer r1, by using a processing device, such as the CPU 911.

In the first prime factor judging step S70, based on the integer B1 indicated by the parameter generation condition information stored by the parameter generation condition storage unit 410 and the integer r1 calculated at the second judgment value calculation step S67 or the fourth judgment value calculation step S69, the group order security judging unit 430 judges whether the integer r1 has a prime factor less than the integer B1 or not, by using a processing device, such as the CPU 911.

When judged that the integer r1 has a prime factor less than the integer B1, it returns to the natural number generation step S61, and generates a different natural number r.

When judged that the integer r1 has no prime factor less than the integer B1, it goes to the second prime factor judging step S71.

In the second prime factor judging step S71, based on the integer B2 indicated by the parameter generation condition information stored by the parameter generation condition storage unit 410, and the integer r2 calculated at the first judgment value calculation step S66 or the third judgment value calculation step S68, the group order security judging unit 430 judges whether the integer r2 has a prime factor less than the integer B2 or not, by using a processing device, such as the CPU 911.

When judged that the integer r2 has a prime factor less than the integer B2, it returns to the natural number generation step S61, and generates a different natural number r.

When judged that the integer r2 has no prime factor less than the integer B2, it goes to the group parameter generation step S85.

In this way, the group order security judging unit 430 selects the natural number r which is secure as the order of the multiplicative group.

In the group parameter generation step S72, based on the parameter generation condition information stored by the parameter generation condition storage unit 410, and the natural number r generated at the natural number generation step S61, the parameter generating unit 440 calculates a multiplicative group whose group order is the natural number r, by using a processing device, such as the CPU 911.

The parameter generating unit 440 generates a group parameter including information indicating the calculated multiplicative group, by using a processing device, such as the CPU 911.

As described above, the ID-based cryptographic communication system 800 using a secure group order is realized.

FIG. 28 is a flowchart showing another example of the flow of group parameter generation processing in which the group parameter generating apparatus 400 according to the present Embodiment generates a group parameter.

The same reference numbers are attached to the steps common to the steps of the group parameter generation processing explained referring to FIG. 27, and their explanation is omitted.

In the natural number generation step S81, the group order candidate generating unit 420 generates a natural number n by using a processing device, such as the CPU 911.

In the embedding degree judging step S82, based on the integer k indicated by the parameter generation condition information stored by the parameter generation condition storage unit 410, the group order candidate generating unit 420 judges whether the integer k is an even number or an odd number, by using a processing device, such as the CPU 911.

When judged that the integer k is even, it goes to the first natural number calculation step S83.

When judged that the integer k is odd, it goes to the second natural number calculation step S84.

In the first natural number calculation step S83, based on the integer k indicated by the parameter generation condition information stored by the parameter generation condition storage unit 410, and the natural number n generated at the natural number generation step S81, the group order candidate generating unit 420 calculates a natural number r=n·k+1 by adding 1 to the product of the integer k and the natural number n, by using a processing device, such as the CPU 911.

Then, it goes to the prime number judging step S62.

In the second natural number calculation step S84, based on the integer k indicated by the parameter generation condition information stored by the parameter generation condition storage unit 410, and the natural number n generated at the natural number generation step S81, the group order candidate generating unit 420 calculates a natural number r=2n·k+1 by adding 1 to the product of the integer k and twice the natural number n, by using a processing device, such as the CPU 911.

Thereby, among the conditions mentioned above, the condition that the natural number r should be (a multiple of the integer k)+1 is satisfied. Moreover, since the natural number r is always odd, it may be a prime number.

In the first judgment value calculation step S85, based on the natural number r calculated at the first natural number calculation step S83 or the second natural number calculation step S84, the group order security judging unit 430 calculates a quotient (r+1)/4 by dividing the sum (r+1) of the natural number r and 1 by 4, to be treated as the integer r2, by using a processing device, such as the CPU 911.

In the second judgment value calculation step S86, the group order security judging unit 430 treats the natural number n generated at the natural number generation step S81, as the integer r1, by using a processing device, such as the CPU 911.

When the integer k is odd, since r=2n·k+1, then n=(r−1)/2k. Therefore, the integer r1 is the quotient obtained by dividing (r−1) by the least common multiple of k and 2, (where the least common multiple is equal to 2k because the integer k is odd).

When the integer k is even, since r=n·k+1, then n=(r−1)/k. Therefore, the integer r1 is the quotient obtained by dividing (r−1) by the least common multiple of k and 2, (where the least common multiple is equal to k because the integer k is even).

Moreover, when k is a multiple of 4, the integer r1 is also the quotient obtained by adjusting (r−1) by the least common multiple of k and 4.

Then, it goes to the first prime factor judging step S70.

In the third judgment value calculation step S87, based on the natural number r calculated at the first natural number calculation step S83 or the second natural number calculation step S84, the group order security judging unit 430 calculates a quotient (r+1)/2 by dividing the sum (r+1) of the natural number r and 1 by 2, to be treated as the integer r2, by using a processing device, such as the CPU 911.

In the second remainder calculation step S88, based on the integer k indicated by the parameter generation condition information stored by the parameter generation condition storage unit 410, the group order security judging unit 430 calculates a remainder by dividing the integer k by 4, by using a processing device, such as the CPU 911.

When the calculated remainder is 0, it goes to the second judgment value calculation step S86.

When the calculated remainder is other than 0, it goes to the fourth judgment value calculation affirmation S89.

In the fourth judgment value calculation step S89, based on the natural number n generated at the natural number generation step S81, the group order security judging unit 430 calculates a quotient n/2 by dividing the natural number n by 2, to be treated as the integer r1, by using a processing device, such as the CPU 911.

When the integer k is odd, r1=(r−1)/4k. Therefore, the natural number r1 is the quotient obtained by dividing (r−1) by the least common multiple of k and 4.

When the integer k is even, the remainder obtained by dividing the integer k by 4 is 2, then r1=(r−1)/2k. Therefore, the integer r1 is the quotient obtained by dividing (r−1) by the least common multiple of k and 4.

Thus, in this way, the natural number r satisfying all the conditions that should be fulfilled by the natural number r as the order of a multiplicative group is selected.

The procedure of selecting the natural number r is not limited to the flow of two procedures described above, and the natural number r may be selected by other procedure. What is necessary is just to select the natural number r satisfying all the conditions that should be fulfilled by the natural number r as mentioned above, and thus, the procedure of judging and detailed steps may be different ones.

The ID-based cryptographic communication system 800 (cryptographic communication system) according to the present Embodiment has the following features:

The ID-based cryptographic communication system 800 further comprises a group parameter generating apparatus 400.

The group parameter generating apparatus 400 includes a processing device for processing information, such as the CPU 911, the group order candidate generating unit 420, the group order security judging unit 430, and the parameter generating unit 440.

The group order candidate generating unit 420 generates a prime number r (natural number r) as a group order candidate by using a processing device, such as the CPU 911.

The group order security judging unit 430 calculates a factor of a difference (r−1) between the prime number r and 1, and a factor of a sum (r+1) of the prime number r and 1, based on the prime number r generated by the group order candidate generating unit 420, by using a processing device, such as the CPU 911, and judges whether the prime number r generated by the group order candidate generating unit 420 is a secure group order or not, based on the calculated factor of (r−1) and factor of (r+1), by using a processing device, such as the CPU 911.

When the group order security judging unit 430 judges that the prime number r generated by the group order candidate generating unit 420 is a secure group order, the parameter generating unit 440 calculates a multiplicative group whose group order is the prime number r, based on the prime number r generated by the group order candidate generating unit 420, by using a processing device, such as the CPU 911, and generates a group parameter including information indicating the multiplicative group calculated, by using a processing device, such as the CPU 911.

The group parameter storage unit 111 stores the group parameter generated by the group parameter generating apparatus 400, by using a storage device, such as the magnetic disk drive 920.

The ID-based cryptographic communication system 800 according to the present Embodiment has the following effect:

The ID-based cryptographic communication can be performed based on the multiplicative group which has a secure group order.

The ID-based cryptographic communication system 800 (cryptographic communication system) according to the present Embodiment also has the following features:

The group order candidate generating unit 420 generates a prime number r (natural number r), as a group order candidate, by adding 1 to a multiple of the predetermined integer k, by using a processing device, such as the CPU 911.

The group order security judging unit 430 includes the remainder calculation unit 431, the judgment value calculation unit 432, and the prime factor judging unit 433.

Based on the prime number r generated by the group order candidate generating unit 420, the remainder calculation unit 431 calculates a remainder by dividing the prime number r by 4, by using a processing device, such as the CPU 911.

When the remainder calculated by the remainder calculation unit is 1, the judgment value calculation unit 432 calculates an integer $r1=(r-1)/\text{LCM}(k,4)$, which is a quotient obtained by dividing the difference $(r-1)$ between the prime number r and 1 by the least common multiple LCM (k,4) of the integer k and 4, based on the predetermined integer k, and the prime number r generated by the group order candidate generating unit 420, by using a processing device, such as the CPU 911, and calculates an integer $r2=(r+1)/2$, which is a quotient obtained by dividing the sum $(r+1)$ of the prime number r and 1 by 2, based on the prime number r generated by the group order candidate generating unit 420, by using a processing device, such as the CPU 911, and when the remainder calculated by the remainder calculation unit 431 is 3, the judgment value calculation unit 432 calculates an integer $r1=(r-1)/\text{LCM}(k,2)$, which is a quotient obtained by dividing the difference $(r-1)$ between the prime number r and 1 by the least common multiple LCM(k,2) of the integer k and 2, based on the predetermined integer k, and the prime number r generated by the group order candidate generating unit 420, by using a processing device, such as the CPU 911, and calculates an integer $r2=(r+1)/4$, which is a quotient obtained by dividing the sum $(r+1)$ of the prime number r and 1 by 4, based on the prime number r generated by the group order candidate generating unit 420, by using a processing device, such as the CPU 911.

The prime factor judging unit 433 judges whether the integer r1 has a prime factor less than a predetermined integer B1 or not, based on the integer r1 calculated by the judgment value calculation unit 432, by using a processing device, such as the CPU 911, and judges whether the integer r2 has a prime factor less than a predetermined integer B2 or not, based on the integer r2 calculated by the judgment value calculation unit 432, by using a processing device, such as the CPU 911, and when it is judged that the integer r1 has a prime factor less than the predetermined integer B1 and when it is judged that the integer r2 has a prime factor less than the predetermined integer B2, the prime factor judging unit 433 judges that the prime number r generated by the group order candidate generating unit 420 is not a secure group order.

The ID-based cryptographic communication system 800 according to the present Embodiment has the following effect:

Since it is possible to avoid a group order the attack method concerning which has been revealed, the ID-based cryptographic communication can be performed based on a multiplicative group that has a secure group order.

The group parameter generating apparatus 400 according to the present Embodiment has the following features:

The group parameter generating apparatus 400, for generating a parameter of a multiplicative group used for encryption processing in a cryptographic communication system (ID-based cryptographic communication system 800) that notifies n recipients (n being an integer greater than or equal to 1), respectively having corresponding ciphertext receiving apparatuses 301 to 303, of a plaintext M (session key K) through one ciphertext C (key ciphertext C), comprises a processing device for processing data, such as the CPU 911, the group order candidate generating unit 420, the group order security judging unit 430, and the parameter generating unit 440.

The group order candidate generating unit 420 generates a prime number r as a group order candidate, by using a processing device, such as the CPU 911.

Based on the prime number r generated by the group order candidate generating unit 420, the group order security judging unit 430 calculates a factor of the difference $(r-1)$ between the prime number r and 1, and a factor of the sum $(r+1)$ of the prime number r and 1, by using a processing device, such as the CPU 911, and based on the calculated factor of $(r-1)$ and factor of $(r+1)$, judges whether the prime number r generated by the group order candidate generating unit 420 is a secure group order or not, by using a processing device, such as the CPU 911.

When the group order security judging unit 430 judges that the prime number r generated by the group order candidate generating unit 420 is a secure group order, the parameter generating unit 440 calculates a multiplicative group whose group order is the prime number r, based on the prime number r generated by the group order candidate generating unit 420, by using a processing device, such as the CPU 911, and generates a group parameter including information indicating the calculated multiplicative group, by using a processing device, such as the CPU 911.

The group parameter generating apparatus 400 according to the present Embodiment has the following effect:

Since the group parameter used for the encryption processing in the ID-based cryptographic communication system 800 can be generated based on the multiplicative group that has a secure group order, the security of cryptographic communication in the ID-based cryptographic communication system 800 is ensured.

The group parameter generating apparatus 400 according to the present Embodiment also has the following features:

The group order candidate generating unit 420 generates a prime number r, as a group order candidate, by adding 1 to a multiple of the predetermined integer k, by using a processing device, such as the CPU 911.

The group order security judging unit 430 includes the remainder calculation unit 431, the judgment value calculation unit 432, and the prime factor judging unit 433.

Based on the prime number r generated by the group order candidate generating unit 420, the remainder calculation unit 431 calculates a remainder by dividing the prime number r by 4, by using a processing device, such as the CPU 911.

When the remainder calculated by the remainder calculation unit 431 is 1, the judgment value calculation unit 432 calculates an integer $r1=(r-1)/\text{LCM}(k,4)$, which is a quotient obtained by dividing the difference $(r-1)$ between the prime number r and 1 by the least common multiple LCM (k,4) of the integer k and 4, based on the predetermined integer k and the prime number r generated by the group order candidate generating unit 420, by using a processing device, such as the CPU 911, and calculates an integer $r2=(r+1)/2$, which is a quotient obtained by dividing the sum $(r+1)$ of the prime number r and 1 by 2, based on the prime number r generated by the group order candidate generating unit 420, by using a processing device, such as the CPU 911, and when the remainder calculated by the remainder calculation unit 431 is 3, the judgment value calculation unit 432 calculates an integer r1=(r−1)/LCM (k,2), which is a quotient obtained by dividing the difference (r−1) between the prime number r and 1 by the least common multiple LCM (k,2) between the integer k and 2, based on the predetermined integer k and the prime number r generated by the group order candidate generating unit 420, by using a processing device, such as the CPU 911, and calculates an integer r2=(r+1)/4, which is a quotient obtained by dividing the sum (r+1) of the prime number r and 1 by 4, based on the prime number r generated by the group order candidate generating unit 420, by using a processing device, such as the CPU 911.

Based on the integer r1 calculated by the judgment value calculation unit 432, the prime factor judging unit 433 judges whether the integer r1 has a prime factor less than the predetermined integer B1 or not, by using a processing device, such as the CPU 911, and based on the integer r2 calculated by the judgment value calculation unit 432, judges whether the integer r2 has a prime factor less than the predetermined integer B2 or not, by using a processing device, such as the CPU 911, and when it is judged that the integer r1 has a prime factor less than the predetermined integer B1, and when it is judged that the integer r2 has a prime factor less than the predetermined integer B2, the prime factor judging unit 433 judges that the prime number r generated by the group order candidate generating unit 420 is not a secure group order.

The group parameter generating apparatus 400 according to the present Embodiment has the following effect:

Since it is possible to avoid a group order the attack method concerning which has been revealed, a group parameter used for the encryption processing in the ID-based cryptographic communication system 800 can be generated based on a multiplicative group that has a secure group order, thereby ensuring the security of cryptographic communication in the ID-based cryptographic communication system 800.

Embodiment 5

Referring to FIG. 29, Embodiment 5 will now be described.

Since the whole configuration of the ID-based cryptographic communication system 800, and the block configuration of the encryption parameter generating apparatus 100, the ciphertext generating apparatus 200, and the ciphertext receiving apparatuses 301 to 303 according to the present Embodiment are the same as those described in Embodiment 4, their explanation is omitted herein.

The group parameter generating apparatus 400 will be described. Since the block configuration of the group parameter generating apparatus 400 according to the present Embodiment is the same as that described in Embodiment 4, different points will be described with reference to FIG. 26.

The parameter generation condition storage unit 410 stores information indicating an integer k and an integer D, as parameter generation condition information.

The prime factor judging unit 433 inputs information indicating the integer r1 and the integer r2 output by the judgment value calculation unit 432, by using a processing device, such as the CPU 911.

Based on the integer r1 indicated by the input information, the prime factor judging unit 433 judges whether the integer r1 is a prime number or not, by using a processing device, such as the CPU 911.

When it is judged that the integer r1 is not a prime number, the prime factor judging unit 433 judges that the natural number r generated by the group order candidate generating unit 420 is not a secure group order and not suitable as a group order, by using a processing device, such as the CPU 911.

Based on the integer r2 indicated by the input information, the prime factor judging unit 433 judges whether the integer r2 is a prime number or not, by using a processing device, such as the CPU 911.

When it is judged that the integer r2 is not a prime number, the prime factor judging unit 433 judges that the natural number r generated by the group order candidate generating unit 420 is not a secure group order and not suitable as a group order, by using a processing device, such as the CPU 911.

Only when it is judged that both the integers r1 and integer r2 are prime numbers, the prime factor judging units 433 judges that the natural number r generated by the group order candidate generating unit 420 is a secure group order, and suitable as a group order.

Next, operations will be described.

FIG. 29 is a flowchart showing an example of the flow of group parameter generation processing in which the group parameter generating apparatus 400 according to the present Embodiment generates a group parameter.

The same reference numbers are attached to the steps common to the steps of group parameter generation processing explained in Embodiment 4.

In the first prime factor judging step S70, based on the integer r1 calculated at the second judgment value calculation step S67 or the fourth judgment value calculation step S69, the group order security judging unit 430 judges whether the integer r1 is a prime number or not, by using a processing device, such as the CPU 911.

When judged that the integer r1 is not a prime number, it returns to the natural number generation step S61, and generates a different natural number r.

When judged that the integer r1 is a prime number, it goes to the second prime factor judging step S71.

In the second prime factor judging step S71, based on the integer r2 calculated at the first judgment value calculation step S66 or the second judgment value calculation step S68, the group order security judging unit 430 judges whether the integer r2 is a prime number or not, by using a processing device, such as the CPU 911.

When judged that the integer r2 is not a prime number, it returns to the natural number generation step S61, and generates a different natural number r.

When judged that the integer r2 is a prime number, it goes to the group parameter generation step S85.

In Embodiment 4, it is regarded to be safe when the integers r1 and r2 do not have prime numbers less than a certain extent, whereas in this Embodiment, whether the natural number r is a secure group order or not is determined by judging if the integer r1 and the integer r2 are prime numbers or not, thereby enhancing the security.

The ID-based cryptographic communication system 800 (cryptographic communication system) according to the present Embodiment has the following features:

The group order candidate generating unit 420 generates a prime number r, as a group order candidate, by adding 1 to a multiple of the predetermined integer k, by using a processing device, such as the CPU 911.

The group order security judging unit 430 includes the remainder calculation unit 431, the judgment value calculation unit 432, and the prime factor judging unit 433.

Based on the prime number r generated by the group order candidate generating unit 420, the remainder calculation unit 431 calculates a remainder by dividing the prime number r by 4, by using a processing device, such as the CPU 911.

When the remainder calculated by the remainder calculation unit 431 is 1, the judgment value calculation unit 432 calculates an integer r1=(r−1)/LCM(k,4), which is a quotient obtained by dividing the difference (r−1) between the prime number r and 1 by the least common multiple LCM(k,4) of the integer k and 4, based on the predetermined integer k and the prime number r generated by the group order candidate generating unit 420, by using a processing device, such as the CPU 911, and calculates an integer r2=(r+1)/2, which is a quotient obtained by dividing the sum (r+1) of the prime number r and 1 by 2, based on the prime number r generated by the group order candidate generating unit 420, by using a processing device, such as the CPU 911, and when the remainder calculated by the remainder calculation unit 431 is 3, the judgment value calculation unit 432 calculates an integer r1=(r−1)/LCM(k,2), which is a quotient obtained by dividing the difference (r−1) between the prime number r and 1 by the least common multiple LCM(k,2) of the integer k and 2, based on the predetermined integer k and the prime number r generated by the group order candidate generating unit 420, by using a processing device, such as the CPU 911, and calculates an integer r2=(r+1)/4, which is a quotient obtained by dividing the sum (r+1) of the prime number r and 1 by 4, based on the prime number r generated by the group order candidate generating unit 420, by using a processing device, such as the CPU 911.

Based on the integer r1 calculated by the judgment value calculation unit 432, the prime factor judging unit 433 judges whether the integer r1 is a prime number or not, by using a processing device, such as the CPU 911, and based on the integer r2 calculated by the judgment value calculation unit 432, judges whether the integer r2 is a prime number or not, by using a processing device, such as the CPU 911, and when it is judged that the integer r1 is not a prime number and when it is judged that the integer r2 is not a prime number, the prime factor judging unit 433 judges that the prime number r generated by the group order candidate generating unit 420 is not a secure group order.

The ID-based cryptographic communication system 800 according to the present Embodiment has the following effect:

Since it is possible to certainly avoid a group order the attack method concerning which has been revealed, a group parameter used for the encryption processing in the ID-based cryptographic communication system 800 can be generated based on a multiplicative group that has a secure group order, thereby ensuring the security of cryptographic communication in the ID-based cryptographic communication system 800.

The group parameter generating apparatus 400 according to the present Embodiment has the following features:

The group order candidate generating unit 420 generates the prime number r, as the group order candidate, by adding 1 to a multiple of the predetermined integer k, by using a processing device, such as the CPU 911.

The group order security judging unit 430 includes the remainder calculation unit 431, the judgment value calculation unit 432, and the prime factor judging unit 433.

Based on the prime number r generated by the group order candidate generating unit 420, the remainder calculation unit 431 calculates a remainder by dividing the prime number r by 4, by using a processing device, such as the CPU 911.

When the remainder calculated by the remainder calculation unit 431 is 1, the judgment value calculation unit 432 calculates an integer r1=(r−1)/LCM(k,4), which is a quotient obtained by dividing the difference (r−1) between the prime number r and 1 by the least common multiple LCM(k,4) of the integer k and 4, based on the predetermined integer k and the prime number r generated by the group order candidate generating unit 420, by using a processing device, such as the CPU 911, and calculates an integer r2=(r+1)/2, which is a quotient obtained by dividing the sum (r+1) of the prime number r and 1 by 2, based on the prime number r generated by the group order candidate generating unit 420, by using a processing device, such as the CPU 911, and when the remainder calculated by the remainder calculation unit 431 is 3, the judgment value calculation unit 432 calculates an integer r1=(r−1)/LCM (k,2), which is a quotient obtained by dividing the difference (r−1) between the prime number r and 1 by the least common multiple LCM(k,2) of the integer k and 2, based on the predetermined integer k and the prime number r generated by the group order candidate generating unit 420, by using a processing device, such as the CPU 911, and calculates an integer r2=(r+1)/4, which is a quotient obtained by dividing the sum (r+1) of the prime number r and 1 by 4, based on the prime number r generated by the group order candidate generating unit 420, by using a processing device, such as the CPU 911.

Based on the integer r1 calculated by the judgment value calculation unit 432, the prime factor judging unit 433 judges whether the integer r1 is a prime number or not, by using a processing device, such as the CPU 911, and based on the integer r2 calculated by the judgment value calculation unit 432, judges whether the integer r2 is a prime number or not, by using a processing device, such as the CPU 911, and when it is judged that the integer r1 is not a prime number and when it is judged that the integer r2 is not a prime number, the prime factor judging unit 433 judges that the prime number r generated by the group order candidate generating unit 420 is not a secure group order.

The group parameter generating apparatus 400 according to the present Embodiment has the following effect:

Since it is possible to certainly avoid a group order the attack method concerning which has been revealed, a group parameter used for the encryption processing in the ID-based cryptographic communication system 800 can be generated based on a multiplicative group that has a secure group order, thereby ensuring the security of cryptographic communication in the ID-based cryptographic communication system 800.

BRIEF DESCRIPTION OF DRAWINGS

FIG. 14 is a flowchart showing an example of the flow of ciphertext generation processing in which the ciphertext generating apparatus 200 being a comparative example generates a ciphertext, according to Embodiment 2;

FIG. 21 is a flowchart showing an example of the flow of ciphertext generation processing in which the ciphertext generating apparatus 200 being a comparative example generates a ciphertext, according to Embodiment 3;

FIG. 29 is a flowchart showing an example of the flow of group parameter generation processing in which the group parameter generating apparatus 400 generates a group parameter, according to Embodiment 5.

REFERENCE SIGNS LIST

Figure 1:
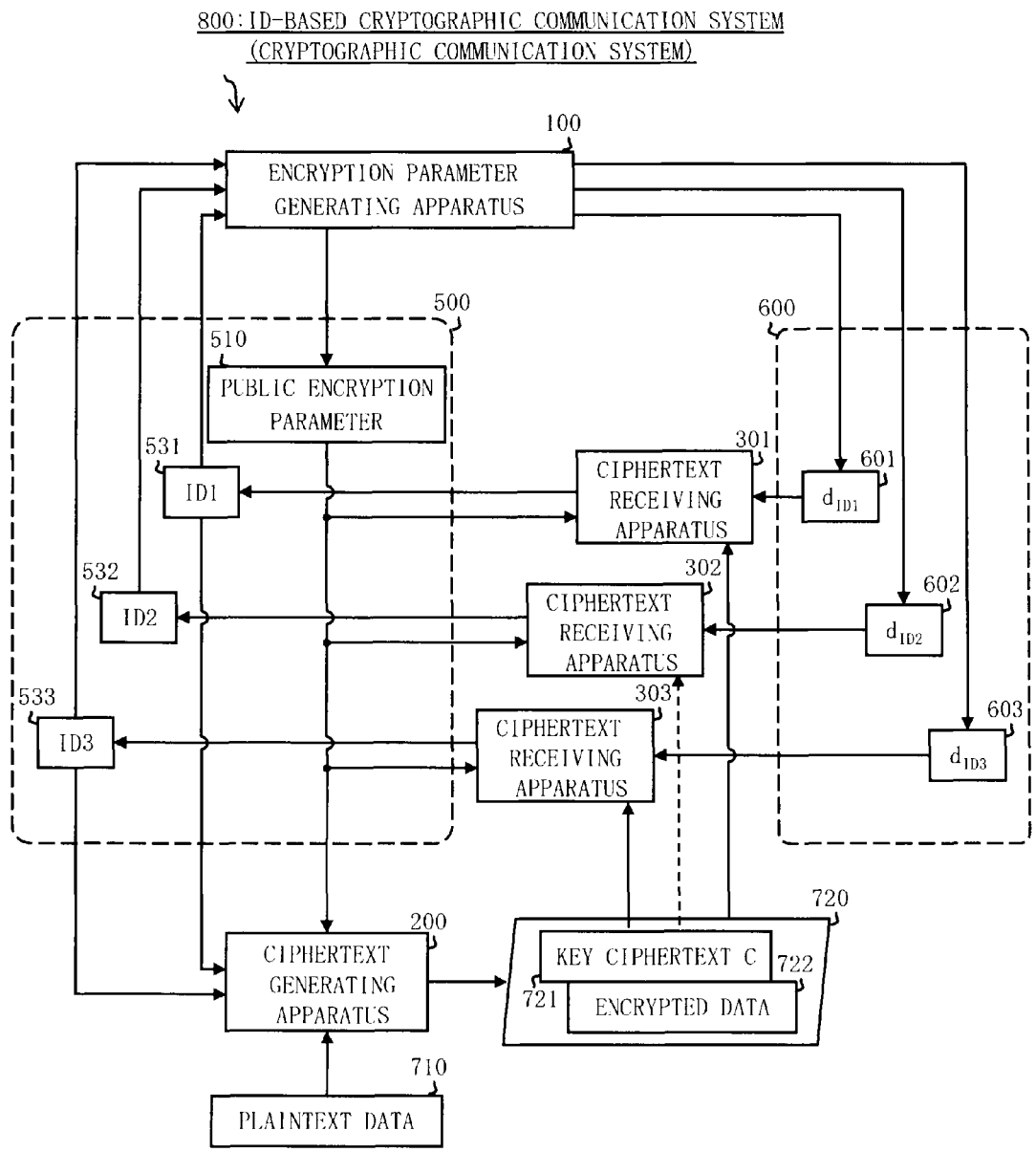
FIG. 1 shows a system configuration illustrating an example of the whole configuration of the ID-based cryptographic communication system 800 according to Embodiment 1.
Figure 2:
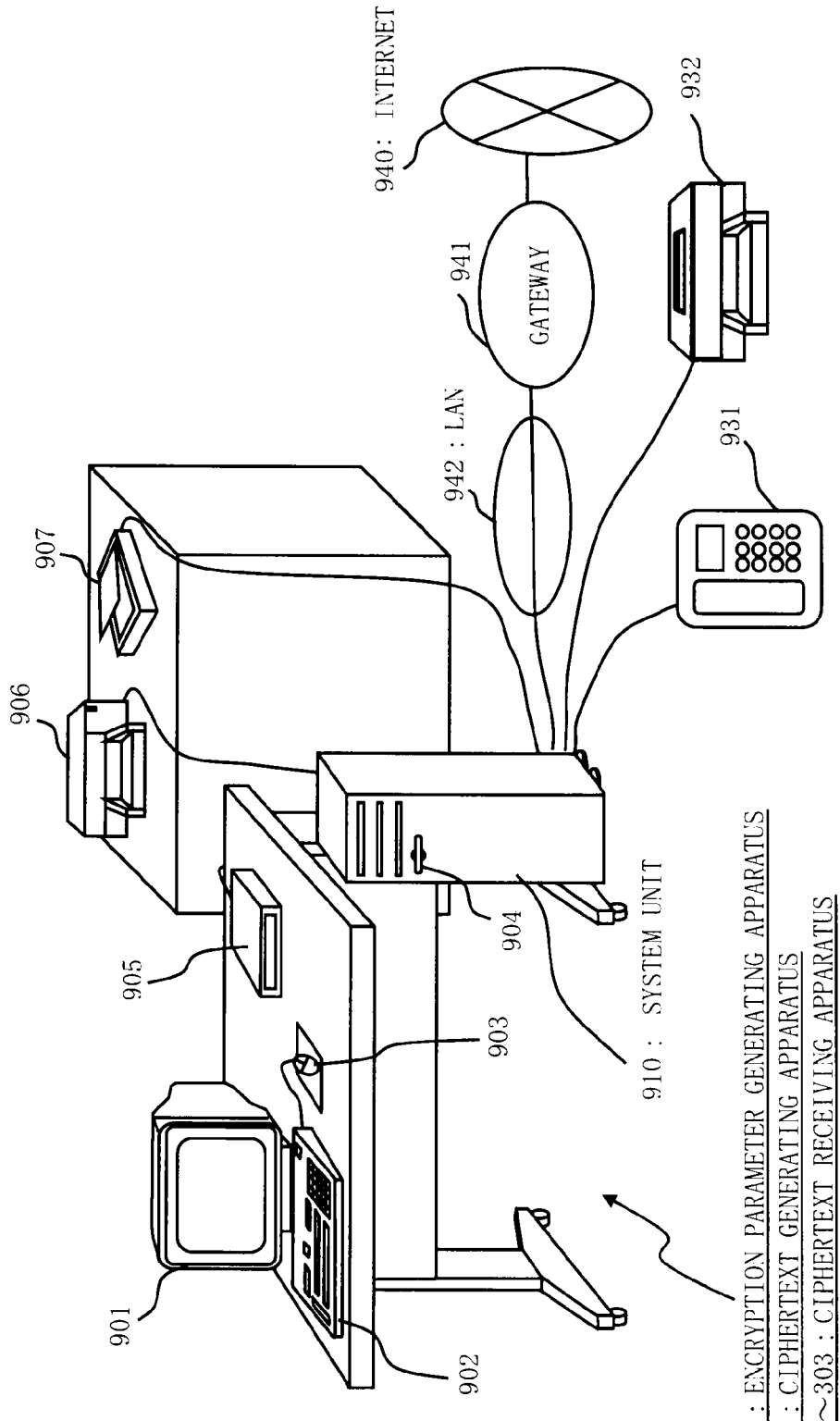
FIG. 2 shows an example of the appearance of the encryption parameter generating apparatus 100, the ciphertext generating apparatus 200, and the ciphertext receiving apparatuses 301 to 303 according to Embodiment 1.
Figure 3:
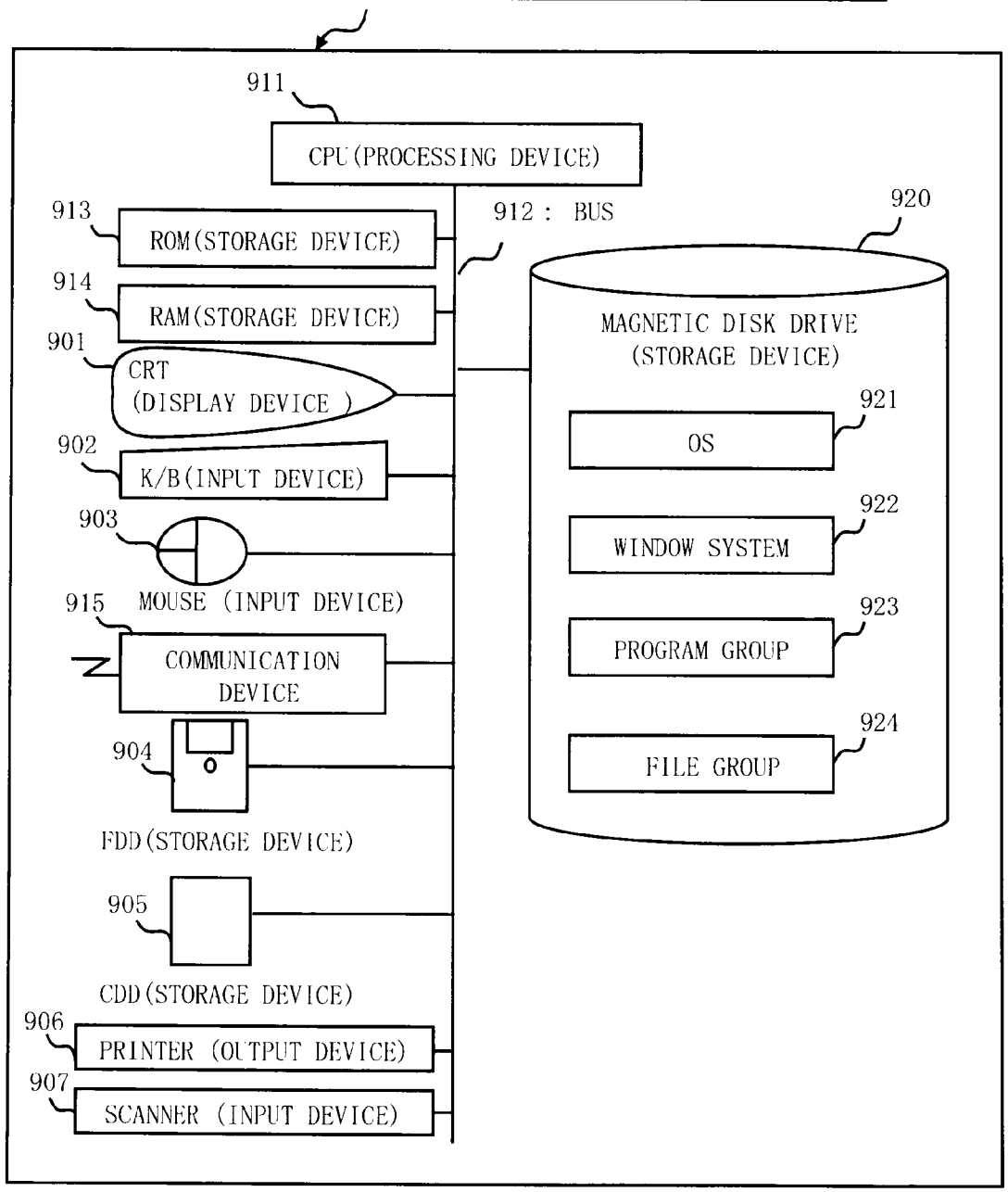
FIG. 3 shows an example of hardware resources of the encryption parameter generating apparatus 100, the ciphertext generating apparatus 200, and the ciphertext receiving apparatuses 301 to 303 according to Embodiment 1.
Figure 4:
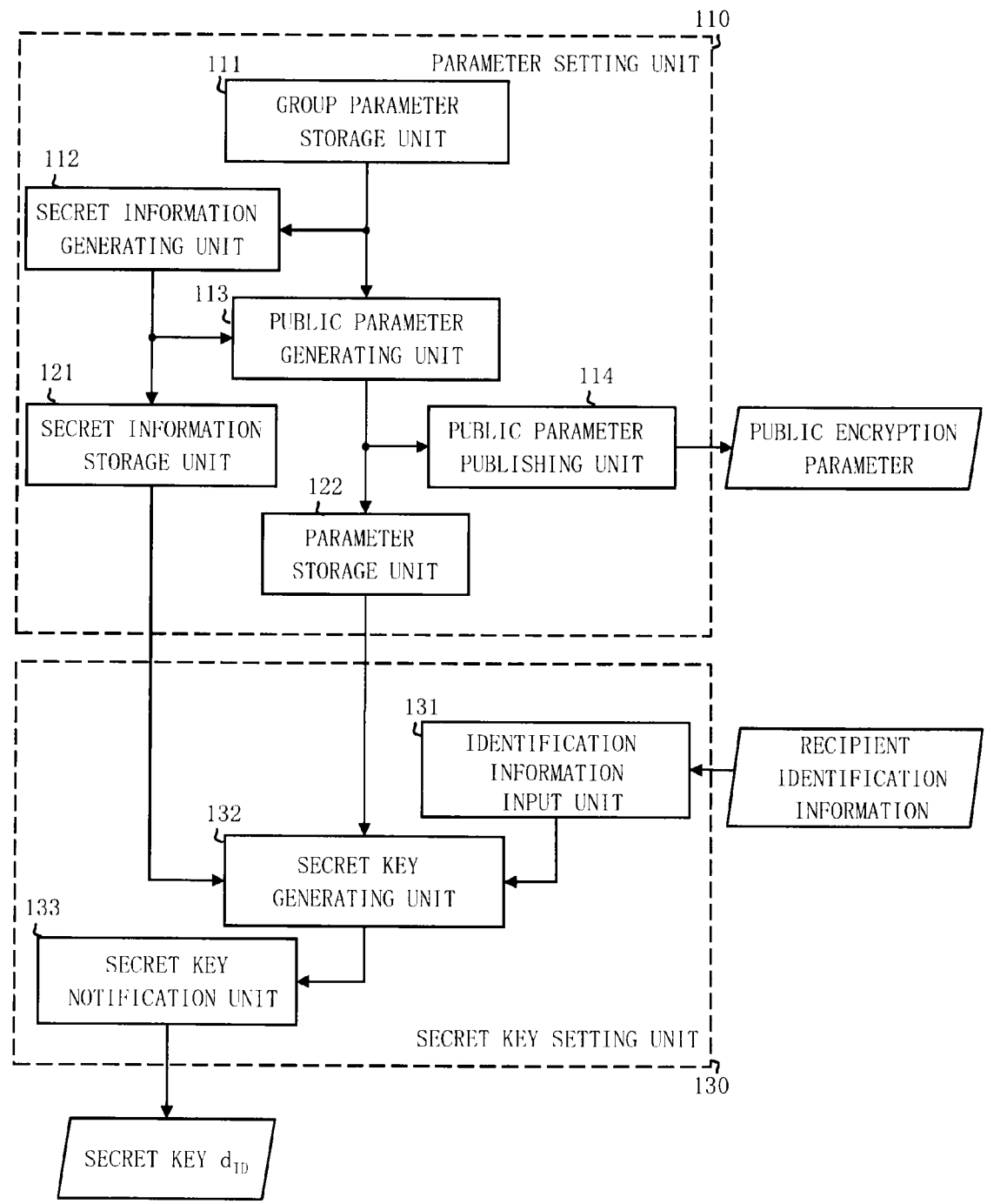
FIG. 4 is a block diagram showing an example of the functional block configuration of the encryption parameter generating apparatus 100 according to Embodiment 1.
Figure 5:
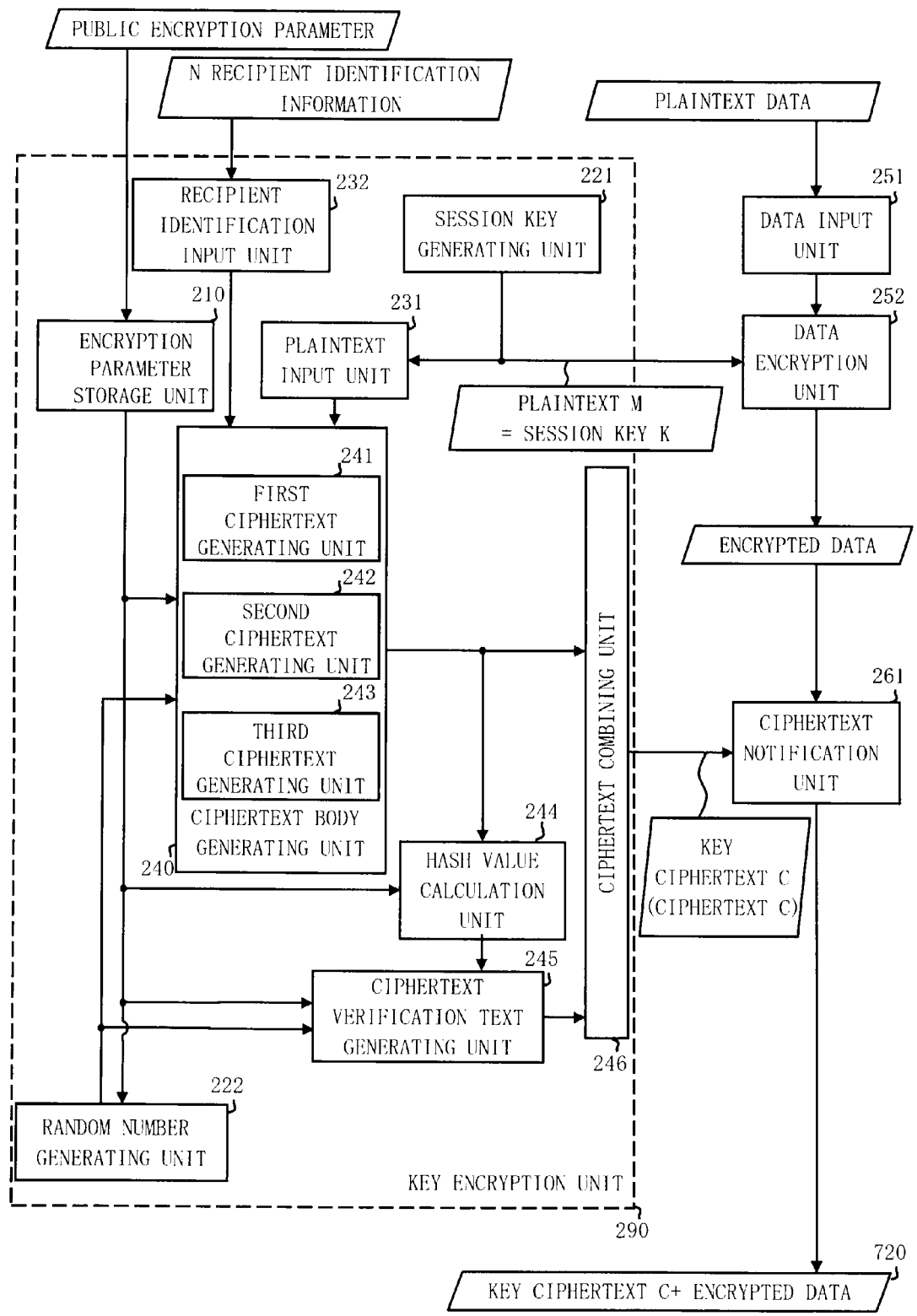
FIG. 5 is a block diagram showing an example of the functional block configuration of the ciphertext generating apparatus 200 according to Embodiment 1.
Figure 6:
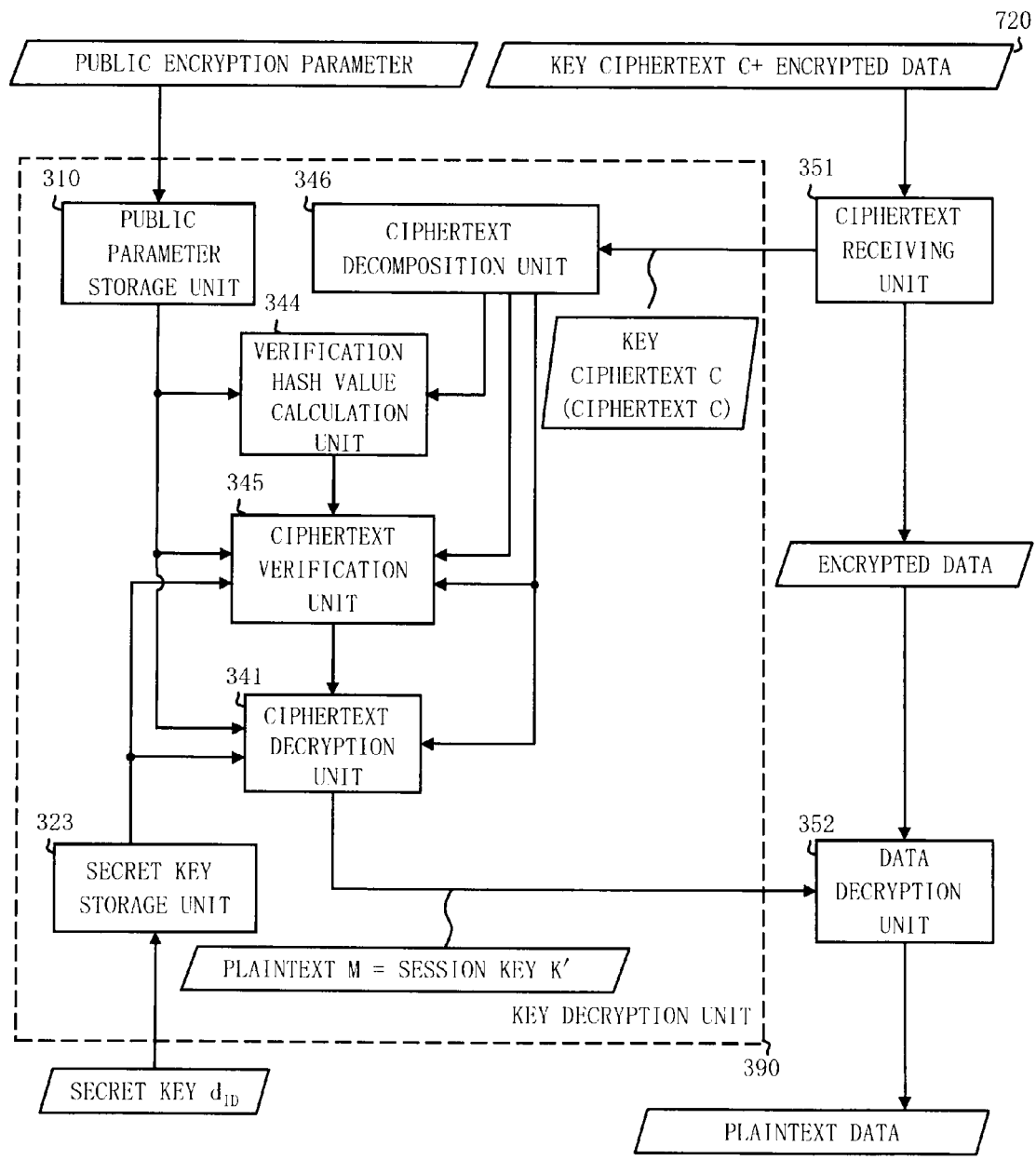
FIG. 6 is a block diagram showing an example of the functional block configuration of the ciphertext receiving apparatus 301 according to Embodiment 1.
Figure 7:
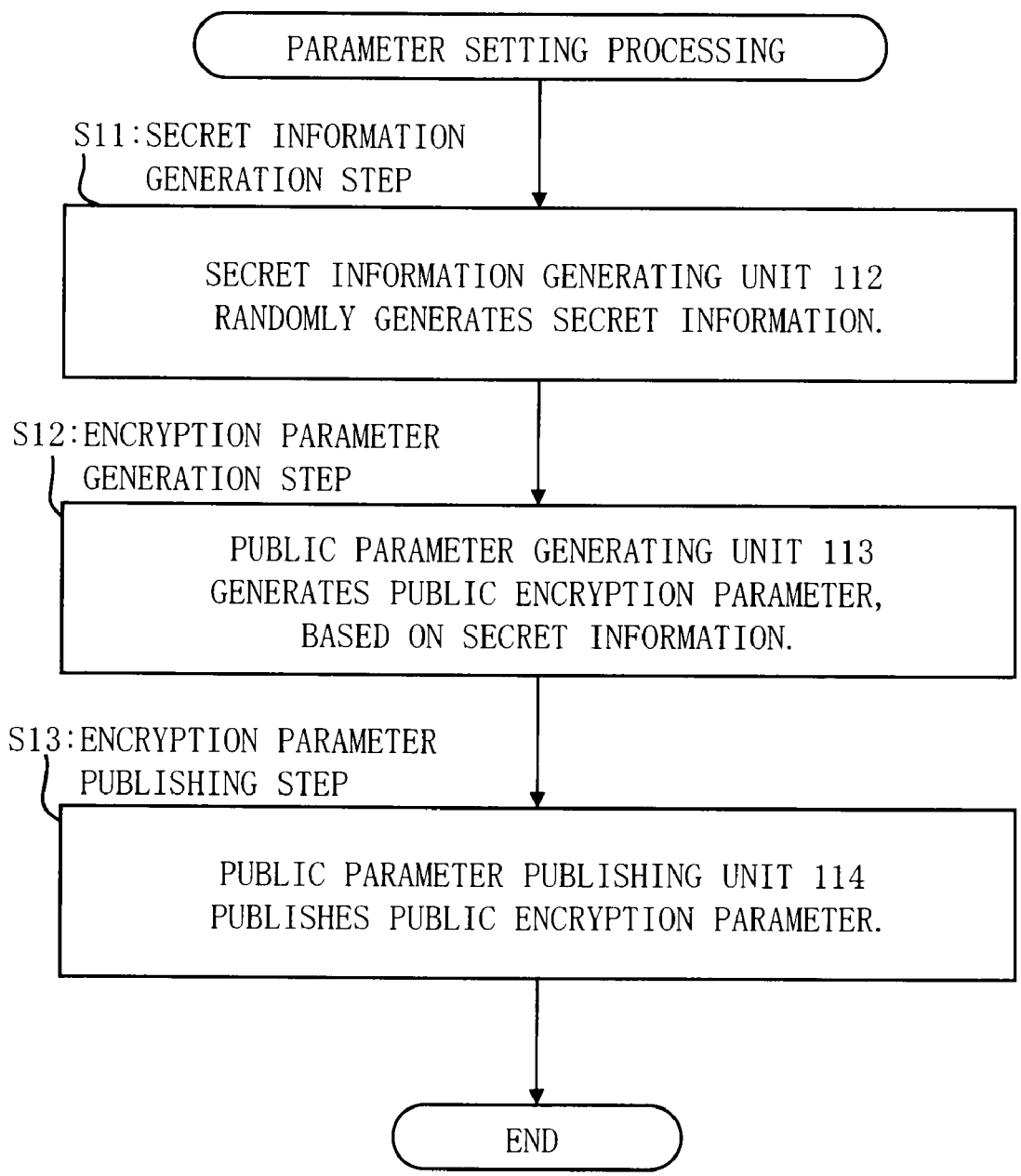
FIG. 7 is a flowchart showing an example of the flow of parameter setting processing in which the encryption parameter generating apparatus 100 sets public encryption parameters, according to Embodiment 1.
Figure 8:
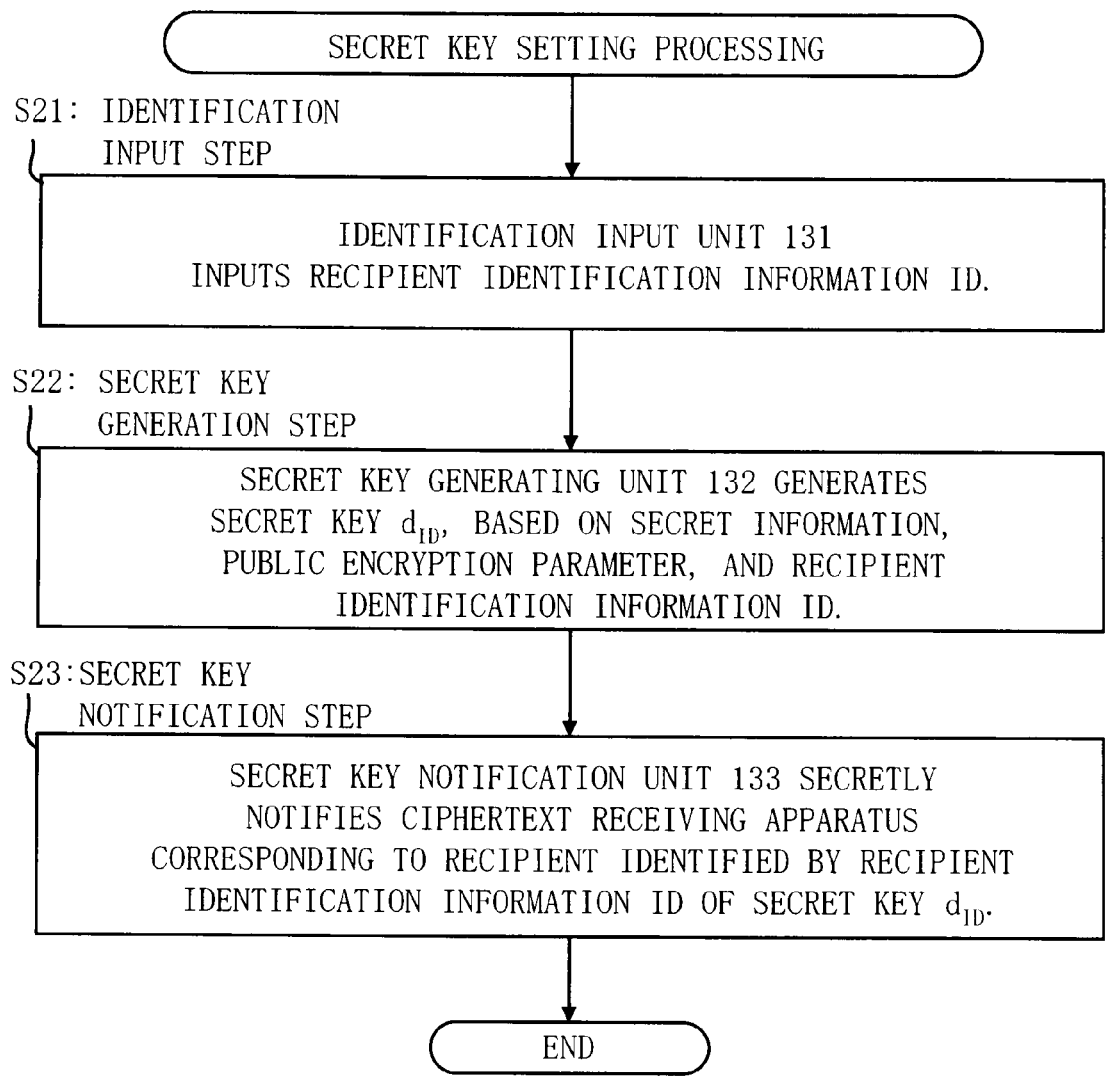
FIG. 8 is a flowchart showing an example of the flow of secret key setting processing in which the encryption parameter generating apparatus 100 sets a secret key, according to Embodiment 1.
Figure 9:
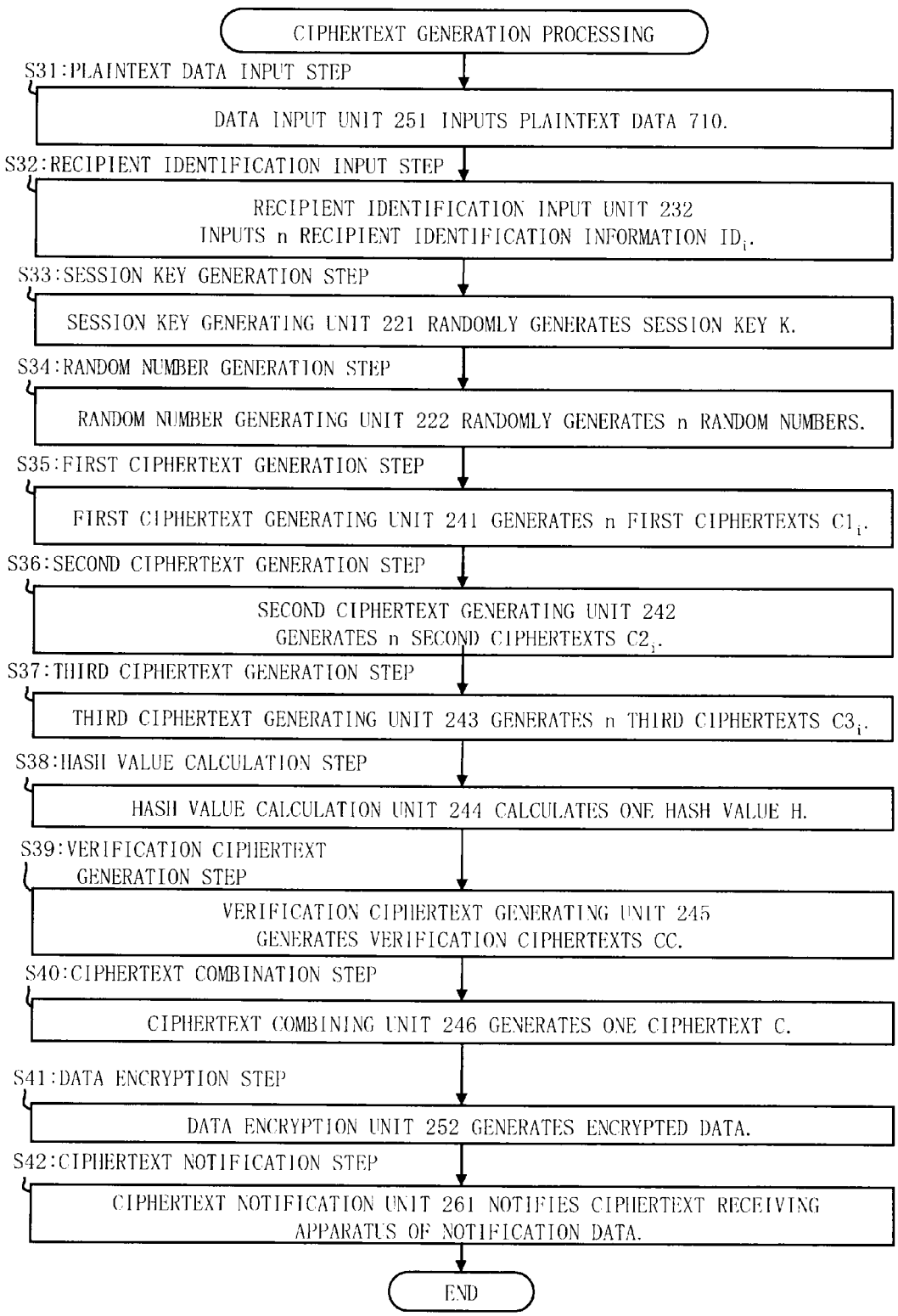
FIG. 9 is a flowchart showing an example of the flow of ciphertext generation processing in which the ciphertext generating apparatus 200 generates a ciphertext, according to Embodiment 1.
Figure 10:
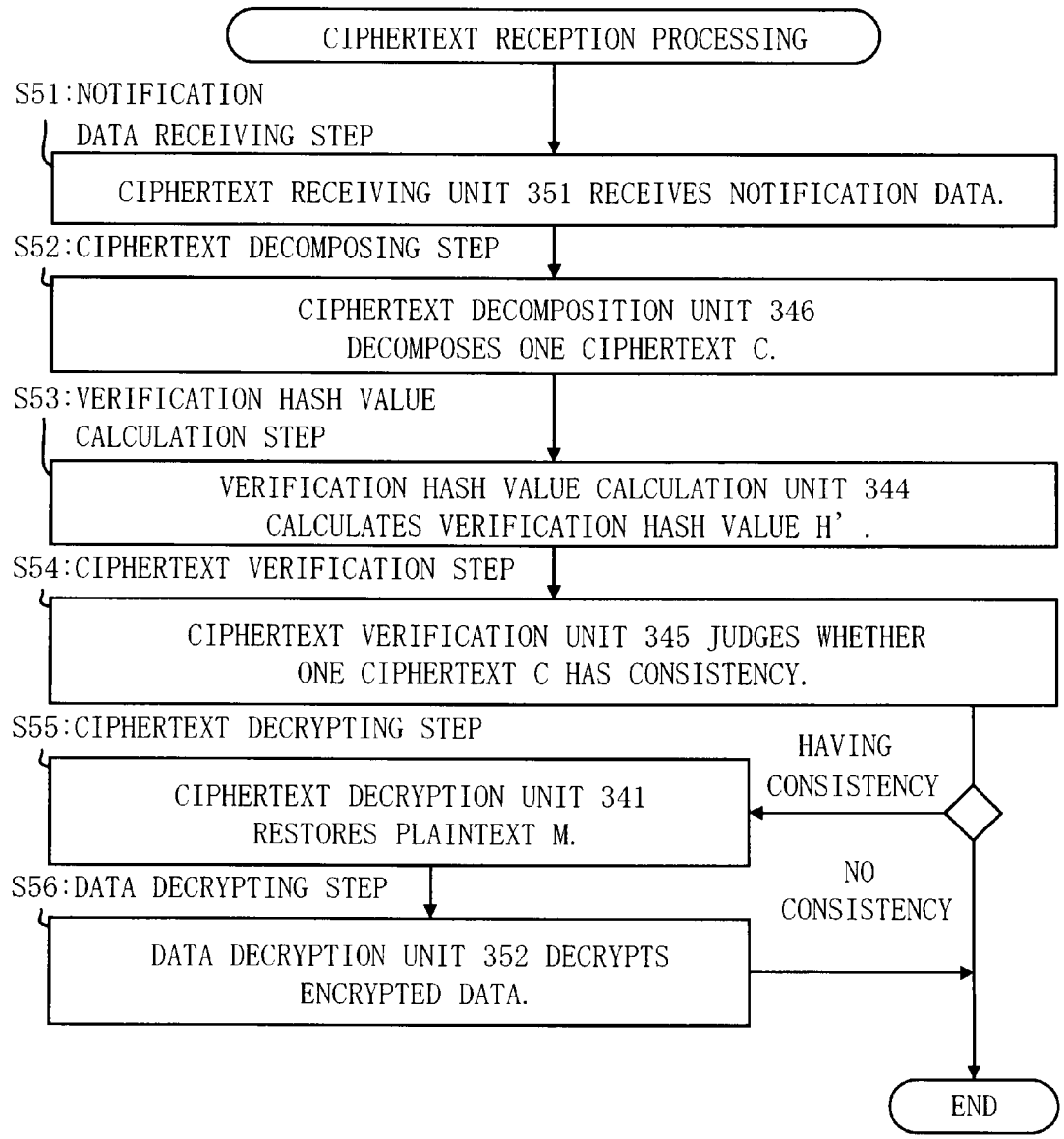
FIG. 10 is a flowchart showing an example of the flow of ciphertext reception processing in which the ciphertext receiving apparatuses 301 to 303 receive ciphertexts, according to Embodiment 1.
Figure 11:
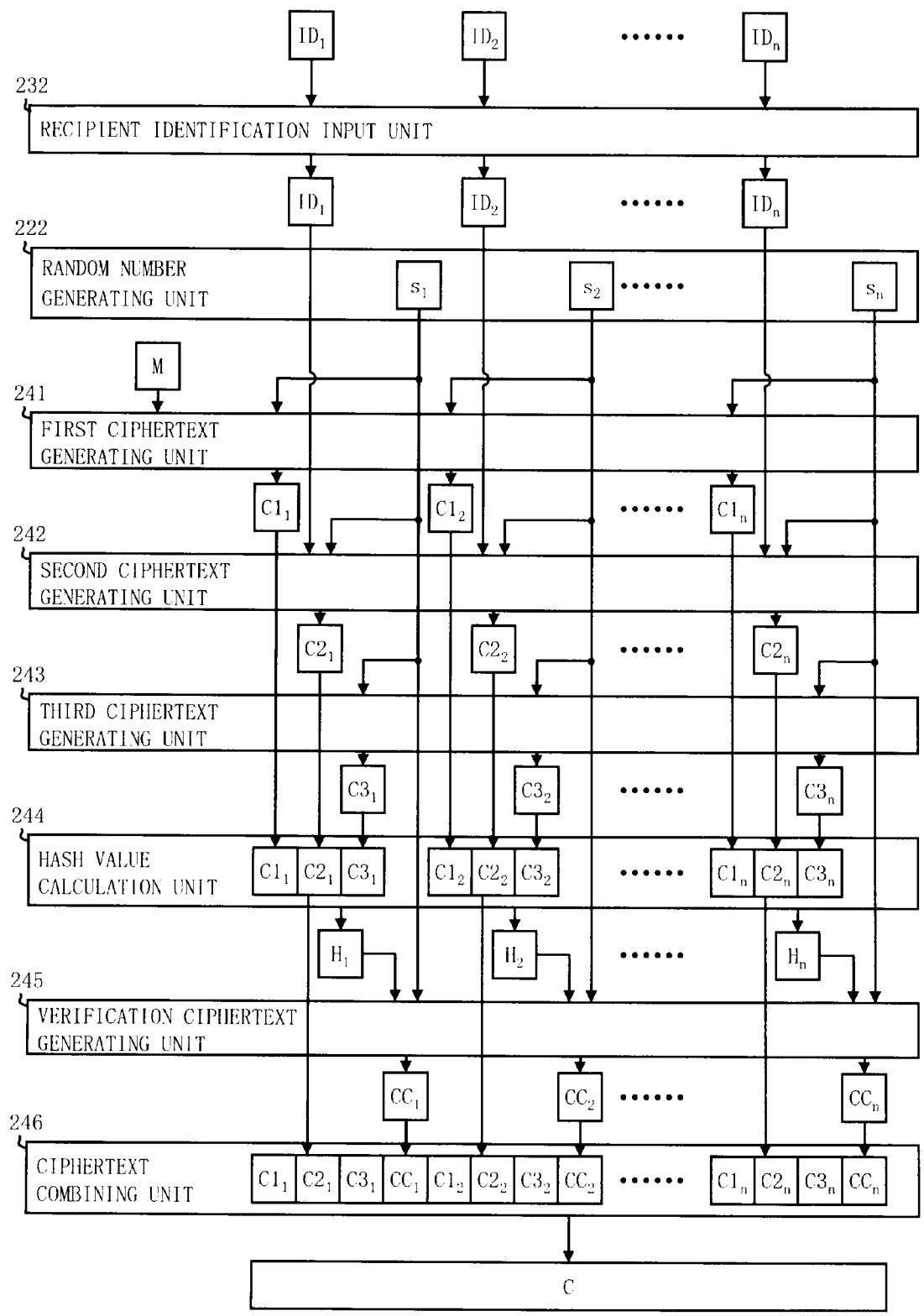
FIG. 11 shows an example of the flow of information exchanged in the ciphertext generating apparatus 200 which is a comparative example, according to Embodiment 2.
Figure 12:
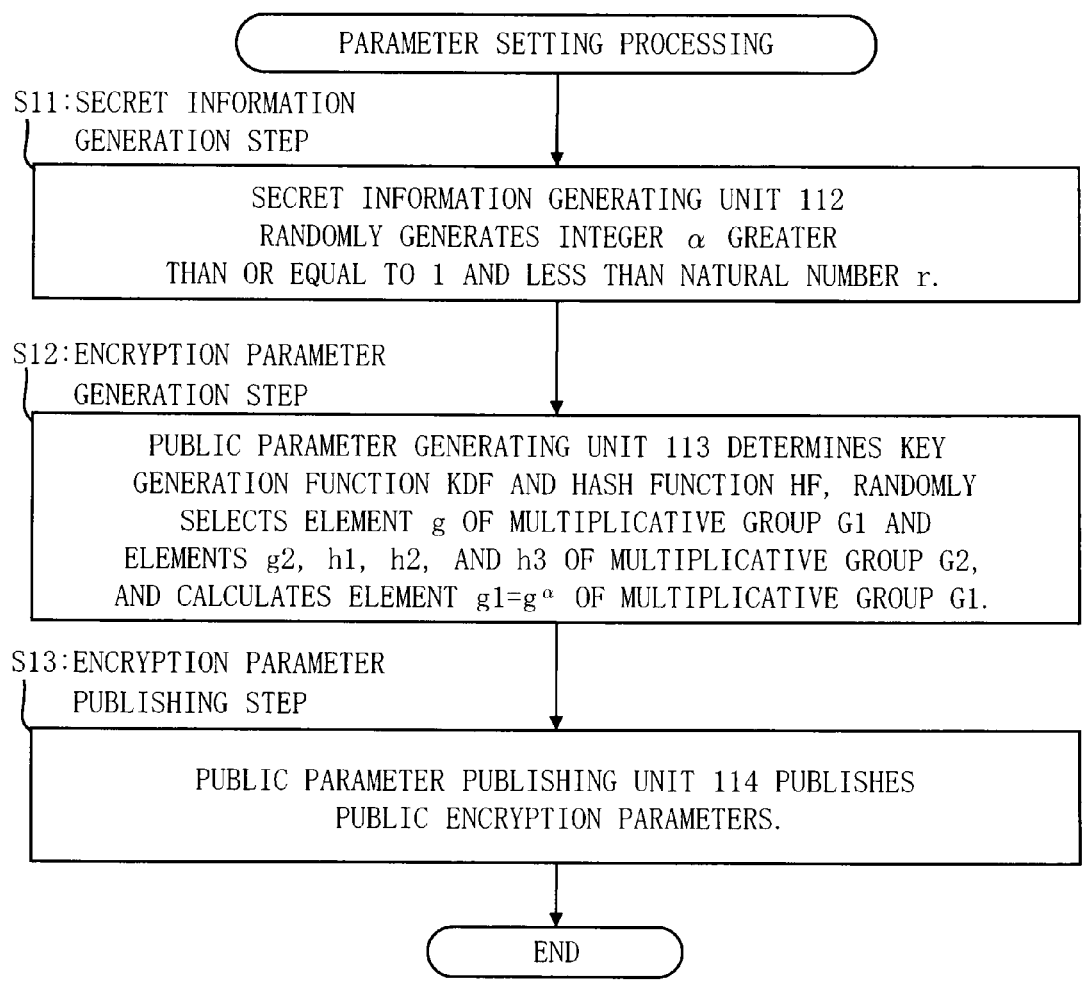
FIG. 12 is a flowchart showing an example of the flow of parameter setting processing in which the encryption parameter generating apparatus 100 being a comparative example sets a public encryption parameter, according to Embodiment 2.
Figure 13:
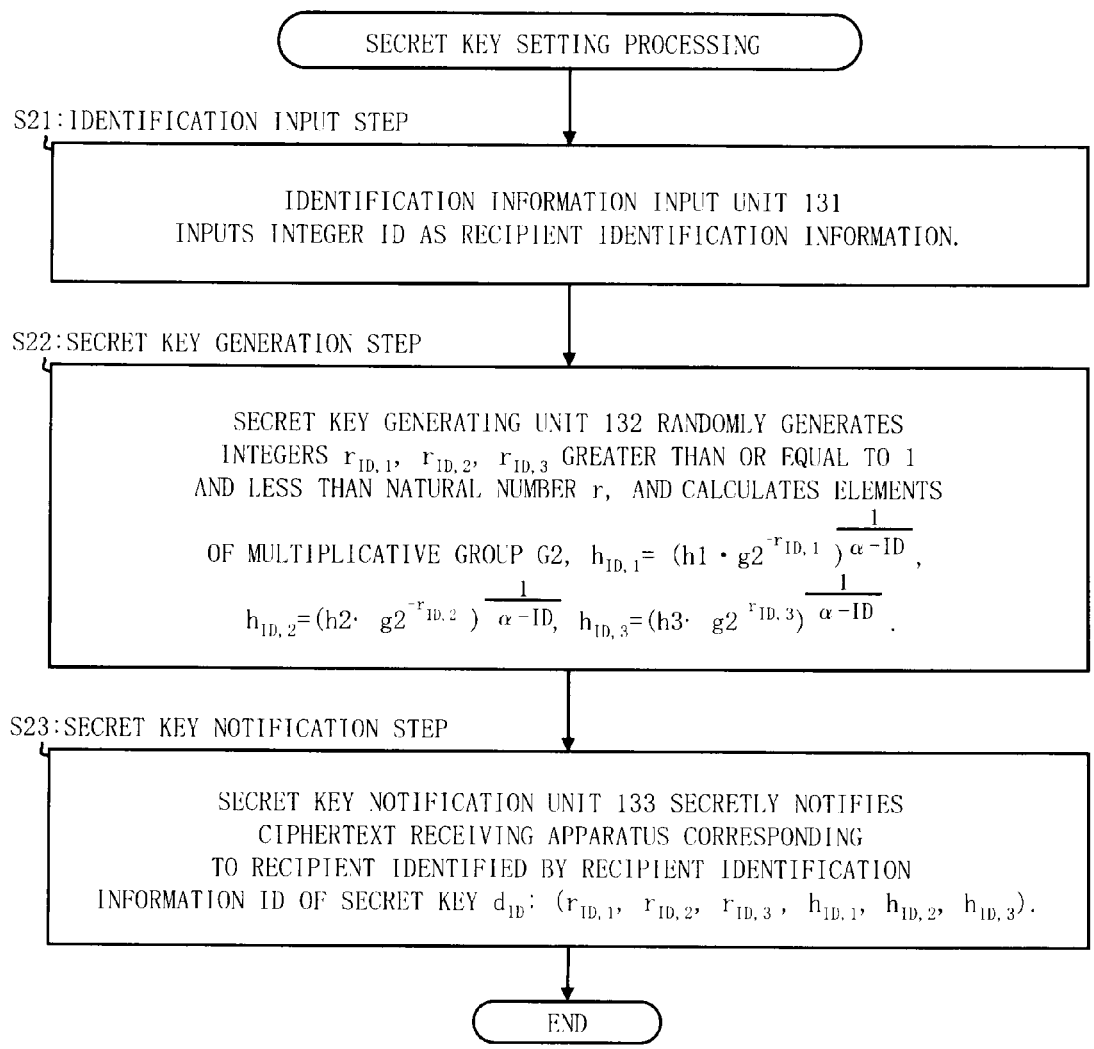
FIG. 13 is a flowchart showing an example of the flow of secret key setting processing in which the encryption parameter generating apparatus 100 being a comparative example sets a secret key, according to Embodiment 2.
Figure 15:
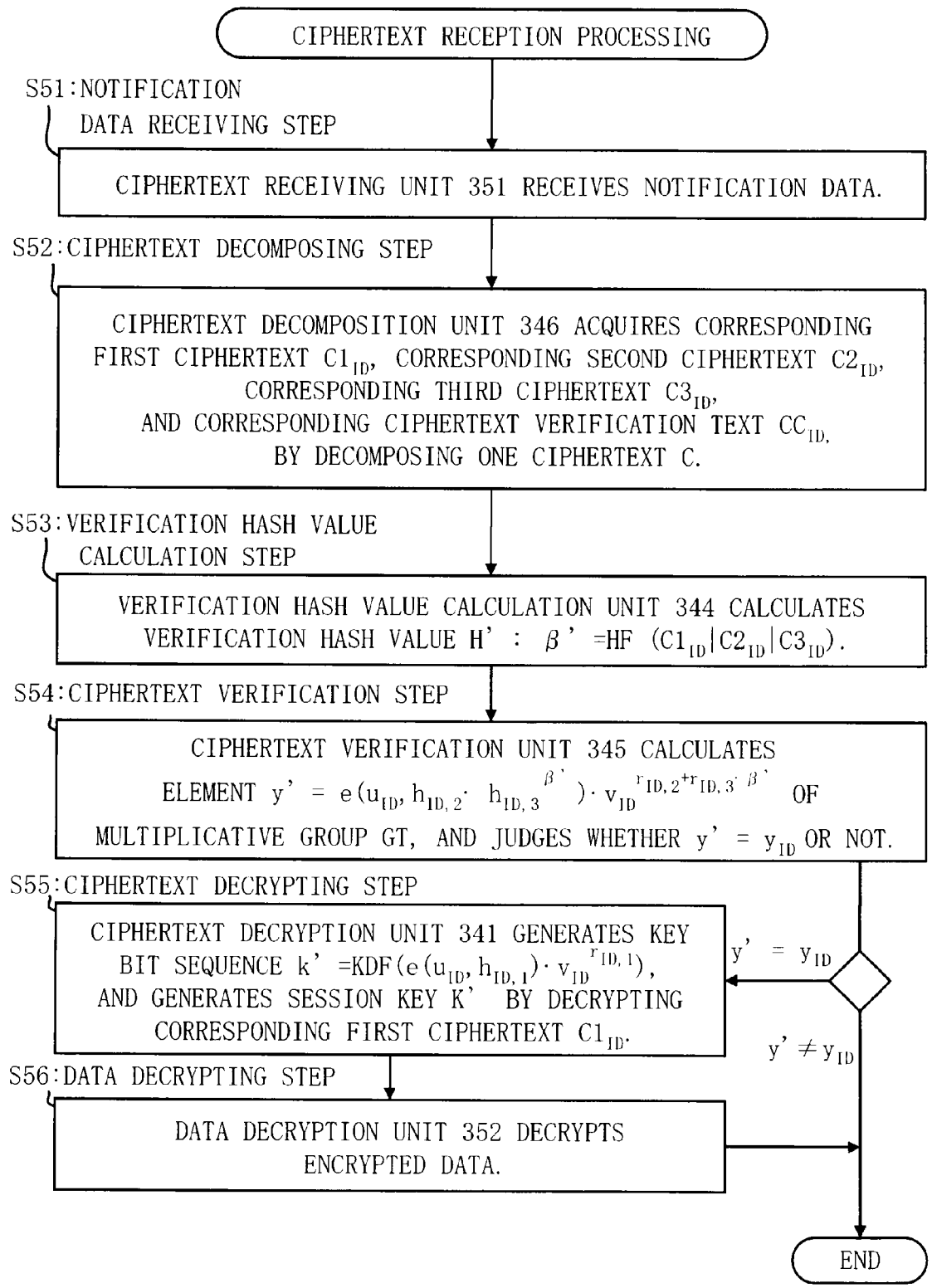
FIG. 15 is a flowchart showing an example of the flow of ciphertext reception processing in which the ciphertext receiving apparatuses 301 to 303 being comparative examples receive ciphertexts, according to Embodiment 2.
Figure 16:
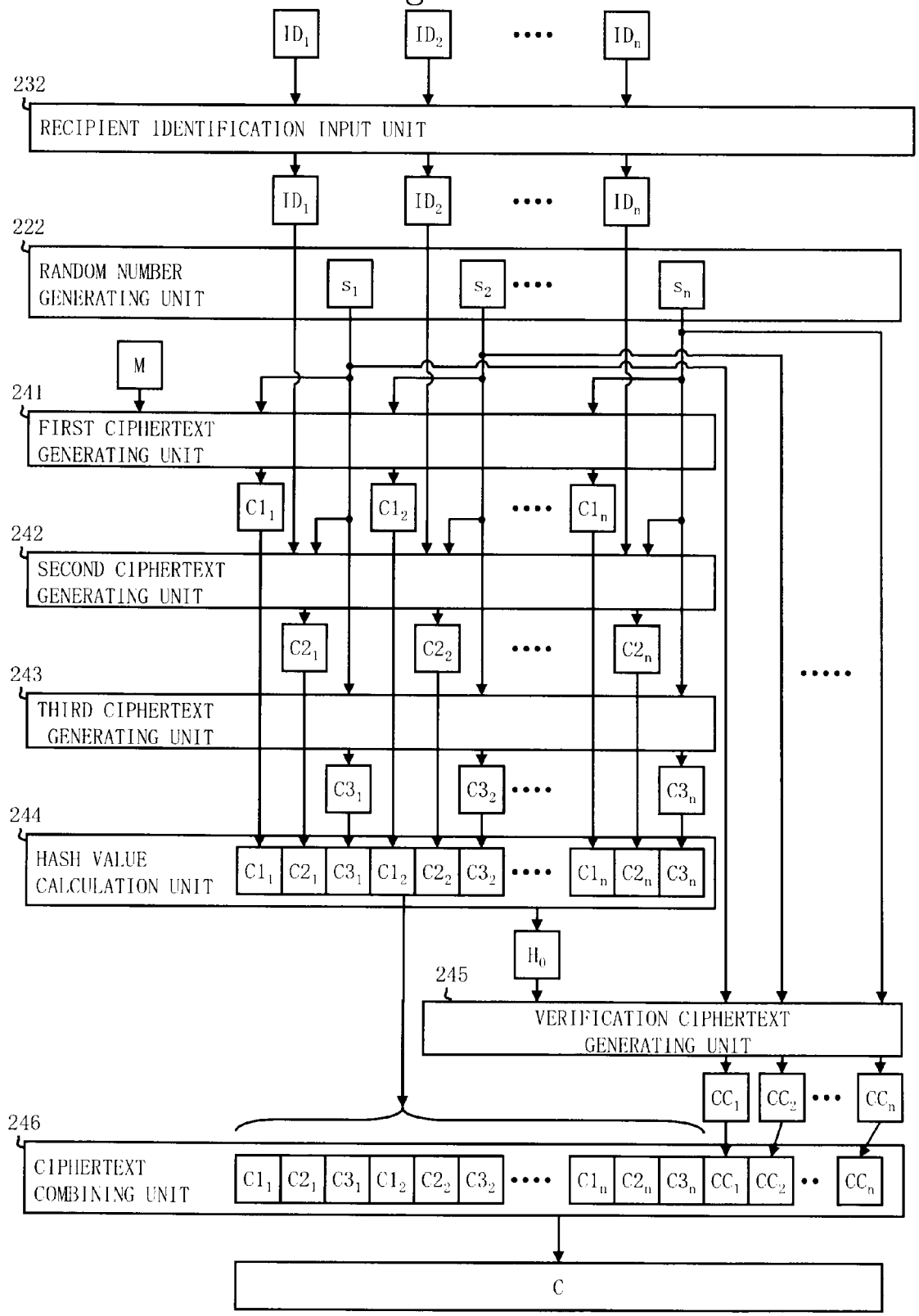
FIG. 16 shows an example of the flow of information exchanged in the ciphertext generating apparatus 200 according to Embodiment 2.
Figure 17:
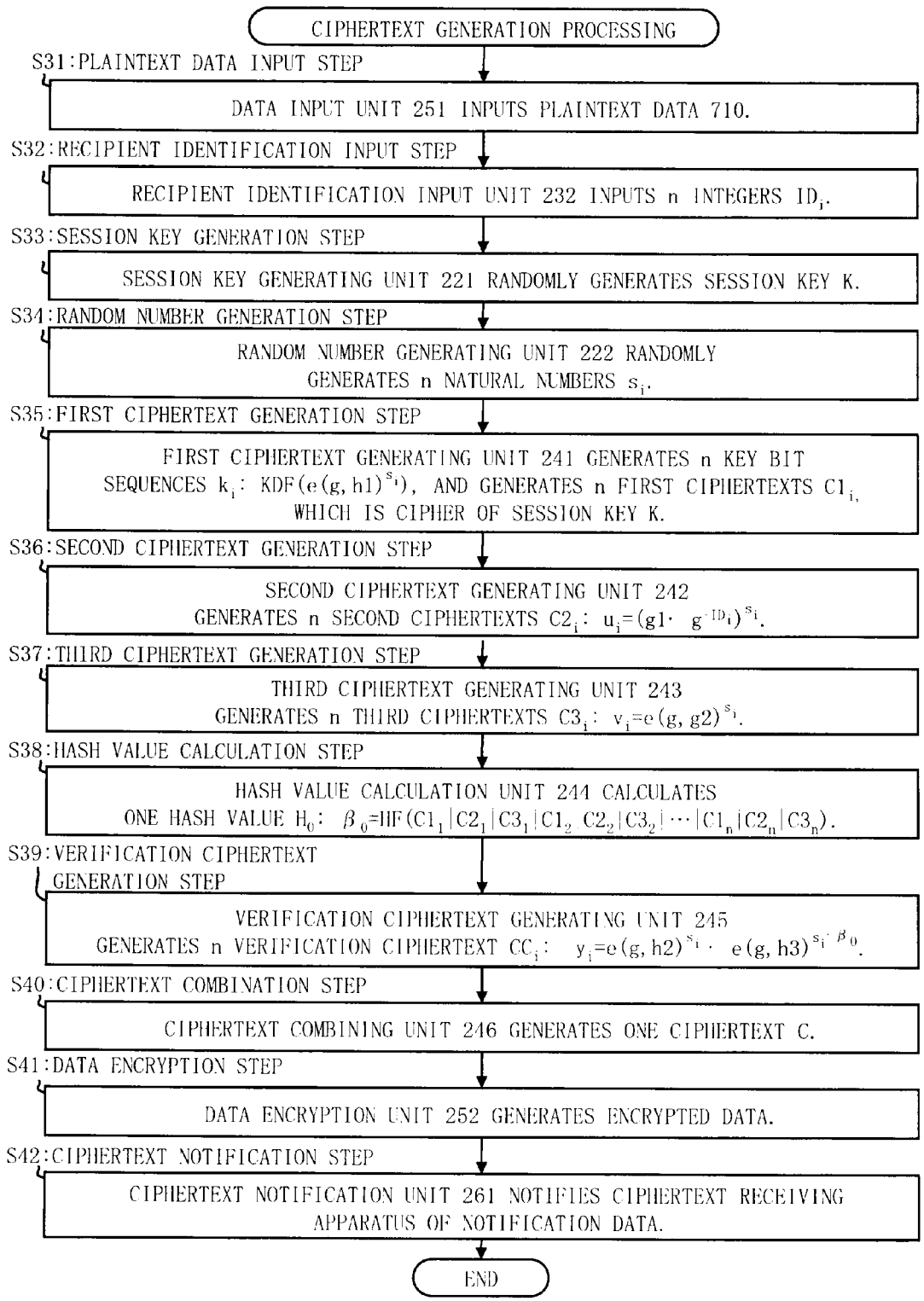
FIG. 17 is a flowchart showing an example of the flow of ciphertext generation processing in which the ciphertext generating apparatus 200 generates a ciphertext, according to Embodiment 2.
Figure 18:
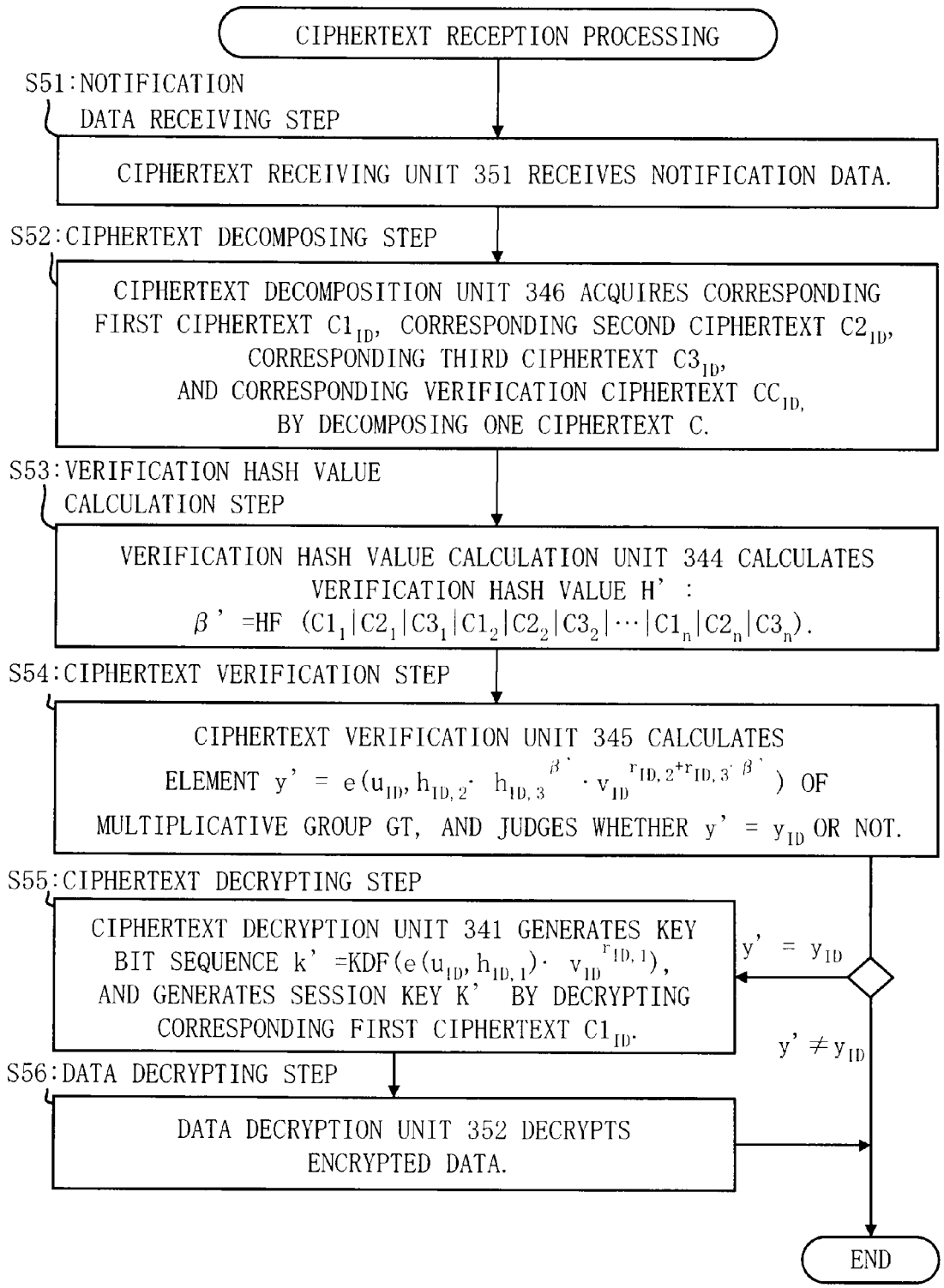
FIG. 18 is a flowchart showing an example of the flow of ciphertext reception processing in which the ciphertext receiving apparatuses 301 to 303 receive ciphertexts, according to Embodiment 2.
Figure 19:
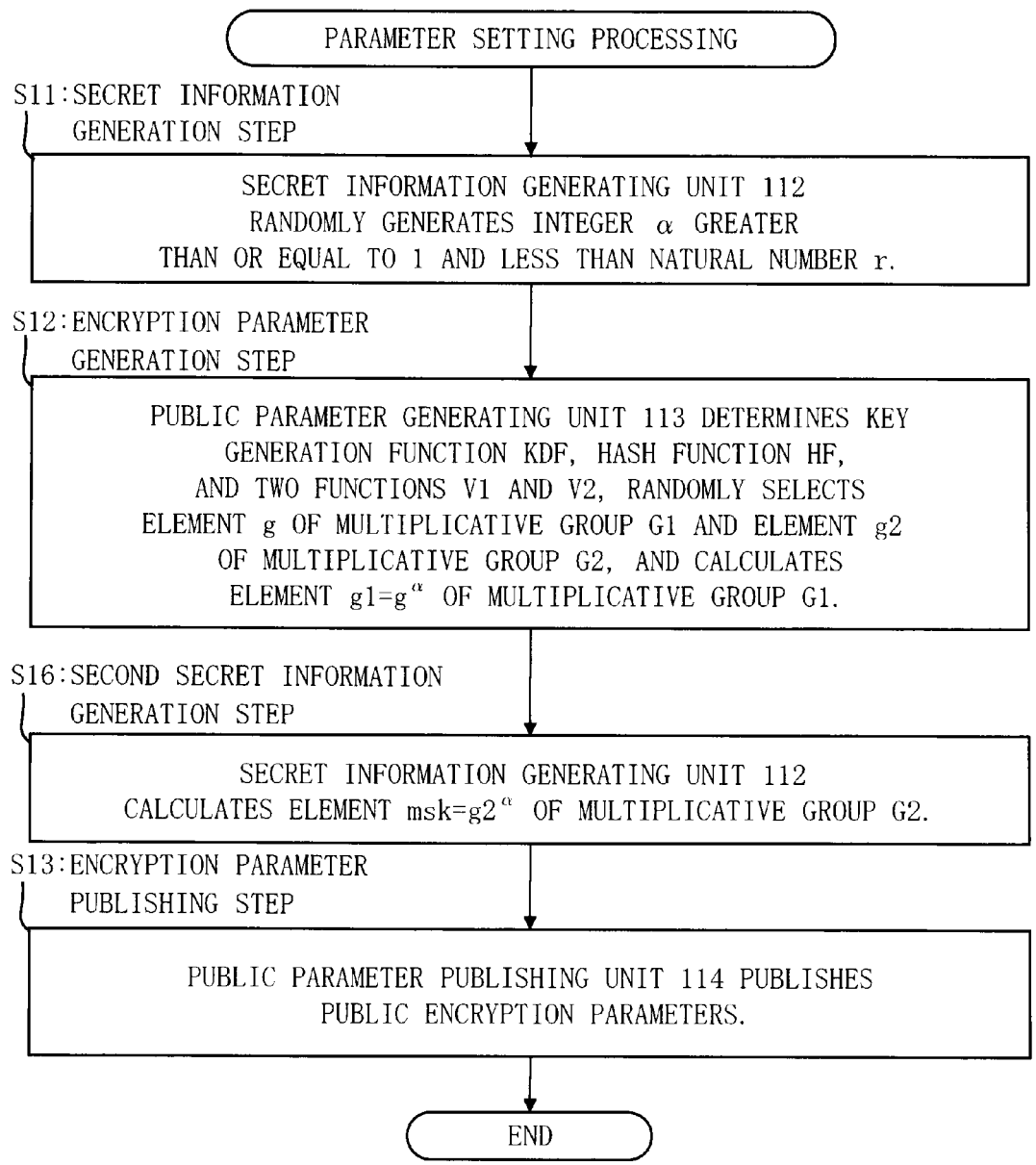
FIG. 19 is a flowchart showing an example of the flow of parameter setting processing in which the encryption parameter generating apparatus 100 being a comparative example sets a public encryption parameter, according to Embodiment 3.
Figure 20:
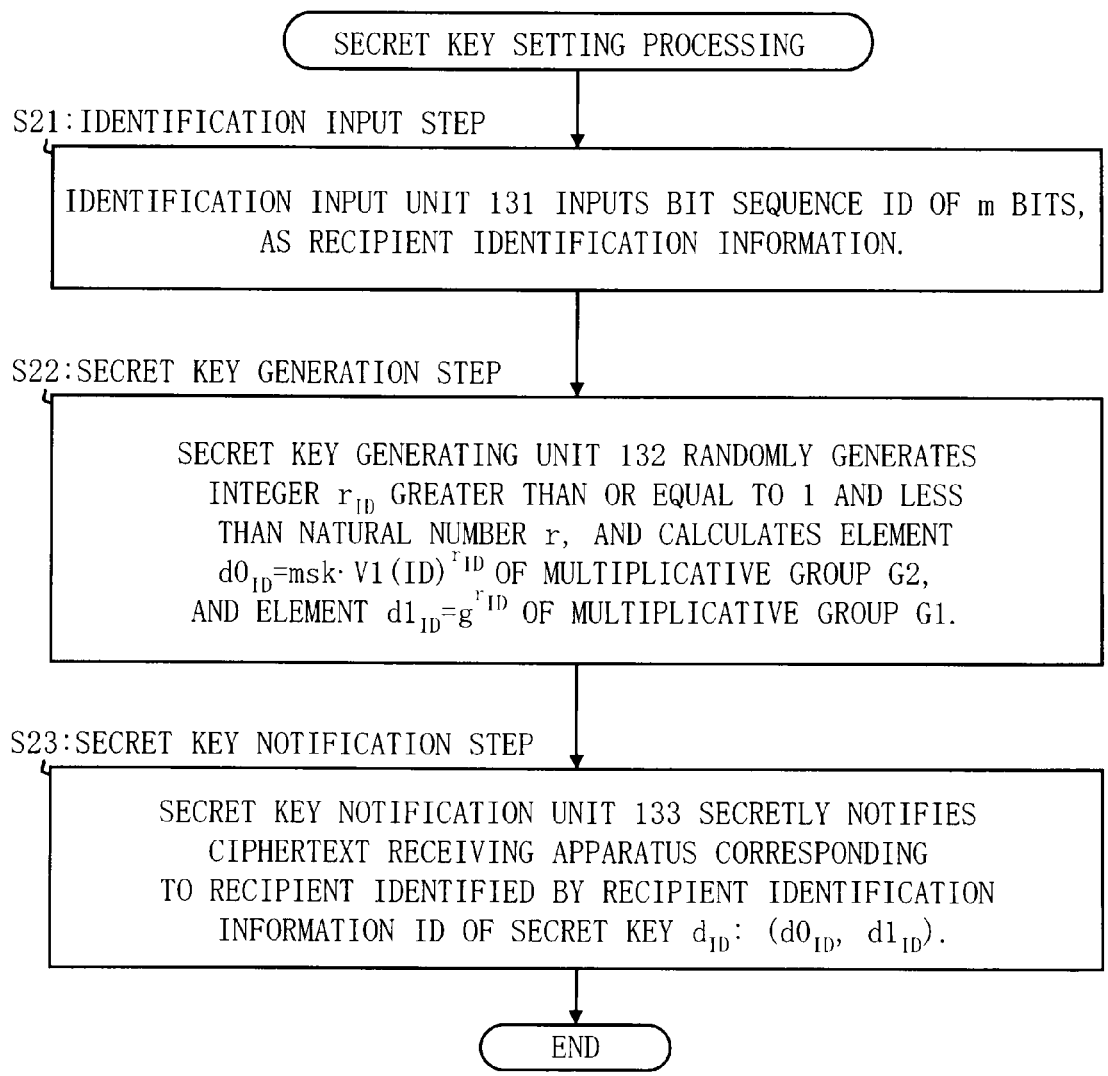
FIG. 20 is a flowchart showing an example of the flow of secret key setting processing in which the encryption parameter generating apparatus 100 being a comparative example sets a secret key, according to Embodiment 3.
Figure 22:
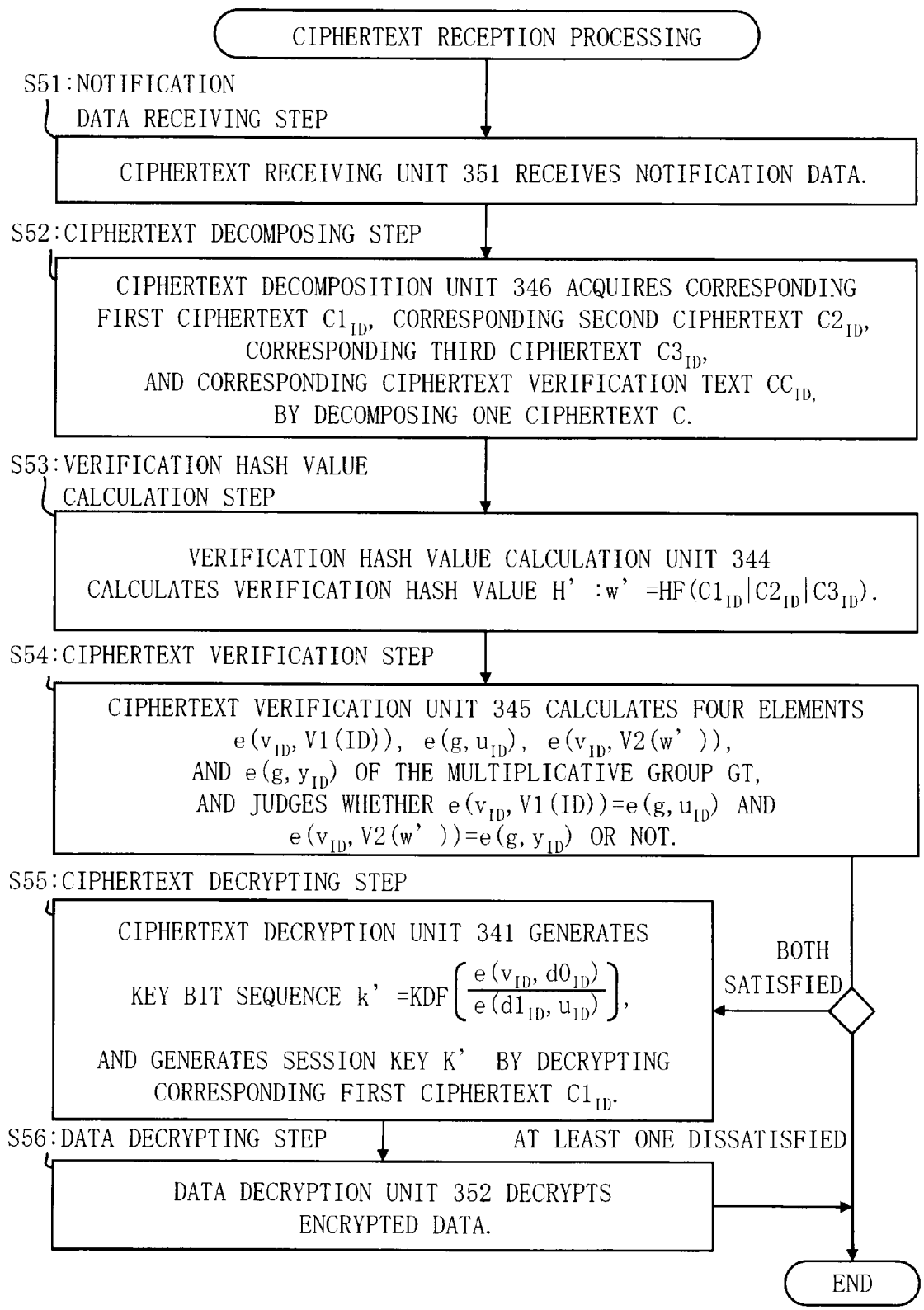
FIG. 22 is a flowchart showing an example of the flow of ciphertext reception processing in which the ciphertext receiving apparatuses 301 to 303 being comparative examples receive ciphertexts, according to Embodiment 3.
Figure 23:
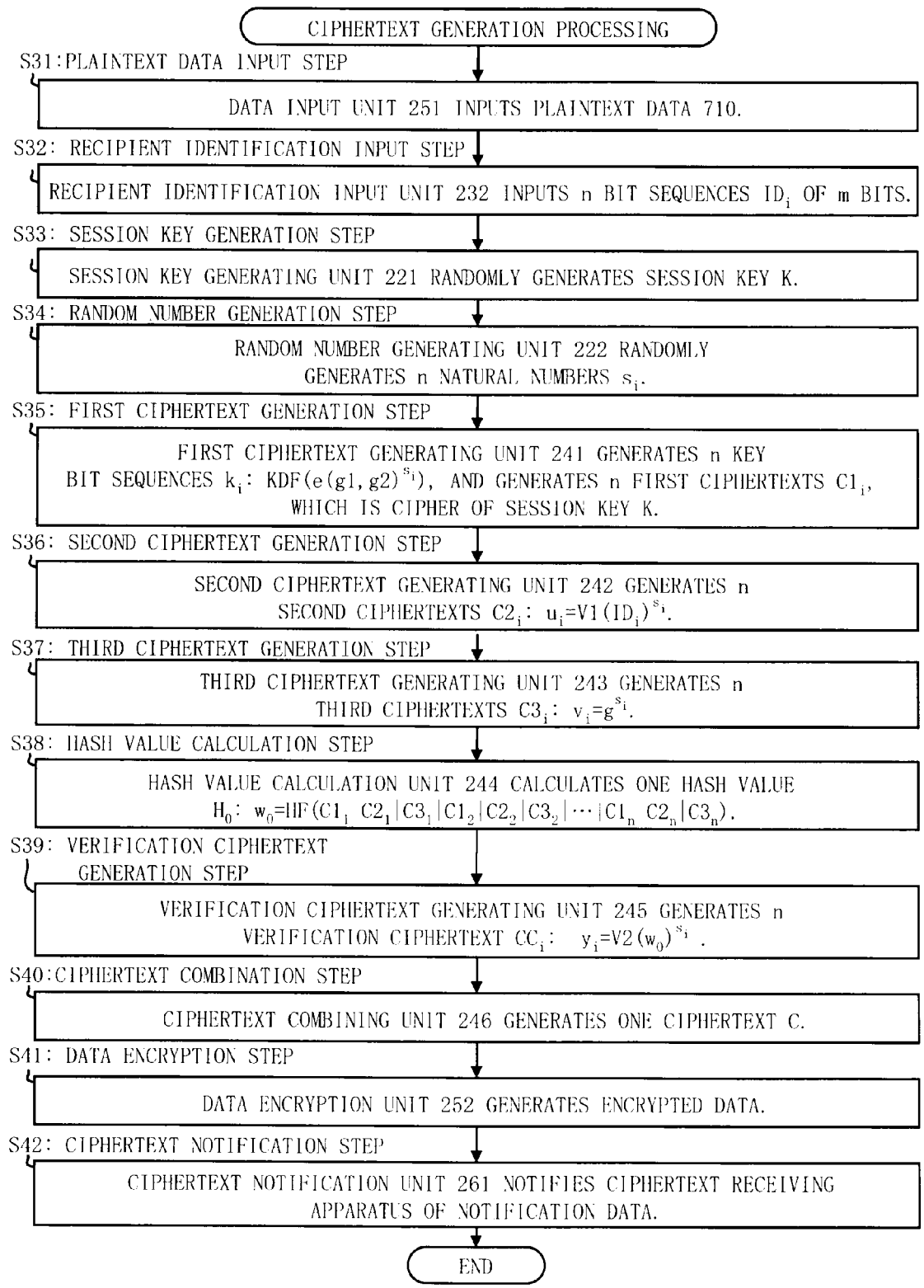
FIG. 23 is a flowchart showing an example of the flow of ciphertext generation processing in which the ciphertext generating apparatus 200 generates a ciphertext, according to Embodiment 3.
Figure 24:
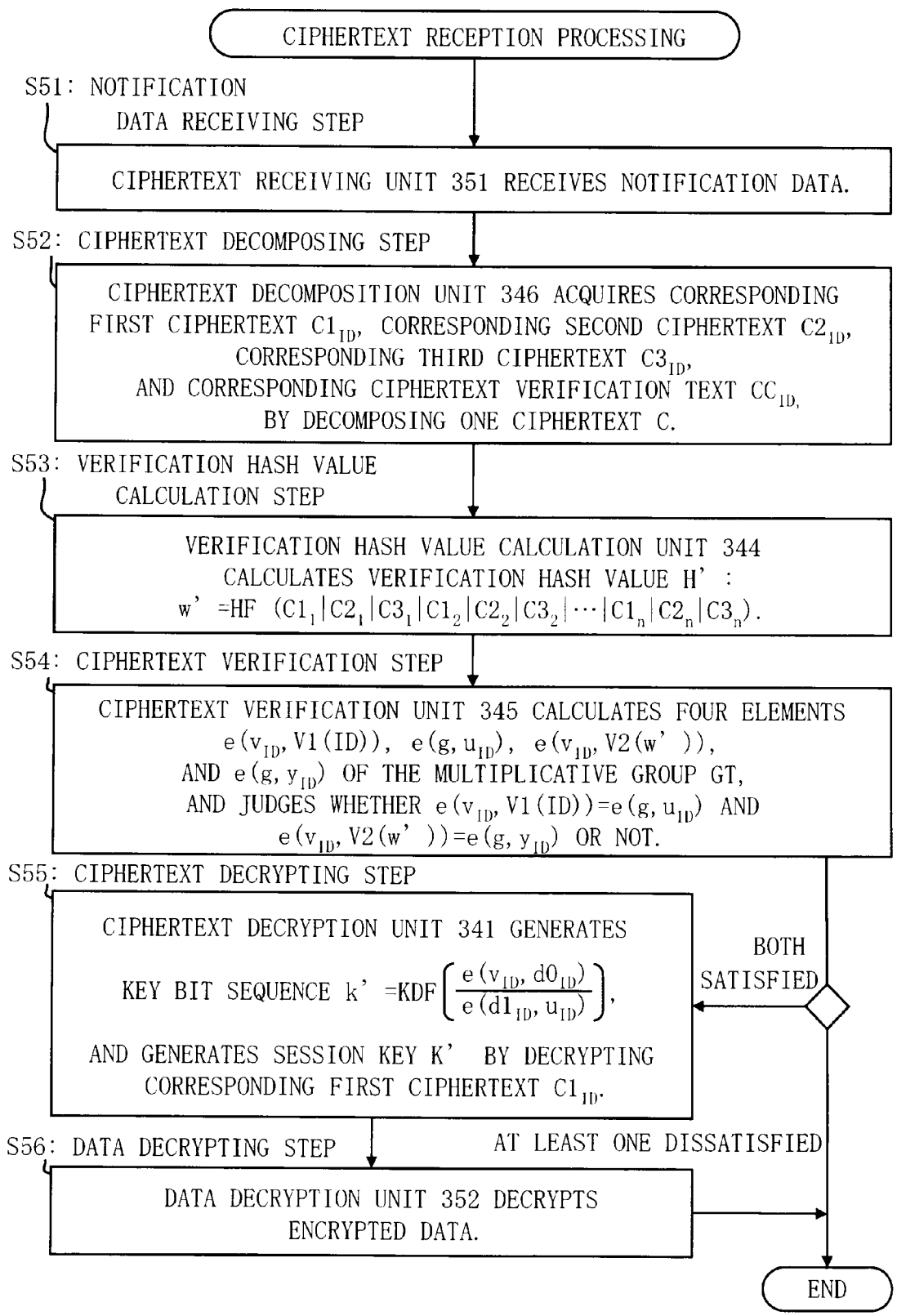
FIG. 24 is a flowchart showing an example of the flow of ciphertext reception processing in which the ciphertext receiving apparatuses 301 to 303 receive ciphertexts, according to Embodiment 3.
Figure 25:
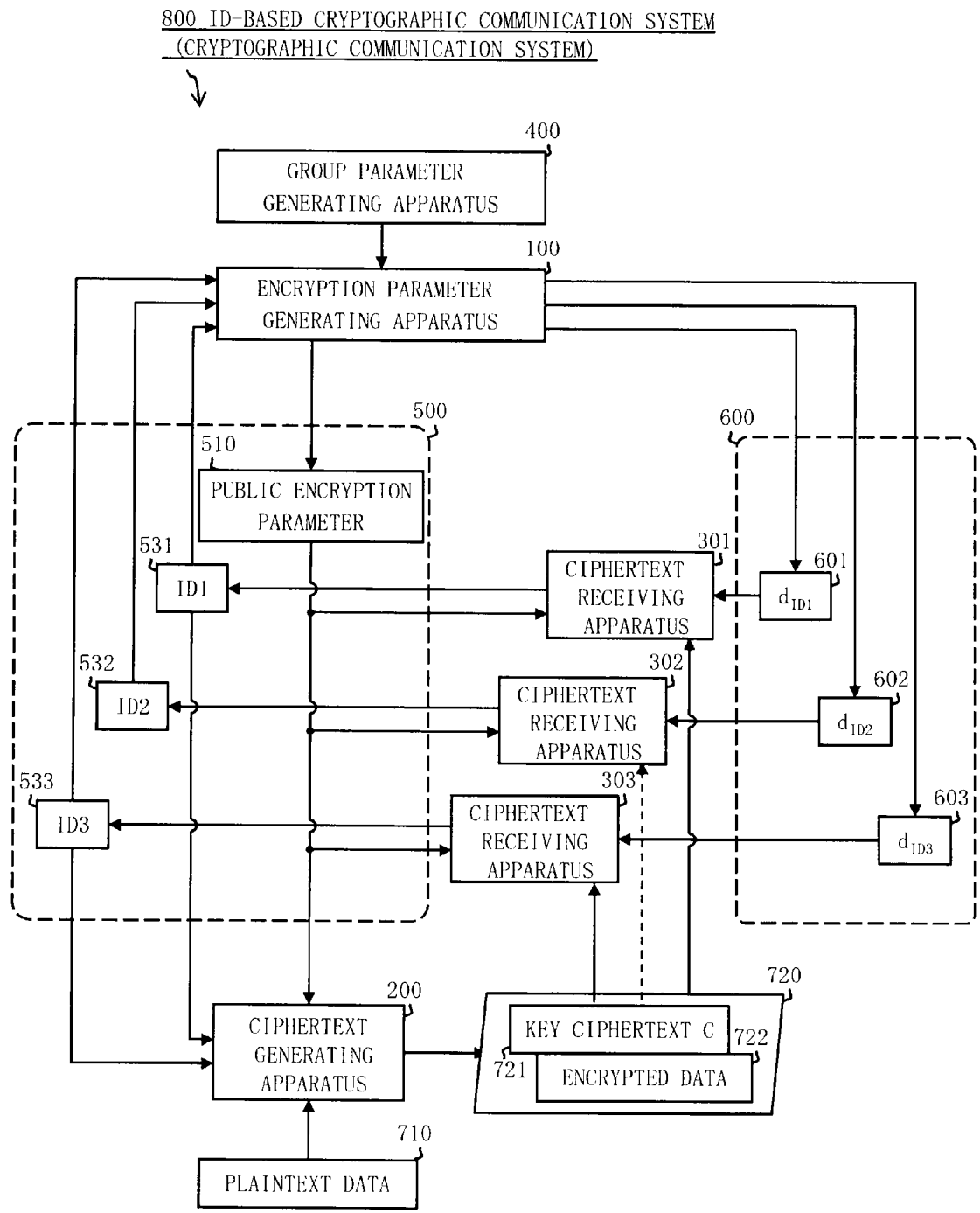
FIG. 25 shows a system configuration illustrating an example of the whole configuration of the ID-based cryptographic communication system 800 according to Embodiment 4.
Figure 26:
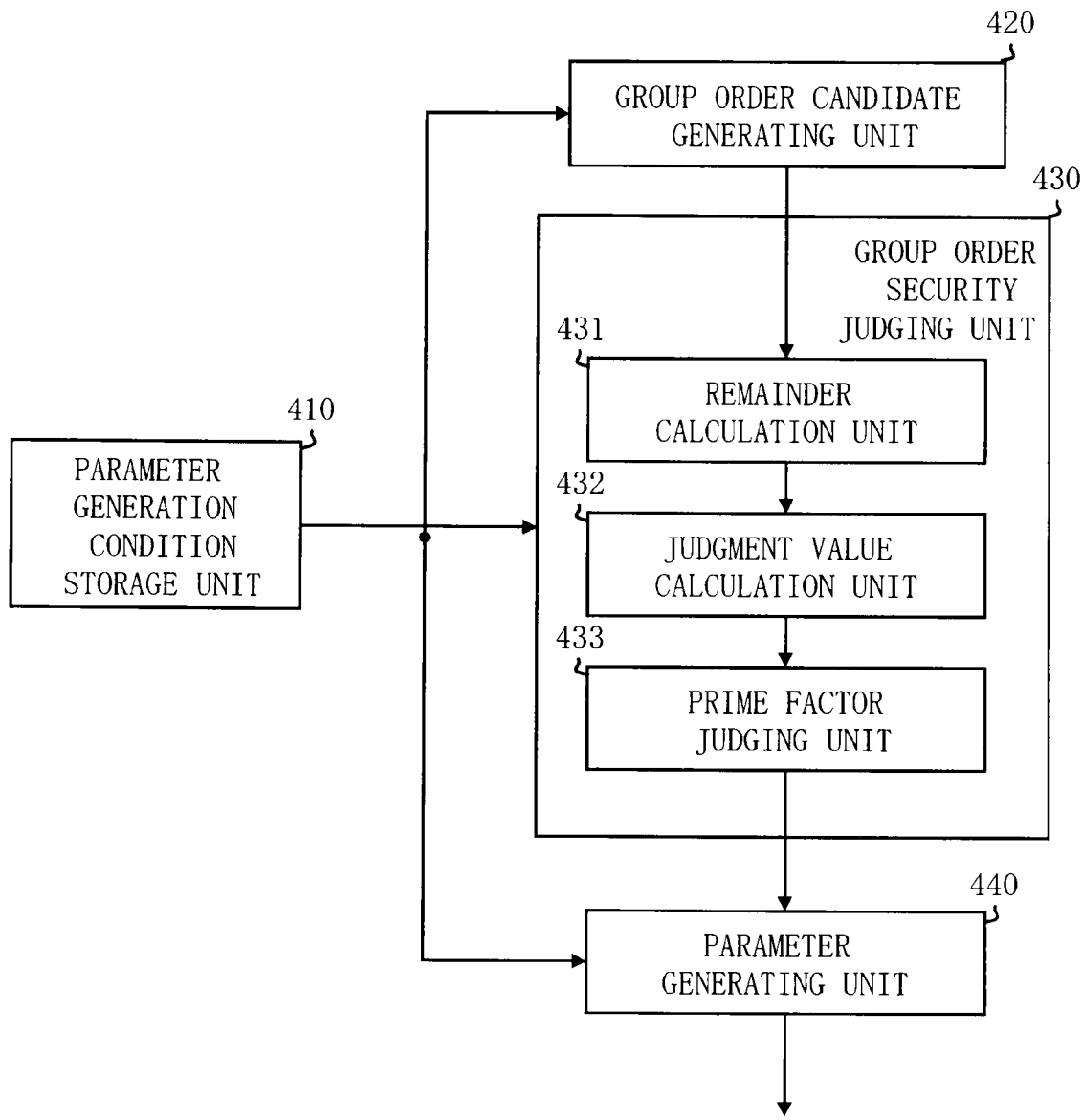
FIG. 26 is a block diagram showing an example of the functional block configuration of the group parameter generating apparatus 400 according to Embodiment 4.
Figure 27:
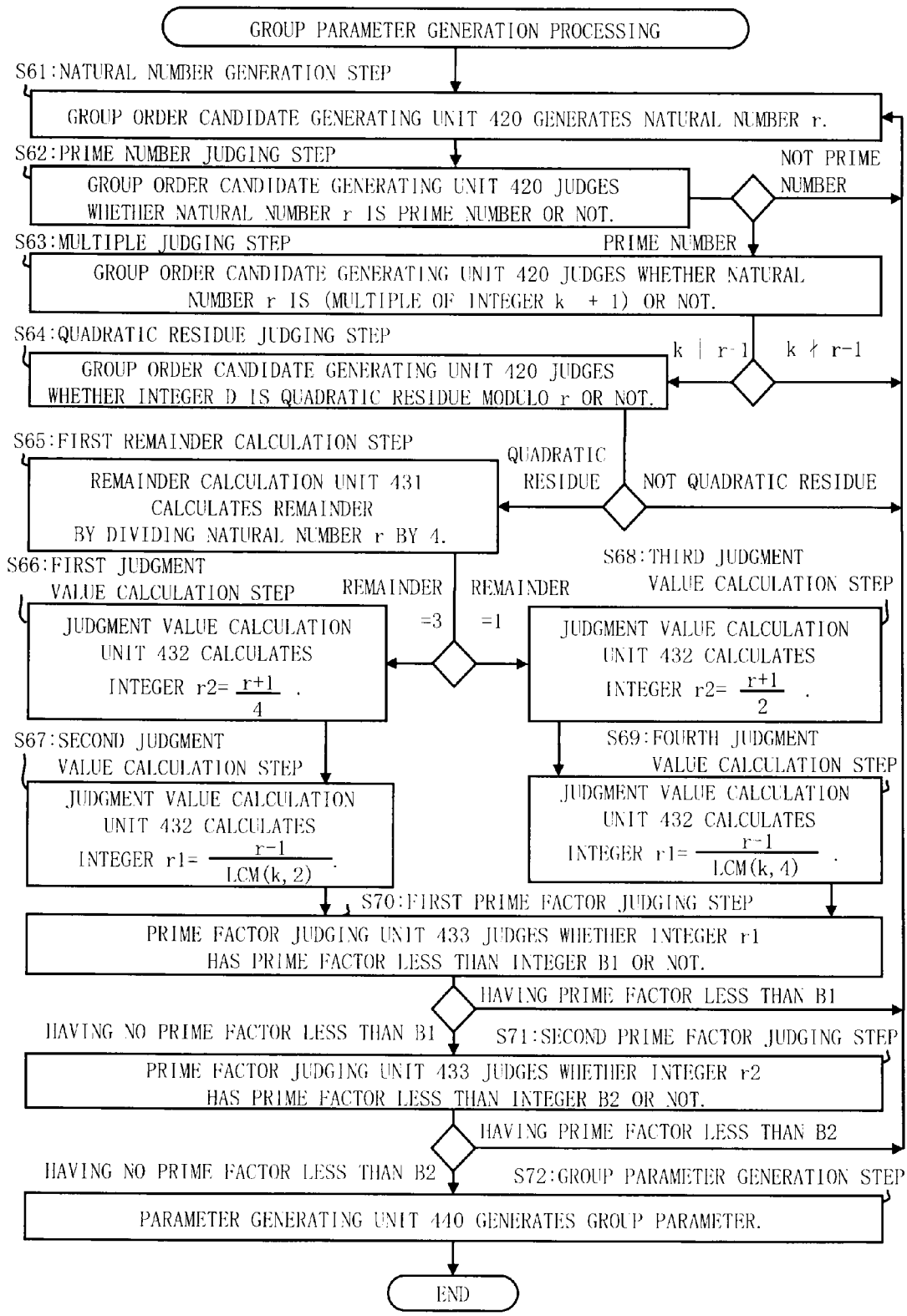
FIG. 27 is a flowchart showing an example of the flow of group parameter generation processing in which the group parameter generating apparatus 400 generates a group parameter, according to Embodiment 4.
Figure 28:
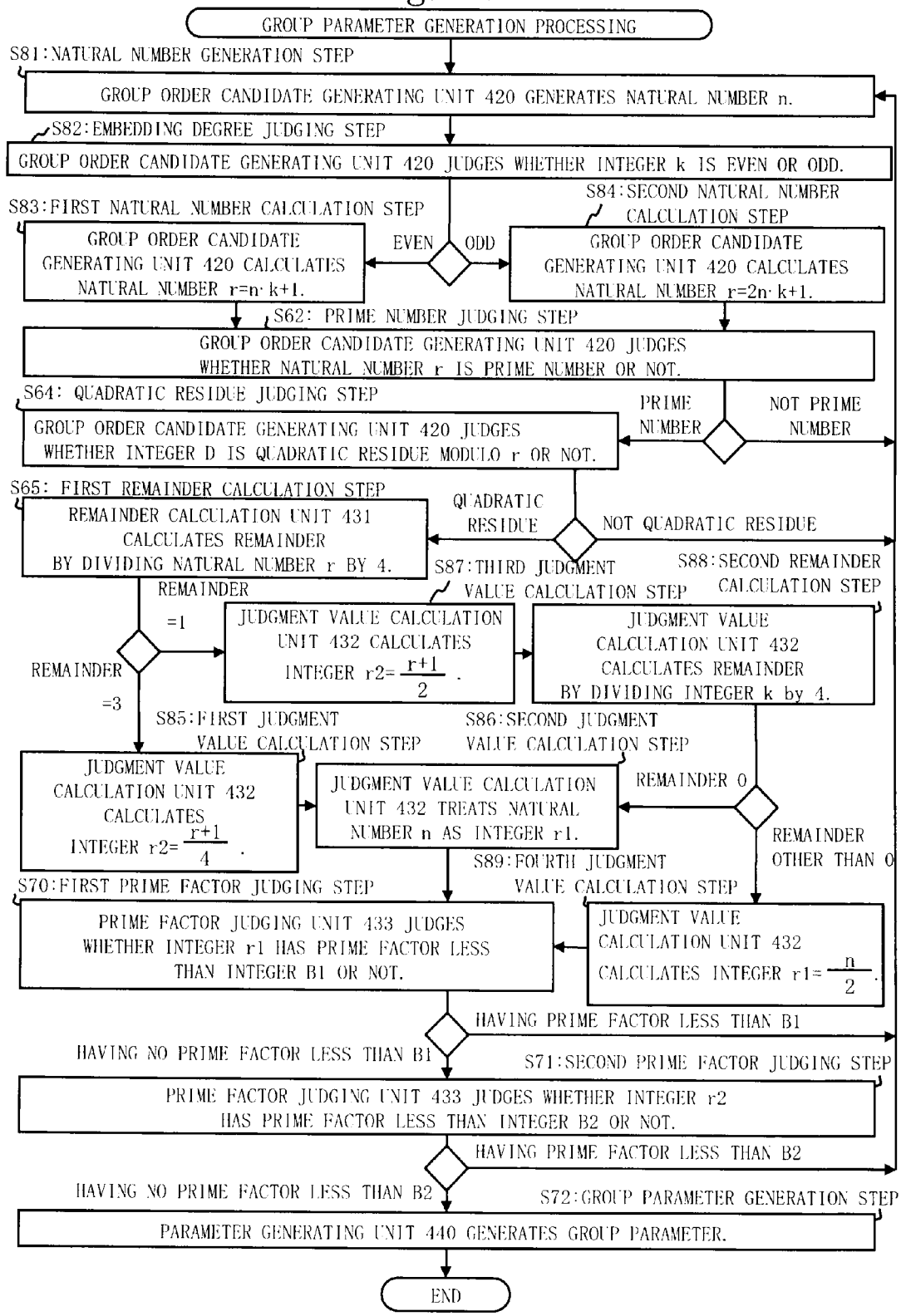
FIG. 28 is a flowchart showing an example of the flow of group parameter generation processing in which the group parameter generating apparatus 400 generates a group parameter, according to Embodiment 5.

100 Encryption parameter generating apparatus, 110 Parameter setting unit, 111 Group parameter storage unit, 112 Secret information generating unit, 113 Public parameter generating unit, 114 Public parameter publishing unit, 121 Secret information storage unit, 122 Parameter storage unit, 130 Secret key setting unit, 131 Identification information input unit, 132 Secret key generating unit, 133 Secret key notification unit, 200 Ciphertext generating apparatus, 210 Encryption parameter storage unit, 221 Session key generating unit, 222 Random number generating unit, 231 Plaintext input unit, 232 Recipient identification input unit, 240 Ciphertext body generating unit, 241 First ciphertext generating unit, 242 Second ciphertext generating unit, 243 Third ciphertext generating unit, 244 Hash value calculation unit, 245 Ciphertext verification text generating unit, 246 Ciphertext combining unit, 251 Data input unit, 252 Data encryption unit, 261 Ciphertext notification unit, 290 Key encryption unit, 301 to 303 Ciphertext receiving apparatus, 310 Public parameter storage unit, 323 Secret key storage unit, 341 Ciphertext decryption unit, 344 Verification hash value calculation unit, 345 Ciphertext verification unit, 346 Ciphertext decomposition unit, 351 Ciphertext receiving unit, 352 Data decryption unit, 390 Key decryption unit, 400 Group parameter generating apparatus, 410 Parameter generation condition storage unit, 420 Group order candidate generating unit, 430 Group order security judging unit, 431 Remainder calculation unit, 432 Judgment value calculation unit, 433 Prime factor judging unit, 440 Parameter generating unit, 500 Published information, 510 Public encryption parameter, 531 to 533 Recipient identification information, 600 information to be notified in secrecy, 601 to 603 Secret key, 710 Plaintext data, 720 Notification data, 721 Key ciphertext C, 722 Encrypted data, 800 ID-based cryptographic communication system, 901 Display device, 902 Keyboard, 903 Mouse, 904 FDD, 905 CDD, 906 Printer, 907 Scanner, 910 System unit, 911 CPU, 912 Bus, 913 ROM, 914 RAM, 915 Communication device, 920 Magnetic disk drive, 921 OS, 922 Window system, 923 Program group, 924 File group, 931 Telephone, 932 Facsimile machine, 940 Internet, 941 Gateway, 942 LAN.

The invention claimed is:

1. A ciphertext generating apparatus that generates a ciphertext C to notify n recipient (n being an integer greater than or equal to 1) of a plaintext M comprising:

a storage device for storing information; a processing device for processing information; an encryption parameter storage unit; a recipient identification input unit; a plaintext input unit; a ciphertext body generating unit; a hash value calculation unit; a ciphertext verification text generating unit; and a ciphertext combining unit, wherein the encryption parameter storage unit stores a public encryption parameter by using the storage device, the recipient identification input unit inputs n recipient identification information $ID_i$ (i being an integer greater than or equal to 1 and less than or equal to n) for identifying the n recipient respectively, by using the processing device, the plaintext input unit inputs the plaintext M by using the processing device, the ciphertext body generating unit generates n ciphertext body $CB_i$ (i being an integer greater than or equal to 1 and less than or equal to n) corresponding to the n recipient, based on the public encryption parameter stored by the encryption parameter storage unit, the n recipient identification information $ID_i$ input by the recipient identification input unit, and the plaintext M input by the plaintext input unit, by using the processing device, the hash value calculation unit generates a combined ciphertext by combining the n ciphertext body $CB_i$ generated by the ciphertext body generating unit, by using the processing device, and calculates a hash value H based on the combined ciphertext generated, by using the processing device, the ciphertext verification text generating unit generates a ciphertext verification text CC, based on the public encryption parameter stored by the encryption parameter storage unit and the hash value H calculated by the hash value calculation unit, by using the processing device, and the ciphertext combining unit makes one ciphertext C by combining the n ciphertext body $CB_i$ generated by the ciphertext body generating unit and the ciphertext verification text CC generated by the ciphertext verification text generating unit, by using the processing device.

2. The ciphertext generating apparatus according to claim 1, further comprising a random number generating unit, wherein the random number generating unit randomly generates n integer $s_i$ (i being an integer greater than or equal to 1 and less than or equal to n) corresponding to the n recipient, by using the processing device, the ciphertext body generating unit includes a first ciphertext generating unit, a second ciphertext generating unit, and a third ciphertext generating unit, the first ciphertext generating unit generates n first ciphertext $C1_i$ (i being an integer greater than or equal to 1 and less than or equal to n) corresponding to the n recipient, based on the public encryption parameter stored by the encryption parameter storage unit, the plaintext M input by the plaintext input unit, and the n integer $s_i$ generated by the random number generating unit, by using the processing device, the second ciphertext generating unit generates n second ciphertext $C2_i$ (i being an integer greater than or equal to 1 and less than or equal to n) corresponding to the n recipient, based on the public encryption parameter stored by the encryption parameter storage unit, the n recipient identification information $ID_i$ input by the recipient identification input unit, and the n integer $s_i$ generated by the random number generating unit, by using the processing device, the third ciphertext generating unit generates n third ciphertext $C3_i$ (i being an integer greater than or equal to 1 and less than or equal to n) corresponding to the n recipient, based on the public encryption parameter stored by the encryption parameter storage unit and the n integer $s_i$ generated by the random number generating unit, by using the processing device, the n first ciphertext $C1_i$ generated by the first ciphertext generating unit, the n second ciphertext $C2_i$ generated by the second ciphertext generating unit, and the n third ciphertext $C3_i$ generated by the third ciphertext generating unit are treated as the n ciphertext body $CB_i$ corresponding to the n recipient, the hash value calculation unit makes one combined ciphertext by combining the n first ciphertext $C1_i$ generated by the first ciphertext generating unit, the n second ciphertext $C2_i$ generated by the second ciphertext generating unit, and the n third ciphertext $C3_i$ generated by the third ciphertext generating unit, by using the processing device, and calculates one hash value H based on the one combined ciphertext by using the processing device, the ciphertext verification text generating unit generates n ciphertext verification text $CC_i$ (i being an integer greater than or equal to 1 and less than or equal to n) corresponding to the n recipient, based on the public encryption parameter stored by the encryption parameter storage unit, the n integer $s_i$ generated by the random number generating unit, and the one hash value H calculated by the hash value calculation unit, by using the processing device, and the ciphertext combining unit makes the one ciphertext C by combining the n first ciphertext $C1_i$ generated by the first ciphertext generating unit, the n second ciphertext $C2_i$ generated by the second ciphertext generating unit, the n third ciphertext $C3_i$ generated by the third ciphertext generating unit, and the n ciphertext verification text $CC_i$ generated by the ciphertext verification text generating unit, by using the processing device.

3. The ciphertext generating apparatus according to claim 2, wherein the encryption parameter storage unit stores information, as public encryption parameters, indicating a natural number r, a multiplicative group G1 whose order is the natural number r, a multiplicative group G2 whose order is the natural number r, a multiplicative group GT whose order is the natural number r, a pairing e for calculating an element of the multiplicative group GT from an element of the multiplicative group G1 and an element of the multiplicative group G2, a key generation function KDF for calculating a bit sequence of predetermined length from the element of the multiplicative group GT, a hash function HF for calculating a natural number being less than the natural number r from a bit sequence of arbitrary length, an element g of the multiplicative group G1, an element g1 of the multiplicative group G1, an element g2 of the multiplicative group G2, an element h1 of the multiplicative group G2, an element h2 of the multiplicative group G2, and an element h3 of the multiplicative group G2, by using the storage device, the recipient identification input unit inputs n integer $ID_i$ as n recipient identification information, by using the processing device, the random number generating unit randomly generates the n integer $s_i$ being greater than or equal to 1 and less than the natural number r, (i being an integer greater than or equal to 1 and less than or equal to n) corresponding to the n recipient, based on the natural number r indicated by the public encryption parameter stored by the encryption parameter storage unit, by using the processing device, the first ciphertext generating unit calculates n key bit sequence $k_i = KDF(e(g, h1)\hat{\ }s_i)$ (i being an integer greater than or equal to 1 and less than or equal to n) corresponding to the n recipient, based on the element g of the multiplicative group G1, the element h1 of the multiplicative group G2, the pairing e, and the key generation function KDF indicated by the public encryption parameters stored by the encryption parameter storage unit, and the n integer $s_i$ generated by the random number generating unit, by using the processing device, and generates the n first ciphertext $C1_i$ (i being an integer greater than or equal to 1 and less than or equal to n) corresponding to the n recipient by respectively encrypting the plaintext M input by the plaintext input unit, with the n key bit sequence $k_i$ calculated, by using the processing device, the second ciphertext generating unit calculates n element $u_i = (g1 \cdot g\hat{\ }-ID_i)\hat{\ }s_i$ (i being an integer greater than or equal to 1 and less than or equal to n) of the multiplicative group G1 corresponding to the n recipient, based on the element g of the multiplicative group G1 and the element g1 of the multiplicative group G1 indicated by the public encryption parameters stored by the encryption parameter storage unit, the n integer $ID_i$ input by the recipient identification input unit, and the n integer $s_i$ generated by the random number generating unit, and treats each bit sequence, indicating each calculated n element $u_i$ of the multiplicative group G1, as the n second ciphertext $C2_i$ (i being an integer greater than or equal to 1 and less than or equal to n) corresponding to the n recipient, by using the processing device, the third ciphertext generating unit calculates n element $v_i = e(g, g2)\hat{\ }s_i$ (i being an integer greater than or equal to 1 and less than or equal to n) of the multiplicative group GT corresponding to the n recipient, based on the element g of the multiplicative group G1, the element g2 of the multiplicative group G2, and the pairing e indicated by the public encryption parameters stored by the encryption parameter storage unit and the n integer $s_i$ generated by the random number generating unit, and treats each bit sequence, indicating each calculated element $v_i$ of the multiplicative group GT, as the n third ciphertext $C3_i$ (i being an integer greater than or equal to 1 and less than or equal to n) corresponding to the n recipient, by using the processing device, the hash value calculation unit calculates one natural number $\beta_0$ to be treated as the hash value H, based on the hash function HF indicated by the public encryption parameter stored by the encryption parameter storage unit, by using the processing device, and the ciphertext verification text generating unit calculates n element $y_i = e(g, h2)\hat{\ }s_i \cdot e(g, h3)\hat{\ }(s_i \cdot \beta_0)$ (i being an integer greater than or equal to 1 and less than or equal to n) of the multiplicative group GT corresponding to the n recipient, based on the element g of the multiplicative group G1, the element h2 of the multiplicative group G2, the element h3 of the multiplicative group G2, and the pairing e indicated by the public encryption parameter stored by the encryption parameter storage unit, the n integer $s_i$ generated by the random number generating unit, and the one natural number $\beta_0$ calculated by the hash value calculation unit, and treats each bit sequence, indicating each calculated n element $y_i$ of the multiplicative group GT, as the n ciphertext verification text $CC_i$ (i being an integer greater than or equal to 1 and less than or equal to n) corresponding to the n recipient, by using the processing device.

4. The ciphertext generating apparatus according to claim 2, wherein the encryption parameter storage unit stores information indicating, as public encryption parameters, a natural number r, a multiplicative group G1 whose order is the natural number r, a multiplicative group G2 whose order is the natural number r, a multiplicative group GT whose order is the natural number r, a pairing e for calculating an element of the multiplicative group GT from an element of the multiplicative group G1 and an element of the multiplicative group G2, a key generation function KDF for calculating a bit sequence of predetermined length from an element of the multiplicative group GT, two functions V1 and V2 for calculating an element of the multiplicative group GT from a bit sequence of predetermined length, a hash function HF for calculating a bit sequence of predetermined length from a bit sequence of arbitrary length, an element g of the multiplicative group G1, an element g1 of the multiplicative group G1, and an element g2 of the multiplicative group G2, by using the storage device, the recipient identification input unit inputs n bit sequence $ID_i$ of predetermined length, as n recipient identification information, by using the processing device, the random number generating unit randomly generates the n integer $s_i$, being greater than or equal to 1 and less than the natural number r, (i being an integer greater than or equal to 1 and less than or equal to n) corresponding to the n recipient, based on the natural number r indicated by the public encryption parameter stored by the encryption parameter storage unit, by using the processing device, the first ciphertext generating unit calculates n key bit sequence $k_i = KDF(e(g1, g2)\hat{\ }s_i)$ (i being an integer greater than or equal to 1 and less than or equal to n) corresponding to the n recipient, based on the element g1 of the multiplicative group G1, the element g2 of the multiplicative group G2, the pairing e and the key generation function KDF indicated by the public encryption parameters stored by the encryption parameter storage unit, and the n integer $s_i$ generated by the random number generating unit, by using the processing device, and generates the n first ciphertext $C1_i$ (i being an integer greater than or equal to 1 and less than or equal to n) corresponding to the n recipient by respectively encrypting the plaintext M input by the plaintext input unit, with the n key bit sequence $k_i$ calculated, by using the processing device, the second ciphertext generating unit calculates n element $u_i = V1(ID_i)\hat{\ }s_i$ (i being an integer greater than or equal to 1 and less than or equal to n) of the multiplicative group G2 corresponding to the n recipient, based on the function V1 indicated by the public encryption parameter stored by the encryption parameter storage unit, the n integer $s_i$ generated by the random number generating unit, and the n bit sequence $ID_i$ of predetermined length input by the recipient identification input unit, and treats each bit sequence, indicating each calculated n element $u_i$ of the multiplicative group G2, as the n second ciphertext $C2_i$ (i being an integer greater than or equal to 1 and less than or equal to n) corresponding to the n recipient, by using the processing device, the third ciphertext generating unit calculates n element $v_i = g \hat{} s_i$ (i being an integer greater than or equal to 1 and less than or equal to n) of the multiplicative group G1 corresponding to the n recipient, based on the element g of the multiplicative group G1 indicated by the public encryption parameter stored by the encryption parameter storage unit and the n integer $s_i$ generated by the random number generating unit, and treats each bit sequence, indicating each calculated n element $v_i$ of the multiplicative group G1, as the n third ciphertext $C3_i$ (i being an integer greater than or equal to 1 and less than or equal to n) corresponding to the n recipient, by using the processing device, the hash value calculation unit calculates one bit sequence $w_0$ of predetermined length to be treated as the hash value H, based on the hash function HF indicated by the public encryption parameter stored by the encryption parameter storage unit, by using the processing device, and the ciphertext verification text generating unit calculates n element $y_i = V2(w_0) \hat{} s_i$ (i being an integer greater than or equal to 1 and less than or equal to n) of the multiplicative group G2 corresponding to the n recipient, based on the function V2 indicated by the public encryption parameter stored by the encryption parameter storage unit, the n integer $s_i$ generated by the random number generating unit, and the one bit sequence $w_0$ of predetermined length calculated by the hash value calculation unit, and treats each bit sequence, indicating each calculated n element $y_i$ of the multiplicative group G2, as the n ciphertext verification text $CC_i$ (i being an integer greater than or equal to 1 and less than or equal to n) corresponding to the n recipient, by using the processing unit.

5. The ciphertext generating apparatus according to claim 1, wherein the ciphertext body generating unit generates n ciphertext body $CB_i$ including n recipient identification information $ID_i$, which has been input by the recipient identification input unit, by using the processing device.

6. The ciphertext generating apparatus according to claim 1, further comprising a ciphertext notification unit, wherein the ciphertext notification unit notifies the n recipient identified by the n recipient identification information $ID_i$ input by the recipient identification input unit, of one ciphertext C combined by the ciphertext combining unit, by using the processing device.

7. The ciphertext generating apparatus according to claim 1, further comprising a session key generating unit, wherein the session key generating unit randomly generates a bit sequence of predetermined length, as a session key K, by using the processing device, and the plaintext input unit inputs the session key K generated by the session key generating unit, as the plaintext M, by using the processing device.

8. The ciphertext generating apparatus according to claim 7, further comprising a data input unit; a data encryption unit; and a ciphertext notification unit, wherein the data input unit inputs one plaintext data to be transmitted to the n recipient, by using the processing device, the data encryption unit generates one encrypted data by encrypting the one plaintext data input by the data input unit, with the session key K generated by the session key generating unit, by using the processing device, and the ciphertext notification unit notifies the n recipient identified by the n recipient identification information $ID_i$ input by the recipient identification input unit of the one ciphertext C combined by the ciphertext combining unit and the one encrypted data encrypted by the data encryption unit, by using the processing device.

9. A cryptographic communication system that notifies n recipient (n being an integer greater than or equal to 1), each having a corresponding ciphertext receiving apparatus, of a plaintext M through one ciphertext C, the system comprising:

an encryption parameter generating apparatus; a ciphertext generating apparatus; and a plurality of ciphertext receiving apparatuses wherein the encryption parameter generating apparatus includes a storage device for storing information, a processing device for processing information, a secret information generating unit, a secret information storage unit, a public parameter generating unit, a public parameter publishing unit, an identification information input unit, a secret key generating unit, and a secret key notification unit, the secret information generating unit randomly generates secret information by using the processing device, the secret information storage unit stores the secret information generated by the secret information generating unit, by using the storage device, the public parameter generating unit generates a public encryption parameter, based on the secret information generated by the secret information generating unit, by using the processing device, the public parameter publishing unit publishes the public encryption parameter generated by the public parameter generating unit, by using the processing device, the identification information input unit inputs recipient identification information ID for identifying one recipient corresponding to one ciphertext receiving apparatus among the plurality of ciphertext receiving apparatuses, by using the processing device, the secret key generating unit generates a secret key $d_{ID}$ corresponding to the one recipient, based on the secret information stored by the secret information storage unit, the public encryption parameter generated by the public parameter generating unit, and the recipient identification information ID input by the identification information input unit, by using the processing device, the secret key notification unit secretly notifies the one ciphertext receiving apparatus corresponding to the one recipient of the secret key $d_{ID}$ generated by the secret key generating unit, by using the processing device, wherein the ciphertext generating apparatus includes a storage device for storing information, a processing device for processing information, an encryption parameter storage unit, a recipient identification input unit, a plaintext input unit, a ciphertext body generating unit, a hash value calculation unit, a ciphertext verification text generating unit, a ciphertext combining unit, and a ciphertext notification unit, the encryption parameter storage unit stores the public encryption parameter published by the encryption parameter generating apparatus, by using the storage device, the recipient identification input unit inputs n recipient identification information $ID_i$ (i being an integer greater than or equal to 1 and less than or equal to n) for respectively identifying the n recipient, by using the processing device, the plaintext input unit inputs the plaintext M by using the processing device, the ciphertext body generating unit generates n ciphertext body $CB_i$ (i being an integer greater than or equal to 1 and less than or equal to n) corresponding to the n recipient, based on the public encryption parameter stored by the encryption parameter storage unit, the n recipient identification information $ID_i$ input by the recipient identification input unit, and the plaintext M input by the plaintext input unit, by using the processing device, the hash value calculation unit generates a combined ciphertext by combining the n ciphertext body $CB_i$ generated by the ciphertext body generating unit, by using the processing device, and calculates a hash value H based on the combined ciphertext generated, by using the processing device, the ciphertext verification text generating unit generates a ciphertext verification text CC, based on the public encryption parameter stored by the encryption parameter storage unit and the hash value H calculated by the hash value calculation unit, by using the processing device, the ciphertext combining unit makes one ciphertext C by combining the n ciphertext body $CB_i$ generated by the ciphertext body generating unit and the ciphertext verification text CC generated by the ciphertext verification text generating unit, by using the processing device, the ciphertext notification unit notifies n ciphertext receiving apparatus corresponding to the n recipient of the one ciphertext C combined by the ciphertext combining unit, by using the processing device, wherein each of the plurality of ciphertext receiving apparatuses includes a storage device for storing information, a processing device for processing information, a public parameter storage unit, a secret key storage unit, a ciphertext receiving unit, a ciphertext decomposition unit, a verification hash value calculation unit, a ciphertext verification unit, and a ciphertext decryption unit, the public parameter storage unit stores the public encryption parameter published by the encryption parameter generating apparatus, by using the storage device, the secret key storage unit stores the secret key $d_{ID}$ notified by the encryption parameter generating apparatus, by using the storage device, the ciphertext receiving unit receives the one ciphertext C notified by the ciphertext generating apparatus, by using the processing device, the ciphertext decomposition unit acquires the n ciphertext body $CB_i$ and the ciphertext verification text CC, based on the one ciphertext C received by the ciphertext receiving unit, by using the processing device, the verification hash value calculation unit calculates a verification hash value H', based on a combined verification ciphertext made by combining the n ciphertext body $CB_i$ acquired by the ciphertext decomposition unit, by using the processing device, the ciphertext verification unit judges whether the one ciphertext C received by the ciphertext receiving unit has consistency or not, based on the public encryption parameter stored by the public parameter storage unit, one corresponding ciphertext body $CB_{ID}$ corresponding to a recipient corresponding to a ciphertext receiving apparatus among the n ciphertext body $CB_i$ acquired by the ciphertext decomposition unit, the ciphertext verification text CC, and the verification hash value H' calculated by the verification hash value calculation unit, by using the processing device, and when the ciphertext verification unit judges that the one ciphertext C received by the ciphertext receiving unit has consistency, the ciphertext decryption unit restores the plaintext M, based on the public encryption parameter stored by the public parameter storage unit, the secret key $d_{ID}$ stored by the secret key storage unit, and the one corresponding ciphertext body $CB_{ID}$ corresponding to the recipient corresponding to the ciphertext receiving apparatus among the n ciphertext body $CB_i$ acquired by the ciphertext decomposition unit, by using the processing device.

10. The cryptographic communication system according to claim 9, wherein the ciphertext generating apparatus further includes a random number generating unit, the random number generating unit randomly generates n integer $s_i$ (i being an integer greater than or equal to 1 and less than or equal to n) corresponding to the n recipient, by using the processing device, the ciphertext body generating unit includes a first ciphertext generating unit, a second ciphertext generating unit, and a third ciphertext generating unit, the first ciphertext generating unit generates n first ciphertext $C1_i$ (i being an integer greater than or equal to 1 and less than or equal to n) corresponding to the n recipient, based on the public encryption parameter stored by the encryption parameter storage unit, the plaintext M input by the plaintext input unit, and the n integer $s_i$ generated by the random number generating unit, by using the processing device, the second ciphertext generating unit generates n second ciphertext $C2_i$ (i being an integer greater than or equal to 1 and less than or equal to n) corresponding to the n recipient, based on the public encryption parameter stored by the encryption parameter storage unit, the n recipient identification information $ID_i$ input by the recipient identification input unit, and the n integer $s_i$ generated by the random number generating unit, by using the processing device, the third ciphertext generating unit generates n third ciphertext $C3_i$ (i being an integer greater than or equal to 1 and less than or equal to n) corresponding to the n recipient, based on the public encryption parameter stored by the encryption parameter storage unit, and the n integer $s_i$ generated by the random number generating unit, by using the processing device, the n first ciphertext $C1_i$ generated by the first ciphertext generating unit, the n second ciphertext $C2_i$ generated by the second ciphertext generating unit, and the n third ciphertext $C3_i$ generated by the third ciphertext generating unit are treated as the n ciphertext body $CB_i$ corresponding to the n recipient, the hash value calculation unit makes one combined ciphertext by combining the n first ciphertext $C1_i$ generated by the first ciphertext generating unit, the n second ciphertext $C2_i$ generated by the second ciphertext generating unit, and the n third ciphertext $C3_i$ generated by the third ciphertext generating unit, by using the processing device, and calculates one hash value H, based on the one combined ciphertext, by using the processing device, the ciphertext verification text generating unit generates n ciphertext verification text $CC_i$ (i being an integer greater than or equal to 1 and less than or equal to n) corresponding to the n recipient, based on the public encryption parameter stored by the encryption parameter storage unit, the n integer $s_i$ generated by the random number generating unit, and the one hash value H calculated by the hash value calculation unit, by using the processing device, the ciphertext combining unit makes the one ciphertext C by combining the n first ciphertext $C1_i$ generated by the first ciphertext generating unit, the n second ciphertext $C2_i$ generated by the second ciphertext generating unit, the n third ciphertext $C3_i$ generated by the third ciphertext generating unit, and the n ciphertext verification text $CC_i$ generated by the ciphertext verification text generating unit, by using the processing device, the ciphertext decomposition unit acquires the n first ciphertext $C1_i$, the n second ciphertext $C2_i$, the n third ciphertext $C3_i$, and the n ciphertext verification text $CC_i$, based on the one ciphertext C received by the ciphertext receiving unit, by using the processing device, and acquires one corresponding first ciphertext $C1_{ID}$, one corresponding second ciphertext $C2_{ID}$, one corresponding third ciphertext $C3_{ID}$, and one corresponding ciphertext verification text $CC_{ID}$ which are corresponding to the recipient corresponding to the ciphertext receiving apparatus, among the n first ciphertext $C1_i$, the n second ciphertext $C2_i$, the n third ciphertext $C3_i$, and the n ciphertext verification text $CC_i$ which have been acquired, by using the processing device, the verification hash value calculation unit calculates the verification hash value H', based on the combined verification ciphertext made by combining the n first ciphertext $C1_i$, the n second ciphertext $C2_i$, and the n third ciphertext $C3_i$ acquired by the ciphertext decomposition unit, by using the processing device, the ciphertext verification unit judges whether the one ciphertext C received by the ciphertext receiving unit has consistency or not, based on the public encryption parameter stored by the public parameter storage unit, at least either one of the one corresponding second ciphertext $C2_{ID}$ and the one corresponding third ciphertext $C3_{ID}$, and the one corresponding ciphertext verification text $CC_{ID}$ which have been acquired by the ciphertext decomposition unit, and the verification hash value H' calculated by the verification hash value calculation unit, by using the processing device, and when the ciphertext verification unit judges that the one ciphertext C received by the ciphertext receiving unit has consistency, the ciphertext decryption unit restores the plaintext M, based on the public encryption parameter stored by the public parameter storage unit, the secret key $d_{ID}$ stored by the secret key storage unit, and the one corresponding first ciphertext $C1_{ID}$, the one corresponding second ciphertext $C2_{ID}$, and the one corresponding third ciphertext $C3_{ID}$ acquired by the ciphertext decomposition unit, by using the processing device.

11. The cryptographic communication system according to claim 9, wherein the ciphertext body generating unit generates the n ciphertext body $CB_i$ including the n recipient identification information $ID_i$ input by the recipient identification input unit, by using the processing device.

12. The cryptographic communication system according to claim 9, wherein the ciphertext generating apparatus further includes a session key generating unit, a data input unit, a data encryption unit, and a ciphertext notification unit, the session key generating unit randomly generates a bit sequence of predetermined length, as a session key K, by using the processing device, the plaintext input unit inputs the session key K generated by the session key generating unit, as the plaintext M, by using the processing device, the data input unit inputs one plaintext data to be transmitted to the n recipient, by using the processing device, the data encryption unit generates one encrypted data by encrypting the one plaintext data input by the data input unit, with the session key K generated by the session key generating unit, by using the processing device, the ciphertext notification unit notifies the n recipient identified by the n recipient identification information input by the recipient identification input unit of one ciphertext C combined by the ciphertext combining unit and the one encrypted data encrypted by the data encryption unit, by using the processing device, each of the plurality of ciphertext receiving apparatuses further includes a data decryption unit, the ciphertext receiving unit receives the one ciphertext C and the one encrypted data notified by the ciphertext generating apparatus, by using the processing device, and the data decryption unit treats the plaintext M decrypted by the ciphertext decryption unit as a session key K', and decrypts the one encrypted data received by the ciphertext receiving unit with the session key K', by using the processing device.

13. A group parameter generating apparatus for generating a parameter of a multiplicative group used for encryption processing in a cryptographic communication system that notifies n recipient (n being an integer greater than or equal to 1), each having a corresponding ciphertext receiving apparatus, of a plaintext M through one ciphertext C, the group parameter generating apparatus comprising:

a processing device for processing information; a group order candidate generating unit; a group order security judging unit; and a parameter generating unit, wherein the group order candidate generating unit generates a prime number r as a group order candidate, by using the processing device, the group order security judging unit calculates a factor of (r−1) being a difference between the prime number r and 1, and a factor of (r+1) being a sum of the prime number r and 1, based on the prime number r generated by the group order candidate generating unit, by using the processing device, and judges whether the prime number r generated by the group order candidate generating unit is a secure group order or not, based on a calculated factor of (r−1) and a calculated factor of (r+1), by using the processing device, when the group order security judging unit judges that the prime number r generated by the group order candidate generating unit is a secure group order, the parameter generating unit calculates a multiplicative group whose group order is the prime number r, based on the prime number r generated by the group order candidate generating unit, by using the processing device, and generates a group parameter including information indicating the multiplicative group calculated, by using the processing device, and the group parameter storage unit stores the group parameter generated by the group parameter generating apparatus, by using the storage device.

14. The group parameter generating apparatus according to claim 13,
- wherein the group order candidate generating unit generates the prime number r by adding 1 to a multiple of a predetermined integer k, as the group order candidate, by using the processing device,
- the group order security judging unit includes a remainder calculation unit, a judgment value calculation unit, and a prime factor judging unit,
- the remainder calculation unit calculates a remainder by dividing the prime number r by 4, based on the prime number r generated by the group order candidate generating unit, by using the processing device,
- when the remainder calculated by the remainder calculation unit is 1, the judgment value calculation unit calculates an integer $r1=(r-1)/LCM(k,4)$, which is a quotient obtained by dividing the difference $(r-1)$ between the prime number r and 1 by a least common multiple $LCM(k,4)$ of an integer k and 4, based on the predetermined integer k and the prime number r generated by the group order candidate generating unit, by using the processing device, and calculates an integer $r2=(r+1)/2$, which is a quotient obtained by dividing the sum $(r+1)$ of the prime number r and 1 by 2, based on the prime number r generated by the group order candidate generating unit, by using the processing device, and when the remainder calculated by the remainder calculation unit is 3, the judgment value calculation unit calculates an integer $r1=(r-1)/LCM(k,2)$, which is a quotient obtained by dividing the difference $(r-1)$ between the prime number r and 1 by a least common multiple $LCM(k,2)$ of the integer k and 2, based on the predetermined integer k and the prime number r generated by the group order candidate generating unit, by using the processing device, and calculates an integer $r2=(r+1)/4$, which is a quotient obtained by dividing the sum $(r+1)$ of the prime number r and 1 by 4, based on the prime number r generated by the group order candidate generating unit, by using the processing device, and
- the prime factor judging unit judges whether the integer r1 has a prime factor less than a predetermined integer B1 or not, based on the integer r1 calculated by the judgment value calculation unit, by using the processing device, and judges whether the integer r2 has a prime factor less than a predetermined integer B2 or not, based on the integer r2 calculated by the judgment value calculation unit, by using the processing device, and when it is judged that the integer r1 has a prime factor less than the predetermined integer B1 and when it is judged that the integer r2 has a prime factor less than the predetermined integer B2, the prime factor judging unit judges that the prime number r generated by the group order candidate generating unit is not a secure group order.

15. The group parameter generating apparatus according to claim 13,
- wherein the group order candidate generating unit generates the prime number r by adding 1 to a multiple of a predetermined integer k, as a group order candidate, by using the processing device,
- the group order security judging unit includes a remainder calculation unit, a judgment value calculation unit, and a prime factor judging unit,
- the remainder calculation unit calculates a remainder by dividing the prime number r by 4, based on the prime number r generated by the group order candidate generating unit, by using the processing device,
- when the remainder calculated by the remainder calculation unit is 1, the judgment value calculation unit calculates an integer $r1=(r-1)/LCM(k,4)$, which is a quotient obtained by dividing the difference $(r-1)$ between the prime number r and 1 by a least common multiple $LCM(k,4)$ of an integer k and 4, based on the predetermined integer k and the prime number r generated by the group order candidate generating unit, by using the processing device, and calculates an integer $r2=(r+1)/2$, which is a quotient obtained by dividing the sum $(r+1)$ of the prime number r and 1 by 2, based on the prime number r generated by the group order candidate generating unit, by using the processing device, and when the remainder calculated by the remainder calculation unit is 3, the judgment value calculation unit calculates an integer $r1=(r-1)/LCM(k,2)$, which is a quotient obtained by dividing the difference $(r-1)$ between the prime number r and 1 by a least common multiple $LCM(k,2)$ of the integer k and 2, based on the predetermined integer k and the prime number r generated by the group order candidate generating unit, by using the processing device, and calculates an integer $r2=(r+1)/4$, which is a quotient obtained by dividing the sum $(r+1)$ of the prime number r and 1 by 4, based on the prime number r generated by the group order candidate generating unit, by using the processing device, and
- the prime factor judging unit judges whether the integer r1 is a prime number or not, based on the integer r1 calculated by the judgment value calculation unit, by using the processing device, and judges whether the integer r2 is a prime number or not, based on the integer r2 calculated by the judgment value calculation unit, by using the processing device, and when it is judged that the integer r1 is not a prime number and when it is judged that the integer r2 is not a prime number, the prime factor judging unit judges that the prime number r generated by the group order candidate generating unit is not a secure group order.

\* \* \* \* \*